US010977811B2

(12) United States Patent
Patriarche

(10) Patent No.: US 10,977,811 B2
(45) Date of Patent: Apr. 13, 2021

(54) METHODS AND SYSTEMS THAT NORMALIZE IMAGES, GENERATE QUANTITATIVE ENHANCEMENT MAPS, AND GENERATE SYNTHETICALLY ENHANCED IMAGES

(71) Applicant: AI Analysis, Inc., Bellevue, WA (US)

(72) Inventor: Julia Patriarche, Bellevue, WA (US)

(73) Assignee: AI Analysis, Inc., Bellevue, WA (US)

( * ) Notice: Subject to any disclaimer, the term of this patent is extended or adjusted under 35 U.S.C. 154(b) by 0 days.

(21) Appl. No.: 16/654,345

(22) Filed: Oct. 16, 2019

(65) Prior Publication Data

US 2020/0118282 A1   Apr. 16, 2020

Related U.S. Application Data

(63) Continuation-in-part of application No. 16/251,412, filed on Jan. 18, 2019, now Pat. No. 10,672,113, and
(Continued)

(51) Int. Cl.
*G06T 7/32* (2017.01)
*G06T 5/00* (2006.01)
(Continued)

(52) U.S. Cl.
CPC .................. *G06T 7/32* (2017.01); *G06T 5/003* (2013.01); *G06T 5/40* (2013.01); *G06T 7/12* (2017.01)

(58) Field of Classification Search
CPC ........... G06T 7/32; G06T 7/12; G06T 7/0012; G06T 7/248; G06T 7/33; G06T 7/90;
(Continued)

(56) References Cited

U.S. PATENT DOCUMENTS 8,965,121 B2 * 2/2015 McNamer ............. G06T 11/001
382/167
9,002,134 B2 * 4/2015 Knapp ..................... G06T 5/002
382/265
(Continued)

OTHER PUBLICATIONS

"Histogram Equalization-Based Techniques for Contrast Enhancement of MRI Brain Glioma Tumor Images: Comparative Study"; Hiba MZOUGHI, 4th International Conference on Advanced Technologies for Signal and Image Processing 2018 (Year: 2018).*
(Continued)

*Primary Examiner* — Michael S Osinski
(74) *Attorney, Agent, or Firm* — Olympic Patent Works, PLLC

(57) ABSTRACT

The current document is directed to digital-image-normalization methods and systems that generate accurate intensity mappings between the intensities in two digital images. The intensity mapping generated from two digital images is used to normalize or adjust the intensities in one image in order to produce a pair of normalized digital images to which various types of change-detection methodologies can be applied in order to extract differential data. Accurate intensity mappings facilitate accurate and robust normalization of sets of multiple digital images which, in turn, facilitates many additional types of operations carried out on sets of multiple normalized digital images, including change detection, quantitative enhancement, synthetic enhancement, and additional types of digital-image processing, including processing to remove artifacts and noise from digital images.

20 Claims, 109 Drawing Sheets

Related U.S. Application Data a continuation-in-part of application No. 16/279,810, filed on Feb. 19, 2019, now Pat. No. 10,783,699, and a continuation-in-part of application No. 16/228,246, filed on Dec. 20, 2018, now abandoned.

(60) Provisional application No. 62/819,335, filed on Mar. 15, 2019, provisional application No. 62/608,468, filed on Dec. 20, 2017.

(51) Int. Cl.
*G06T 7/12* (2017.01)
*G06T 5/40* (2006.01)

(58) Field of Classification Search
CPC .. G06T 7/97; G06T 5/003; G06T 5/40; G06T 5/009; G06T 5/002; G06T 5/008; G06T 5/50; G06T 5/007; G06T 2207/10024; G06T 2207/20008; G06T 2207/20012; G06T 2207/20021; G06T 3/0068; G06T 3/0093; G06T 3/4038; G06K 9/4671; G06K 9/6215
See application file for complete search history.

(56) References Cited

U.S. PATENT DOCUMENTS

| | | | | |
|---|---|---|---|---|
| 10,192,295 B2* | 1/2019 | Patriarche | | G06T 7/97 |
| 10,453,204 B2* | 10/2019 | Wang | | G06T 5/50 |
| 10,825,155 B2* | 11/2020 | Boehm | | G06T 5/50 |
| 2004/0032982 A1* | 2/2004 | Nishizawa | | H04N 5/147 |
| | | | | 382/171 |
| 2007/0230788 A1* | 10/2007 | Lei | | G06T 5/40 |
| | | | | 382/186 |
| 2010/0232643 A1* | 9/2010 | Chen | | G06T 7/248 |
| | | | | 382/103 |
| 2010/0278423 A1* | 11/2010 | Itoh | | G06T 5/40 |
| | | | | 382/169 |
| 2013/0222645 A1* | 8/2013 | Bilcu | | H04N 19/162 |
| | | | | 348/239 |
| 2014/0125773 A1* | 5/2014 | Maki | | G06T 7/90 |
| | | | | 348/47 |
| 2017/0300778 A1* | 10/2017 | Sato | | H04N 5/2257 |
| 2018/0028156 A1* | 2/2018 | Matsunaga | | A61B 8/4254 |
| 2018/0082454 A1* | 3/2018 | Sahu | | G06T 5/002 |
| 2019/0043176 A1* | 2/2019 | Li | | G06T 5/40 |
| 2019/0080441 A1* | 3/2019 | Guo | | G06T 5/009 |
| 2019/0269359 A1* | 9/2019 | Kim | | G06K 9/00 |
| 2019/0385287 A1* | 12/2019 | Tsikata | | G06T 5/009 |
| 2020/0074626 A1* | 3/2020 | Fan | | G06T 7/33 |
| 2020/0243160 A1* | 7/2020 | Oesterreich Carrillo | | |
| | | | | G16B 30/00 |

OTHER PUBLICATIONS

"Histogram-based normalization technique on human brain magnetic resonance images from different acquisitions"; Xiaofei Sun, BioMed Eng OnLine 14, 73 (2015). https://doi.org/10.1186/s12938-015-0064-y (Year: 2015).*

\* cited by examiner

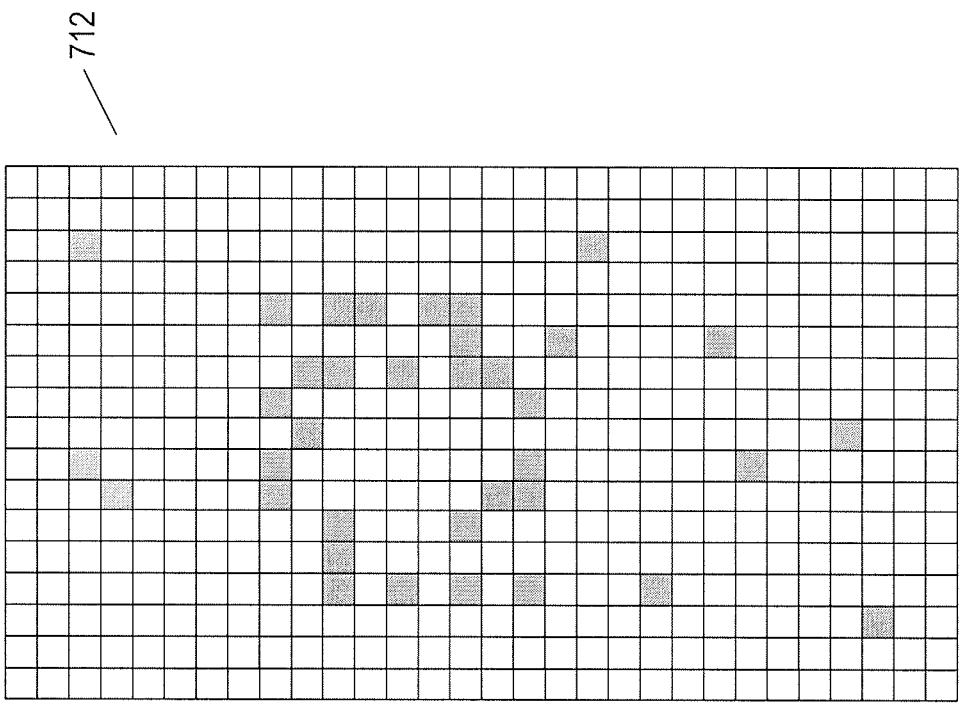

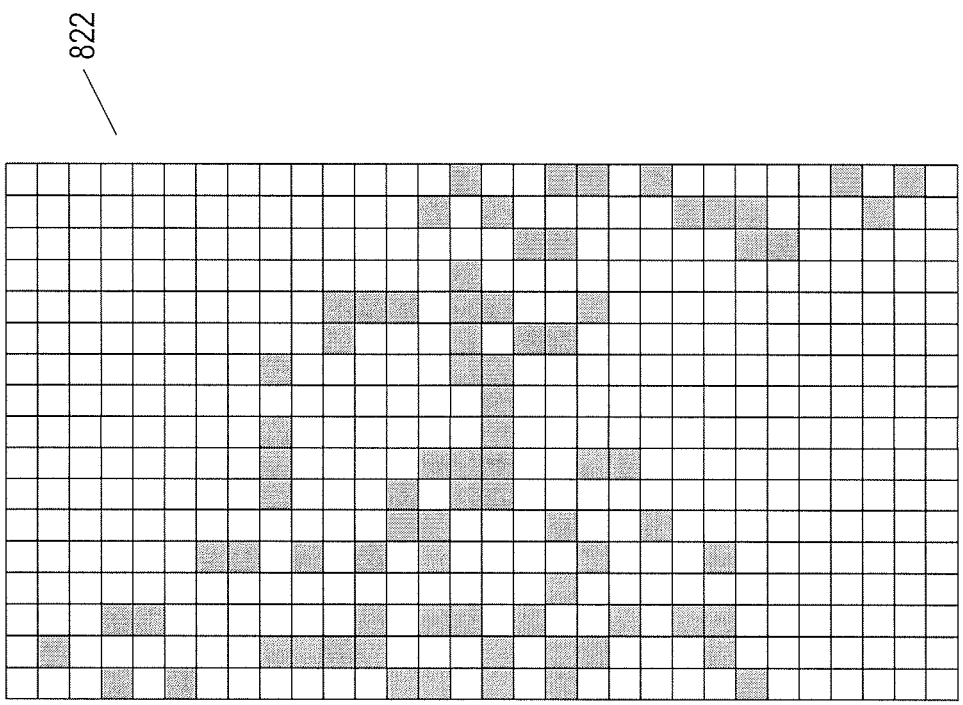

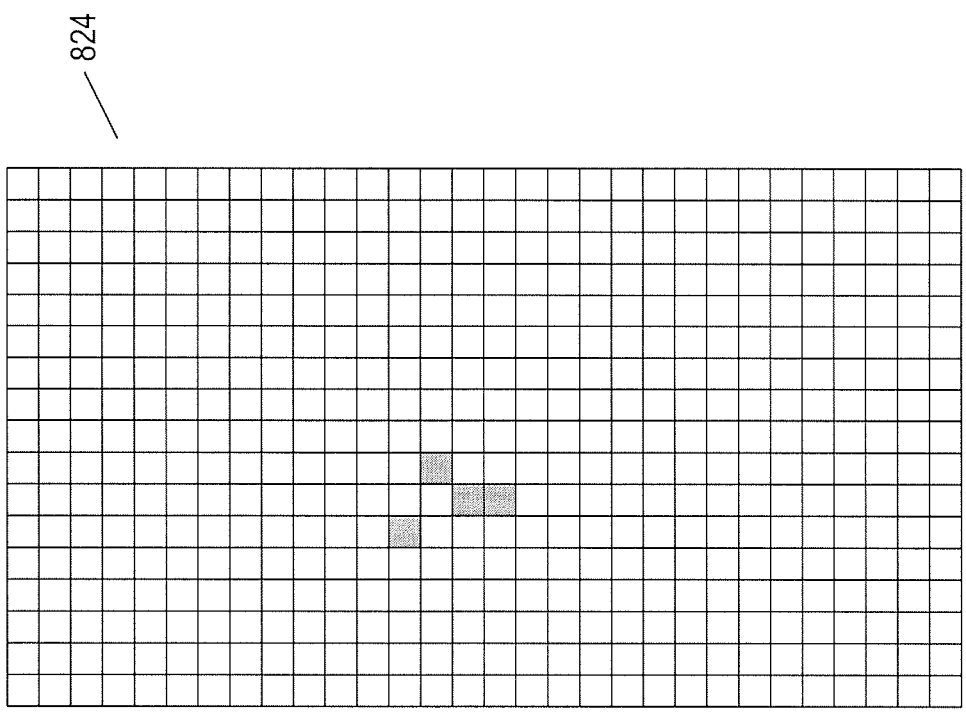

FIG. 9A

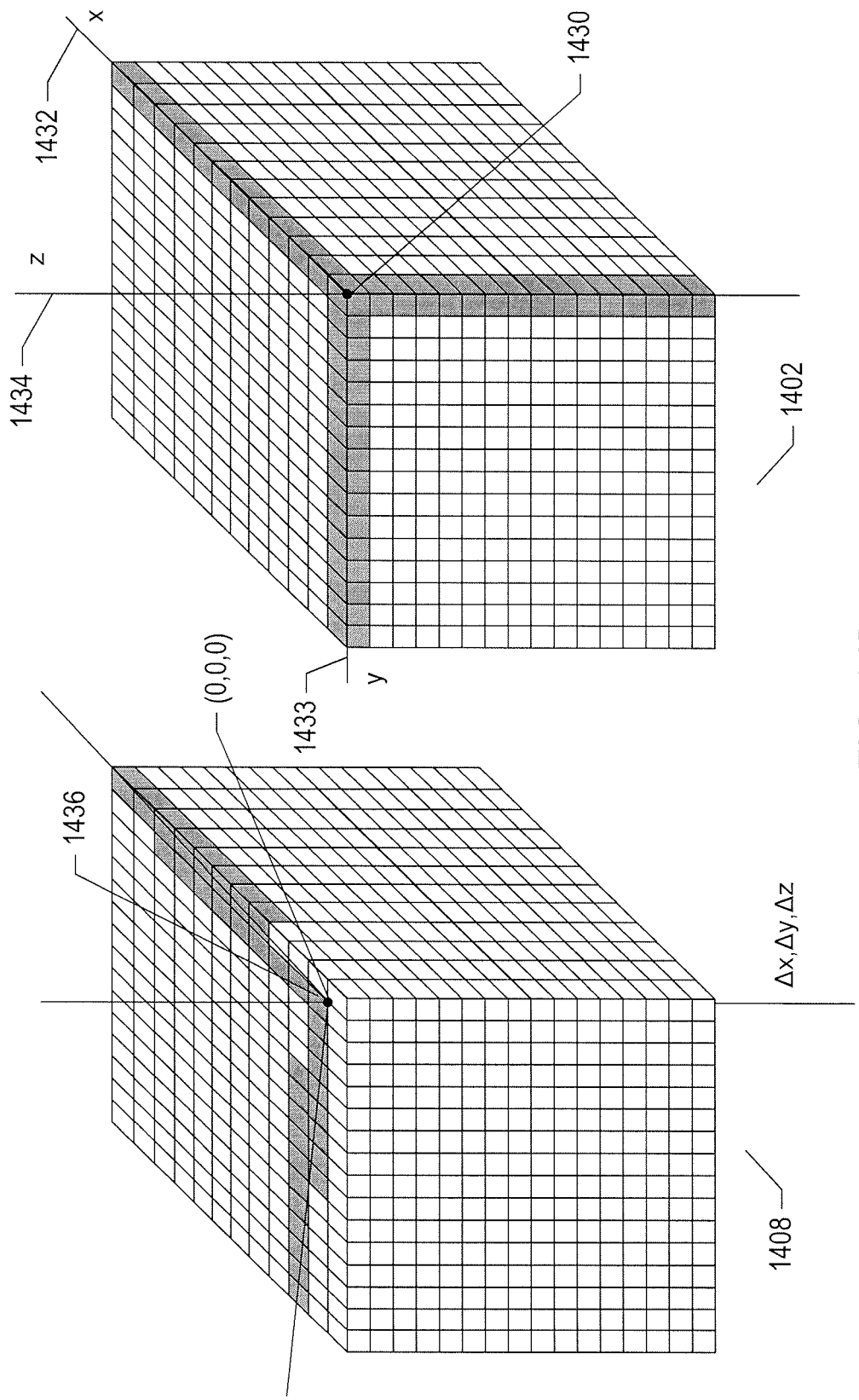

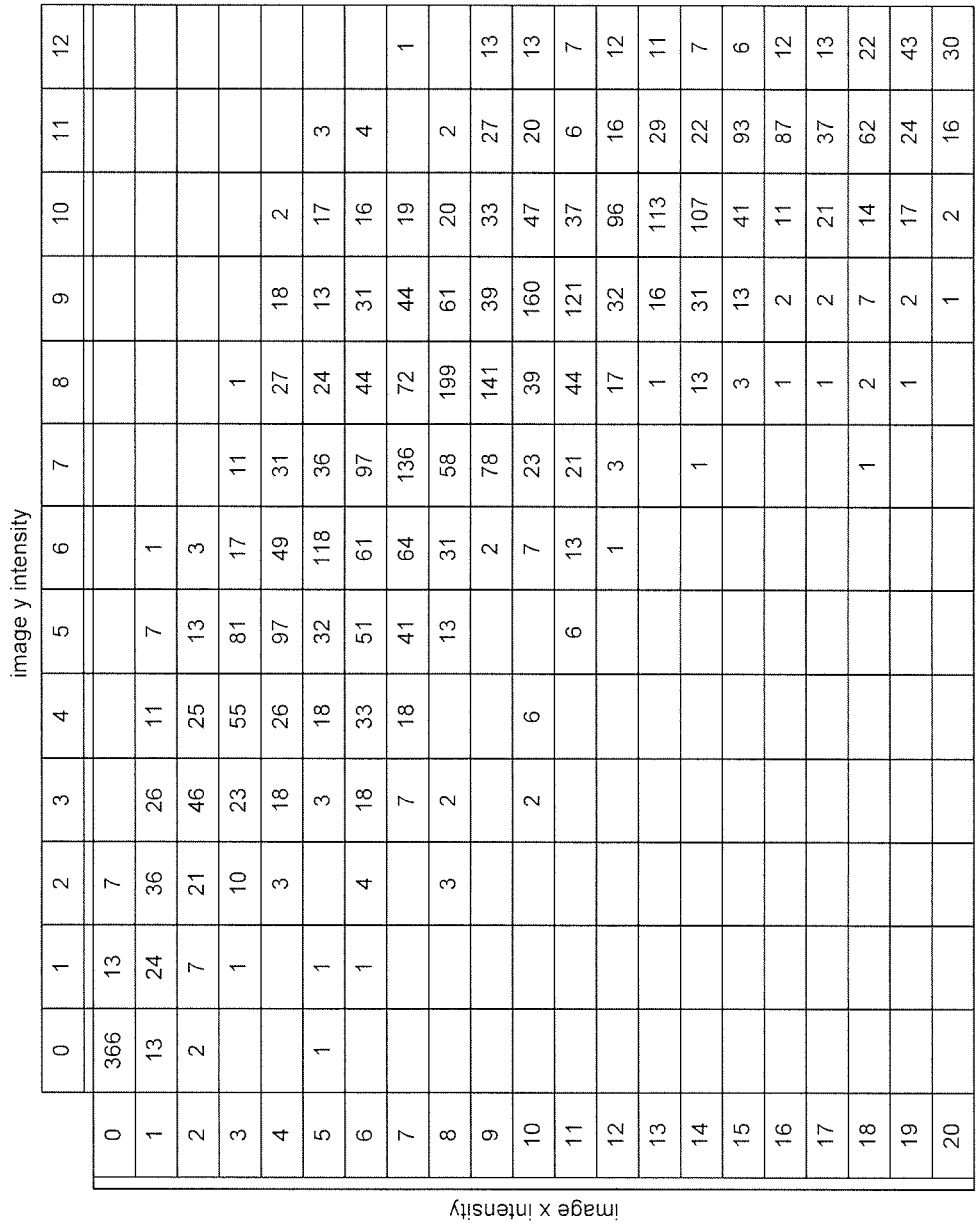

2412 — $M$ = mapping function = $\{cp_1, e_{1,2}, cp_2, e_{2,3}, cp_3, \ldots cp_{n-1}, e_{n-1,n}, cp_n\}$ 2414 — $|e_{x,y}|$ = length of edge $e_{x,y}$ = $\sqrt{[(CP_y)_i - (CP_x)_i]^2 + [(CP_y)_j - (CP_x)_j]^2}$ 2416 — $b_{i,j}$ = bin at $(i,j)$ in 2-D histogram 2418 — $[b_{i,j}]$ = value stored in bin $b_{i,j}$ 2420 — $\text{numBins}(e_{x,y})$ = number of bins crossed by $e_{x,y}$ 2422 — $\text{bin}(e_{x,y}, i)$ = $i^{th}$ bin of bins crossed by $e_{x,y}$ 2424 — $\text{fitness}(M) = F(M) = \dfrac{\sum\limits_{j=1}^{\text{numBins}(e_{1,2})} [\text{bin}(e_{1,2}, j)] + \sum\limits_{i=2}^{n} \sum\limits_{j=2}^{\text{numBins}(e_{i,i+1})} [\text{bin}(e_{i,i+1}, j)]}{\sum\limits_{k=1}^{n-1} |e_{k,k+1}|}$ 2426 — $M_{optimal} = \underset{M \in \{\text{constrainedM}\}}{\arg\max} F(M)$

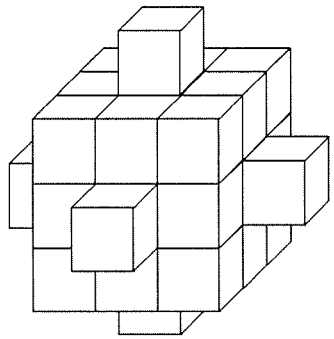

```
int noise_kernel (int i, int j, int k, image*orig, image*noise,
                  int T1, int T2)
{
    int new = 0;
    int sum = 0;        } 3217
    int l, m, n;

for (l = i-2; l < i + 3; l++)
        for (m = j – 2 + abs(l); m < j + 3 - abs(l); m++)
            for (n = k – 2 + abs(l); n < k + 3 - abs(l); n++)
            {
                if (orig[l][m][n] > -T1 && orig[l][m][n] < T1)
                    sum += orig[l][m][n];
                else return 0;
            }
    if (sum < -T2 || sum > T2) return 0;
    for (l = i - 2; l < i +3; l++)
        for (m = j – 2 + abs(l); m < j + 3 - abs(l); m++)
            for (n = k – 2 + abs(l); n < k + 3 – abs(l); n++)
            {
                if(noise[l][m][n]! = InitVal)
                {
                    new++;
                    noise[l][m][n] = orig[l][m][n];
                }
            }
    return new;
}
```

FIG. 32C

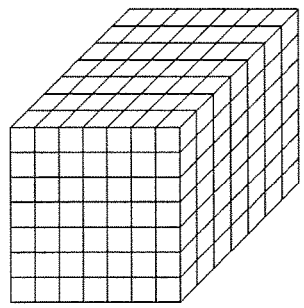

3226

```
object_kernel (int i, int j, int k, image orig, bool sign
                clusters * ctr)
{
    cluster c;
    int l, m, n;
    bool full = true;
    bool merge = false;
    for (l = i – 3; l < i + 4; l++)
        for (m = j – 3; m < j + 4; m++)
            for (n = k – 3; n < k + 4; n++)
            {
                if ((sign && orig[l][m][n] < 0) || (!sign && orig[l][m][n] >= 0))
                {
                    full = false;
                    goto nxt;
                }
                if (ctr → in_cluster (l,m,n))
                    merge = true;
            }
    nxt: if (full)
    {
        for (l = i – 3; l < i +4; l++)
            for (m = j – 3; m < j + 4; m ++)
                for (n = k – 3; n < k + 4; k++)
                {
                    c.add(l,m,n,orig[l][m][n];
                }
        if (merge) ctr → merge (&c);
        else ctr → add_cluster(&c);
    }
    else
    {
        for (l = i – 3; l < i +4; l++)
            for (m = j – 3; m < j + 4; m++)
                for (n = k – 3; n < k + 4; k++)
                {
                    c.add(l,m,n,orig[l][m][n];
                    ctr → add_cluster(&c);
                    c.clear( );
                }
    }
}
```

METHODS AND SYSTEMS THAT NORMALIZE IMAGES, GENERATE QUANTITATIVE ENHANCEMENT MAPS, AND GENERATE SYNTHETICALLY ENHANCED IMAGES

CROSS-REFERENCE TO RELATED APPLICATIONS

This application is a continuation-in-part of application Ser. No. 16/251,412, filed Jan. 18, 2019, and application Ser. No. 16/279,810, filed Feb. 19, 2019, and claims the benefit of Provisional Application No. 62//819,335, filed Mar. 15, 2019.

TECHNICAL FIELD

The current application is directed to digital-image processing and, in particular, to methods and systems that carry out digital-image-difference operations on normalized digital images to produce quantitative-enhancement maps and synthetically enhanced images.

BACKGROUND

Digital-image processing is a broad and important field that provides foundation technologies for many types of diagnosis, monitoring, surveillance, data collection, and data analysis. Digital-image-processing methods are used in medical imaging, optical-character-recognition systems, processing and analysis of image data collected by surveillance, monitoring, and remote-sensing systems, production of informational and entertainment videos, and digital photography. A variety of sophisticated mathematical techniques have been developed to address many problem domains in digital-image processing, including reduction of noise in digital images, sharpening of imaged features in digital images, extraction of information from digital images, and many other such problem domains.

In many areas of digital-image processing and analysis, two or more different images are compared in order to extract differential information from the two or more images corresponding to various types of changes. For example, a time sequence of digital medical images may be compared in order to detect changes in a tumor or other pathology over time. As another example, medical images may be acquired prior to, and following, introduction of a contrast agent into the imaged tissue. Often, the images of a pair of related digital images are compared by subtracting the intensity values in one image of the pair from the intensity values of the other, in order to produce a difference image containing indications of the intensity differences between the two images. However, many intensity differences in the resulting difference image may arise from phenomena unrelated to the types of changes and events of interest. For example, the intensities in two different medical images may differ systematically due to differences in the imaging devices used to acquire the images, differences in image-device settings and parameters, random and systematic noise in the digital images, and many other types of intensity-altering phenomena. Normalization of images, a major problem domain in image processing, is of particular significance for generating difference images. Normalization seeks to reduce or eliminate systematic intensity variation between images, in preparation for image comparison, without losing or obscuring the meaningful, but often subtle, intensity differences that are sought to be extracted by digital-image-comparison techniques. In addition to effective and efficient methods for normalizing digital medical images, those who employ medical imaging and interpret medical images continue to seek improvements in medical-image interpretation and in medical-imaging procedures and processes as well as new types of medically-relevant information that can be obtained from medical images.

SUMMARY

The current document is directed to digital-image-normalization methods and systems that generate accurate intensity mappings between the intensities in two digital images. The intensity mapping generated from two digital images is used to normalize or adjust the intensities in one image in order to produce a pair of normalized digital images to which various types of change-detection methodologies can be applied in order to extract differential data. Accurate intensity mappings facilitate accurate and robust normalization of sets of multiple digital images which, in turn, facilitates many additional types of operations carried out on sets of multiple normalized digital images, including change detection, quantitative enhancement, synthetic enhancement, and additional types of digital-image processing, including processing to remove artifacts and noise from digital images. The methods and systems disclosed in the current document find application in medical imaging and interpretation of medical images, but also find application in a wide variety of additional types of digital imaging, including optical-character-recognition technologies, processing and analysis of image data collected by surveillance, monitoring, and remote-sensing systems, production of informational and entertainment videos, digital photography, and many other digital-image-processing methods and systems.

BRIEF DESCRIPTION OF THE DRAWINGS

FIGS. 7A-D show similar examples to those shown in FIG. 6A-D, but with the pixels corresponding to the imaged cruciform object having relatively low intensity values compared to the intensities of the pixels corresponding to the imaged cruciform object in FIG. 6A.

FIGS. 8A-D show a different example of image comparison using the same illustration conventions used in FIGS. 6A-D and FIGS. 7A-D.

FIGS. 9A-B illustrate a typical result obtained by digital-image comparison.

FIGS. 14A-F illustrates registration of two three-dimensional images using rigid-body transformations.

FIGS. 24A-F illustrate a second histogram-based normalization method.

FIGS. 27A-F illustrate aspects of a genetic mapping-function-parameter-fitting method that is used to optimize parameter values for a mapping function that maps intensities from a first image to a second image within at least a pair of image domains.

FIGS. 32A-I illustrate a noise-removal method that is used to remove noise from difference images prior to synthetic boosting in order to reduce or eliminate noise-related artifacts in synthetically enhanced images.

DETAILED DESCRIPTION OF EMBODIMENTS

The current document is directed to digital-image-normalization methods and systems and to additional types of operations and technologies that involve sets of multiple normalized digital images. In a first subsection, below, an overview of computer systems is provided, with reference to FIGS. 1-3. In a second subsection, provided below, a description of digital images, digital-image-comparison operations, and digital-image normalization is provided with reference to FIGS. 4-10B. In a third subsection, difference images and problems arising from registration and normalization of images prior to application of the difference operation to images are discussed. In a fourth section, registration of images is discussed. In a fifth section, image normalization is discussed. In a sixth section, optimization is discussed. In a seventh section, synthetically enhanced images are discussed. In an eighth section, a noise-removal method that removes noise from difference images and other types of images is disclosed. In a ninth section, sequential-imaging methods are discussed. In a tenth subsection, various display modes and methods are discussed.

Overview of Computer Systems and Computer Architecture

Figure 1:
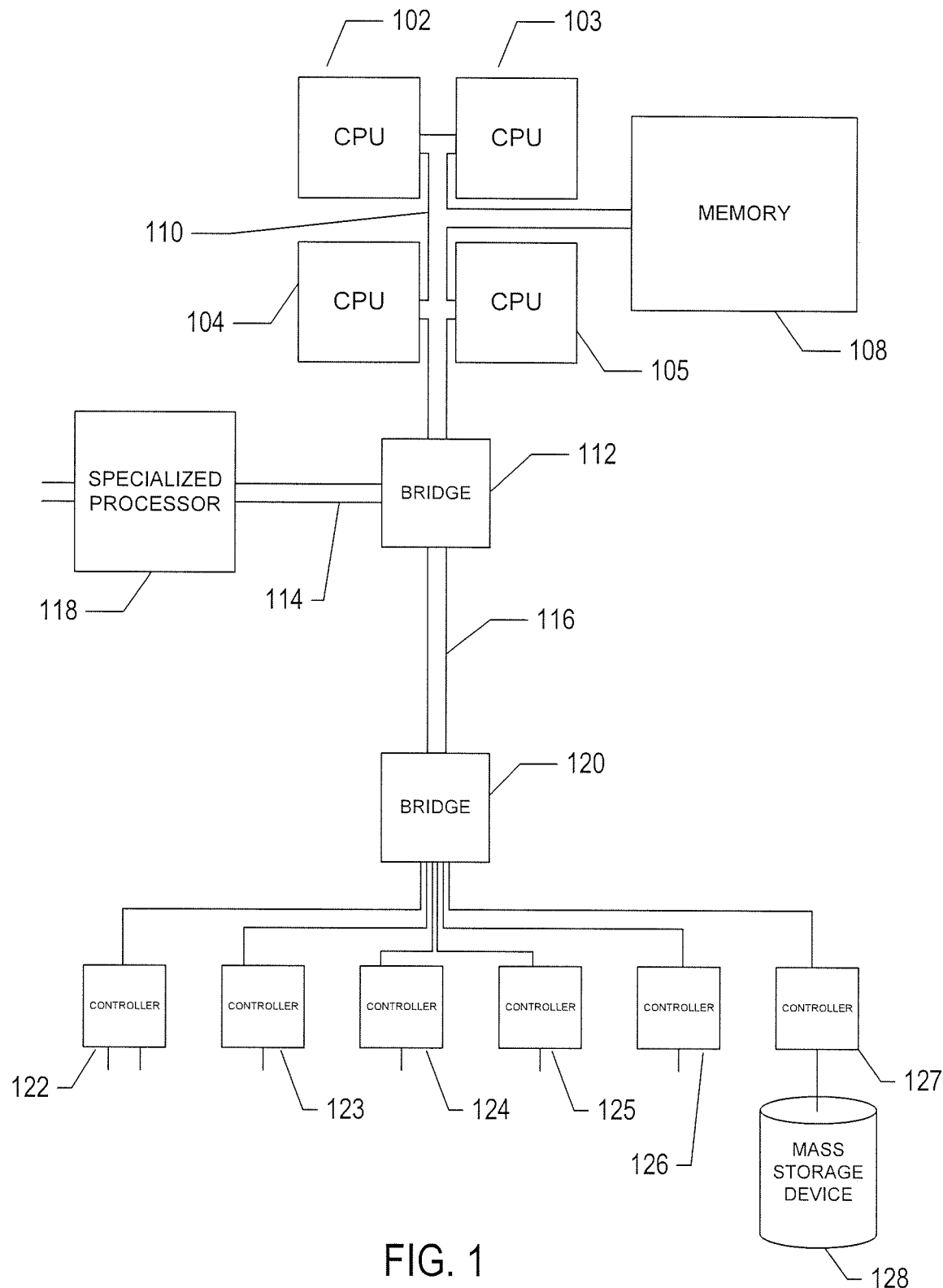
FIG. 1 provides a general architectural diagram for various types of computers.

FIG. 1 provides a general architectural diagram for various types of computers. The computer system contains one or multiple central processing units ("CPUs") 102-105, one or more electronic memories 108 interconnected with the CPUs by a CPU/memory-subsystem bus 110 or multiple busses, a first bridge 112 that interconnects the CPU/memory-subsystem bus 110 with additional busses 114 and 116, or other types of high-speed interconnection media, including multiple, high-speed serial interconnects. These busses or serial interconnections, in turn, connect the CPUs and memory with specialized processors, such as a graphics processor 118, and with one or more additional bridges 120, which are interconnected with high-speed serial links or with multiple controllers 122-127, such as controller 127, that provide access to various different types of mass-storage devices 128, electronic displays, input devices, and other such components, subcomponents, and computational resources. It should be noted that computer-readable data-storage devices include optical and electromagnetic disks, electronic memories, and other physical data-storage devices. Those familiar with modern science and technology appreciate that electromagnetic radiation and propagating signals do not store data for subsequent retrieval, and can transiently "store" only a byte or less of information per mile, far less information than needed to encode even the simplest of routines.

Figure 2:
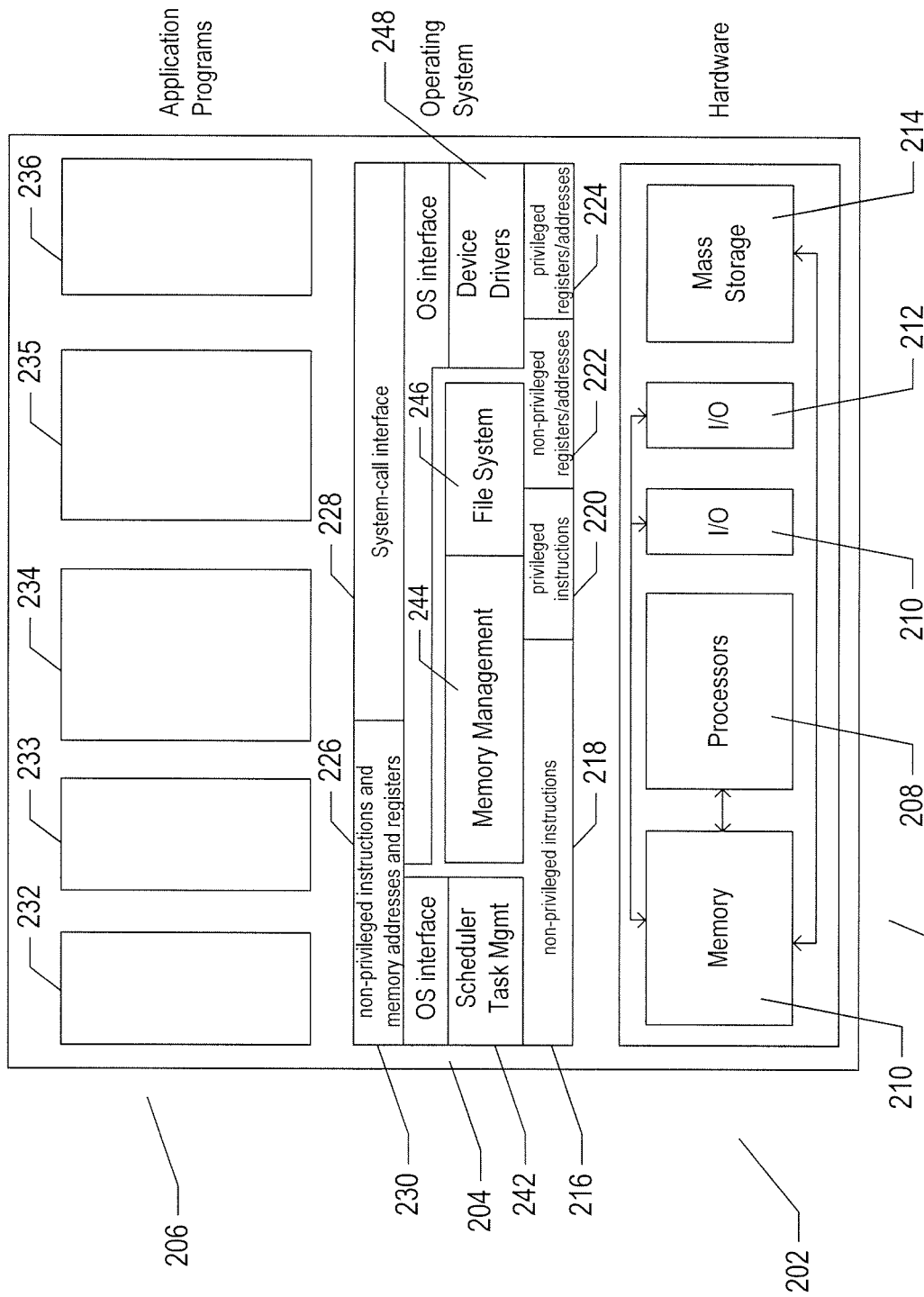
FIG. 2 illustrates generalized hardware and software components of a general-purpose computer system, such as a general-purpose computer system having an architecture similar to that shown in FIG. 1.

FIG. 2 illustrates generalized hardware and software components of a general-purpose computer system, such as a general-purpose computer system having an architecture similar to that shown in FIG. 1. The computer system 200 is often considered to include three fundamental layers: (1) a hardware layer or level 202; (2) an operating-system layer or level 204; and (3) an application-program layer or level 206. The hardware layer 202 includes one or more processors 208, system memory 210, various different types of input-output ("I/O") devices 210 and 212, and mass-storage devices 214. Of course, the hardware level also includes many other components, including power supplies, internal communications links and busses, specialized integrated circuits, many different types of processor-controlled or microprocessor-controlled peripheral devices and controllers, and many other components. The operating system 204 interfaces to the hardware level 202 through a low-level operating system and hardware interface 216 generally comprising a set of non-privileged computer instructions 218, a set of privileged computer instructions 220, a set of non-privileged registers and memory addresses 222, and a set of privileged registers and memory addresses 224. In general, the operating system exposes non-privileged instructions, non-privileged registers, and non-privileged memory addresses 226 and a system-call interface 228 as an operating-system interface 230 to application programs 232-236 that execute within an execution environment provided to the application programs by the operating system. The operating system, alone, accesses the privileged instructions, privileged registers, and privileged memory addresses. By reserving access to privileged instructions, privileged registers, and privileged memory addresses, the operating system can ensure that application programs and other higher-level computational entities cannot interfere with one another's execution and cannot change the overall state of the computer system in ways that could deleteriously impact system operation. The operating system includes many internal components and modules, including a scheduler 242, memory management 244, a file system 246, device drivers 248, and many other components and modules. To a certain degree, modern operating systems provide numerous levels of abstraction above the hardware level, including virtual memory, which provides to each application program and other computational entities a separate, large, linear memory-address space that is mapped by the operating system to various electronic memories and mass-storage devices. The scheduler orchestrates interleaved execution of various different application programs and higher-level computational entities, providing to each application program a virtual, stand-alone system devoted entirely to the application program. From the application program's standpoint, the application program executes continuously without concern for the need to share processor resources and other system resources with other application programs and higher-level computational entities. The device drivers abstract details of hardware-component operation, allowing application programs to employ the system-call interface for transmitting and receiving data to and from communications networks, mass-storage devices, and other I/O devices and subsystems. The file system 246 facilitates abstraction of mass-storage-device and memory resources as a high-level, easy-to-access, file-system interface.

Figure 3:
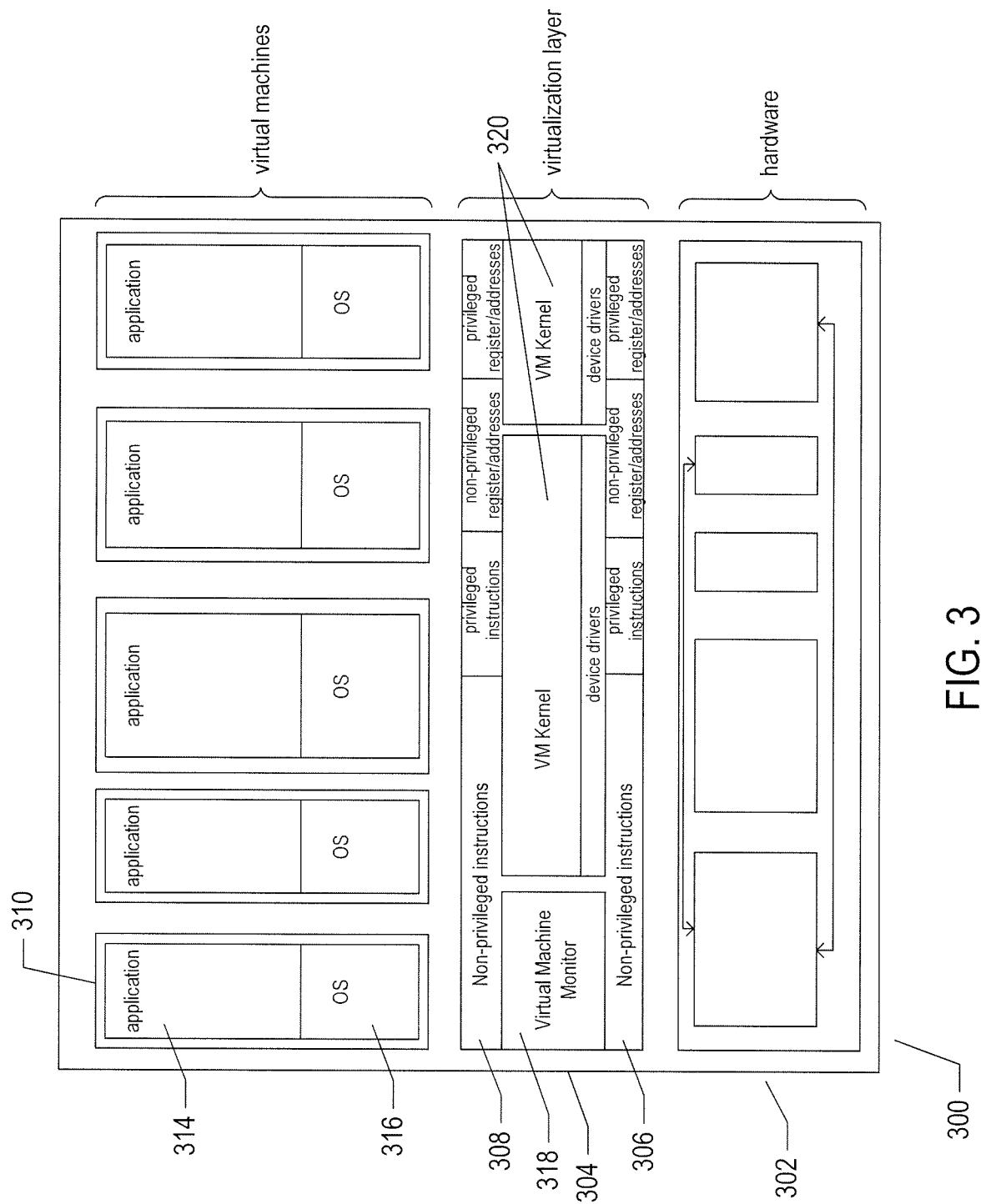
FIG. 3 illustrates a virtual machine and virtual-machine execution environment.

FIG. 3 illustrates a type of virtual machine and virtual-machine execution environment, using the same illustration conventions as used in FIG. 2. FIG. 3 shows a first type of virtualization. The computer system 300 in FIG. 3 includes the same hardware layer 302 as the hardware layer 202 shown in FIG. 2. However, rather than providing an operating system layer directly above the hardware layer, as in FIG. 2, the virtualized computing environment illustrated in FIG. 3 features a virtualization layer 304 that interfaces through a virtualization-layer/hardware-layer interface 306, equivalent to interface 216 in FIG. 2, to the hardware. The virtualization layer provides a hardware-like interface 308 to a number of virtual machines, such as virtual machine 310, executing above the virtualization layer in a virtual-machine layer 212. Each virtual machine includes one or more application programs or other higher-level computational entities packaged together with an operating system, referred to as a "guest operating system," such as application 314 and guest operating system 316 packaged together within virtual machine 310. Each virtual machine is thus equivalent to the operating-system layer 204 and application-program layer 206 in the general-purpose computer system shown in FIG. 2. Each guest operating system within a virtual machine interfaces to the virtualization-layer interface 308 rather than to the actual hardware interface 306. The virtualization layer partitions hardware resources into abstract virtual-hardware layers to which each guest operating system within a virtual machine interfaces. The guest operating systems within the virtual machines, in general, are unaware of the virtualization layer and operate as if they were directly accessing a true hardware interface. The virtualization layer ensures that each of the virtual machines currently executing within the virtual environment receive a fair allocation of underlying hardware resources and that all virtual machines receive sufficient resources to progress in execution. The virtualization-layer interface 308 may differ for different guest operating systems. For example, the virtualization layer is generally able to provide virtual hardware interfaces for a variety of different types of computer hardware. This allows, as one example, a virtual machine that includes a guest operating system designed for a particular computer architecture to run on hardware of a different architecture. The number of virtual machines need not be equal to the number of physical processors or even a multiple of the number of processors.

The virtualization layer includes a virtual-machine-monitor module 318 ("VMM") that virtualizes physical processors in the hardware layer to create virtual processors on which each of the virtual machines executes. For execution efficiency, the virtualization layer attempts to allow virtual machines to directly execute non-privileged instructions and to directly access non-privileged registers and memory. However, when the guest operating system within a virtual machine accesses virtual privileged instructions, virtual privileged registers, and virtual privileged memory through the virtualization-layer interface 308, the accesses result in execution of virtualization-layer code to simulate or emulate the privileged resources. The virtualization layer additionally includes a kernel module 320 that manages memory, communications, and data-storage machine resources on behalf of executing virtual machines ("VM kernel"). The VM kernel, for example, maintains shadow page tables on each virtual machine so that hardware-level virtual-memory facilities can be used to process memory accesses. The VM kernel additionally includes routines that implement virtual communications and data-storage devices as well as device drivers that directly control the operation of underlying hardware communications and data-storage devices. Similarly, the VM kernel virtualizes various other types of I/O devices, including keyboards, optical-disk drives, and other such devices. The virtualization layer essentially schedules execution of virtual machines much like an operating system schedules execution of application programs, so that the virtual machines each execute within a complete and fully functional virtual hardware layer.

Figure 4:
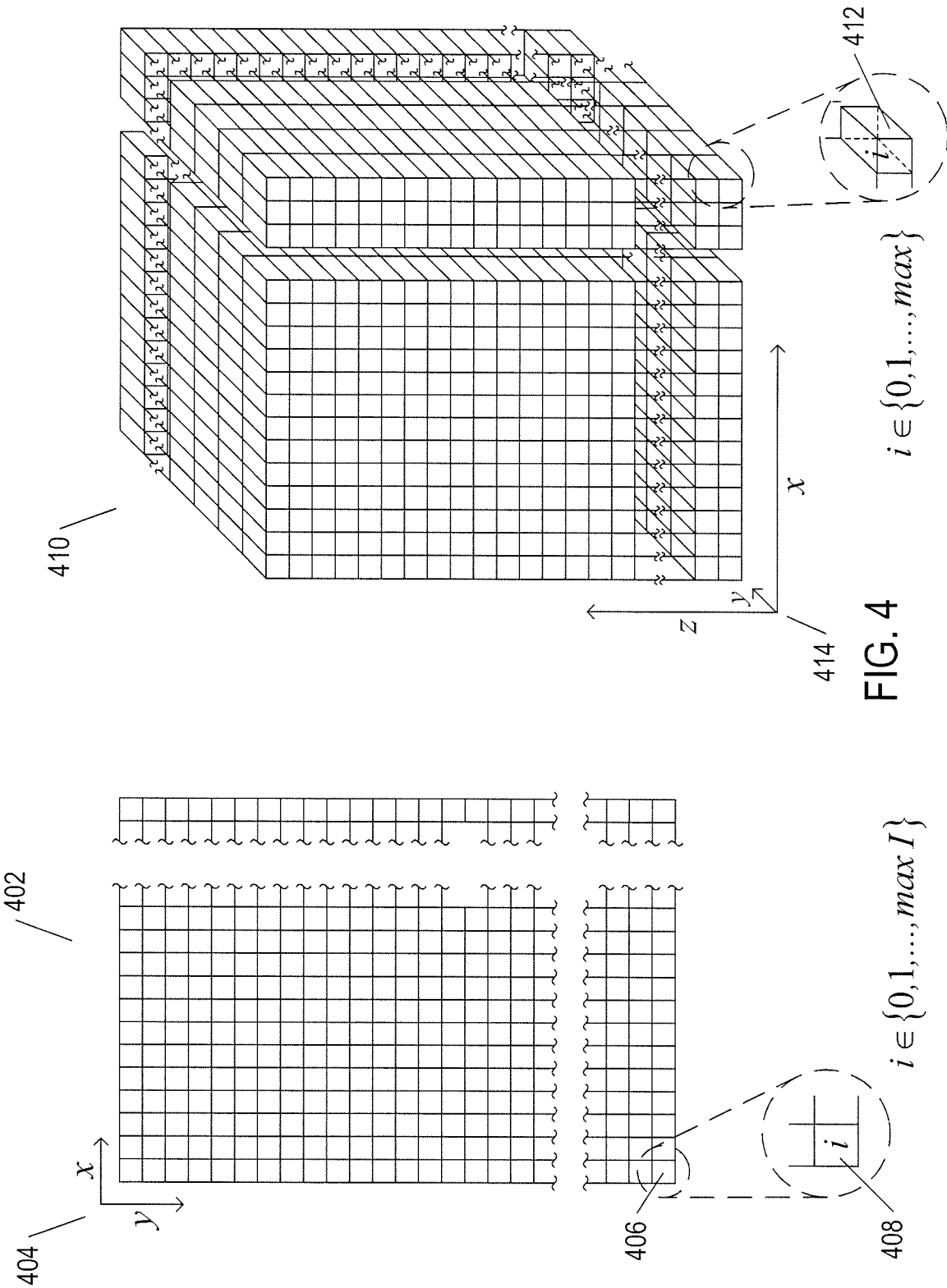
FIG. 4 illustrates two different types of digital images.

Digital Images, Digital-Image-Comparison Operations, and Digital-Image Normalization FIG. 4 illustrates two different types of digital images. A two-dimensional digital image 402 is a rectilinear grid of pixels, with each pixel identified by the grid-cell coordinates of the pixel according to a two-dimensional Cartesian coordinate system 404. The dimensions of a pixel corresponds to the smallest area of an image to which an intensity can be assigned. A pixel also corresponds to an area on the imaged surface, although the dimensions of the area depend on the shape and orientation of the surface and the distance of the surface from the imaging device. Each pixel, such as pixel 406, is associated with an intensity value i 408. In the current discussion, digital images are considered to have grayscale intensities, where i is one of a number of successive integer intensity values ranging from 0 to maxI. For example, maxI may equal 255, in which case each pixel intensity is encoded as a byte. Alternatively, each pixel intensity may be associated with an intensity value stored in a two-byte word, in which case maxI is 65,535. Many other intensity encodings are possible, including signed intensity values. Each pixel of a color image may be associated with a value k in which, according to one color model, three different intensity values $k_{red}$, $k_{blue}$, $k_{green}$ are packaged for the three color channels red, green, and blue. The value k associated with color-image pixels may alternatively represent another type of encoding according to another of many different commonly used color models. The normalization methods and additional operations, discussed below, may be separately applied to each color channel, in certain applications, or may be applied to an intensity value i derived from the value k. A three-dimensional digital image 410 is a volume of voxels, such as voxel 412, the positions of which are generally described by a three-dimensional Cartesian coordinate system 414. The currently disclosed methods and systems for image normalization are applicable both to two-dimensional and to three-dimensional digital images. Images are generally stored in image data structures which contain image metadata and a container that contains the digitally encoded image elements of the image, where image elements are pixels or voxels.

Figure 5A:
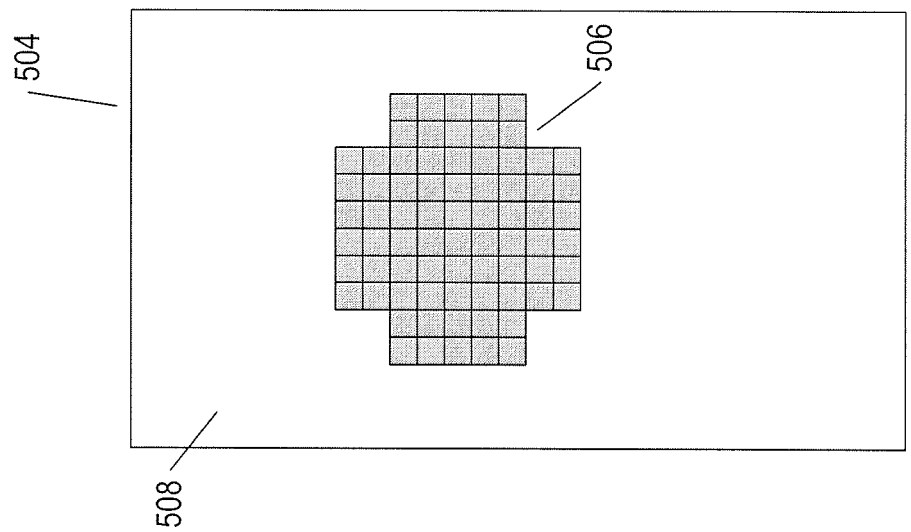
FIGS. 5A-B illustrate digital-image comparison.
Figure 5A:
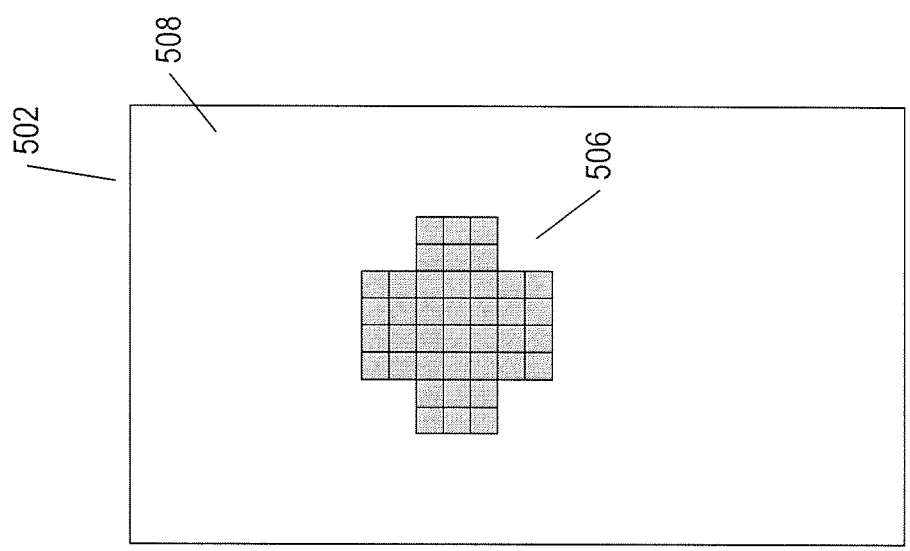
Figure 5B:
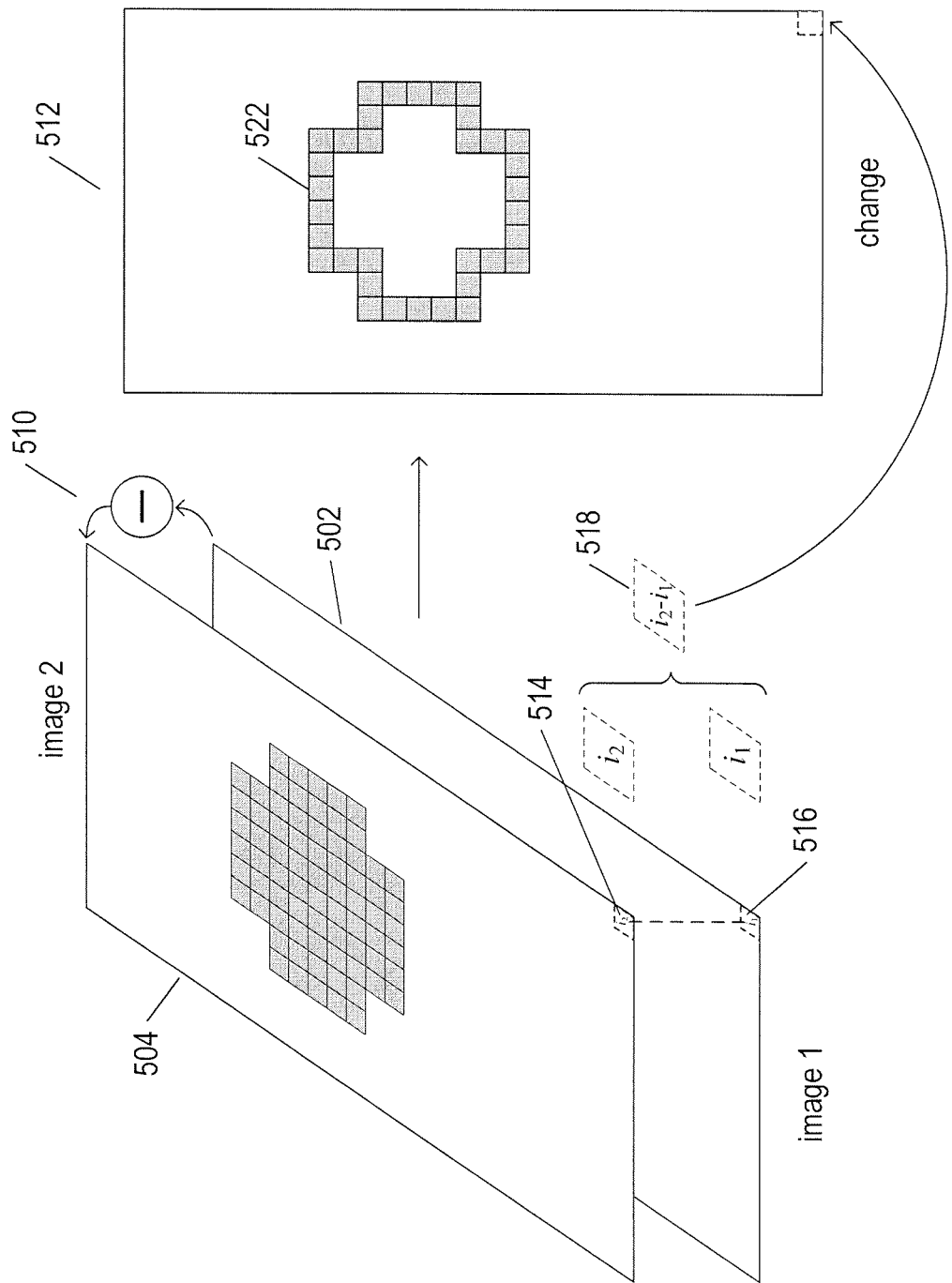

FIGS. 5A-B illustrate digital-image comparison. In FIG. 5A, a first digital image 502 and a second digital image 504 are acquired by digital-image-capture devices at two different points in time. In this example, as in all the remaining examples provided below, pixels are shown with exaggerated dimensions relative to the image size, for clarity of illustration. In a typical digital image, there may be several hundred or more pixels per centimeter in the x and y directions of a two-dimensional digital image or tens to hundreds of voxels per centimeter in the x, y, and z directions of a three-dimensional digital image. Pixel sizes often depend on the medium in which pixels are displayed and may differ dramatically among printed images and images rendered for display on LCD display devices.

Both the first image 502 and the second image 504 in FIG. 5A show a cruciform imaged object 506 with relatively low-intensity pixels on a high-intensity background 508. In one convention, small-magnitude intensity values correspond to dark or black pixels while high-magnitude intensity values correspond to light or white pixels. In the example shown in FIG. 5A, it is obvious that the cruciform object is larger in the second image 504 than in the first image 502. However, in many real-world imaging examples, the differences between the contents of two images are not apparent to a human viewer by visual inspection. Instead, many of the most interesting differences may be quite subtle.

In order to automatically process the pair of images shown in FIG. 5A to determine the differences between the two images, the pixel intensities of the corresponding pixels in the two images may be subtracted, as shown by the digital-image-subtraction operation 510 in FIG. 5B, to produce a difference image 512. The subtraction operation involves, for a given pair of corresponding pixels 514 and 516, generating a single difference pixel 518 containing the difference of the intensities in the original pixel pair 514 and 516 that is placed into the same position in the difference image 512 as the positions of the pixel pair in the original images 502 and 504. The computed differences are often rescaled to fall within the intensity range [0, maxDif]. In this example case, the difference image 512 displays those pixels 522 that have different intensity values in the original digital images 502 and 504 and those differences accurately reflect a cruciform border region that represents growth of the cruciform object.

While straight subtraction of digital images is one method for creating a difference image that highlights differences between two original images, there are many other techniques for generating difference images that use different or additional operations on the intensity values of the two original images. Nonetheless, all of the various different types of comparison operations between digital images seek to highlight meaningful differences between the two images. Meaningful differences are generally differences in image intensities that reflect physical differences in the imaged objects and environments, such as change of tissue type in medical images or the sudden appearance of an object in the imaged environment in a surveillance-video frame. Automated comparison operations are used to detect and display subtle differences between images that would not be apparent to human viewers as well as to automate the process of identifying differences between images, including both subtle differences and differences in image sequences that would be apparent during visual inspection, were there time and budget for visual inspection.

Figure 6A:
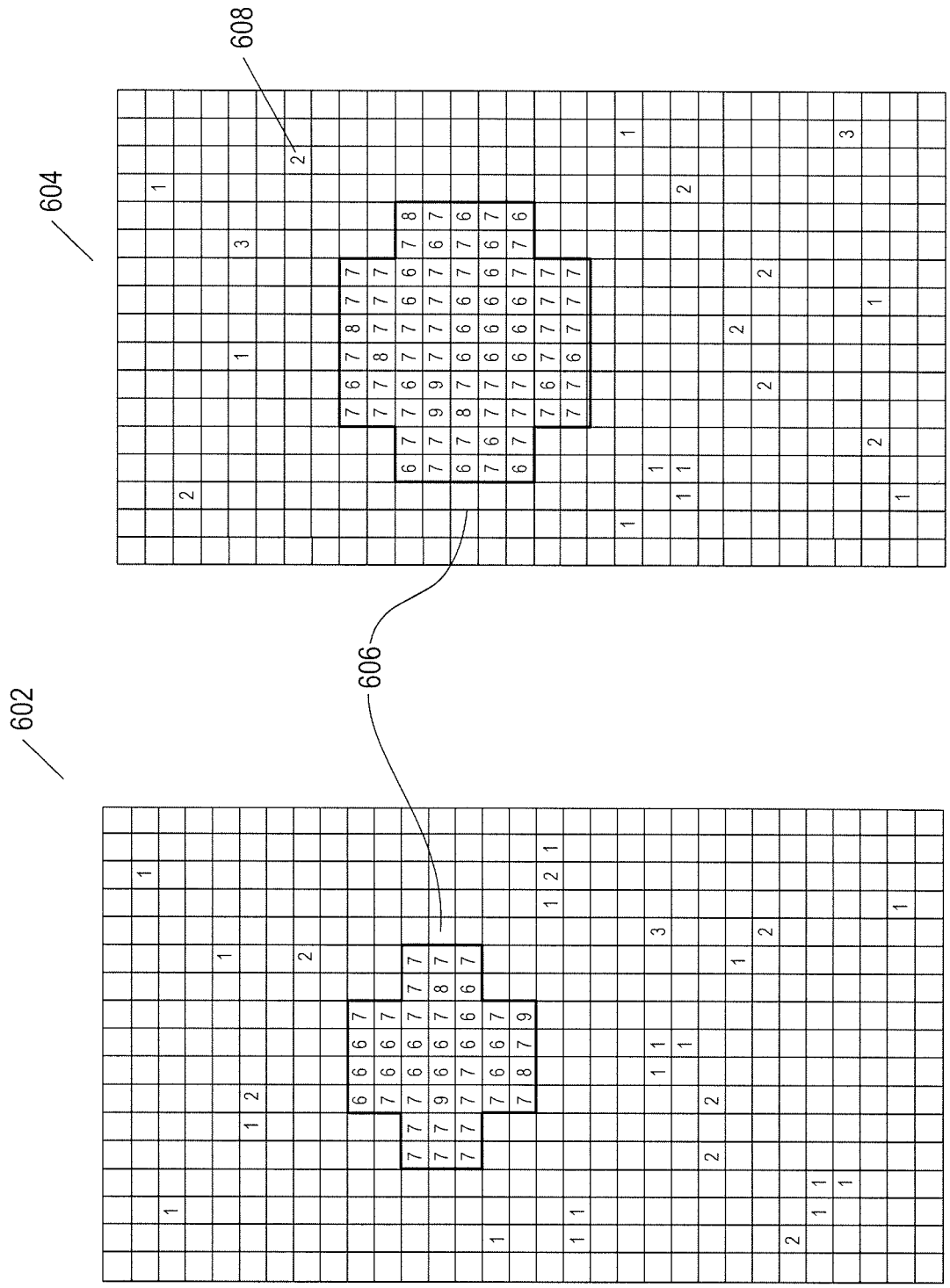
FIGS. 6A-D illustrate the effect of noise on the digital-image-comparison process discussed above with reference to FIGS. 5A-B.
Figure 6B:
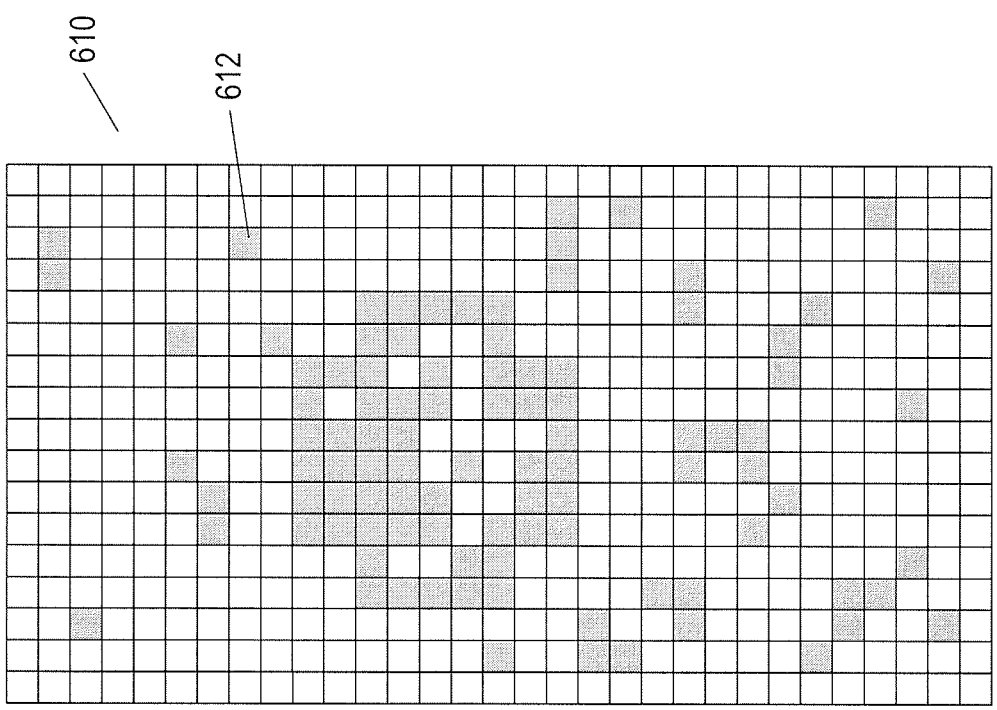
Figure 6C:
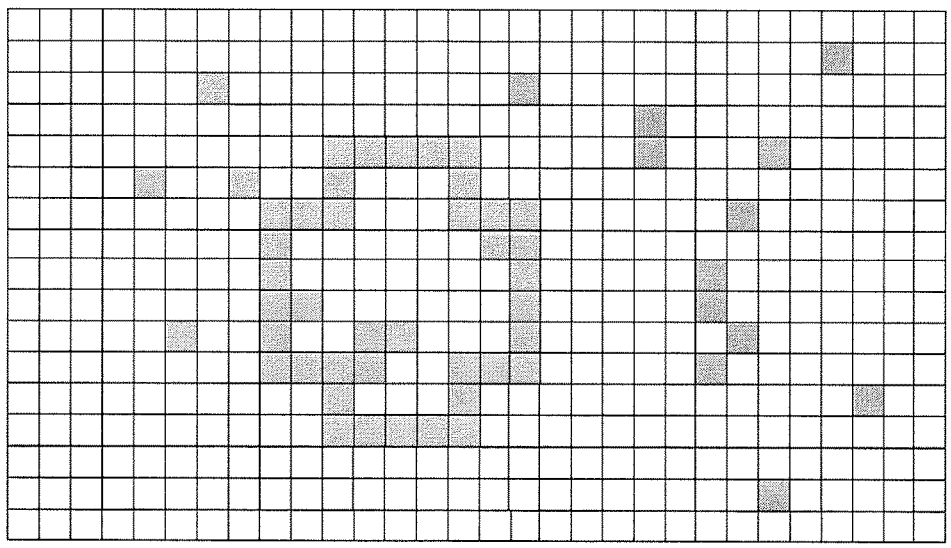
Figure 6D:
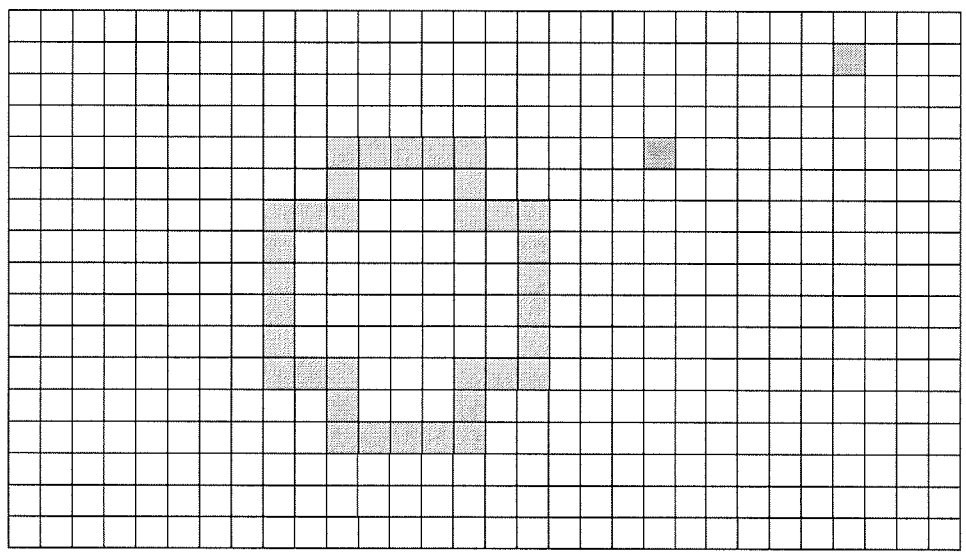

FIGS. 6A-D illustrate the effect of noise on the digital-image-comparison process discussed above with reference to FIGS. 5A-B. FIGS. 6A-D use common illustration conventions subsequently used for FIGS. 7A-9B. Each digital image is shown as a rectilinear grid of pixels with single-digit intensity values. Blank pixels are assumed to have the intensity value 0. FIG. 6A shows a pair of images 602 and 604 similar to images 502 and 504 in FIG. 5A. In this example, the imaged cruciform object 606 has relatively high intensity values while the background pixels have relatively low intensity values. Rendered as positive images, the cruciform object would appear lightly colored or white on a dark background, depending on the value of maxI, but, for clarity of illustration, negative or inverse renderings of the images are shown in FIG. 6A. In addition to relatively high-intensity pixels that comprise the cruciform object 606, each image contains low-intensity values corresponding to noise. For example, pixel 608 in the second image 604 has an intensity value of 2 while the pixel at the same location in the first image 602 has an intensity value 0. In many cases, noise is a stochastic phenomenon and produces different patterns of anomalous pixels in each different image. Furthermore, the intensities of the pixels within the imaged cruciform object 606 in each image are non-uniform, the non-uniformity a product of both noise and perhaps image-acquisition-device-characteristic differences. As a result, when a difference image 610, shown in FIG. 6B, is produced by the comparison method 510 discussed above with reference to FIG. 5B, the difference image is visually cluttered. In FIG. 6B, the non-0 valued pixels are shown darkened while the 0-valued pixels are shown unshaded, an inverted or negative image of the positive difference image produced by the difference operation. This cluttered difference image does include the same difference pixels 522 produced in the example shown in FIG. 5B, but also includes non-0 valued pixels, such as pixel 612 at the position of pixel 608 in the second image shown in FIG. 6A, resulting from noise. Noise can therefore clutter and mask the differences of interest or meaning in a difference image produced by a comparison operation. A thresholding operation may be used to attempt to eliminate noise pixels from a difference image. As shown in FIG. 6C, only difference pixels with unrescaled absolute-value intensities greater than 1 are shaded in the thresholded difference image 620. By removing difference pixels with intensities 1 and −1, much of the clutter in the difference image 610 shown in FIG. 6B has been removed. An even better difference image 622 is shown in FIG. 6D, produced by showing only those difference pixels with at least absolute-value difference intensity 2. When the intensity differences of the pairs of pixels in the original image of interest are large compared to the intensity differences of noise pixels and background pixels, thresholding can remove much of the unwanted noise signal to produce a clear, meaningful difference image.

Figure 7A:
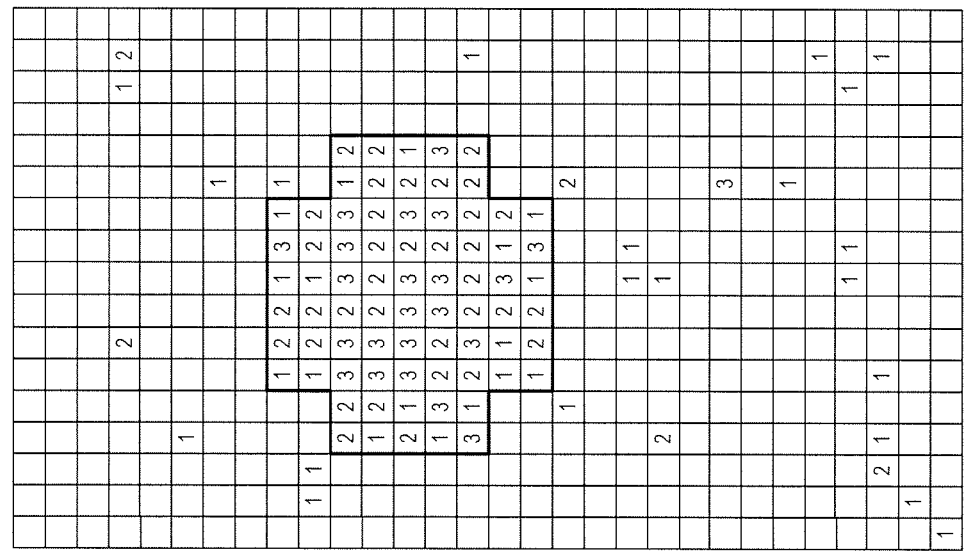
Figure 7A:
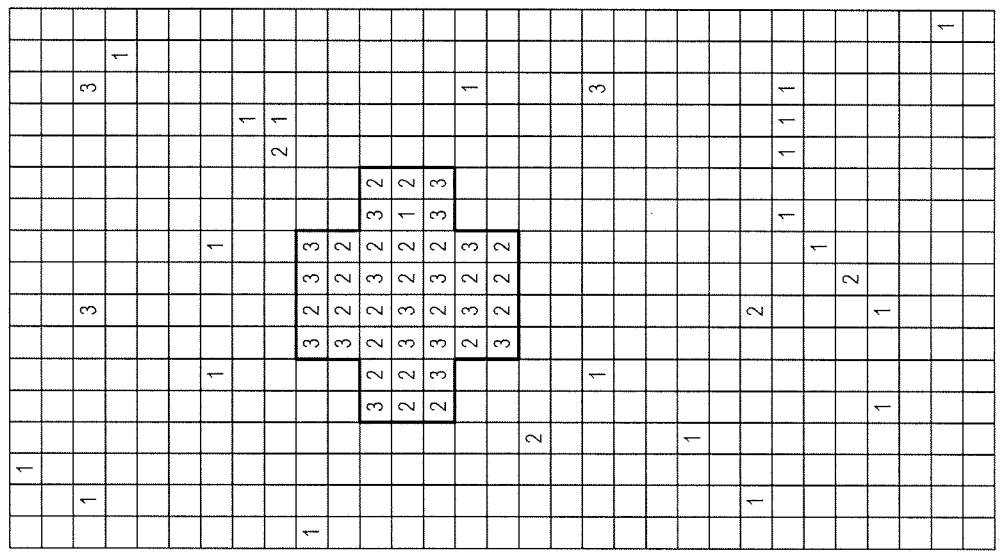
Figure 7B:
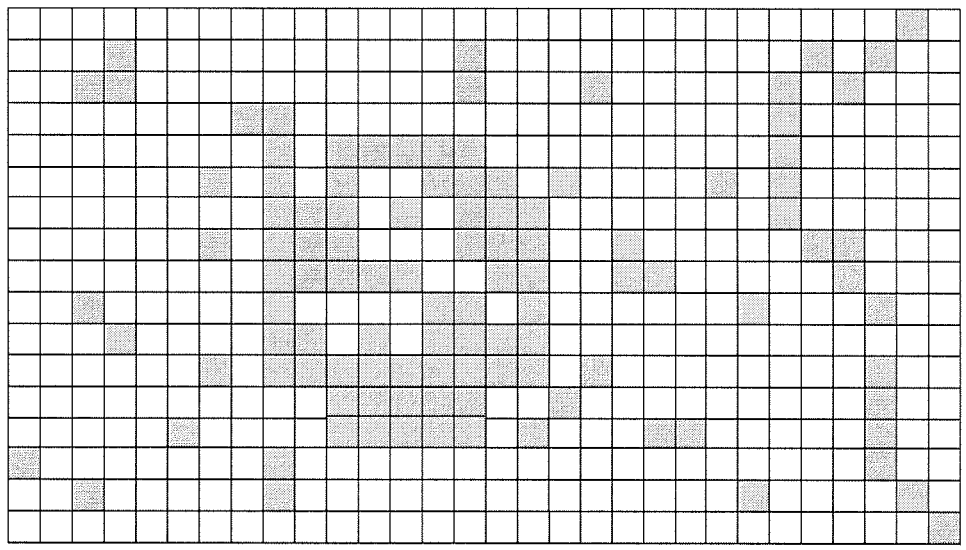
Figure 7D:
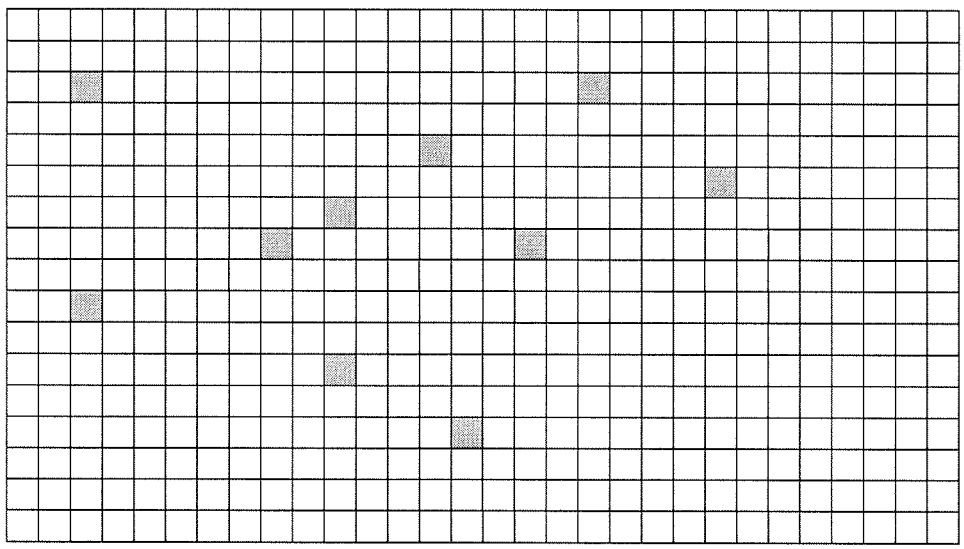

However, when the intensity-valued differences of the pixel pairs of interest in the original images have magnitudes on the order of the magnitudes of noise differences, thresholding may not be effective. FIGS. 7A-D show similar examples to those shown in FIG. 6A-D, but with the pixels corresponding to the imaged cruciform object having relatively low intensity values compared to the intensities of the pixels corresponding to the imaged cruciform object in FIG. 6A. The unthresholded difference image 710 in FIG. 7B produced by the comparison operation 510 discussed above with reference to FIG. 5B applied to original images 702 and 704 shown in FIG. 7A is more visually cluttered than difference image 610 in FIG. 6B. A thresholded version of the difference image 712 in FIG. 7C, with difference pixels having unrescaled absolute-value intensities less than 2 not displayed, has less clutter but does not reveal the cruciform-outline pattern of the difference pixels of interest, originally shown in the difference image 512 in FIG. 5B. A second thresholded difference image 714 in which only difference pixels with unrescaled absolute-value intensities of 2 or greater are displayed, provides relatively little information. Thus, as shown in the example of FIGS. 7A-D, when the intensity differences between two images are subtle, the differences may be entirely masked by the presence of noise in the two images.

Figure 8A:
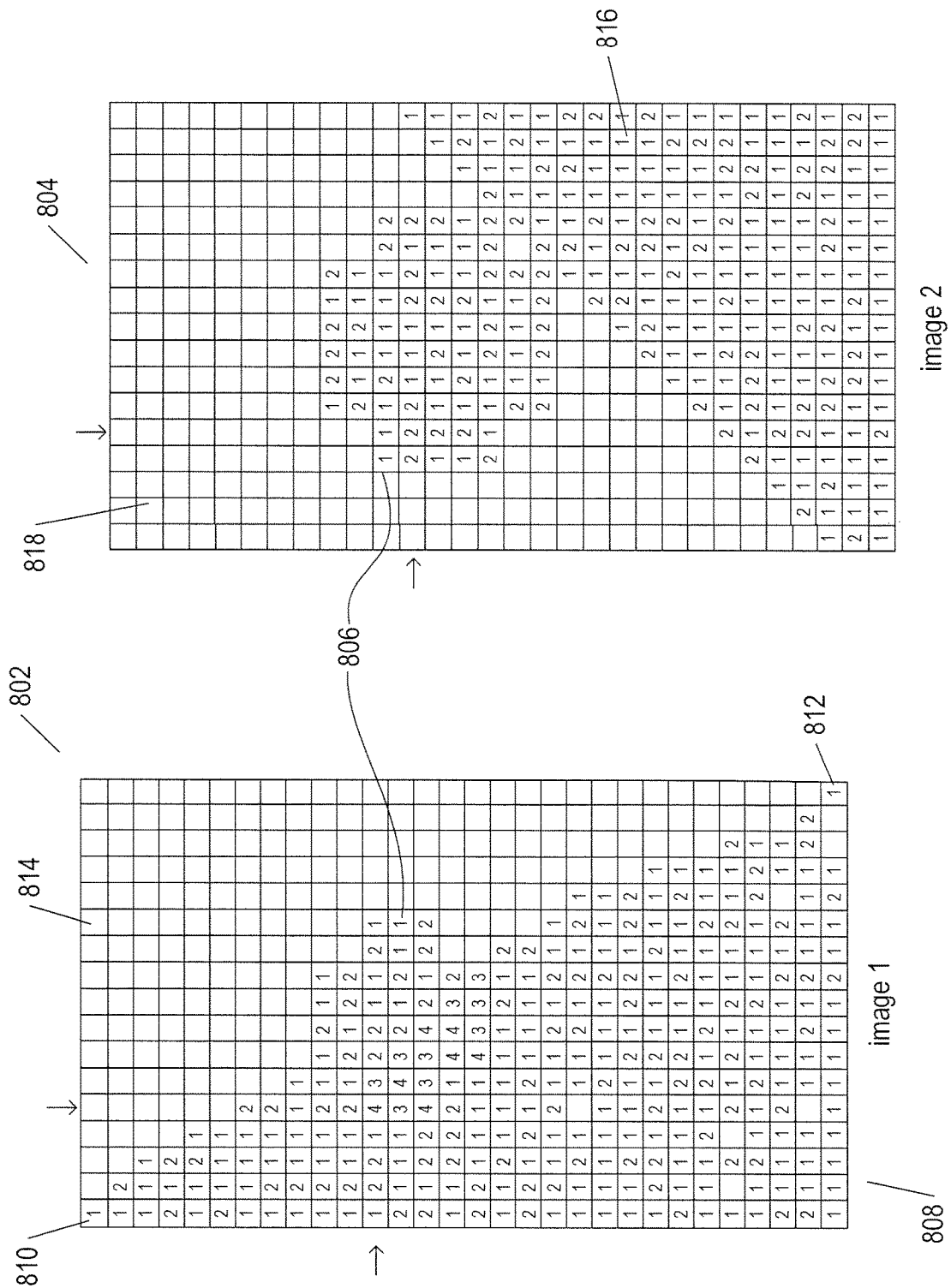
Figure 8B:
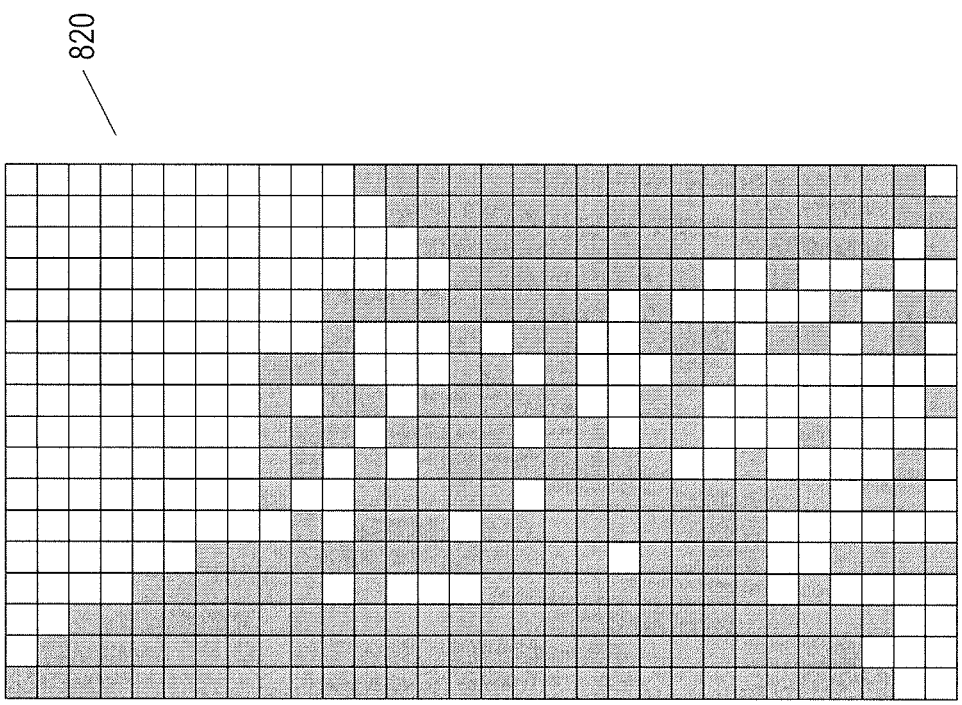

FIGS. 8A-D show a different example of image comparison using the same illustration conventions used in FIGS. 6A-D and FIGS. 7A-D. The original images 802 and 804 shown in FIG. 8A both contain the imaged cruciform object 806. However, original image 802 additionally includes a systematic variation in image intensity, with the portion of the image 808 below a diagonal line from the top left-hand pixel 810 to the bottom right-hand pixel 812 having higher intensities than the portion of the image 814 above the diagonal line. Similarly, the second original image 804 has a lower, roughly triangular region 816 with generally higher intensities than the upper portion 818 of the image. Such systematic intensity differences and patterns may be caused by shading or illumination differences in the environment being imaged or by systematic variations in recorded pixel intensities during image capture within the image-capture device. FIG. 8B shows the unthresholded difference image 820 in similar fashion to the unthresholded difference images shown in FIGS. 6B and 7B. Because of the systematic pixel-intensity differences within each of the original images, the unthresholded difference 820 appears to have more difference pixels than non-difference pixels and is dominated by differences generated from the systematic intensity variation within the two original images rather than from the increase in size of the cruciform object 806. When the difference image is thresholded to remove difference pixels with unrescaled absolute-value intensities less than 2, the thresholded difference image 822, shown in FIG. 8C, is much less cluttered, but also fails to clearly show the differences of interest that represent an increase in size of the cruciform object. When the difference image is thresholded to remove difference pixels with unrescaled absolute-value intensities of 1 and 2, to produce the difference image 824 shown in FIG. 8D, there is almost no difference information of interest remaining in the thresholded difference image. Thus, systematic intensity variation within the original images may completely frustrate an attempt to extract meaningful difference information from the two images.

Figure 9A:
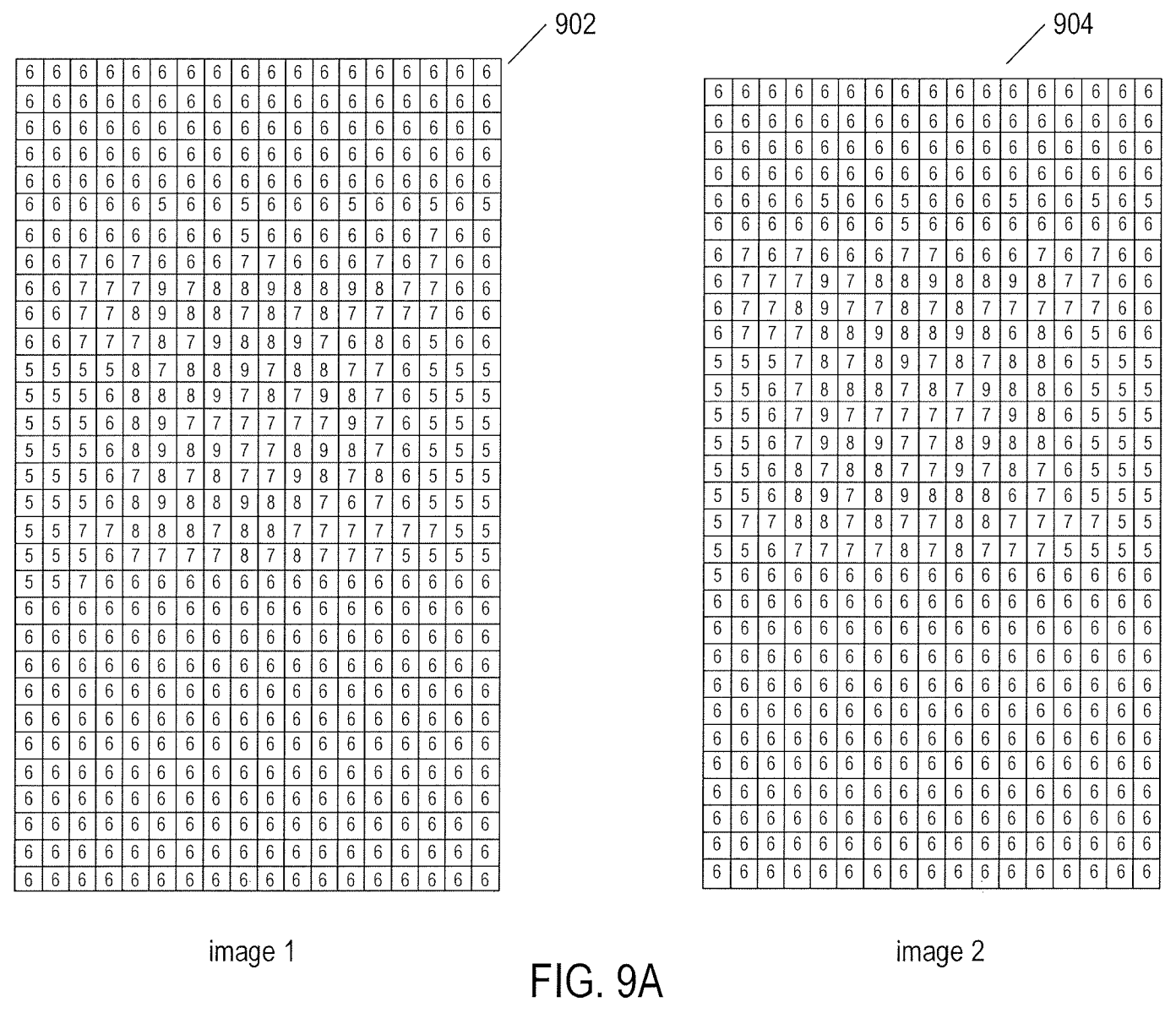
Figure 9B:
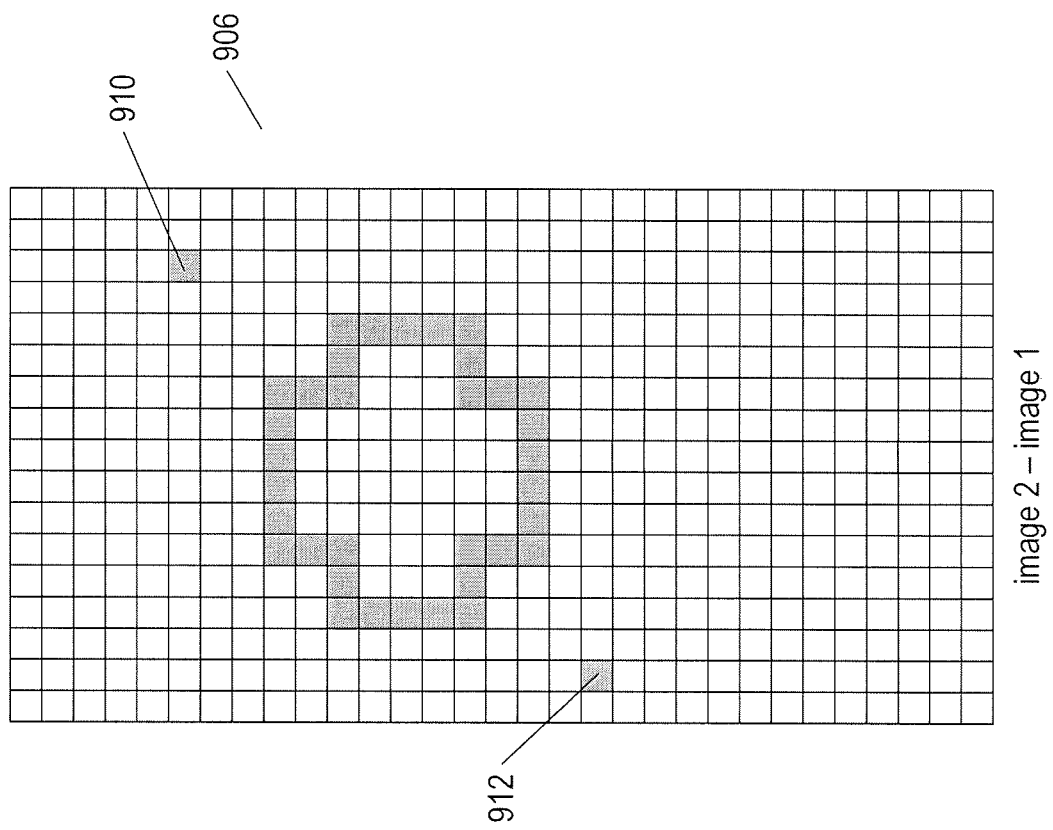

FIGS. 9A-B illustrate a typical result obtained by digital-image comparison. In the examples of FIGS. 5A-8D, the difference pixels of interest were readily apparently from visual inspection of the example original images shown in FIGS. 5A, 6A, 7A, and 8A. By contrast, in many real-world image-analysis problems, the differences may not be readily apparent during visual inspection of the original images. For example, FIG. 9A shows original images 902 and 904 in which all of the pixels have intermediate or high intensities. Neither the imaged cruciform object nor the increase in size of the imaged cruciform object is readily apparent from these displayed intensities. However, when the two images are differenced to produce difference image 906 shown in FIG. 9B, the pattern of difference pixels nicely shows the growth of size of the imaged cruciform object 908 along with several noise-induced differences 910 and 912. Thus, in many cases in which computational digital-image comparison is used, the comparison may reveal meaningful patterns that are not apparent to human viewers. Such subtle patterns of intensity difference are often completely obscured by the presence of noise or systematic intensity variations, as discussed above with reference to FIGS. 7A-D and 8A-D. It is to facilitate comparison of digital images that the normalization methods and systems disclosed in the current document were developed.

Normalization methods and systems are employed to reduce or eliminate certain types of intensity variations among digital images prior to applying comparison operations to the digital images in order to detect meaningful differences in intensity between the digital images and prior to subsequent operations performed on sets of multiple digital images. The currently disclosed normalization methods and systems seek to remove systematic intensity variation without exacerbating noise-induced intensity variations between images, which can lead to obscuring or eliminating the meaningful differences between digital images sought by digital-image comparison and which can complicate or render ineffective additional types of digital-image operations applied to sets of normalized digital images. The currently disclosed normalization methods and systems normalize digital images using the intensity values of pixels or voxels within the images themselves, although the may normalization methods and systems additionally use extrinsic information, including anatomical atlases in the case of medical images.

Figure 10A:
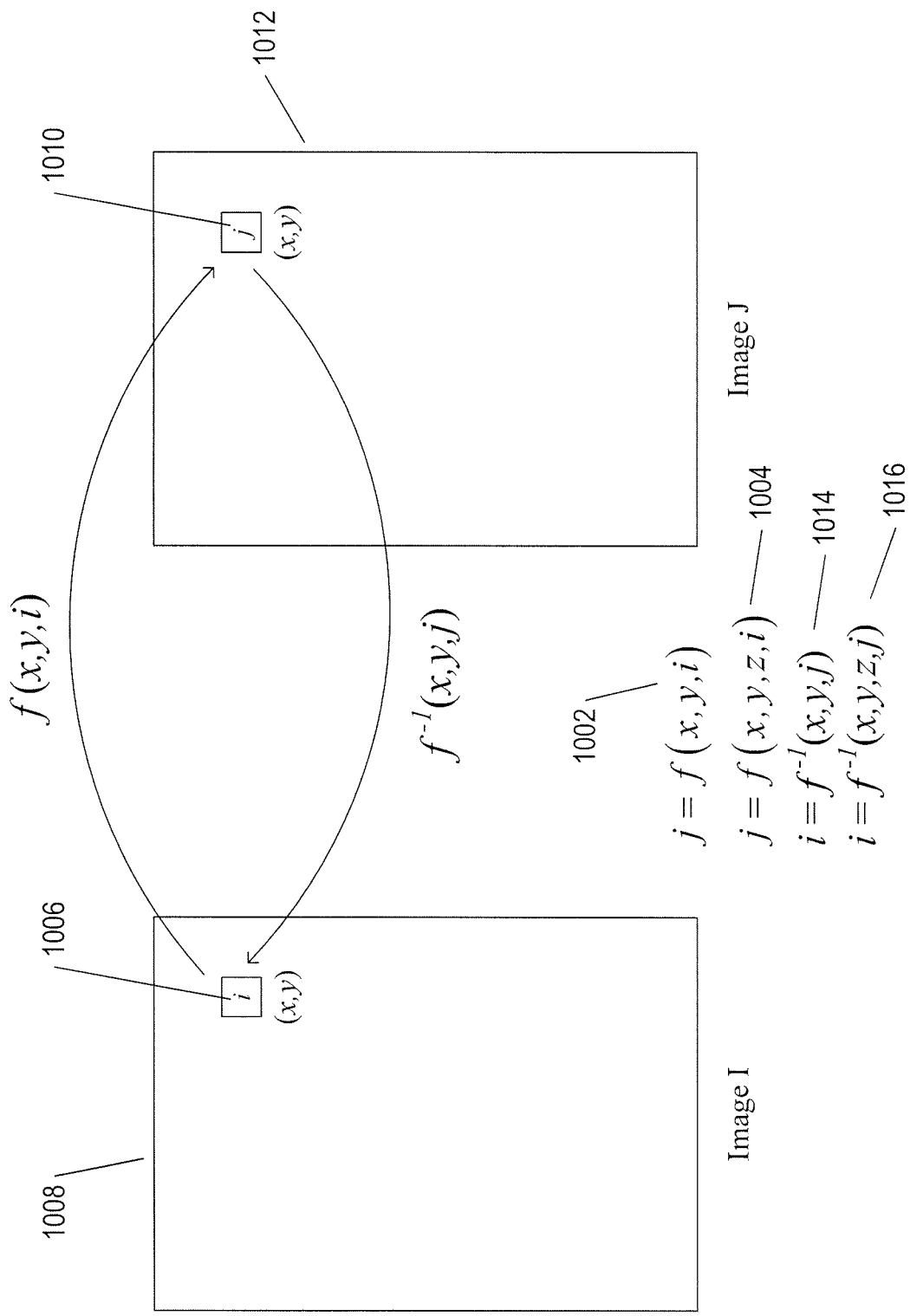
FIGS. 10A-B illustrate underlying concepts of normalization methods and systems.
Figure 10B:
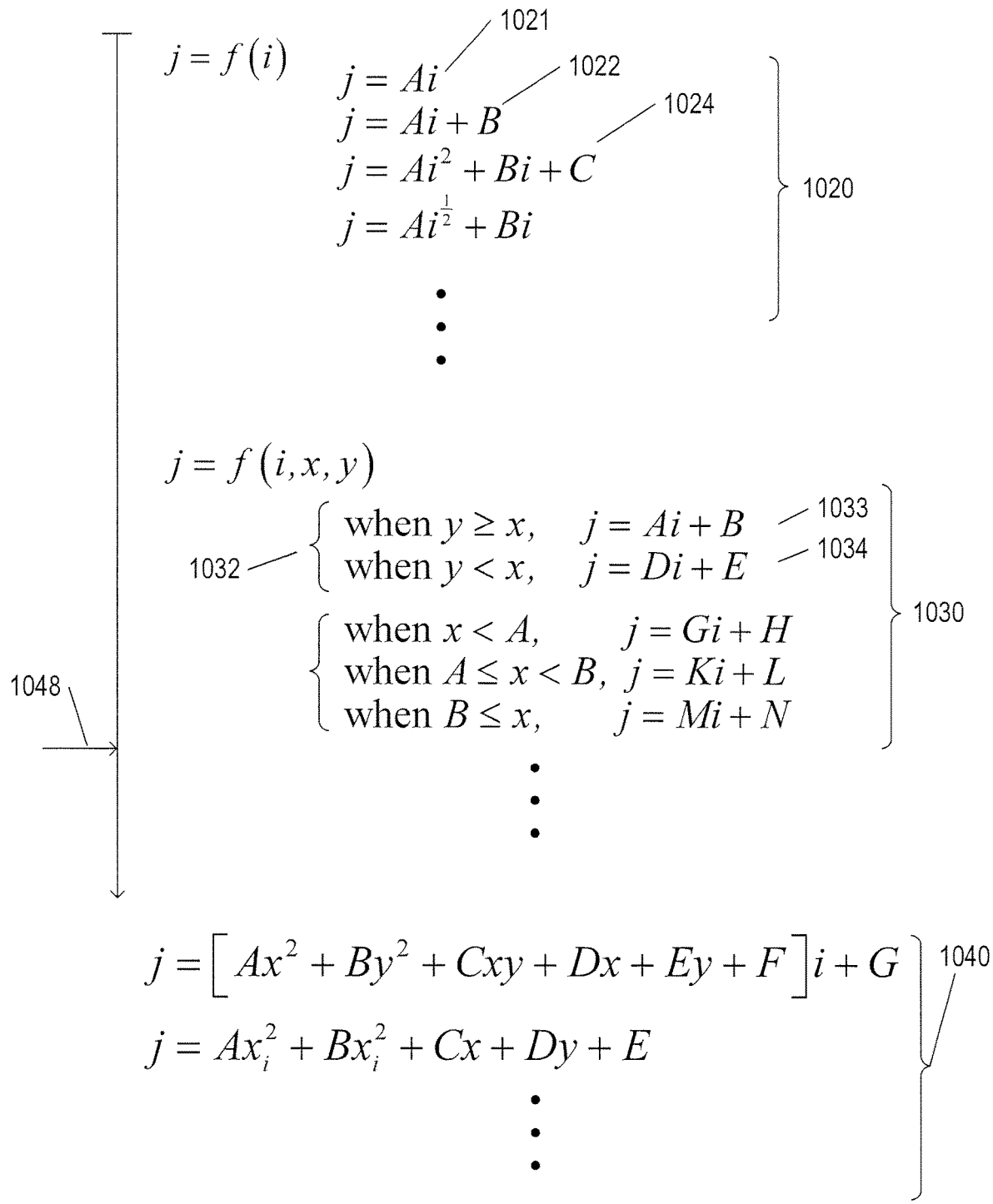

FIGS. 10A-B illustrate underlying concepts of normalization methods and systems. As shown in FIG. 10A, the normalization methods seek to generate a mapping model, such as a mapping function 1002 for two-dimensional images or a mapping function 1004 for three-dimensional images that, given the position and intensity of a pixel 1006 in a first image 1008, generate a corresponding intensity 1010 for an equivalently located pixel in a second image 1012. By applying the mapping model to each pixel in the first image, a normalized image is produced that can be compared to the second image by using any of many different types of comparison operations to reveal intensity differences of interest between the two images. Of course, the mapping model can also be applied in an opposite sense 1014 and 1016 to the second image to normalize the intensities in the second image to those of the first image.

FIG. 10B illustrates, for the two-dimensional-image case, a range of different types of analytical functions, that may be contemplated as mapping models for intensity normalization. A first class of mapping functions 1020 generates corresponding intensities j for intensities i without regard for the position of the pixel with that intensity in the first image. In other words, in this class of mapping functions, only the intensity i is provided as an argument. The mapping functions may be any of a variety of different types of expressions, including linear mapping functions 1021-1022 and quadratic mapping function 1024. Note that, in FIG. 10B, capital letters represent constant parameters in the example mapping functions.

In a second class of mapping functions 1030, each mapping function takes both the intensity as well as the position of a pixel in the first image as arguments and generates a corresponding intensity for a pixel at that same position in the second image. However, as shown by example mapping function 1032, the position arguments are used only to determine to which of several different subregions, or domains, the image any particular mapping function applies. In model 1032, when the pixel is in an upper left triangular domain of the image, a first linear function 1033 is used while, when the input pixel is in a lower triangular region or domain of the image, a second linear function 1034 is used. Thus, the second class of mapping functions essentially divide or partition an image into multiple domains, for each of which a domain-specific mapping function is generated for normalization of the intensities within an image.

A third class of mapping functions 1040 specifically maps individual pixel intensities to corresponding individual pixel intensities. For these mapping functions, both the position and the intensity of a pixel are variables within the mapping function. As shown in the downward-pointing vertical arrow 1048 in FIG. 10B, the specificity of the mapping functions significantly increase over the classes 1020, 1030, and 1040. Were model functions of the final class 1040 obtainable, and were they accurate, such mapping functions may be reasonably expected to provide the most precise and accurate intensity normalization. However, the problem with this level of specificity is that there is generally insufficient data, when only the intensity values within the two images are considered, to try to determine parameter values for such functions in a single pass at parameter optimization. As the model functions become more specific, the danger of the functions being dominated by stochastic noise, rather than real intensity-difference variations between the images, greatly increases, as a result of which a normalization process that attempted to employ such mapping functions in an initial single-pass optimization would likely mask meaningful differences obtained by subsequent image comparison and would instead generate a large amount of unwanted and meaningless noise-induced differences. Thus, as indicated by arrow 1048 in FIG. 10B, the currently disclosed normalization methods and systems, in many implementations, initially use either models of the first class 1020 or the second class 1030, with the additional caveat that the domains specified in the second class of mapping functions must be sufficiently large to provide a sound statistical basis for determining mapping-function parameters.

There are many different possible types of mapping functions, in addition to the polynomial expressions shown in FIG. 10B, for each of the three classes of mapping functions 1020, 1030, and 1040. Mapping functions are generally parametrized, so that the parameters can be determined and adjusted during the process of producing a specific mapping function or set of mapping functions for a given set of digital images. Mapping functions may not be representable as single closed-form expressions, but may be instead specified programmatically or specified as piecewise components, each represented by a different expression.

Figure 11:
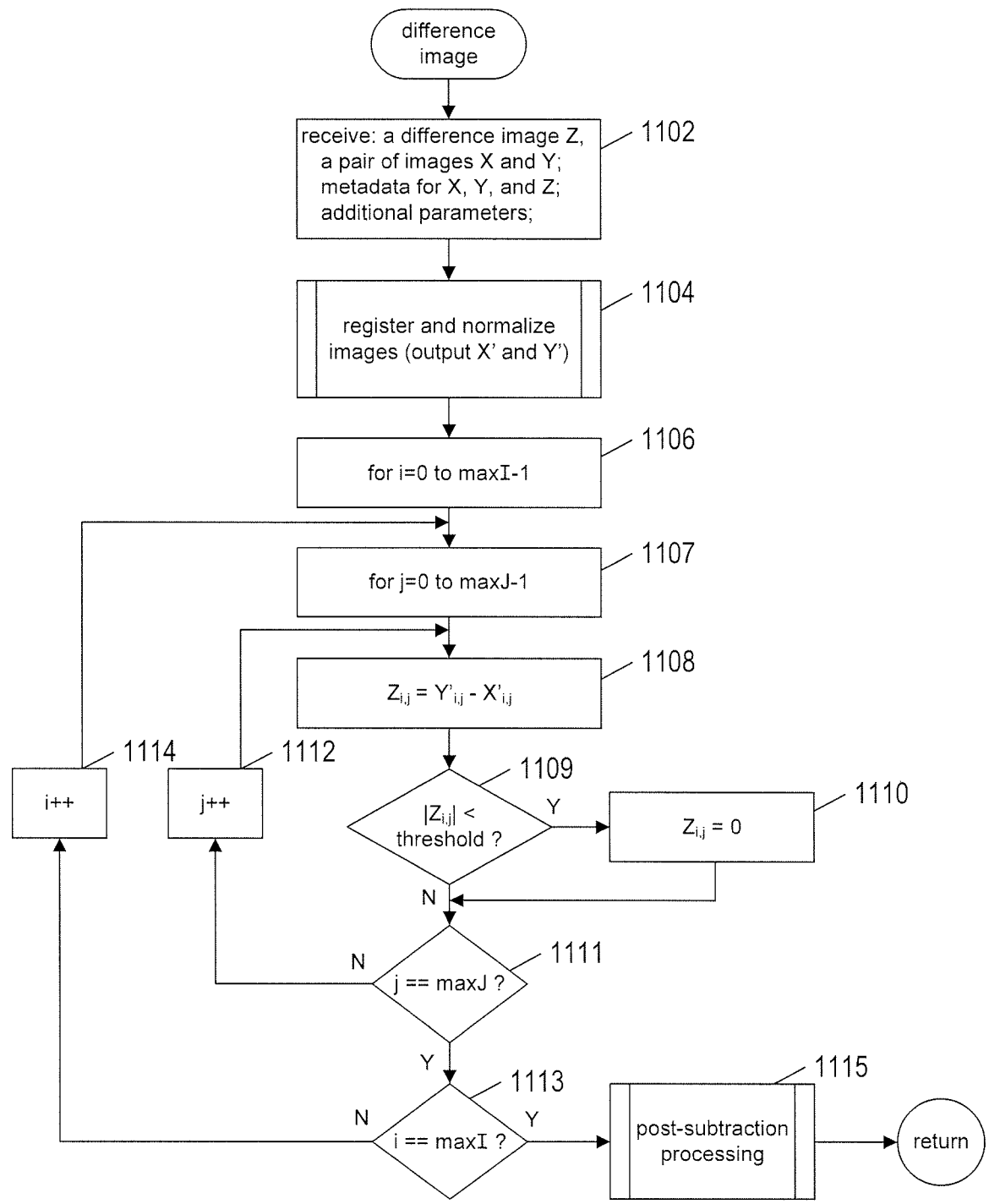
FIG. 11 provides a control-flow diagram that illustrates generation of a difference image from a pair of images.

Difference Images and Problems Arising from Registration and Normalization of Images Prior to Application of the Difference Operation to Images FIG. 11 provides a control-flow diagram that illustrates generation of a difference image from a pair of images. As mentioned above, difference images provide a basis for a variety of different image-processing techniques, including synthetic enhancement of images, generation of quantitative-enhancement maps, and various types of change-detection techniques. In step 1102, the difference-image-generation routine receives an initialized difference image Z, a pair of images X and Y on which the difference operation is to be applied to generate values for the difference image Z, metadata for the images X, Y, and Z, and, depending on the implementation, additional parameters. In step 1104, the pair of images are registered and normalized. Registration involves aligning the two images so that two pixels at equivalent locations of the two images correspond to the same volume of imaged tissue, for medical images, or for the same volume of whatever entity is being imaged, for other types of images. Normalization, as discussed above, seeks to align the intensity values within the two images so that two pixels at equivalent locations of the two images show the same intensity value when the physical properties of the volume of whatever entity is being imaged at the location are similar. In other words, following normalization, any difference between the intensities of two pixels at equivalent locations within the two images should reflect a change in one or more physical properties of the corresponding volume of whatever entity is being imaged. Next, in the nested for-loops of steps 1106-1114, for each pair of corresponding pixels in the two input images X and Y, a difference intensity is computed, in step 1108, and placed in a corresponding pixel of the difference image Z. When the difference operation is applied to three-dimensional images, there would be an additional for-loop within the nested for-loops since voxels of three-dimensional images are specified by three indices. When the nested for-loops have completed executing, the difference image Z has been generated. In step 1115, any of various different post-subtraction processing steps are carried out. One type of novel post-subtraction processing is disclosed later in this document. A common example of post-subtraction processing is a thresholding operation to set the intensity of pixels with absolute intensity values less than a threshold value to 0. Quite often, low-intensity pixels in difference images may result from noise or slight registration or normalization deficiencies. Of course, depending on the implementation language, the images X, Y, and Z may be passed to the routine by reference to avoid the overhead of copying the images from one memory location to another.

FIGS. 12A-E illustrate some of the problems associated with difference images. The example used in FIGS. 12A-E is a difference image generated from a pair of medical images $I_1$ and $I_2$. Image $I_1$ was acquired prior to injection of a contrast agent into a network of connected vessels of a patient and image $I_2$ was acquired following injection of the contrast agent into the vessels. In this example, the contrast agent is used to enhance the visual signal corresponding to fluid leaking from a vessel into the surrounding tissue. This is a hypothetical example used to illustrate problems with difference images, and does not correspond to an actual physiological example or phenomenon. In order to clearly illustrate these problems, two-dimensional images are used in the examples. However, throughout this document, methods described with reference to two-dimensional images can also generally be applied to three-dimensional images and vice versa.

Figure 12A:
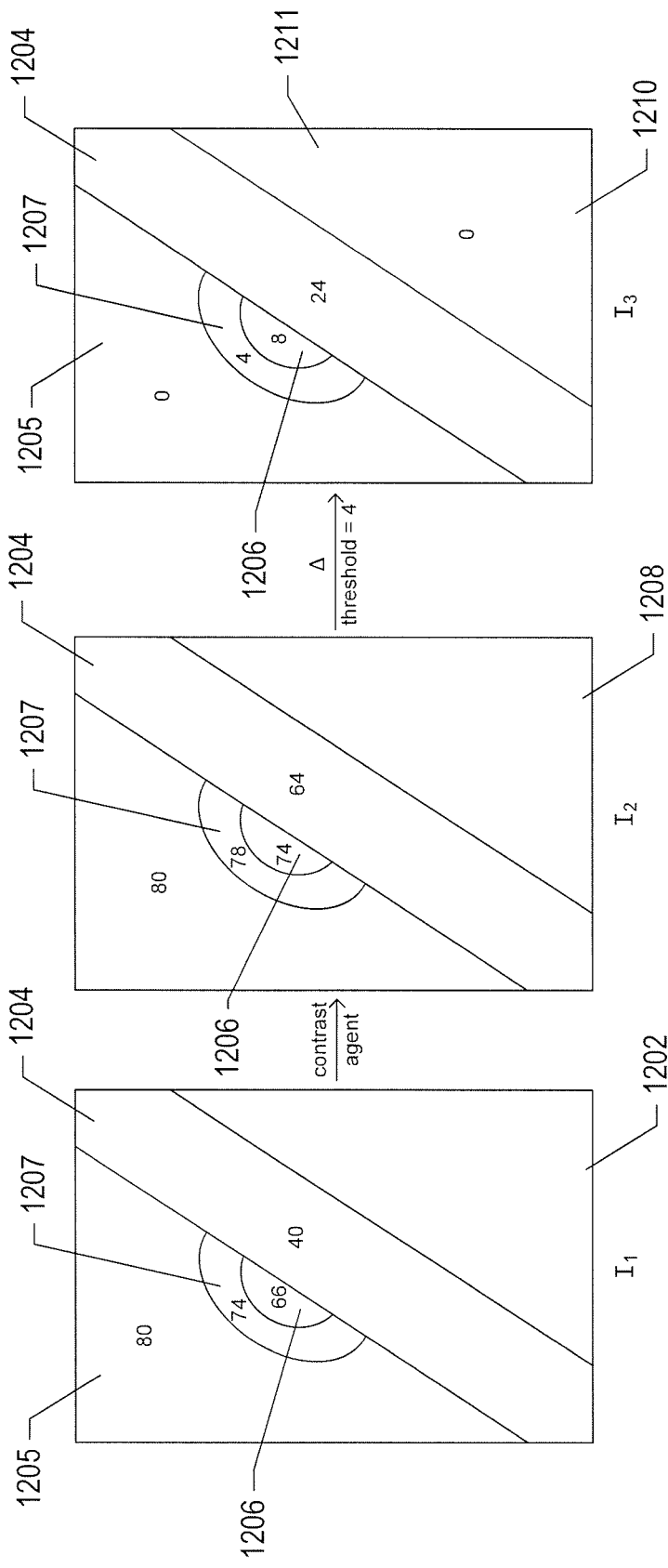
FIGS. 12A-E illustrate some of the problems associated with difference images.

FIG. 12A illustrates the hypothetical example the case that the two images $I_1$ and $I_2$ have been perfectly registered and aligned. Image $I_1$ 1202, the pre-contrast image, shows a vessel 1204 within body tissue 1205 from which fluid has leaked, forming a first fluid-infused region 1206 that contains 35% leaked fluid and a second, surrounding fluid-infused region 1207 that includes 15% leaked fluid. Of course, since this is a two-dimensional image, the image portrays a cross-section of the imaged portion of the patient's body. In this example, the fluid within the vessel has an intensity of 40, the body tissue has an intensity of 80, the contrast agent has an intensity of 1240, and, following introduction of the contrast agent into the patient's network of connected vessels, the vessel fluid contains 2% of the contrast agent, by volume. In image $I_1$, the vessel 1204 has an intensity of 40, since it is filled with vessel fluid. The first fluid-infused region 1206 has an intensity of 66, which is computed as follows:

(0.35*40)+(0.65*80)=66.

The second fluid-infused region 1207 has an intensity of 74, which is computed as follows:

(0.15*40)+(0.85*80)=74.

Image $I_2$ 1208 shows the same features as shown in image $I_1$, but introduction of the contrast agent has brightened the fluid-containing regions of the image. Now, the vessel 1204 has an intensity of 64, which is computed as follows:

(0.02*1240)+(0.98*40)=64.

The first fluid-infused region 1206 in image $I_2$ has an intensity of 74, which is computed as follows:

(0.35*64)+(0.65*80)=74.

The second fluid-infused region 1207 in image $I_2$ has an intensity of 78, which is computed as follows:

(0.15*64)+(0.85*80)=78.

When image $I_1$ is subtracted from image $I_2$ by the difference operation, the difference image $I_3$ 1210 is produced, with post-subtraction thresholding used to set the intensity values of pixels in image $I_3$ with absolute intensity values less than 4 to 0. As can be seen by comparing this image with images $I_1$ and $I_2$, the intensity of each region in the difference image $I_3$ is the intensity of the corresponding region of image $I_1$ subtracted from the corresponding region of image $I_2$. The tissue regions 1205 and 1211 in the difference image $I_3$ have intensity 0, and therefore are black while the regions corresponding to the vessel 1204 and the two fluid-infused regions 1206 and 1207 are brighter. The difference image thus highlights those portions of the patient's body which contain the contrast agent. Difference images can be used for enhancing particular features of medical images and other types of images.

Figure 12B:
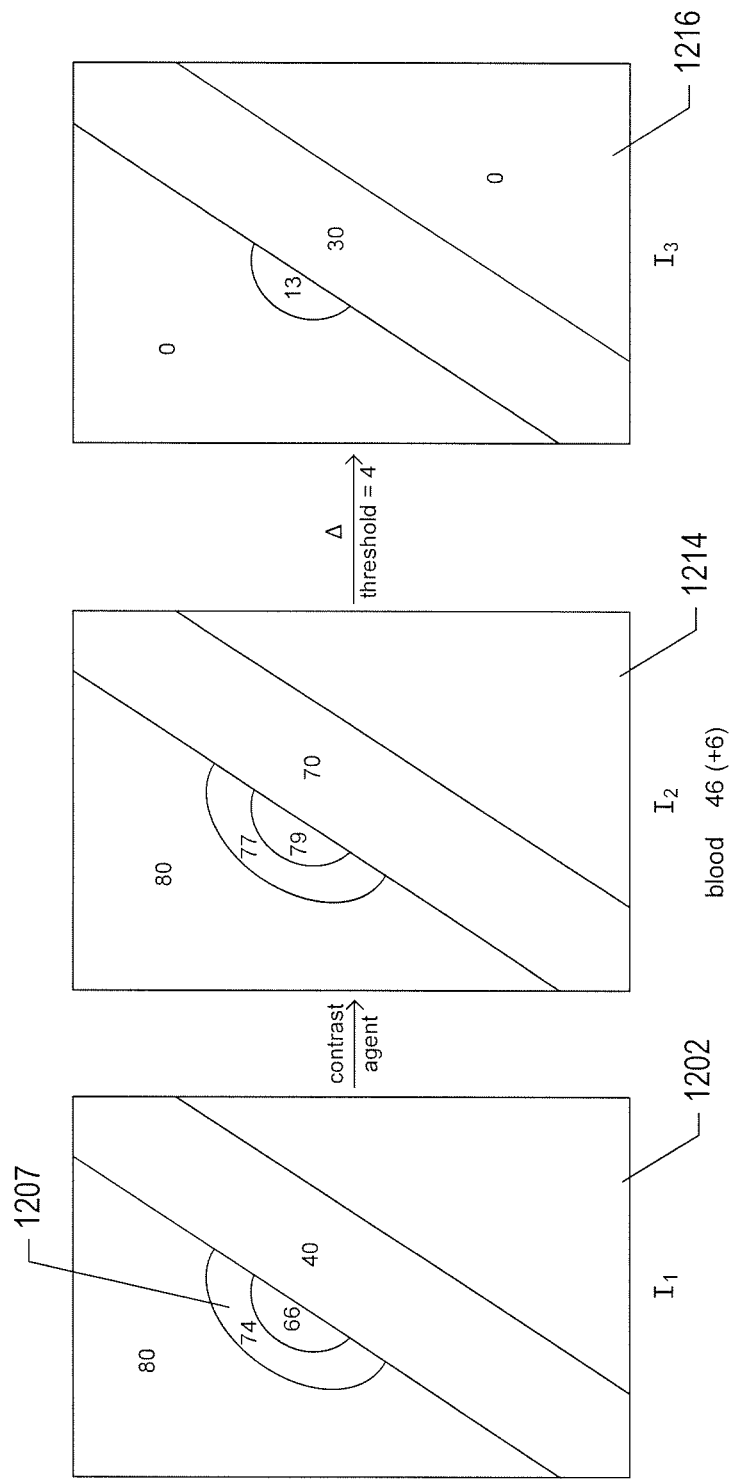

FIG. 12B shows the same hypothetical example of FIG. 12A, but with a slight normalization problem. Image $I_1$ 1202 is identical to image $I_1$ in FIG. 12A. However, due to a normalization problem, the intensity of fluid in Image $I_2$ 1214 in FIG. 12B is 46 rather than 40. Thus, the intensity range in image $I_2$ 1214 in FIG. 12B has been slightly compressed, from the lower end upward, with respect to the intensity range in image $I_1$ 1202. Due to this normalization problem, in difference image $I_3$ 1216, the second fluid-infused region 1207 does not appear since the intensity of the region in the initial difference image $I_3$ would be 3 and is therefore removed by the thresholding operation. This is a simple example in which a normalization problem can produce a significant deficiency in a difference image computed from imperfectly normalized medical images. Comparing difference image $I_3$ 1210 in FIG. 12A to difference image $I_3$ 1216 in FIG. 12B, one might conclude, from reviewing difference image $I_3$ 1216 in FIG. 12B alone, that the fluid vessel may have a bulge or protuberance rather than a leak, which might, in turn, lead to a very different diagnosis for the patient.

Figure 12C:
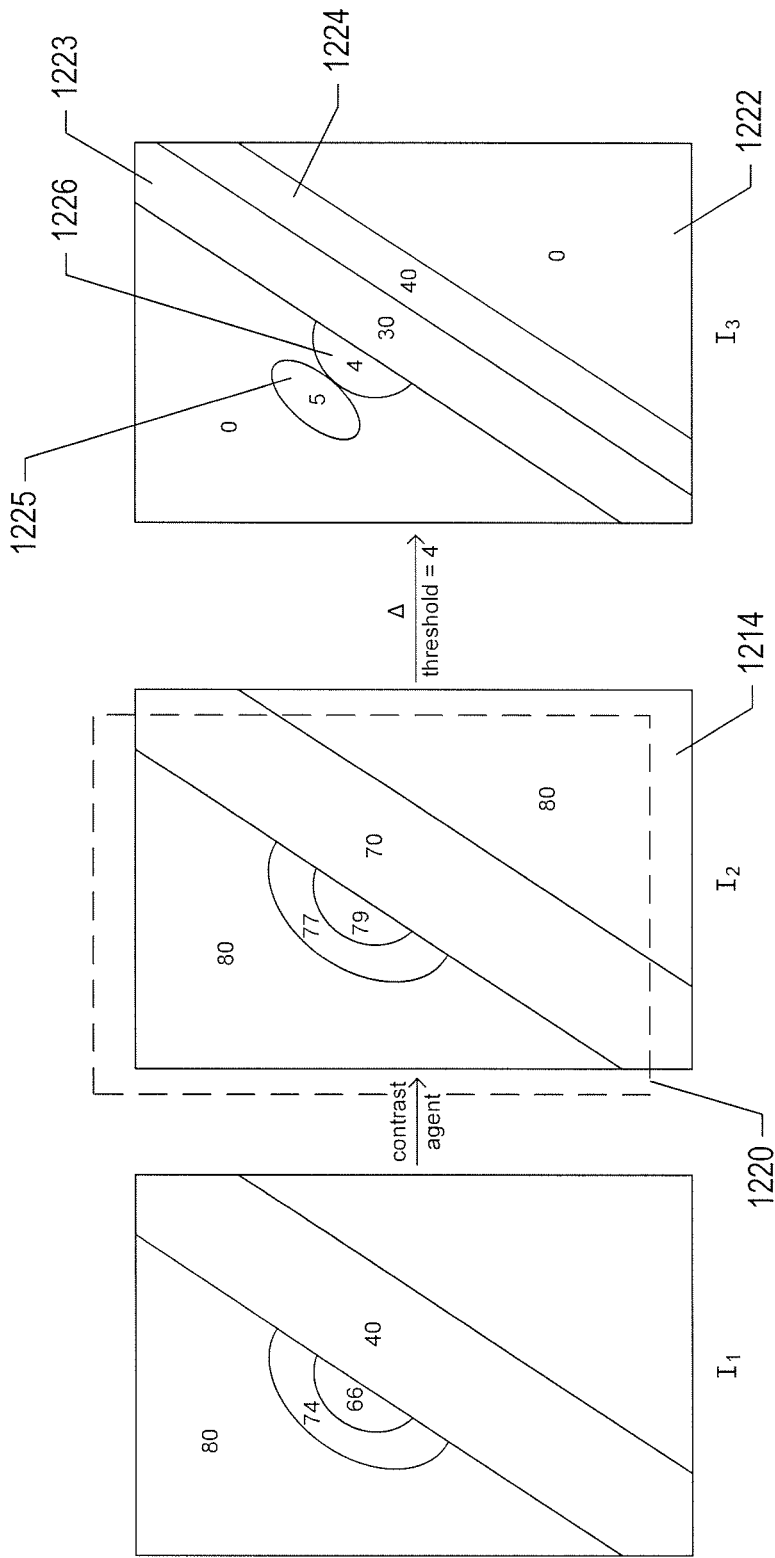

FIG. 12C shows the same hypothetical example of FIG. 12B, but with an additional registration problem in addition to the slight normalization problem, discussed above with reference to FIG. 12B. As indicated by the dashed rectangle 1220 overlying image $I_2$ 1214 in FIG. 12C, the registration failed to properly align image $I_1$ with image $I_2$. The resulting difference image $I_3$ 1222 looks much different than either difference image $I_3$ 1216 in FIG. 12B or difference image $I_3$ 1210 in FIG. 12A. The fluid-vessel region now has two portions 1223 and 1224 of different intensities, the two fluid-infused regions 1225 and 1226 have lower relative intensities, and the second fluid-infused region 1225 is oddly shaped. A reviewer of image $I_3$ 1222 might conclude that the two fluid-infused regions 1225 and 1226 are insignificant artifacts.

Figure 12D:
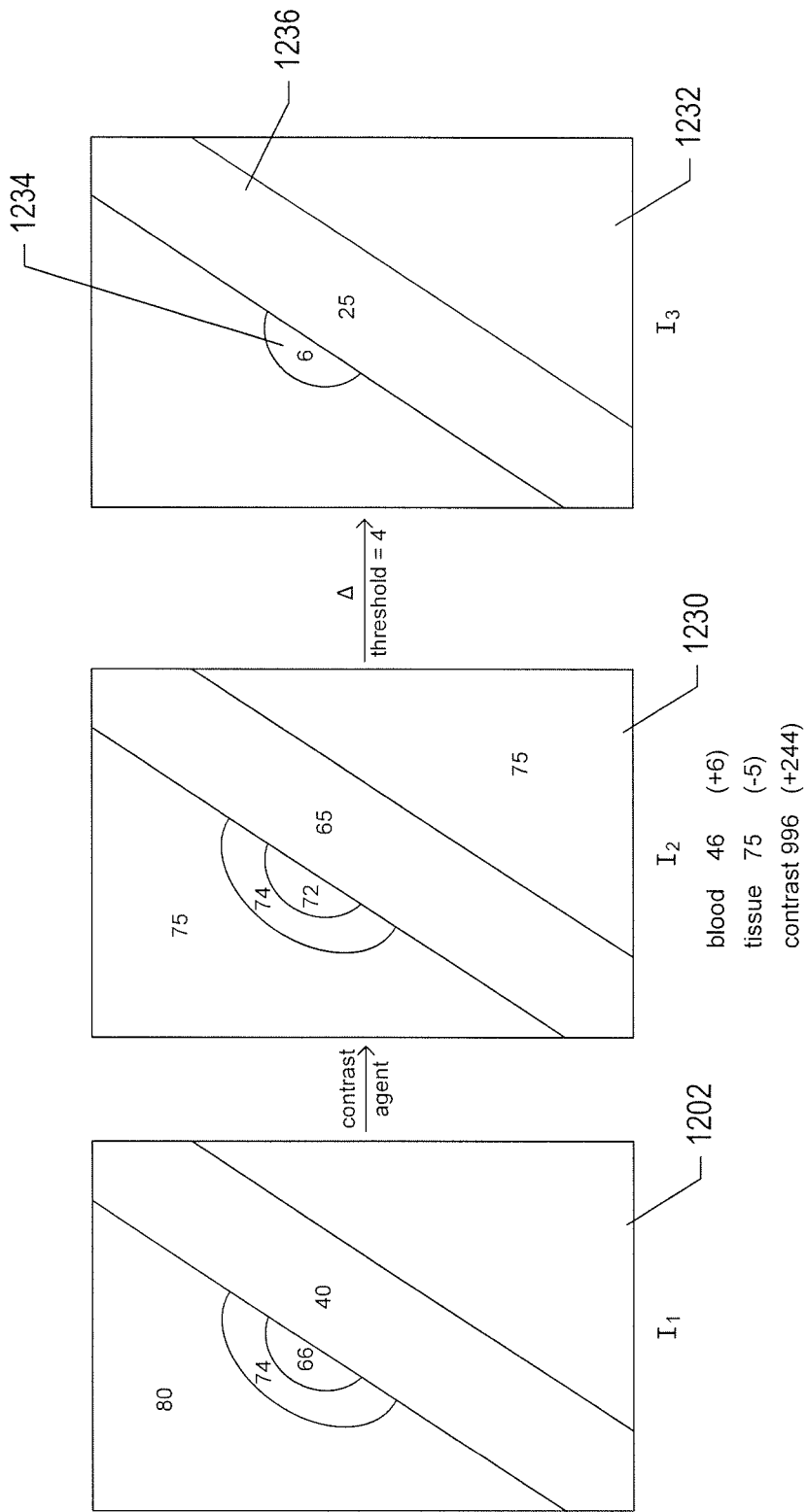

FIG. 12D shows the same hypothetical example of FIG. 12A, but with a more serious normalization problem than that discussed above with reference to FIG. 12B. In this case, the intensity range within image $I_2$ 1230 has been compressed both from below and above, and is significantly narrower than the intensity range within image $I_1$ as a result of a normalization error. The resulting difference image $I_3$ 1232 is similar to difference image $I_3$ 1216 in FIG. 12B, but the relative intensity of the first fluid-infused region 1234 to the fluid-vessel region 1236 is much lower. A reviewer of image $I_3$ 1232 might conclude that the first fluid-infused region 1234 is an insignificant artifact.

Figure 12E:
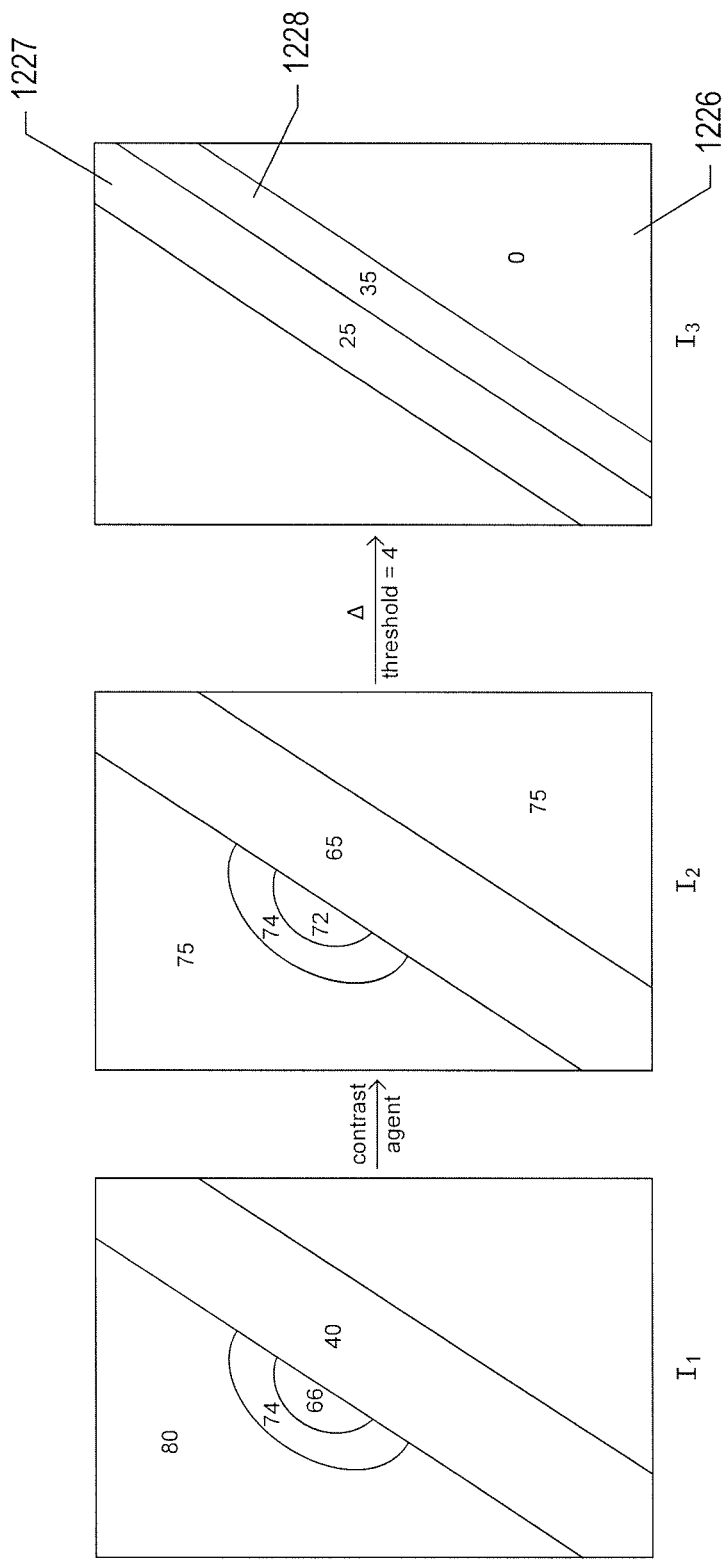

FIG. 12E shows the same hypothetical example of FIG. 12D, but with the registration problem, discussed above with reference to FIG. 12C, in addition to the normalization problem, discussed above with reference to FIG. 12D. The resulting difference image $I_3$ 1226 shows only the fluid-vessel region, comprising two portions 1227 and 1228 of different intensities. Neither of the two fluid-infused regions, 1206 and 1207 in FIG. 12A, show any signal in difference image $I_3$. Clearly, registration and normalization deficiencies and problems can result in a difference image that fails to accurately reflect the subject matter that has been imaged and that is ambiguous, misleading, or even dangerously misleading.

Returning to FIG. 12A, consider again the hypothetical example shown in FIG. 12A. In image $I_1$ 1202, the fluid-infused regions 1206 and 1207 have intensity values 66 and 74 that fall between the relatively low-intensity value of fluid, 40, and the comparatively higher intensity value of the non-fluid tissue, 80. The intensity values of the fluid-infused regions accurately reflect the percentage of fluid in the tissue. In the difference image $I_3$ 1210, the ratio of the intensity of the first fluid-infused region 1206 to the intensity of the fluid-vessel region is 8/24=0.33 or 33%, which is close to the percentage of fluid in the first fluid-infused region, 35%. Similarly, the ratio of the intensity of the second fluid-infused region 1207 to the intensity of the fluid-vessel region is 4/24=0.17 or 17% which is close to the percentage of fluid in the first fluid-infused region, 15%. When the pair of images to which the difference operation is applied have been properly registered and normalized, the intensity ratios in the resulting difference image closely reflect underlying conditions within the imaged entity. In this hypothetical example, the intensity ratios of the non-0-intensity regions in the difference image $I_3$ reflect the ratios of fluid content in the different regions due to the presence of the highly luminous contrast agent in the fluid. In this sense, difference image $I_3$ represents a quantitative-enhancement map, since the intensity values in the image accurately represent the changes between the pre-contrast image $I_1$ 1202 of the post-contrast image $I_2$ 1208. However, as shown in FIGS. 12B-E, improper registration and/or normalization renders difference images at least non-quantitative and often misleading. For example, in FIG. 12B, due to a relatively small normalization problem, the ratio of intensities of the first fluid-infused region to the fluid-vessel region is 43% and in FIG. 12D, due to a more significant normalization problem, ratio of intensities of the first fluid-infused region to the fluid-vessel region is 24%. In both cases, the ratios of intensities no longer reflect the relative amounts of contrast in the contrast-enhanced regions, and these difference images are thus non-quantitative.

Many different types of registration and normalization methods have been developed and are in current use. Many registration methods can handle rigid-body alignment of images, which involve rotations and translations. Certain registration methods can additionally handle affine transformations, which involve skewing of the coordinate axes due to shearing within the subject matter being imaged, and scaling transformations. Certain of the most recently developed registration methods are able to take into consideration various types of local, non-linear deformations of the subject matter being imaged in successive images and correct for such local deformations, such as local fluid-like plastic deformations of living tissue. However, great care must be taken when applying registration methods that attempt to correct for a local, non-linear deformations, since many of the subtle intensity changes in a difference image reflective of changes in the subject matter being imaged might be reduced or eliminated by such registration methods. For many types of subjects, it is best to restrict registration to consideration of rigid-body and affine transformations, together referred to below as semi-rigid transformations. Similarly, many currently used normalization methods fail to precisely normalize images prior to application of the difference operation. Many of these normalization methods rely on generalized models, such as those discussed above with reference to FIG. 10B, which may statistically fit a large portion of the pixels or voxels within a pair of images but which may exhibit local inaccuracies that result in ambiguities and mischaracterizations of the actual contents of the subject matter being imaged, such as in the hypothetical examples shown in FIGS. 12B-E. As discussed above, one of the problems associated with the more spatially sensitive normalization models is the lack of sufficient intensity data within a pair of images to precisely fit values to the many more parameters on which such models depend. While the problems associated with spatially sensitive normalization models might seem to be possibly ameliorated by individually normalizing smaller regions of images, this would only exacerbate the statistical parameter-fitting problems, since even less data is available for smaller regions than for the entire image.

Thus, while difference imaging is a potentially valuable tool for change detection and generation of quantitative-enhancement maps, difference imaging is associated with numerous problems that arise from improper registration and normalization of images prior to application of the difference operation to them. Effective change detection and quantitative enhancement are only possible when images are properly registered and normalized prior to generation of difference images. The current document discloses registration and normalization techniques that provide the robustness and accuracy needed for generating difference images that, in turn, provide a basis for accurate change detection and quantitative enhancement.

Image Registration

As mentioned above, in order to generate accurate and reliable difference images for detecting changes in pairs of closely related images and to generate quantitative-enhancement maps and synthetically enhanced images, discussed below, it is necessary for pairs of images to which difference operations are applied to be accurately registered. Registration methods that do not rely on extrinsic information and that consider local, non-linear transformations are often unsuitable, since these methods may end up inadvertently reducing or removing localized differences between the images of a pair of images. Thus, registration methods that consider rigid-body transformations and, in some cases, affine transformations are desired for registering pairs of images to which difference operations are to be applied.

Figure 13A:
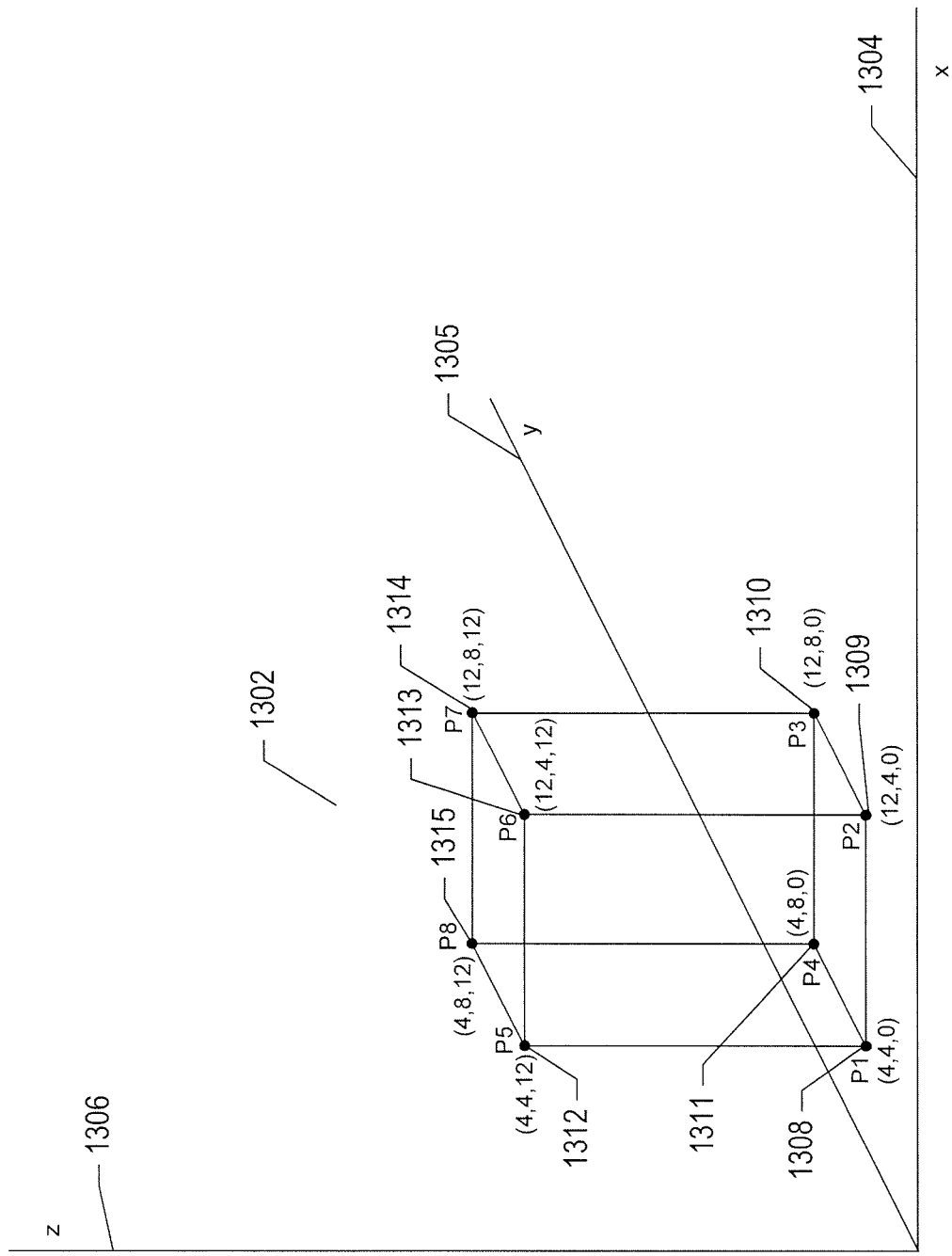
FIGS. 13A-G illustrate rigid-body transformations.
Figure 13B:
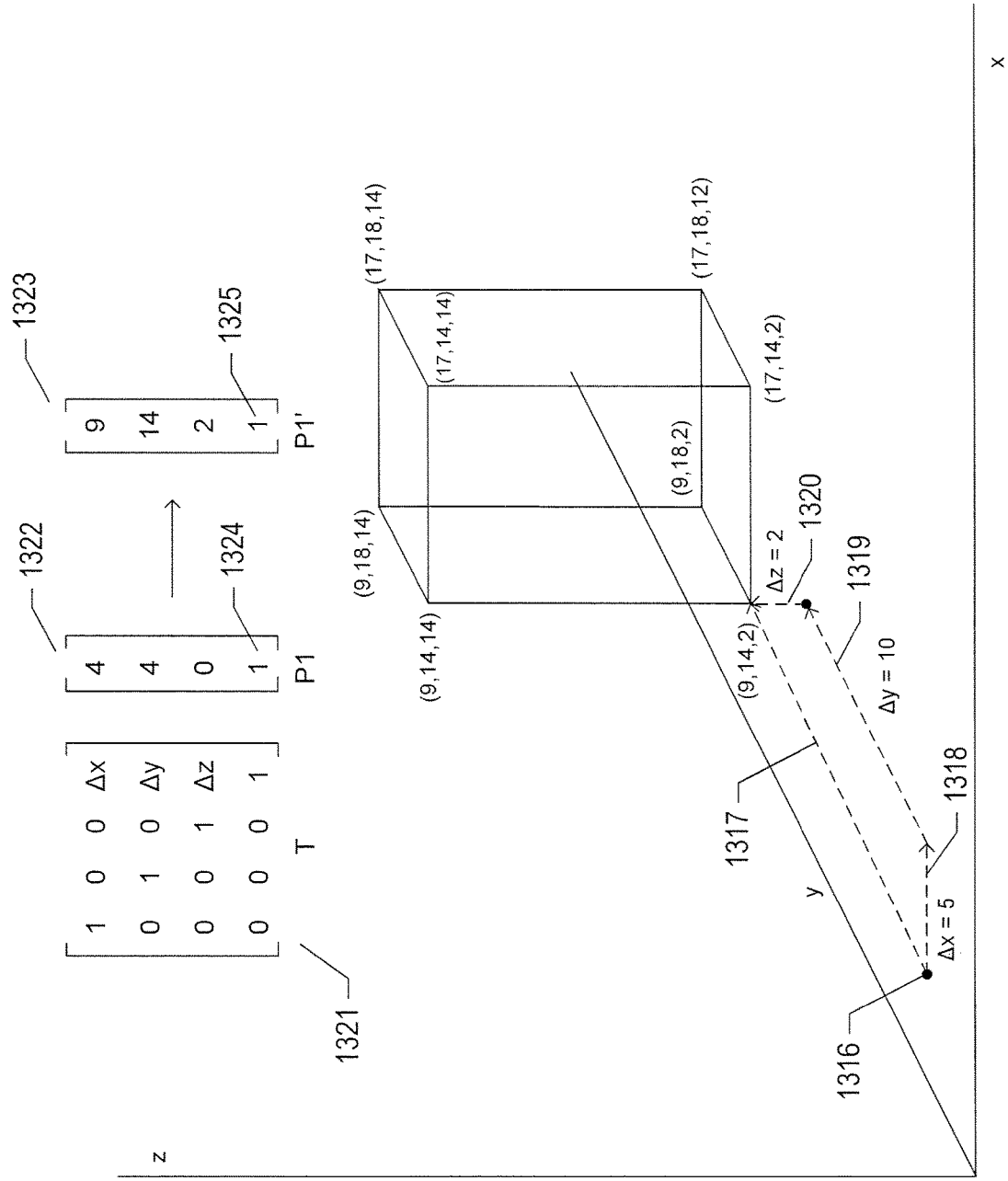

FIGS. 13A-G illustrate rigid-body transformations. In FIG. 13A, a rectangular solid 1302 is positioned in a three-dimensional space with Cartesian coordinate axes 1304-1306. The vertices, or corners, of the rectangular solid correspond to points P1, P2, . . . , P8 1308-1315, with the x, y, z coordinates for each vertex shown in the figure. Rigid-body transformations are mathematical operations that move an object within a space, such as a two-dimensional or three-dimensional space. The motions may be rotations of the object, translations of the object, or transformations that combine both rotations and translations. FIG. 13B illustrates a simple translation of the rectangular solid shown in FIG. 13A. The original location of the vertex P1 is indicated in FIG. 13B by point 1316. The transformation illustrated in FIG. 13B is represented by dashed arrow 1317 and consists of a rightward translation of 5 units parallel to the x axis 1318, an upward translation of 10 units parallel to the y axis 1319, and an upward translation of two units parallel to the z axis 1320. All points of the rectangular solid are translated from their original positions to their transformed positions by the vector 1317. The translation transform corresponding to vector 1317 can be expressed by the 4-by-4 transform matrix T 1321. In this case, $\Delta x=5$, $\Delta y=10$, and $\Delta z=2$. The position of a point is represented by a vector with four elements, such as vector 1322, which represents the position of point P1. Left multiplication of the vector by the transform matrix produces a four-element vector 1323 that represents the position of the transformed point, in this example designated "P1'." The final element in the four-element vectors 1324 and 132 is 1, and is disregarded. The first three elements correspond to the x, y, z coordinates for the point. Use of four-element vectors allows both rotations and translations to be represented by a single 4-by-4 transform matrix.

Figure 13C:
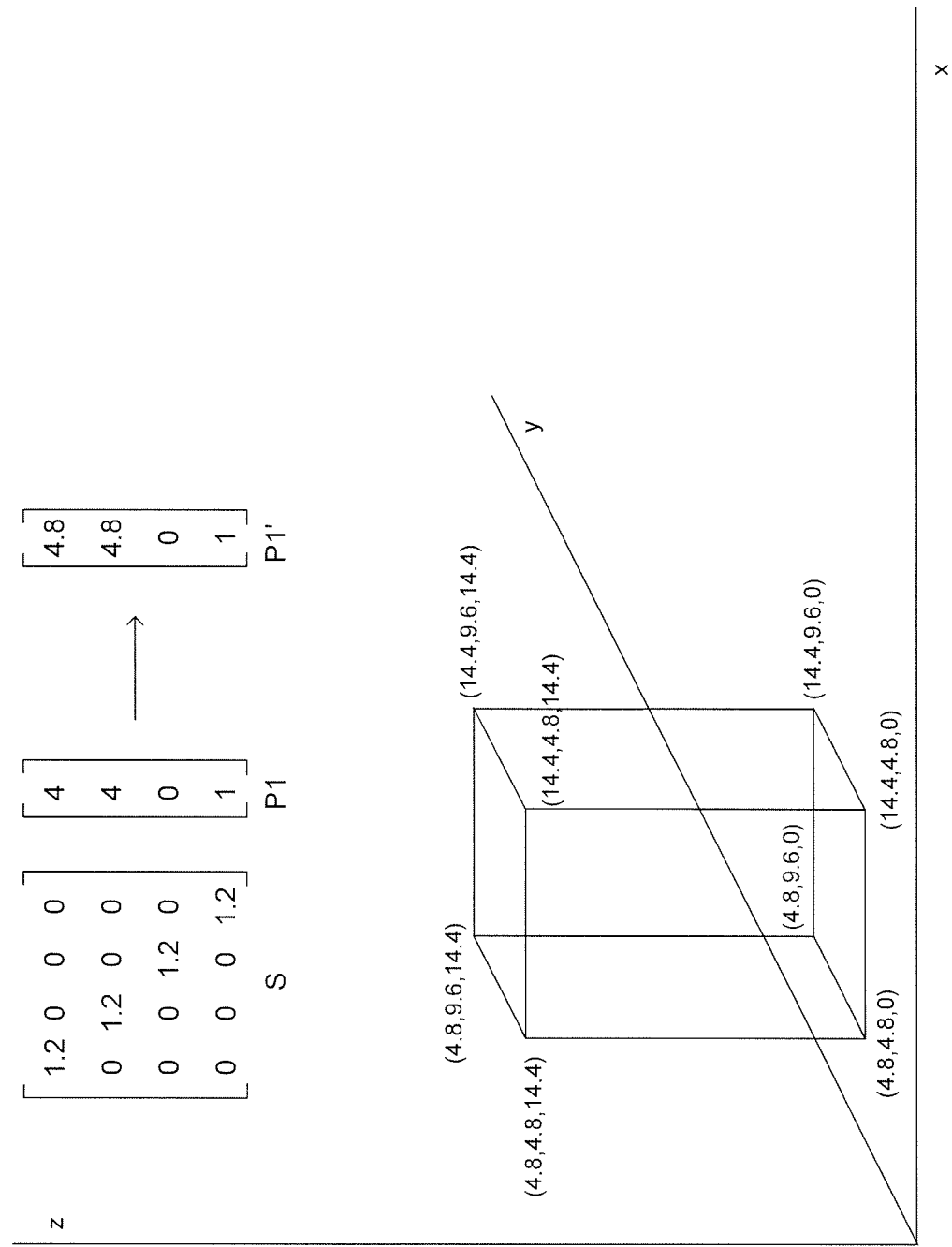
Figure 13D:
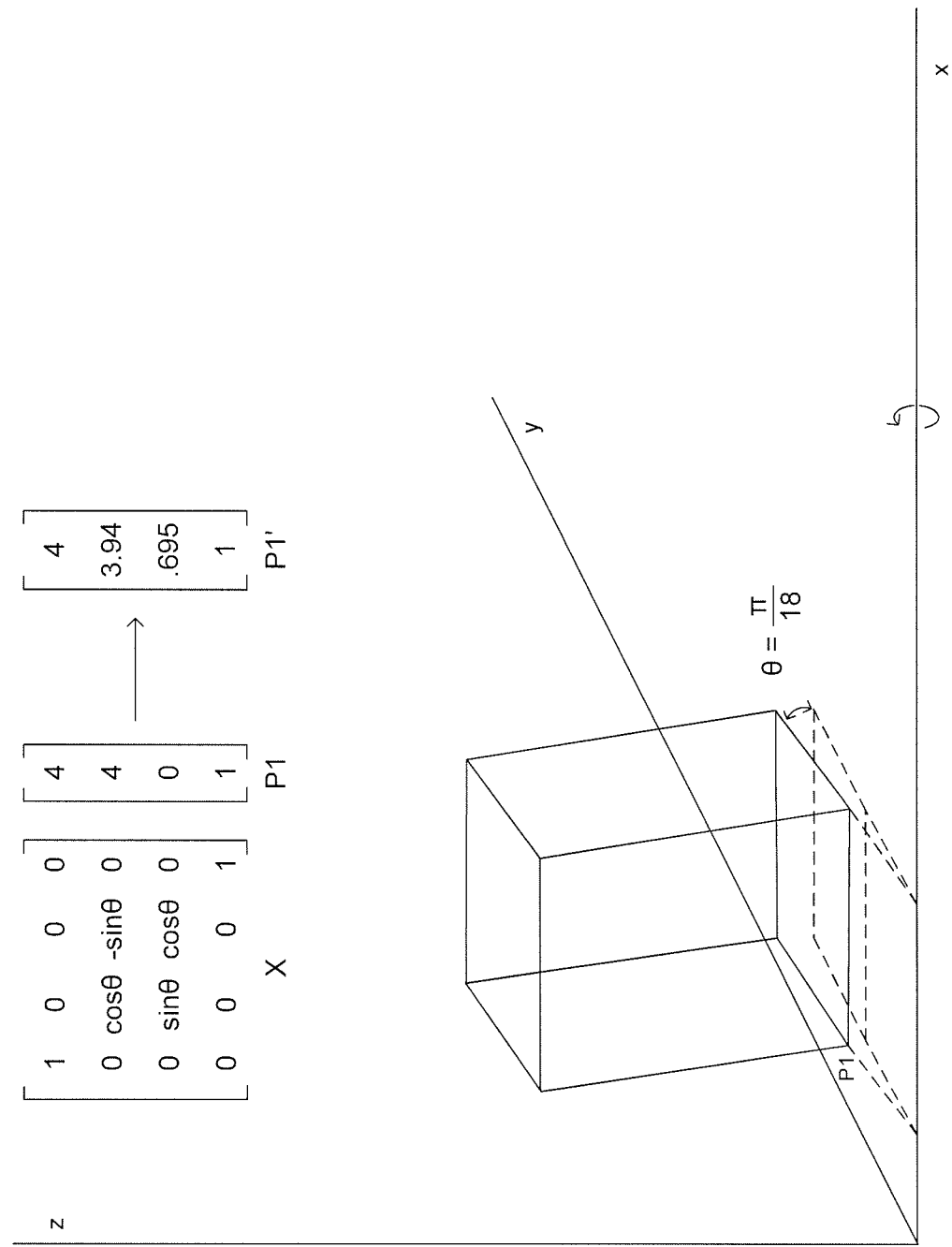
Figure 13E:
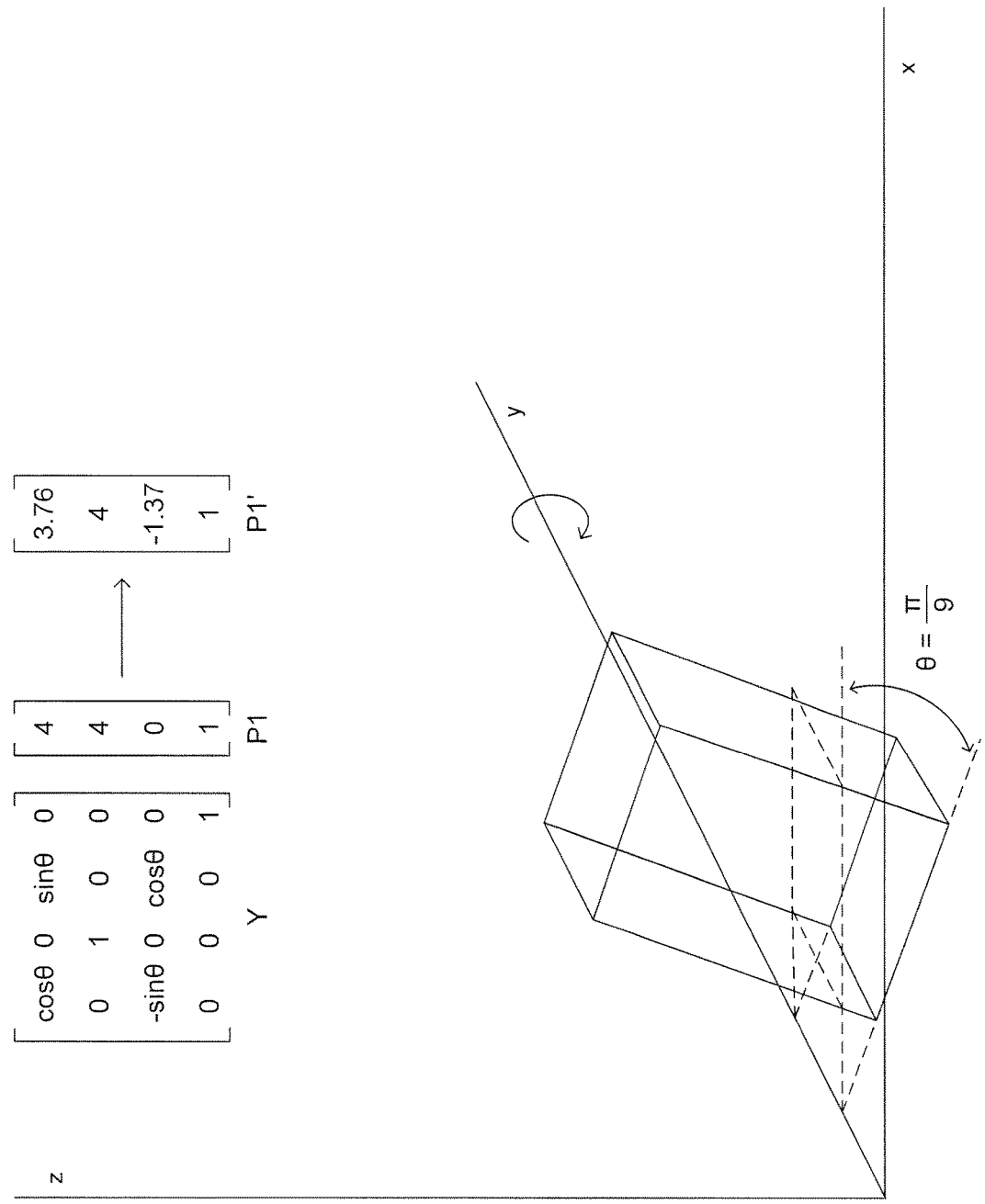
Figure 13F:
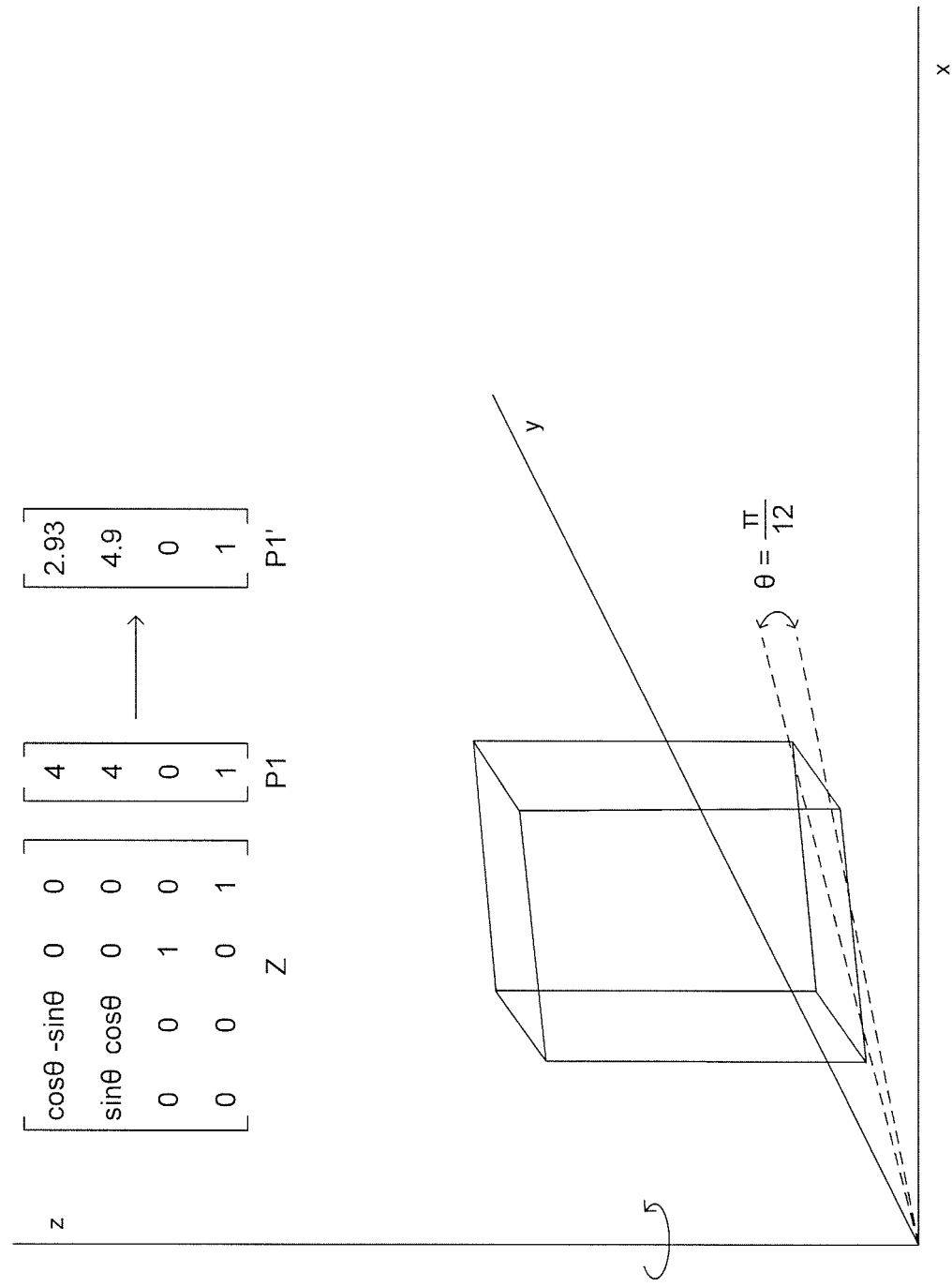
Figure 13G:
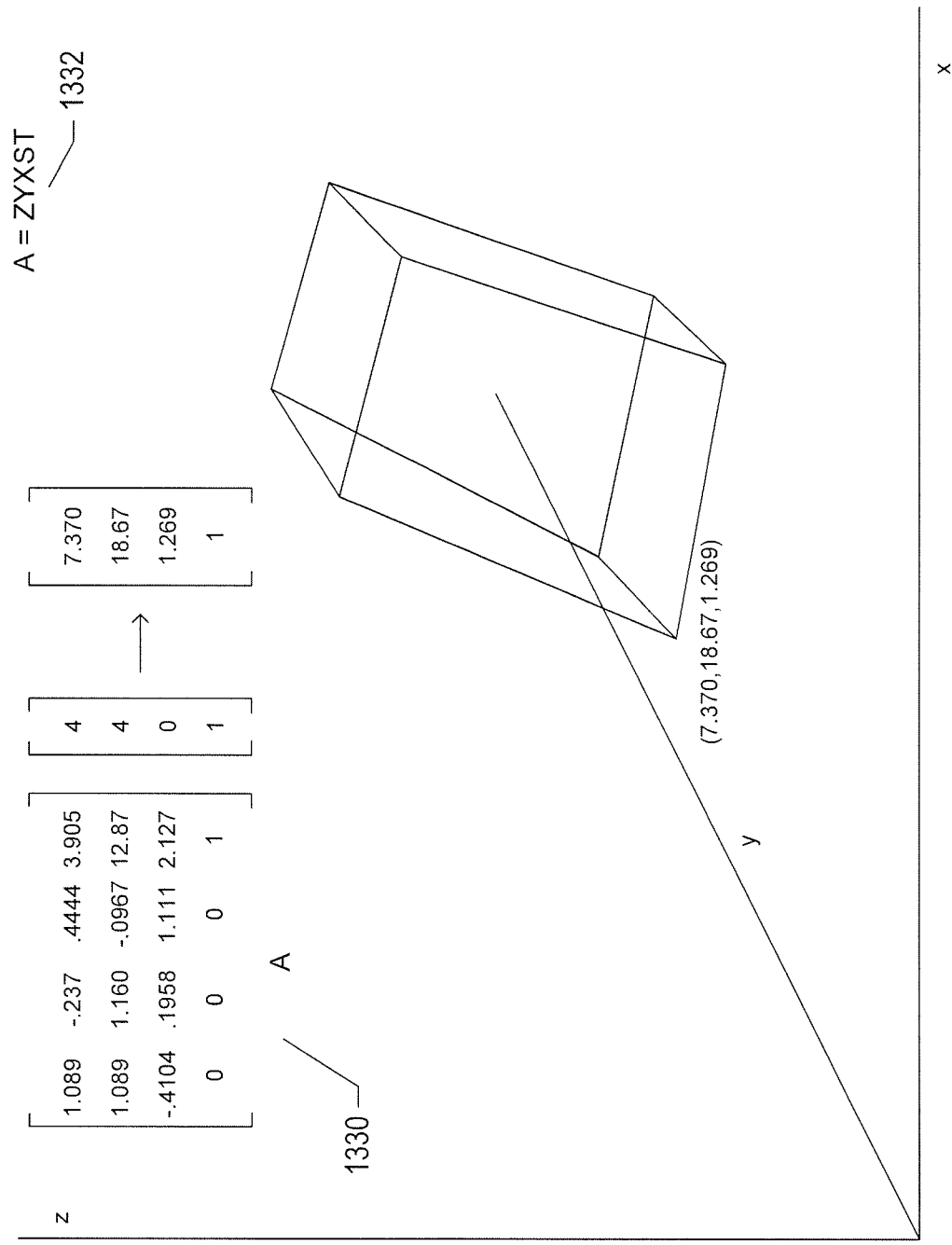

FIGS. 13C-G illustrate various different rigid-body transformations using the same illustration conventions as used in FIGS. 13A-B. A four-by-four transformation matrix is shown for each transformation, as in FIG. 13B. FIG. 13C shows a scaling transformation that increases all three dimensions of the rectangular solid by 20%. FIG. 13D illustrates a rotational transformation in which the rectangular solid is rotated by a small angle counterclockwise about the x axis. FIG. 13E illustrates a different rotational transformation in which the rectangular solid is rotated by small angle about the y axis. FIG. 13F illustrates yet a different rotational transformation in which the rectangular solid is rotated by a small angle about the z axis. FIG. 13G illustrates a single transformation composed of the translation, scaling operations, and rotations illustrated in FIGS. 13B-F. This transformation is mathematically represented by the 4-by-4 transformation matrix 1330, which can be obtained by matrix multiplication of the transformation matrices for the translation, scaling operations, and rotations illustrated in FIGS. 13B-F, as indicated by matrix equation 1332 in FIG. 13G. Note that the order of multiplications is important. The transformation matrix A represents carrying out the individual operations illustrated in FIGS. 13B-F in the order in which they are presented in the figures and text.

Figure 14A:
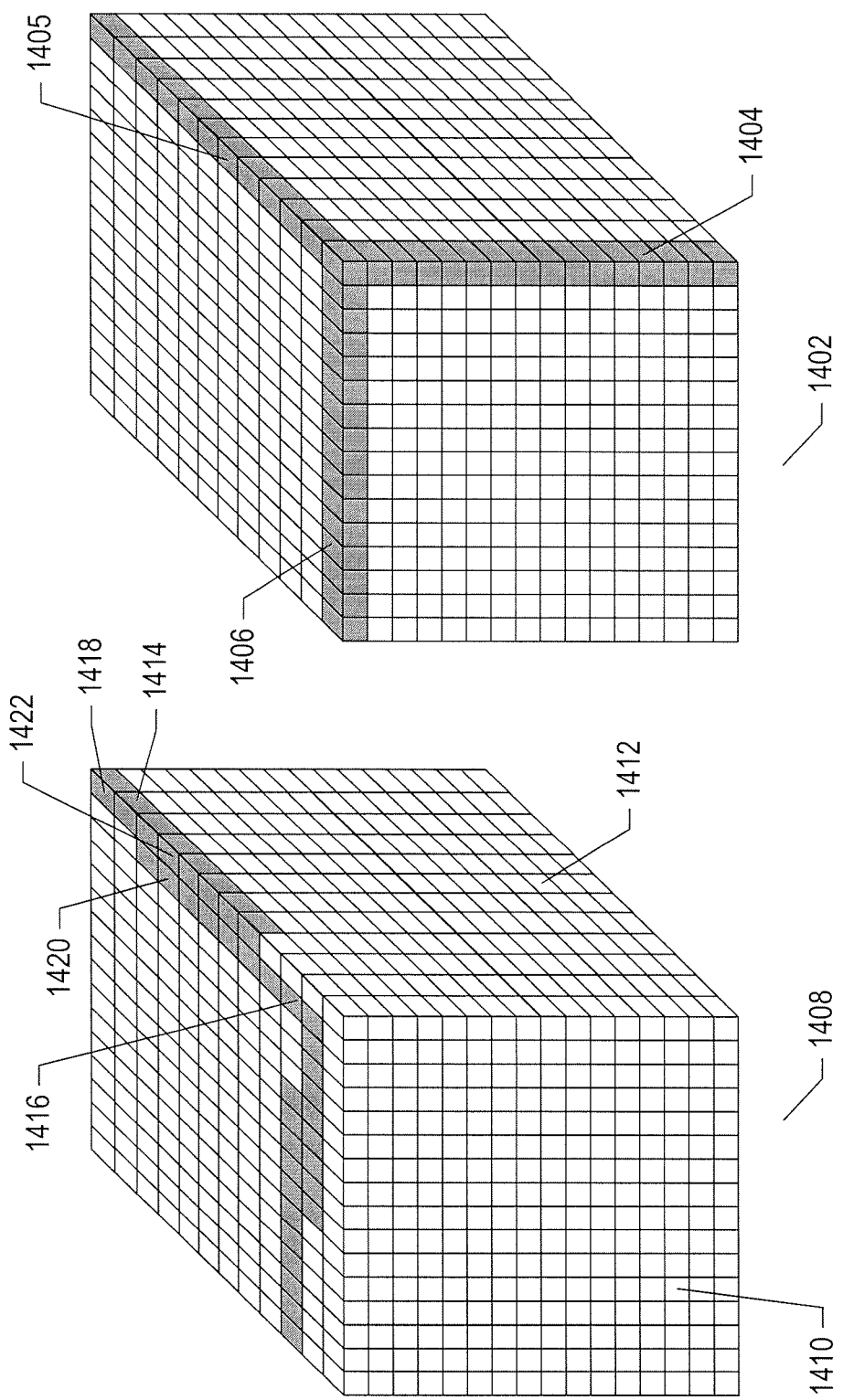

FIGS. 14A-F illustrates registration of two three-dimensional images using rigid-body transformations. FIG. 14A shows the two three-dimensional images. For clarity of illustration, dark voxels have larger numeric intensities than light voxels in this example. The reference image 1402 contains relatively dark or low-intensity voxels along edges 1404-1406. The subject image 1408, which is to be registered to reference image 1402, includes the same mutually orthogonal low-intensity lines as in the reference image, but, because the information within the subject image has been slightly rotated and translated with respect to the information in the reference image, the vertical line seen as low-intensity edge 1404 in the reference image is obscured by high-intensity voxels on the surfaces 1410 and 1412 of the subject image 1408. Furthermore, the two orthogonal horizontal lines, seen as low-intensity edges 1405 and 1406 in the reference image, have been slightly rotated in the subject image so that the lines span multiple rows of voxels. Because the voxel is the smallest volume to which intensity is assigned, a line that is not coincident with a row of voxels ends up being represented by multiple rows of voxels. For example, the line 1414 in the subject image, corresponding to low-intensity edge 1405 in the reference image 1402, starts with the corner voxel 1416, which has a low intensity. As the line proceeds to the rear, upper right corner voxel 1418, the intensity of the voxels increase as the line is distributed across a pair of voxels rather than residing within a single voxel. For example, in the central portion of the line, the line is distributed between voxel 1420 and voxel 1422. As a line proceeds further towards the corner voxel 1418, the line eventually resides within a final line segment comprising a linear arrangement of single voxels which again have darker intensities.

Figure 14C:
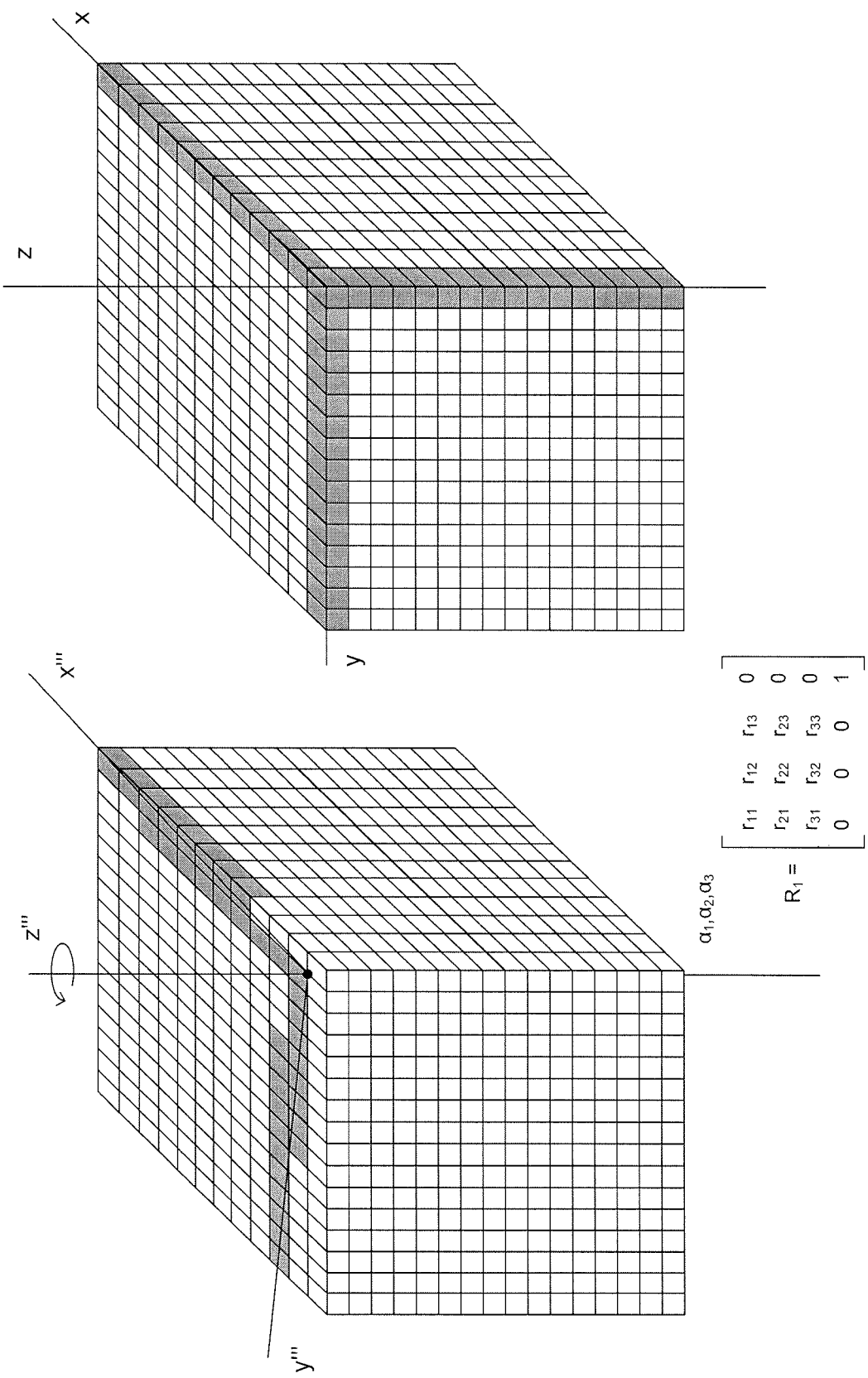
Figure 14D:
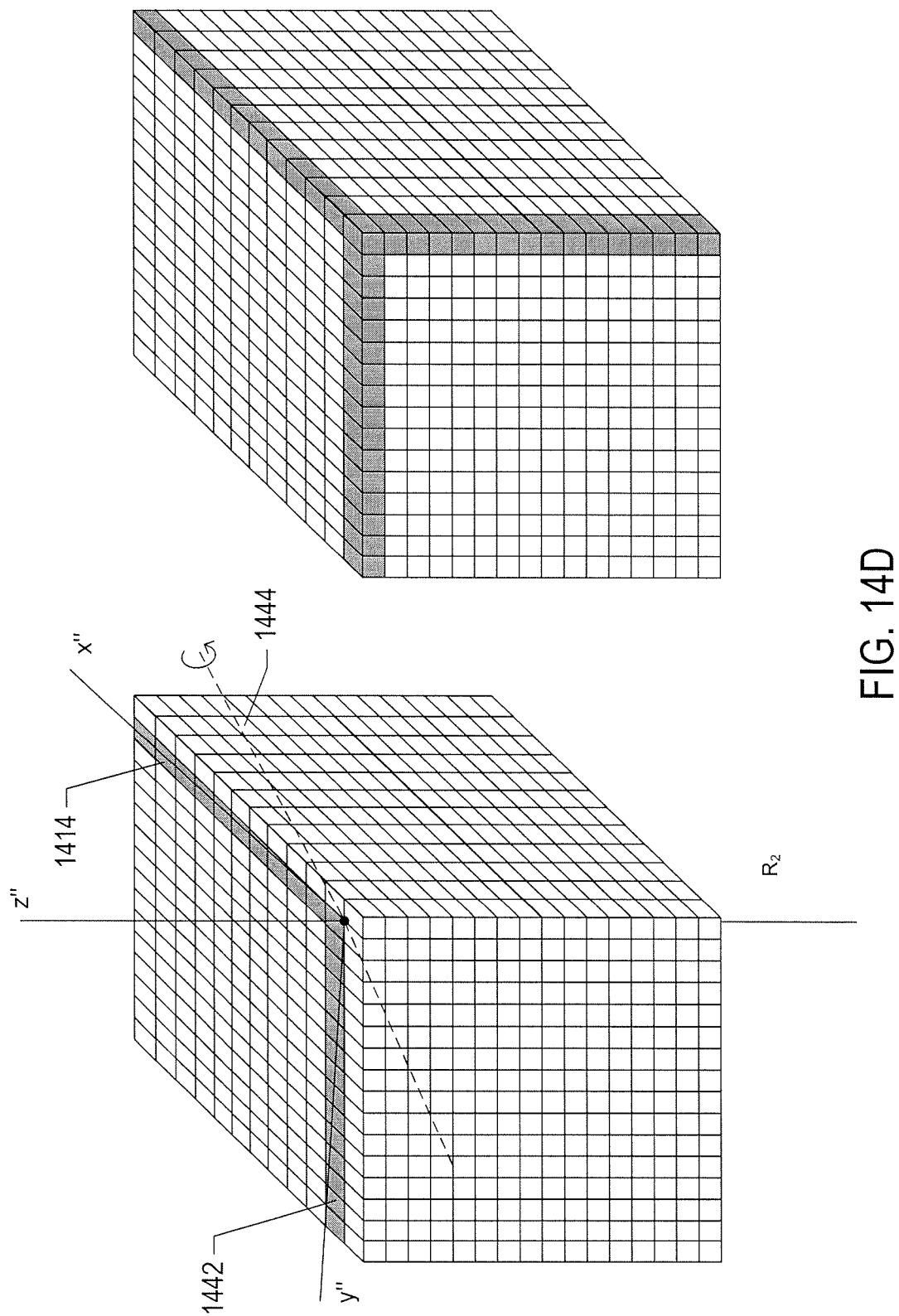
Figure 14E:
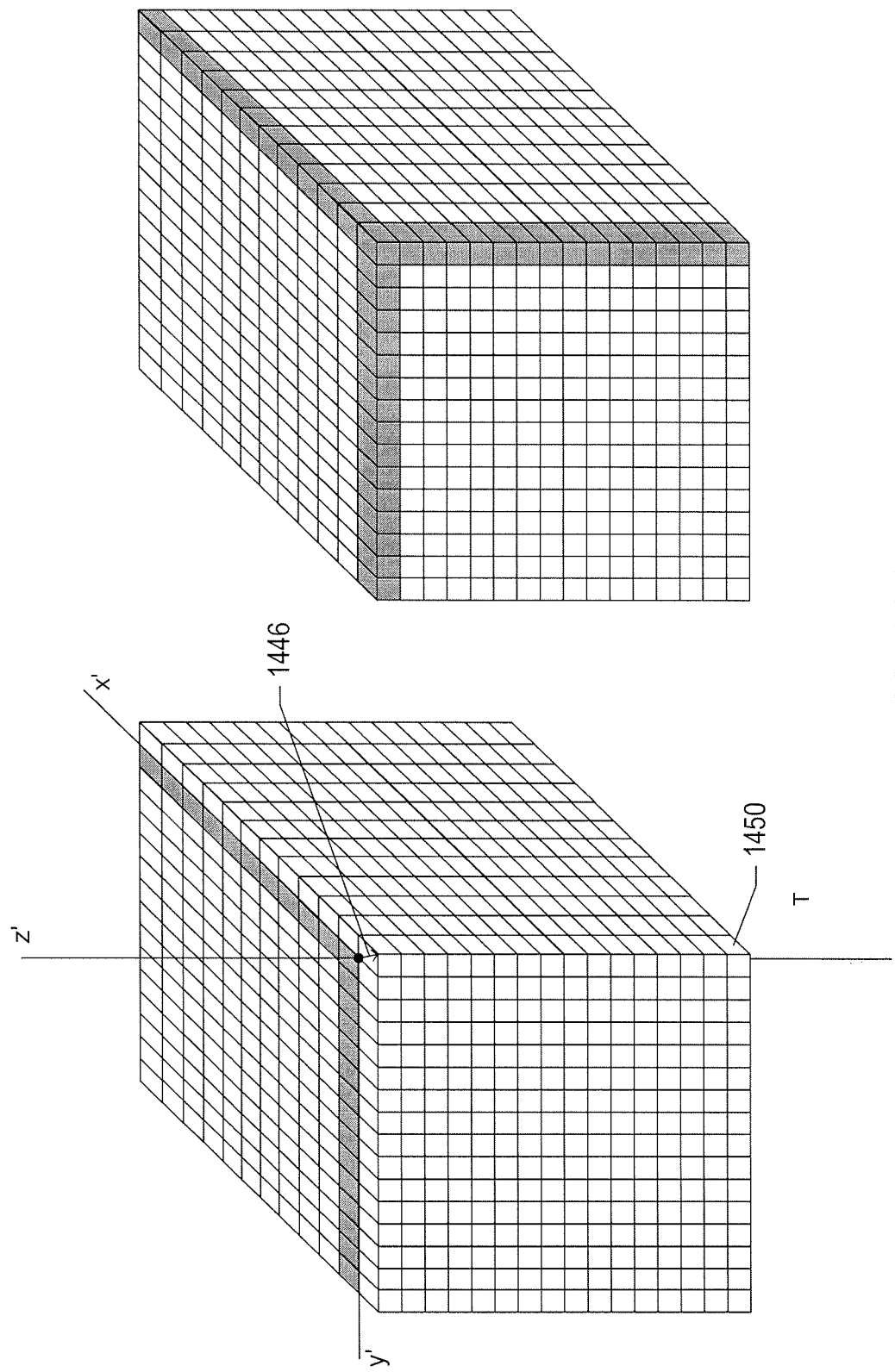
Figure 14F:
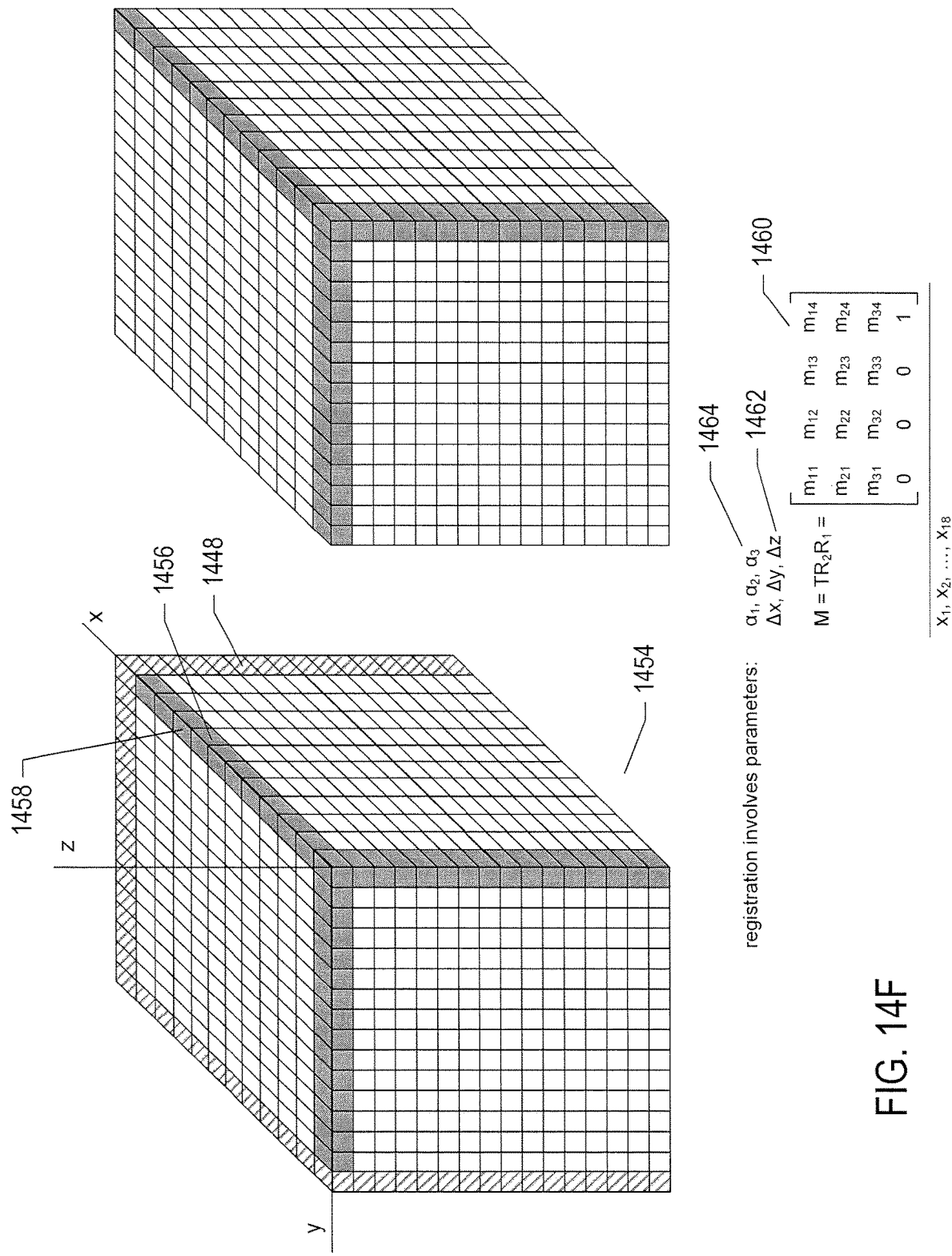

FIG. 14B illustrates several initial steps in a logical registration process. This process is referred to as being "logical" because, as further discussed below, the actual process used for registration is a parameter-fitting optimization process rather than the stepwise process illustrated in FIGS. 14B-F. First, a coordinate system is assigned to the reference image 1402. Coordinate system comprises an origin voxel 1430 and three mutually orthogonal Cartesian axes 1432-1434. Next, an origin 1436 and a coordinate-axis orientation are selected for the subject image 1408. FIG. 14C illustrates a first rotational transformation used to begin to bring the intensity values of the subject image into correspondence with the intensity values of the reference image. The first rotational transformation is a rotation about the z axis, described by a four-by-four rotational transformation matrix 1440. As shown in FIG. 14D, this first rotational transformation nearly aligns the two low-intensity lines 1414 and 1442 with the x and y axes, respectively. A next rotational transformation rotates the three coordinate axes of the subject image about a rotational axis represented by the dashed line 1444 in order to straighten the z axes to the vertical. As shown in FIG. 14D, following the second rotational transformation discussed with reference to FIG. 14D, the Cartesian coordinate system of the subject image is now rotationally aligned with that of the reference image. A final transformation involves a very small horizontal translation, represented by arrow 1446, diagonal to the x and y axes which, as shown in FIG. 14F, results in a perfect registration of the subject image to the reference image. However, because of the original misalignment, numerous voxels, shown crosshatched in FIG. 14F, such as voxel 1448, have no intensity data while the intensity data for certain of the original voxels, including voxel 1450 in FIG. 14E, are no longer present in the registered subject image. Various techniques can be used to handle such a marginal intensity-data absences and losses. For example, the dimensions of both images can be reduced so that all of the remaining voxels in both images are associated with intensity values. In other cases, missing intensity values may be estimated from neighboring voxels with intensity values. Another issue not yet addressed in this discussion is that all of the intensity values in the registered subject image need to be resampled from the original subject image because the volumes of the voxels of the registered subject image no longer correspond to any voxel volume in the original subject image. For example, in the original subject image shown in FIG. 14A, voxels 1420 and 1422 had intermediate intensity values. However, in the registered subject image 1454 in FIG. 14F, only the single voxel 1456 corresponds to the portion of the low-intensity edge 1458 represented by voxels 1420 and 1422 in the original subject image 1408. The two rotation and single translation operations can be represented by a single four-by-four transformation matrix 1460, as discussed above. This transformation matrix contains 12 numerical values that represent parameters of the registration process. The registration process also includes three parameters for the translational offset of the origin of the subject image with respect to the origin the reference image 1462 and three angles 1464 representing the orientation of the coordinate axes in the subject image with respect to the reference image. Thus, the registration process can be viewed as finding the numerical values of 18 parameters 1466 of the registration model in which a position and orientation for a Cartesian coordinate system are determined and then that coordinate system is brought into alignment with a reference coordinate system by rigid-body transformations. In general, the registration process includes a number of numerical parameters corresponding to the numerical elements of a transformation matrix and additional parameters related to a starting point for application of the one or more transformations represented by the transformation matrix to the subject image in order to align the subject image to the reference image. In certain cases, fixed values may be assumed for the second set of parameters, such as the origins and coordinate-axis orientations implied by the pixel or voxel indices, whether explicitly or implicitly contained in the digital encodings of the images, in which case optimization involves only finding values for the first set of parameters.

Figure 15A:
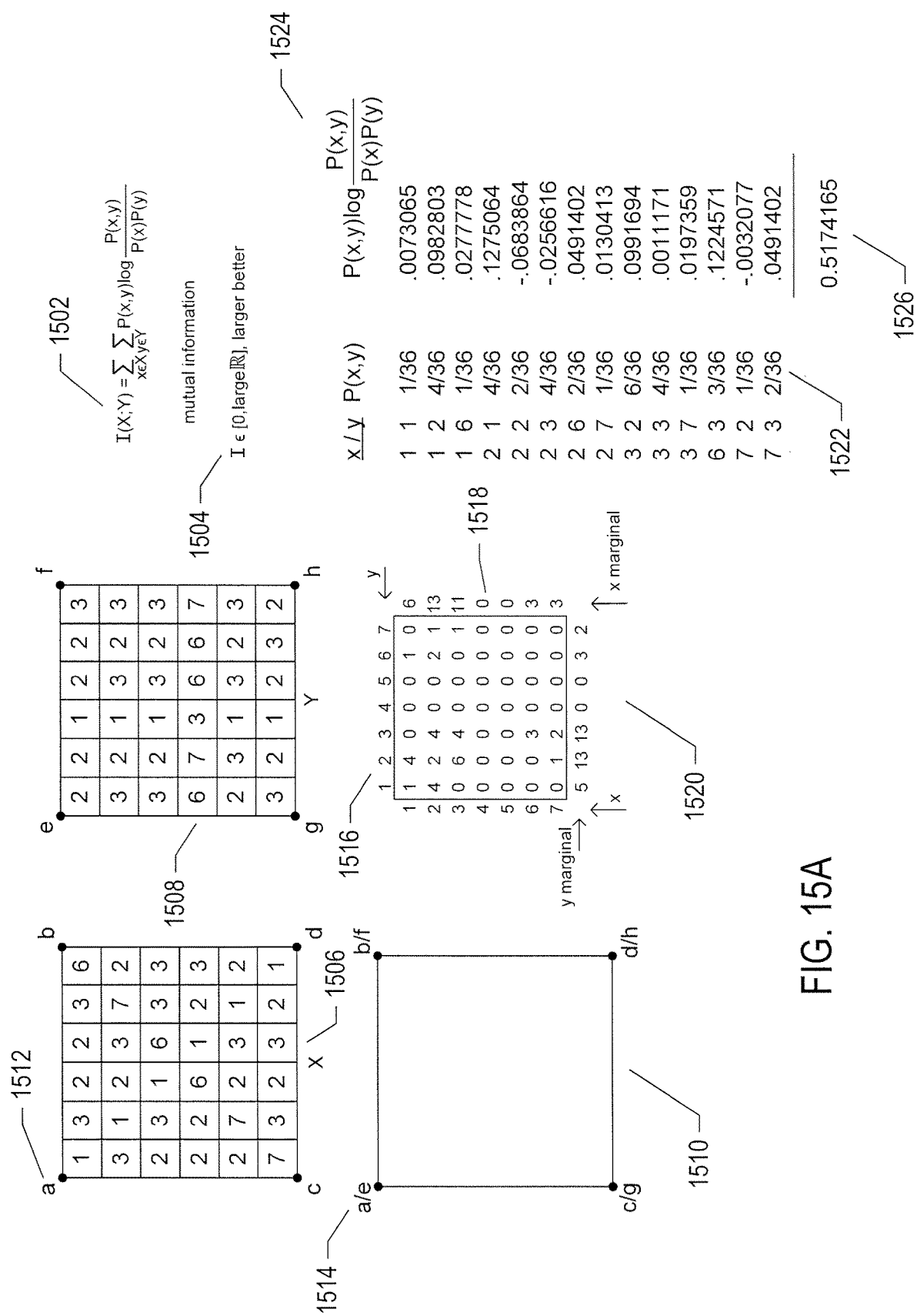
FIGS. 15A-B illustrate alignment metrics that can be used during parameter-fitting optimization of the registration parameters that results in an optimal or near-optimal registration model.
Figure 15B:
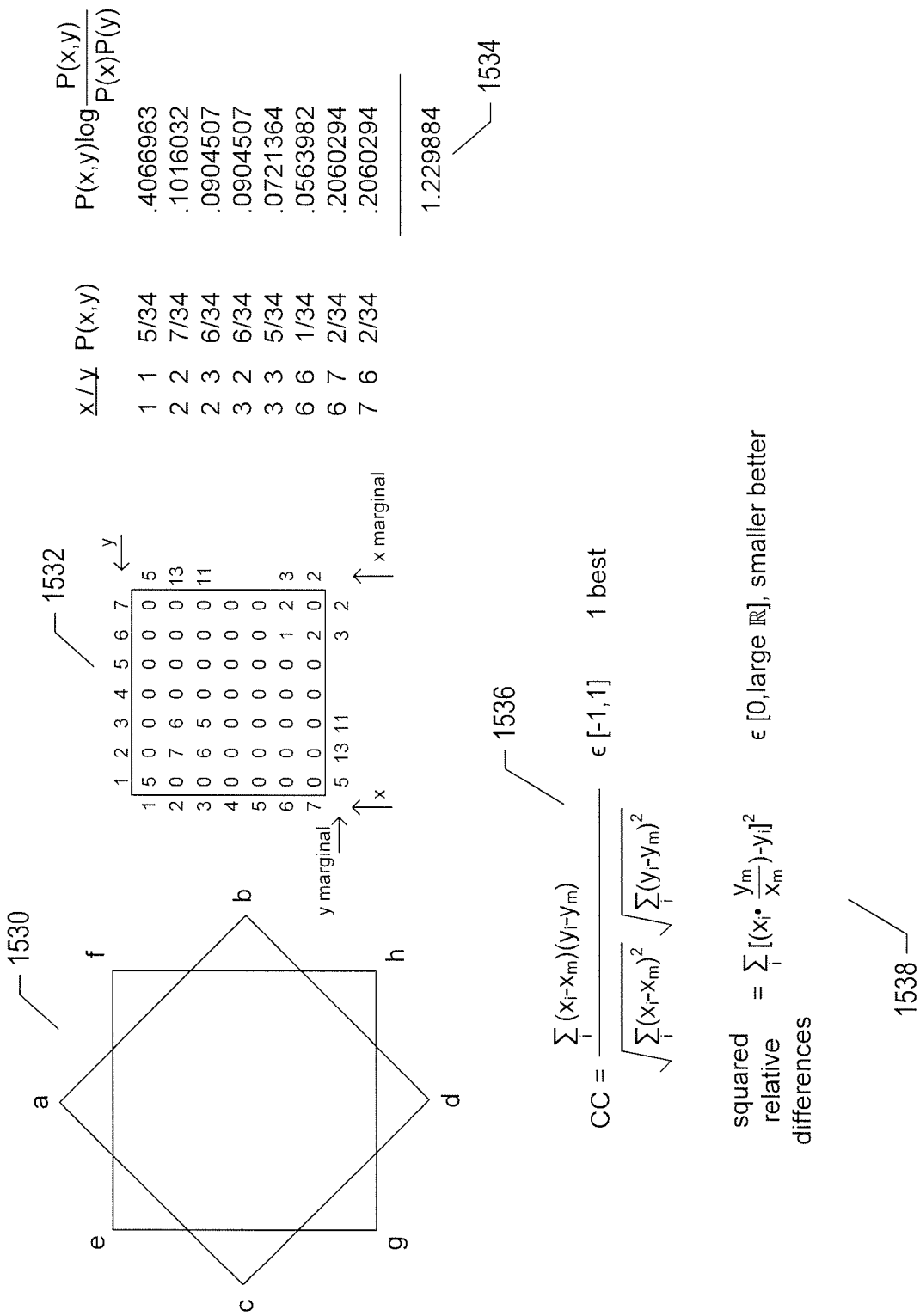

FIGS. 15A-B illustrate alignment metrics that can be used during parameter-fitting optimization of the registration parameters, discussed above with reference to FIG. 14F, that results in an optimal or near-optimal registration model. One metric that is often used as an alignment metric is the mutual information, computed by the expression 1502 shown in the top right-hand corner of FIG. 15A. The mutual information $I(X;Y)$ for a pair of registered images X and Y is the sum, over all possible pairwise intensity values (x, y) where x there is an intensity value from image X and y is an intensity value from image Y, of the probabilities of occurrence of each possible pair of intensity values P(x,y) times the logarithm of the ratio of P(x,y) to the product of the individual probabilities of x and y, P(x) and P(y). As indicated by expression 1504, the mutual information ranges from 0 to a large real number, with larger values corresponding to better alignment.

FIGS. 15A-B provide an example of calculation of the mutual information for a pair of registered images. FIG. 15A shows two very small two-dimensional images X 1506 and Y 1508. The images contain intensity values within a small range of intensity values [1, 7]. Both images contain a cross-like feature, one member of which has low intensity values and one member of which has high intensity values. In image Y, the cross is aligned with the edges of the image, and slight off-centered, while, in image X, the cross is rotated by 90° and centered. As indicated by square 1510, a first calculation of the mutual information is based on alignment of the two images, in which the corners of the two images are coincident, as indicated by the single-letter labels for the corners, such as the label "a" 1512 for the upper left-hand corner of image X 1506, with the notation "a/e" 1514 indicating that corners a and e of images X and Y are coincident. While the images are aligned, the content of the images, including the crosses, is not aligned and therefore the images are not registered. Table 1516 tabulates the number of occurrences of the possible intensity pairs (x, y) in the two images. Each row corresponds to a particular intensity value in image X and each column corresponds to a particular intensity value in the image Y. The rightmost column of numbers 1518 contain the sum of the numbers in each row and the lowest row 1520 of numbers contained in the sums of the numbers in each column. The marginal probabilities P(x) and P(y) are obtained by dividing the sums in column 1518 and row 1520 by 36, the total number of possible intensity pairs (x, y). The probability for each possible intensity pair (x, y) is obtained by dividing the number of occurrences of the intensity pair by 36, as shown in column 1522 of numbers to the right of table 1516. With these probabilities P(x,y) as well as the marginal probabilities P(x) and P(y), the expression 1524 within the nested summation symbols of expression 1502 can be computed for each possible intensity pair (x, y) and, when summed, produce the computed mutual information 1526. Thus, for the unregistered pair of images X and Y, the computed mutual information has a relatively low value of approximately 0.517. By contrast, when the two images are registered via rotation of image X with respect to image Y, as indicated by diagram 1530 in FIG. 15B, similar calculations based on a table of intensity occurrences 1532 computed for the registered images generates the mutual information value 1.230 (1534 in FIG. 15B). Thus, any of various different optimization techniques can maximize the computed mutual information by varying the values of the model parameters, discussed with reference to FIG. 14F, in order to obtain an optimal or near-optimal registration model. As also shown in FIG. 15B, other registration metrics include the correlation coefficient, and expression for which is provided as expression 1536 in FIG. 15B, and the squared relative differences 1538. Many other registration metrics may be used. It should be noted that, in general, when the contents of a pair of images are not too far out of alignment, as is the case in many medical-imaging scenarios, including pre-contrast and post-contrast images, optimization is more of a refinement operation, and far more efficient than when there is no initial relationship between the origins and orientations of the content of the two images.

Figure 16A:
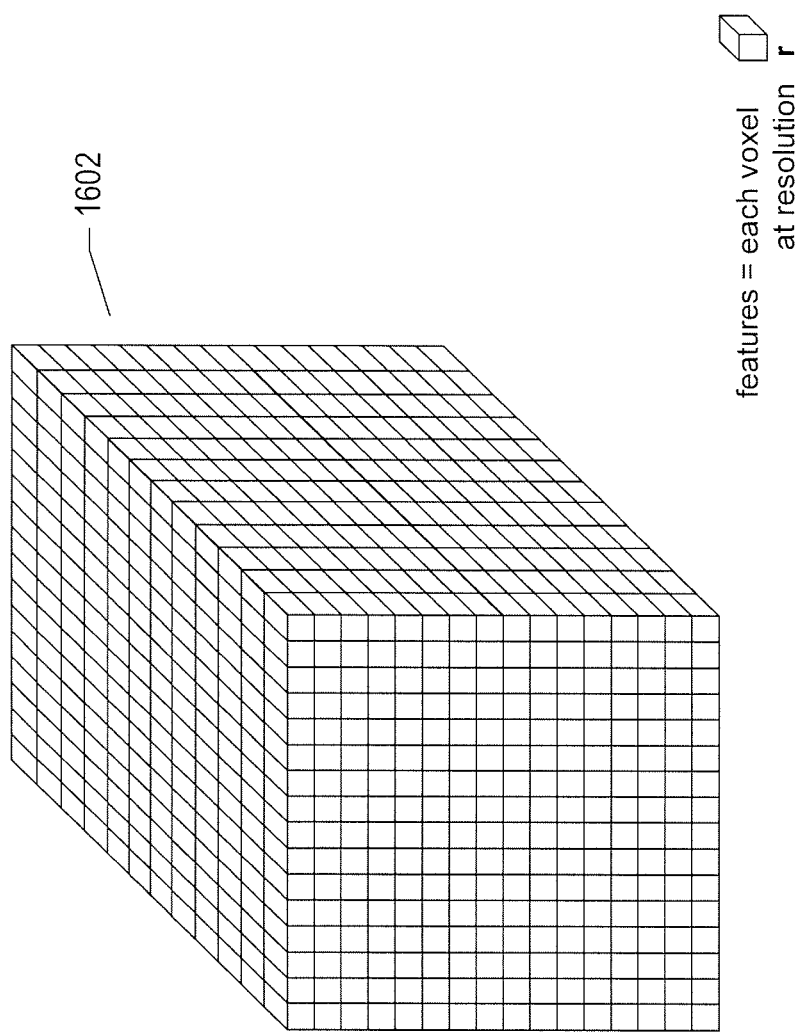
FIGS. 16A-C illustrate use of voxels, as features, at different resolutions.
Figure 16B:
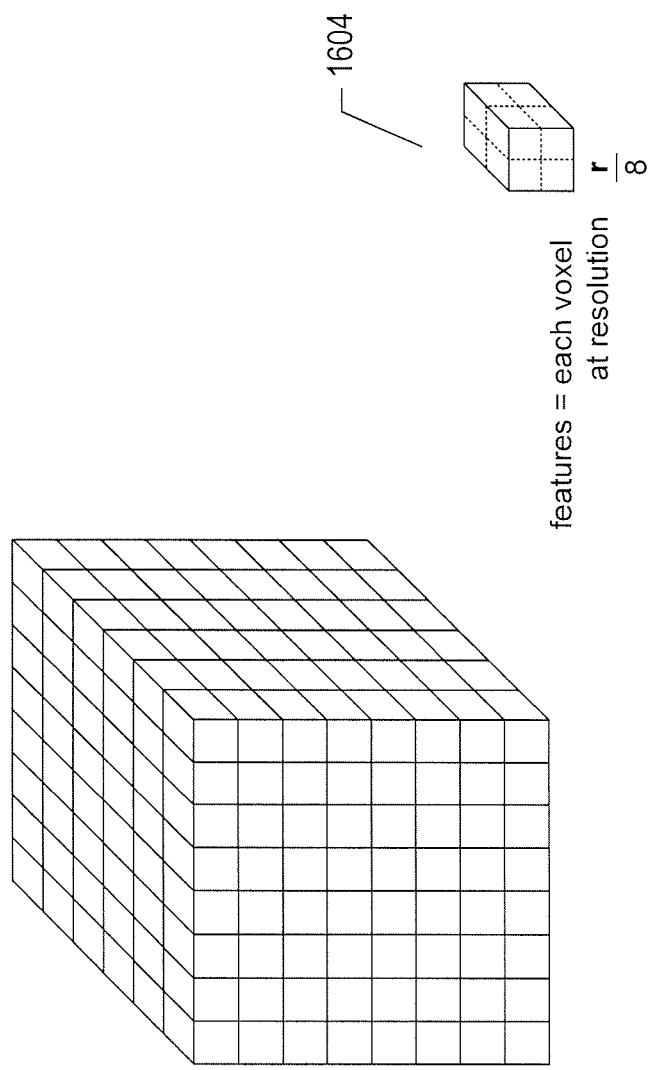
Figure 16C:
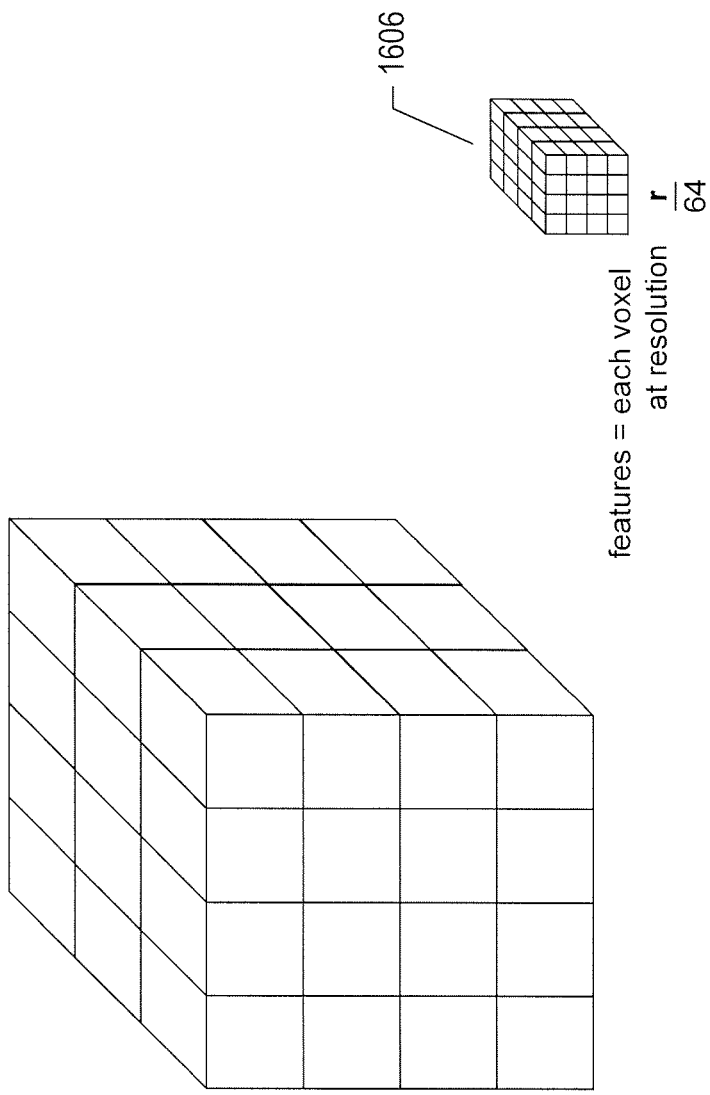

Another important question related to registration is a selection of the features within images to register. FIGS. 16A-C illustrate use of voxels, as features, at different resolutions. As shown in FIG. 16A, registration may be carried out by assuming that each voxel within a three-dimensional image 1602 represents a feature, with these features having a resolution r equal to the number of voxels within each unit volume of the three-dimensional image. When each voxel is considered to be a feature, computation of the mutual information or other alignment metrics is extremely computationally expensive, since there are a very large number of possible origin pairs that may be selected within two images to be registered as well as a very large number of intensity-pair occurrences to tabulate in order to calculate the alignment metric, when mutual information is used as the metric, or a very large number of intensity pairs involved in the computation of the correlation-coefficient metric or squared-relative-differences metric. Alternatively, as shown in FIG. 16B, each eight-voxel cube 1604 may be considered as a feature, equivalent to registering the pair of images at a resolution of r/8. An average intensity for each eight-voxel cube can be used as the intensity of the cube. Clearly, reducing the resolution or, equivalently, increasing the size of the features and therefore decreasing the number of features used for alignment may significantly decrease the computational overheads for optimizing the registration model. As shown in FIG. 16C, 64-voxel cubes 1606 may be chosen as the features used for registration, which further decreases the number of features and correspondingly decreases the computational overheads for optimizing the registration model. Of course, as the resolution is lowered, the registration obtained from the optimized model becomes less accurate. However, by using a stepwise-registration process, accurate registration can be obtained at significantly decreased computational expense.

Figure 17:
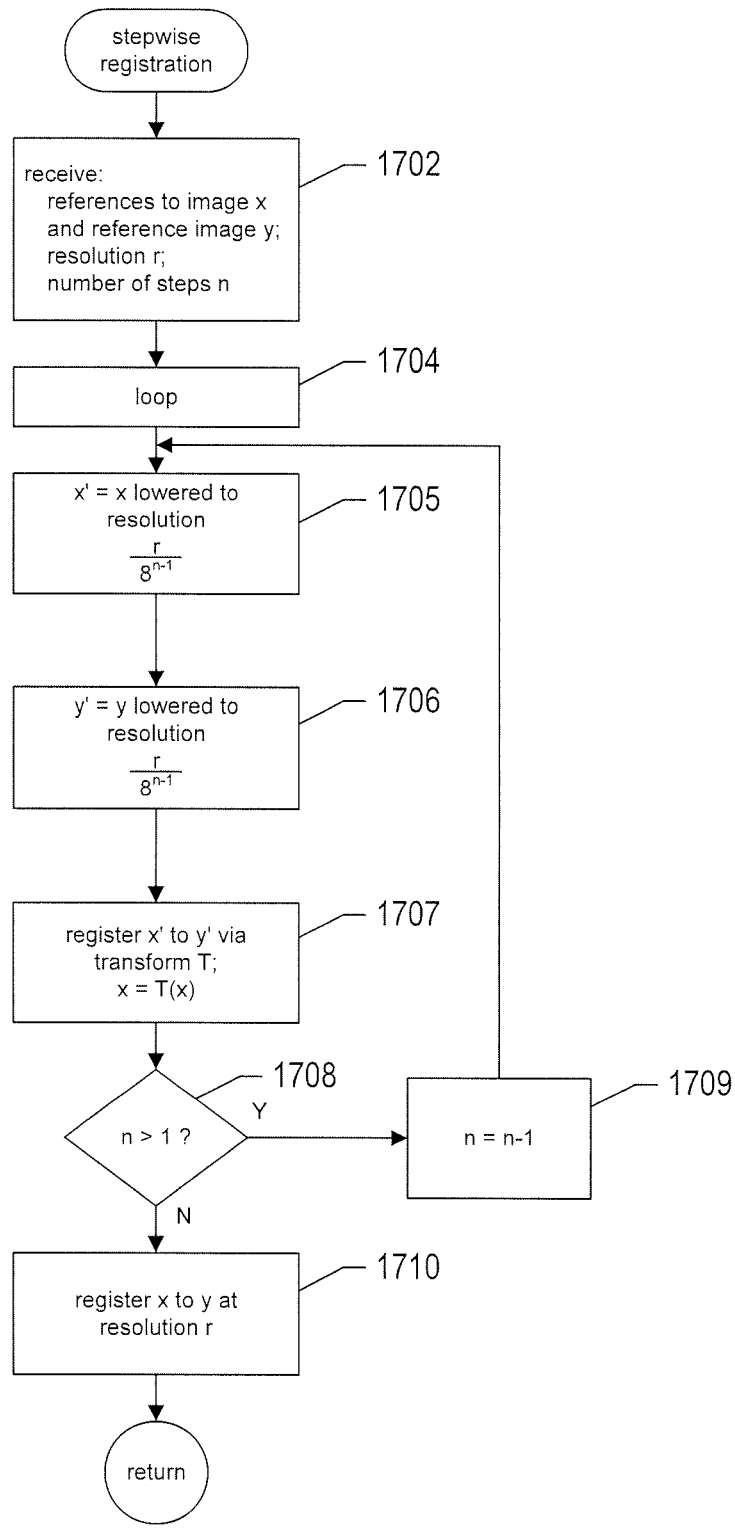
FIG. 17 provides a control-flow diagram for a stepwise registration process.

FIG. 17 provides a control-flow diagram for a stepwise registration process. In step 1702, the stepwise-registration process receives references to an image X and a reference image Y, where image X is to be registered to reference image Y, a final resolution r, and a number of steps n. In the loop of steps 1704-1709, a next lower resolution for image X is generated, in step 1705, a next resolution for image Y is generated in step 1706, and the two images are registered, in step 1707, at the selected resolution via a transform obtained by optimizing the registration-model parameters. When n is greater than 1, n is decremented, in step 1709, and another iteration of the loop of steps 1704-1709 is carried out. The registration obtained by the previous step is carried forward to the next step so that the optimization overhead is greatly reduced with respect to the optimization overhead that would be involved were registration to be carried out initially at the next-step resolution. In other words, the optimizations carried out at steps following the first step are essentially refinements rather than de novo optimizations. Refinements involve slight adjustments of the parameter values within a small volume of the overall search space rather than searching the entire search space for optimal parameter values. Finally, in step 1710, a final registration is carried out at the desired resolution r.

Figure 18A:
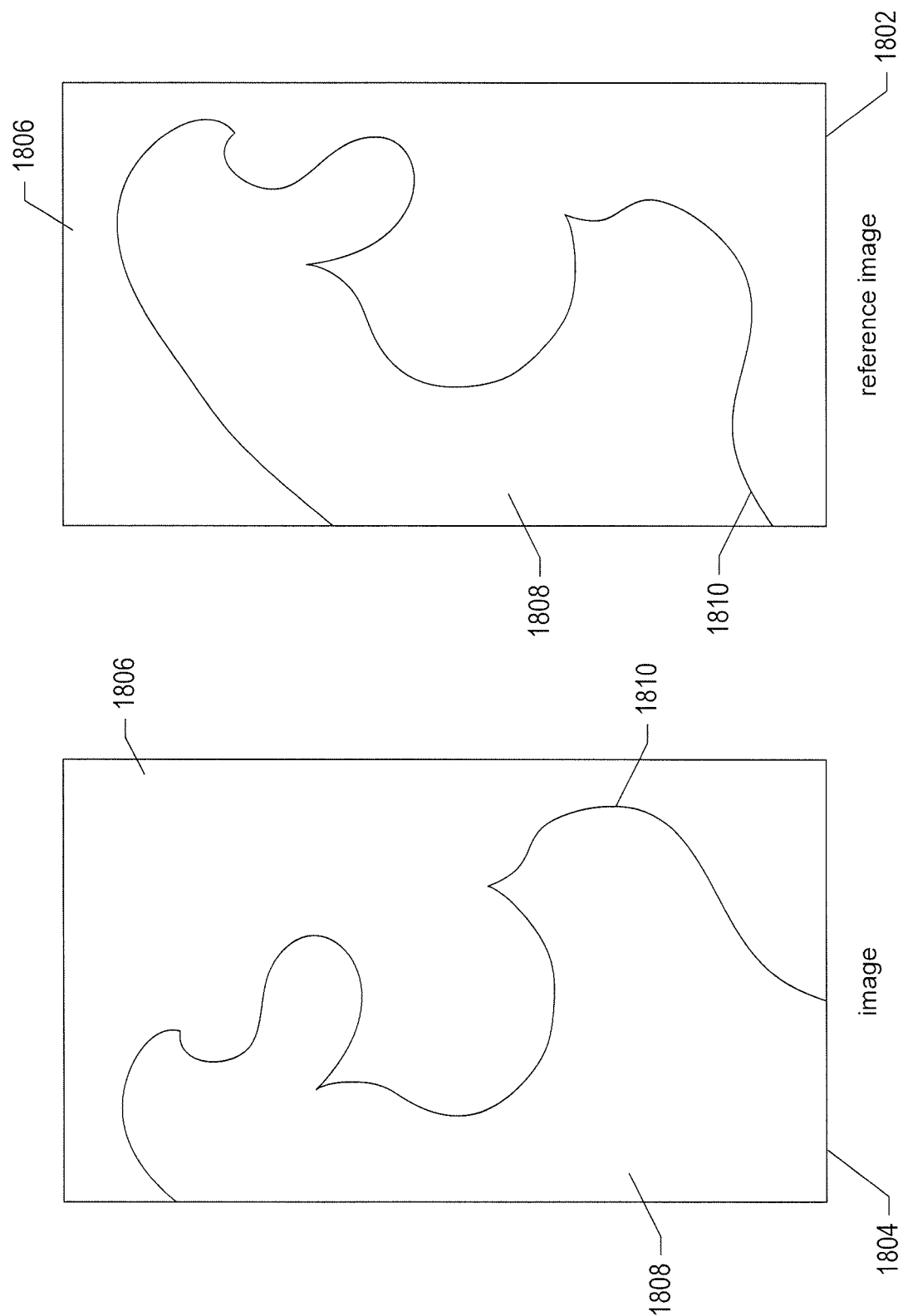
FIGS. 18A-G illustrate unique-feature-based registration using an example pair of two-dimensional images.
Figure 18B:
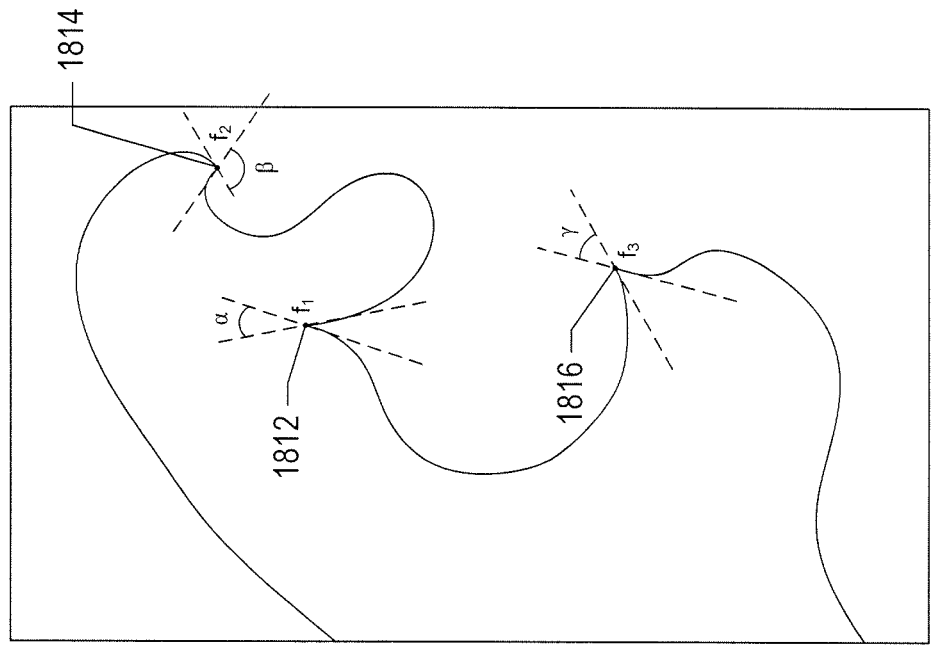
Figure 18B:
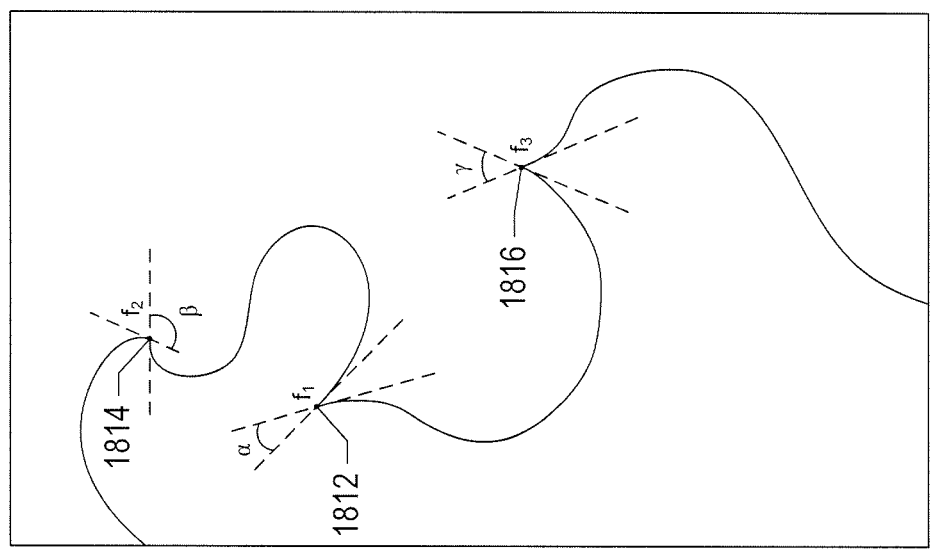
Figure 18C:
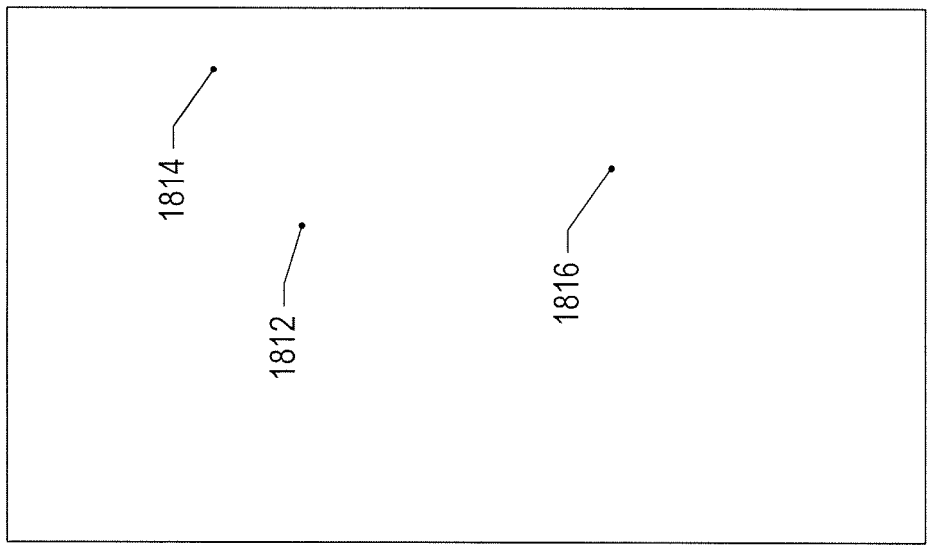
Figure 18C:
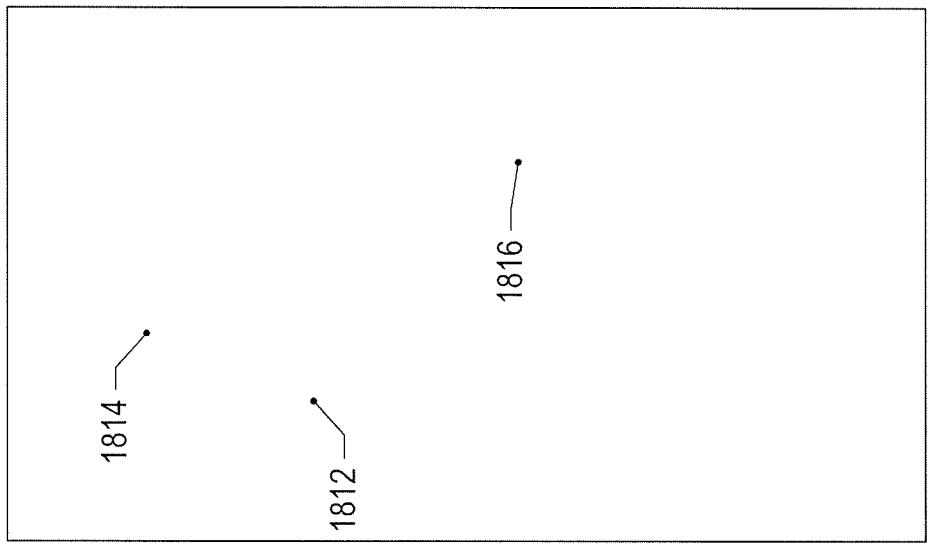
Figure 18D:
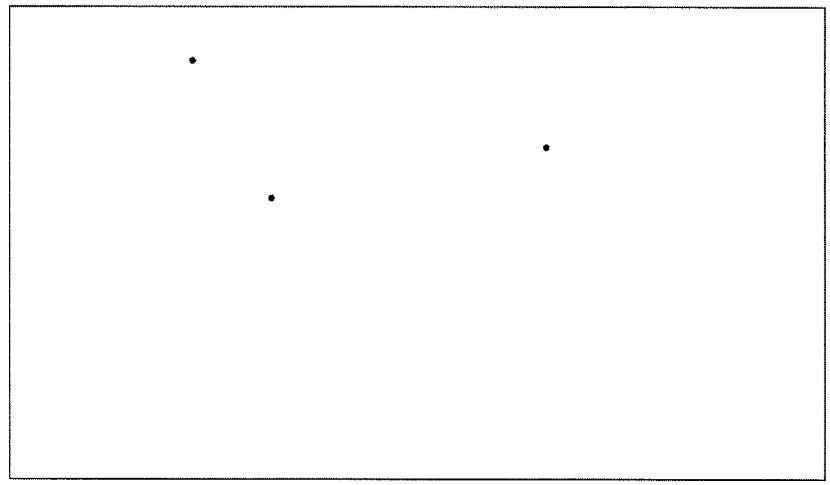
Figure 18D:
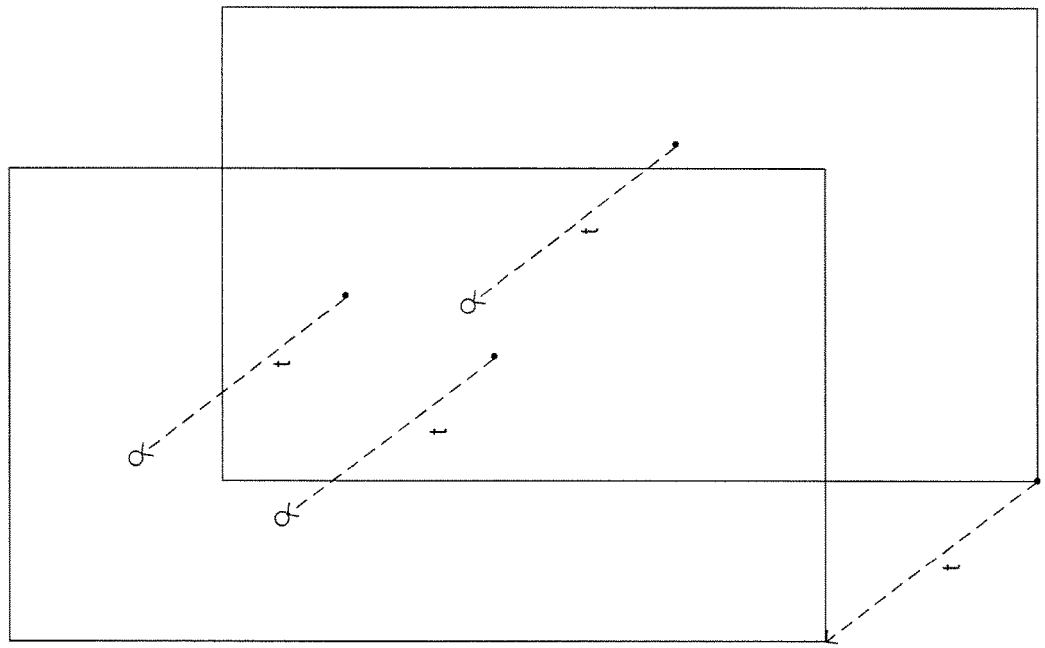
Figure 18E:
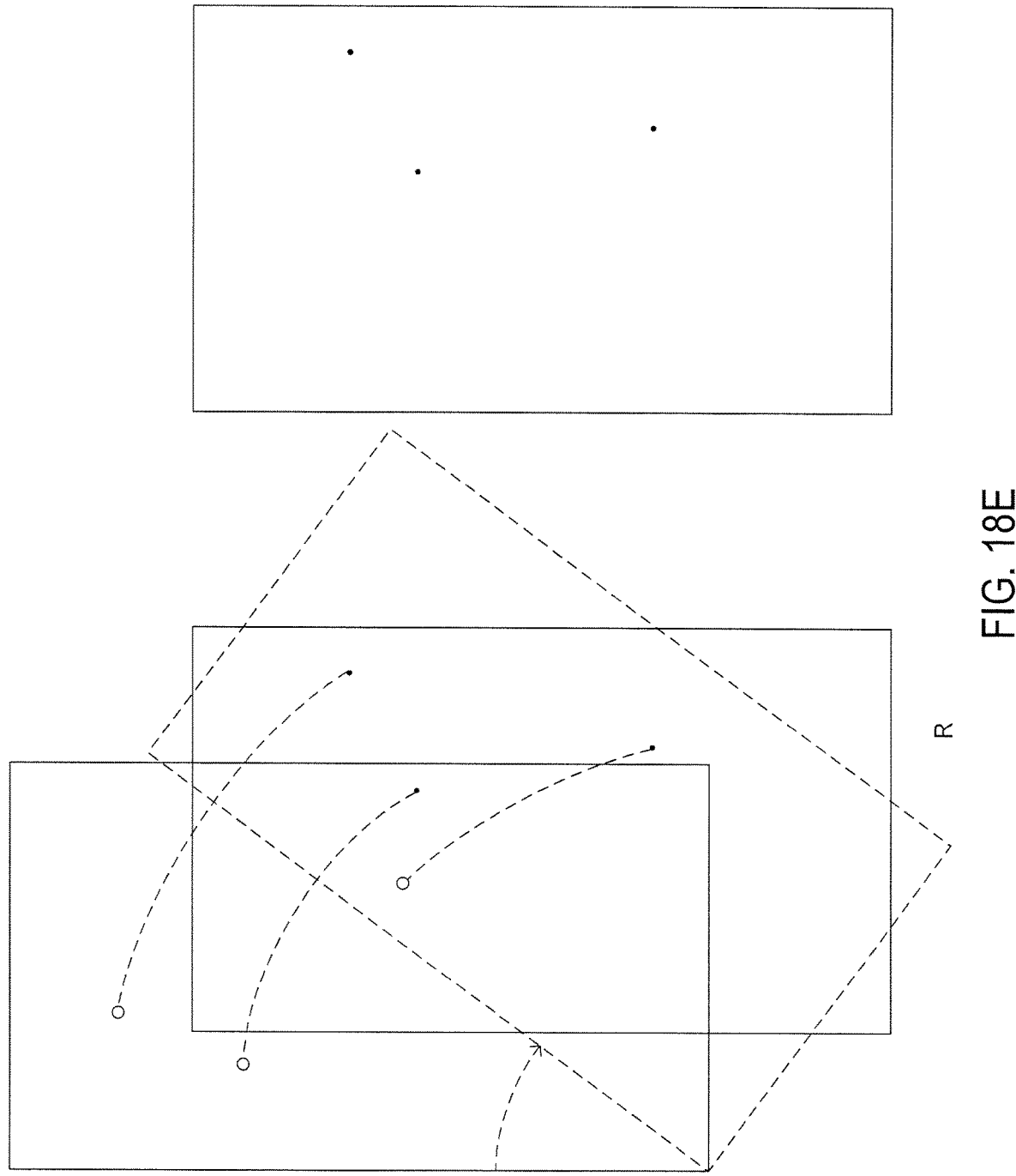
Figure 18F:
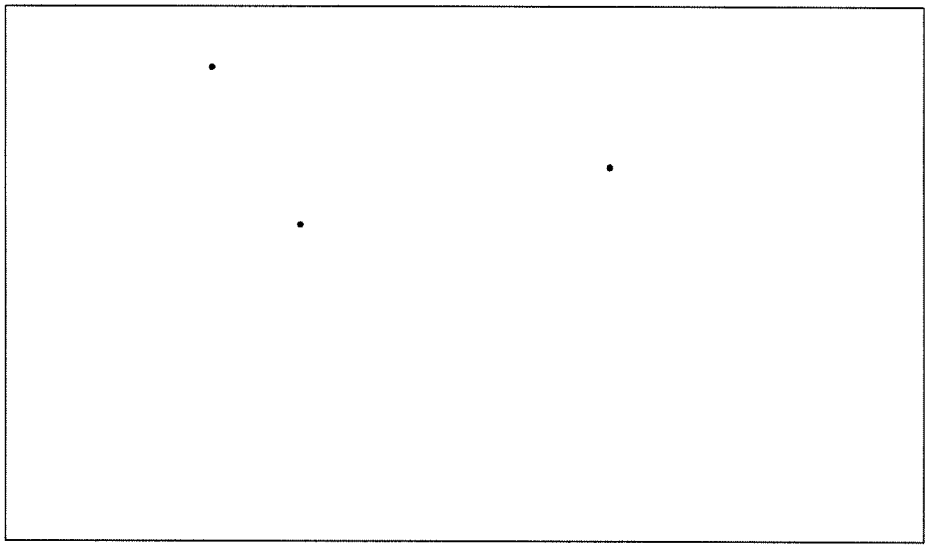
Figure 18F:
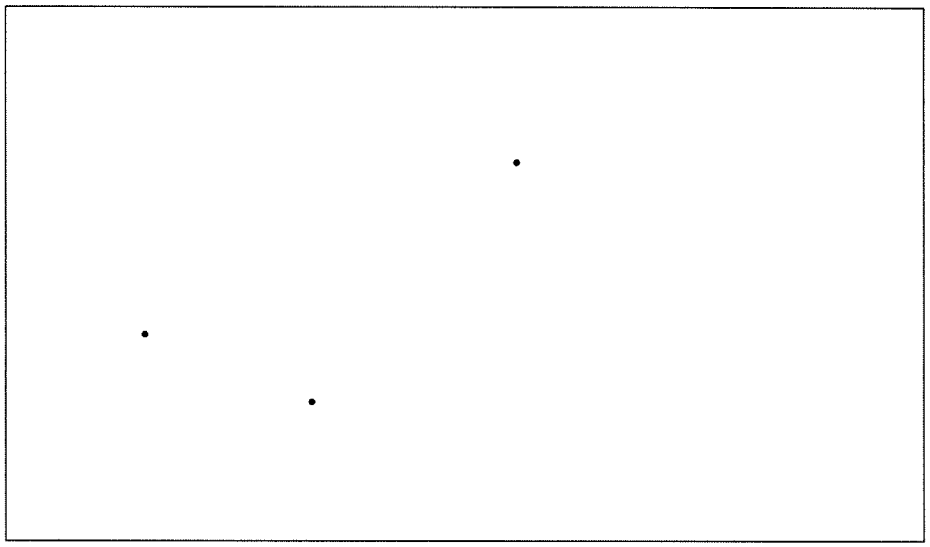
Figure 18G:
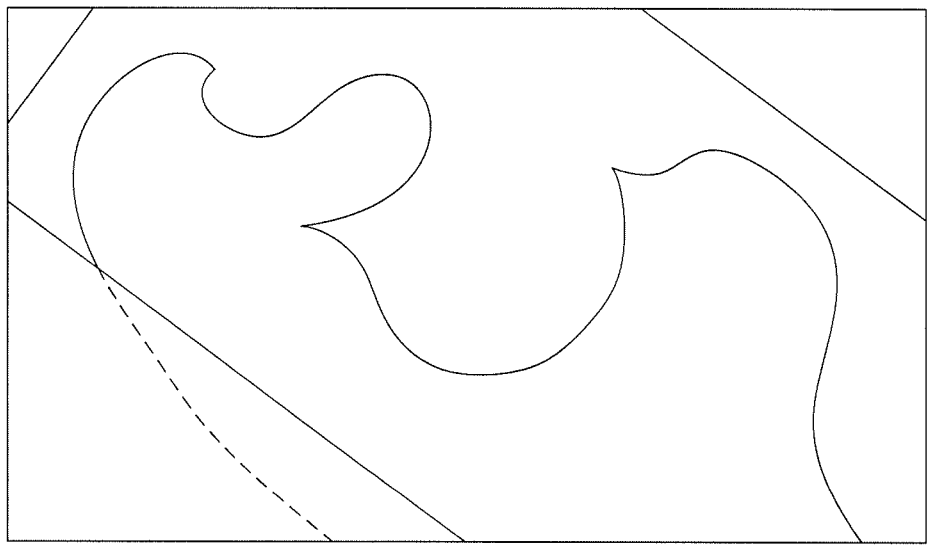
Figure 18G:
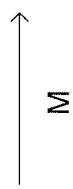
Figure 18G:
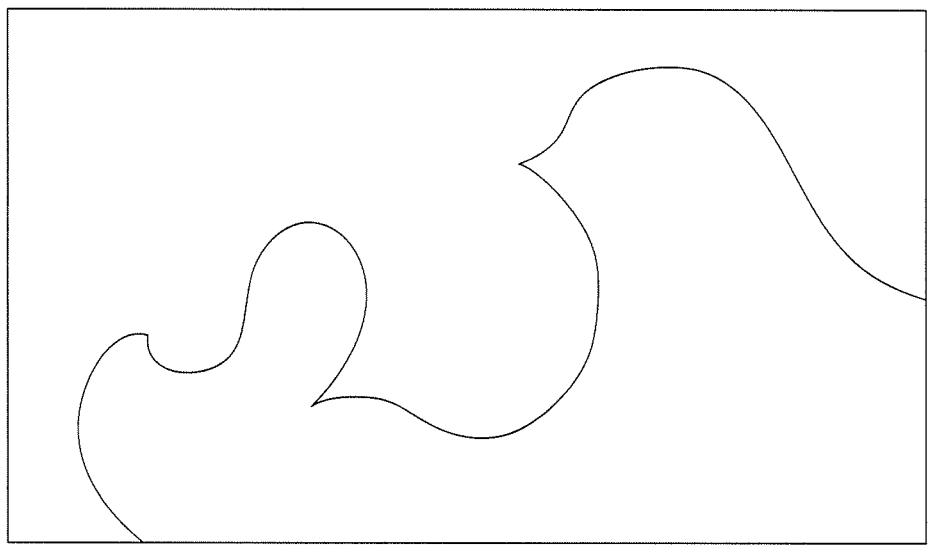

Rather than using the voxels within a pair of images as features for registration, a small number of unique features within images can be selected as the basis for registration. FIGS. 18A-G illustrate unique-feature-based registration using an example pair of two-dimensional images. FIG. 18A shows a pair of example images: a reference image 1802 and a subject image 1804 to be registered to the reference image. In this example, the images contain two regions or domains 1806 and 1808 that are separated from one another by a complex curve 1810. The intensity content of the sample image 1804 is rotated counterclockwise with respect to the reference image. Rather than using pixels as features, three unique features common to both images are instead selected as the basis for registration. These features are vertices of the complex curve, including feature $f_1$ 1812 associated with an angle α between the two tangent-line limits at the point corresponding to feature $f_1$, feature $f_2$ 1814 with an associated angle β, and feature $f_3$ 1816 with an associated angle γ. Once these three features have been selected from, and identified in, both images, as shown in FIG. 18C, the registration process is vastly simplified as a process to register the two different sets of three common features, or points, in the subject image and reference image. In this case, coordinate systems are trivially assigned to the two images and the registration model can be easily optimized to generate an optimal registration. The registration consists of a translation transformation T, illustrated in FIG. 18D, followed by a rotation transformation R, illustrated in FIG. 18E. These are combined, as discussed above, into the single transformation matrix M, as illustrated in FIG. 18F. The transformation M can then be applied to the entire pixel content of the two images, as shown in FIG. 18G, in order to carry out registration of the two images. Thus, when common intensity-content features can be identified within a pair of images, the computational overhead involved in registration can be enormously decreased by registering the locations of the features rather than attempting registration of voxel-based or pixel-based features.

Figure 19:
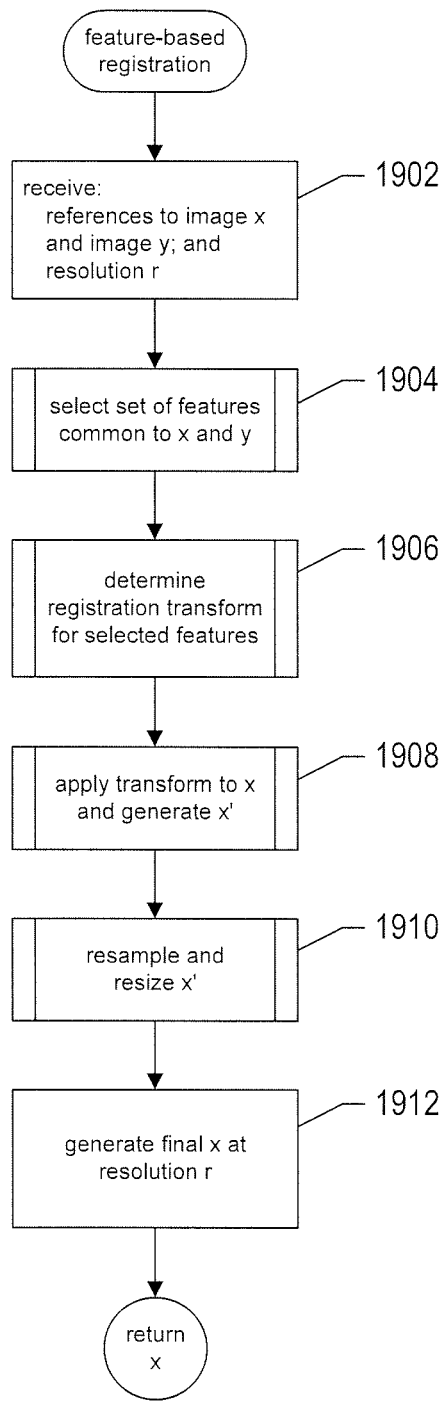
FIG. 19 provides a control-flow diagram for a feature-based registration routine.

FIG. 19 provides a control-flow diagram for a feature-based registration routine. In step 1902, the routine receives references to a pair of images X and Y and a resolution r. In step 1904, the routine selects a set of features common to images X and Y, as discussed above with reference to FIG. 18B. In step 1906, the routine optimizes the parameters of a registration model for the selected features to determine an optimal or near-optimal registration model, including a registration transform. In step 1908, the transform is applied to image X in order to generate a transformed image X'. In step 1910, the transformed image X' is resized and resampled. Finally, in step 1912, the registration is refined to the desired resolution r.

Figure 20:
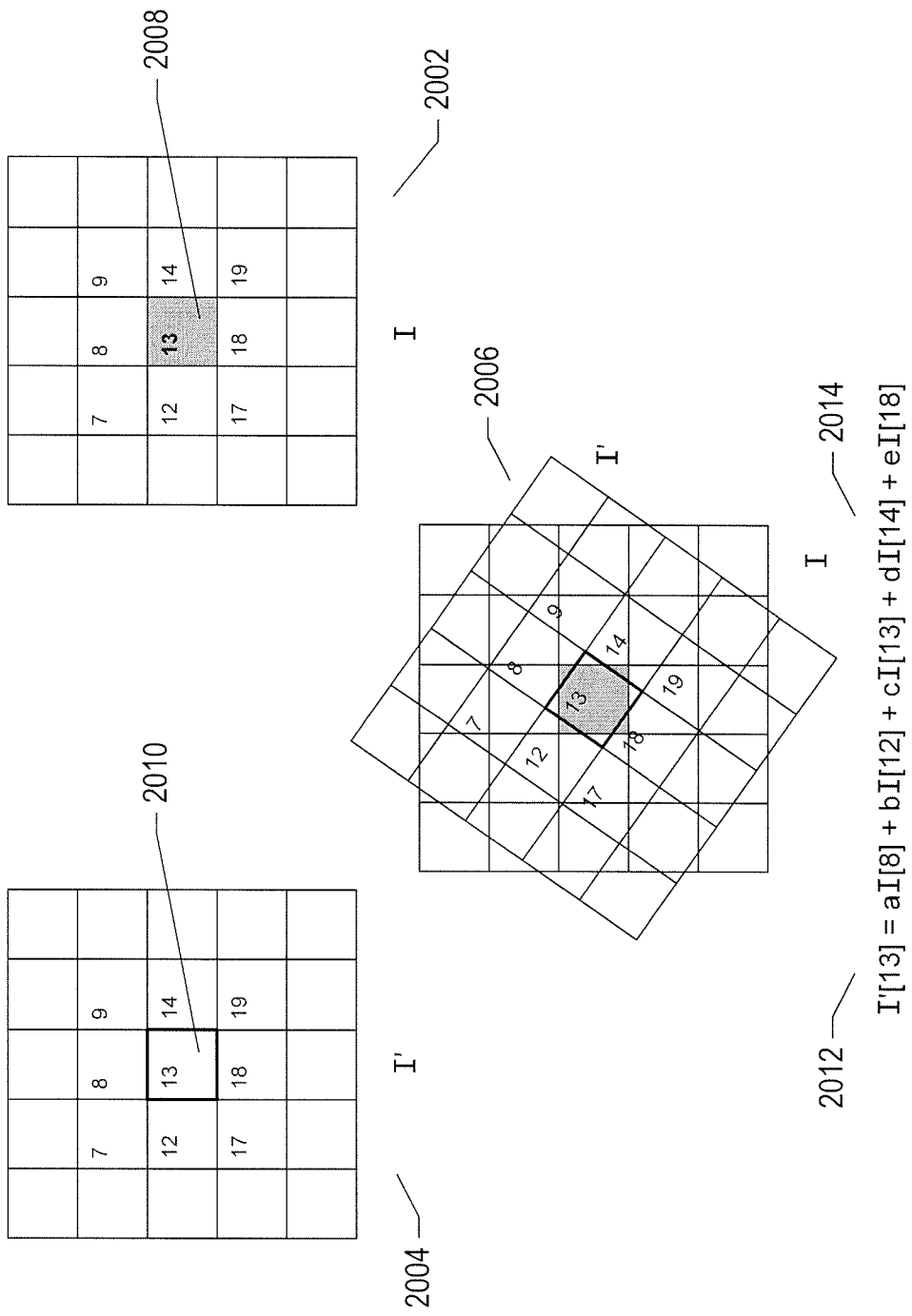
FIG. 20 illustrates the resampling operation.

As discussed above, when an image is transformed by rigid-body transformations, it is often the case that the pixels or voxels of the transformed image do not align with the pixels in voxels of the original image. Therefore, the transformed image may need to be resampled from the original image. FIG. 20 illustrates the resampling operation. In the example shown in FIG. 20, the original image I 2002 is transformed by rigid-body transformations to transformed image I' 2004. In this case, the transformation involves a clockwise rotation of the original image as well as a slight downward diagonal translation. The transformed image I' is superimposed above the original image 2006 in the lower portion of FIG. 20. Considering pixel 13 (2008) of the original image and corresponding pixel 13 (2010) of the transformed image, it can be seen in the superposition 2006 that pixel 13 of the transformed image corresponds to an area that includes portions of pixels 8, 12, 14, and 18 of the underlying original image. Thus, the intensity value for pixel 13 of the transformed image 2012 can be computed as a linear combination of the intensity values of pixels 8, 12, 13, 14, and 18 of the original image 2014, where each original-image intensity value is multiplied by a coefficient representing the percentage of the area of the pixel containing that intensity value overlain by pixel 13 of the transformed image. In the case of three-dimensional images, a given transformed-image voxel may correspond to portions of voxels within a 3×3×3 cube of voxels in the original image.

Figure 21:
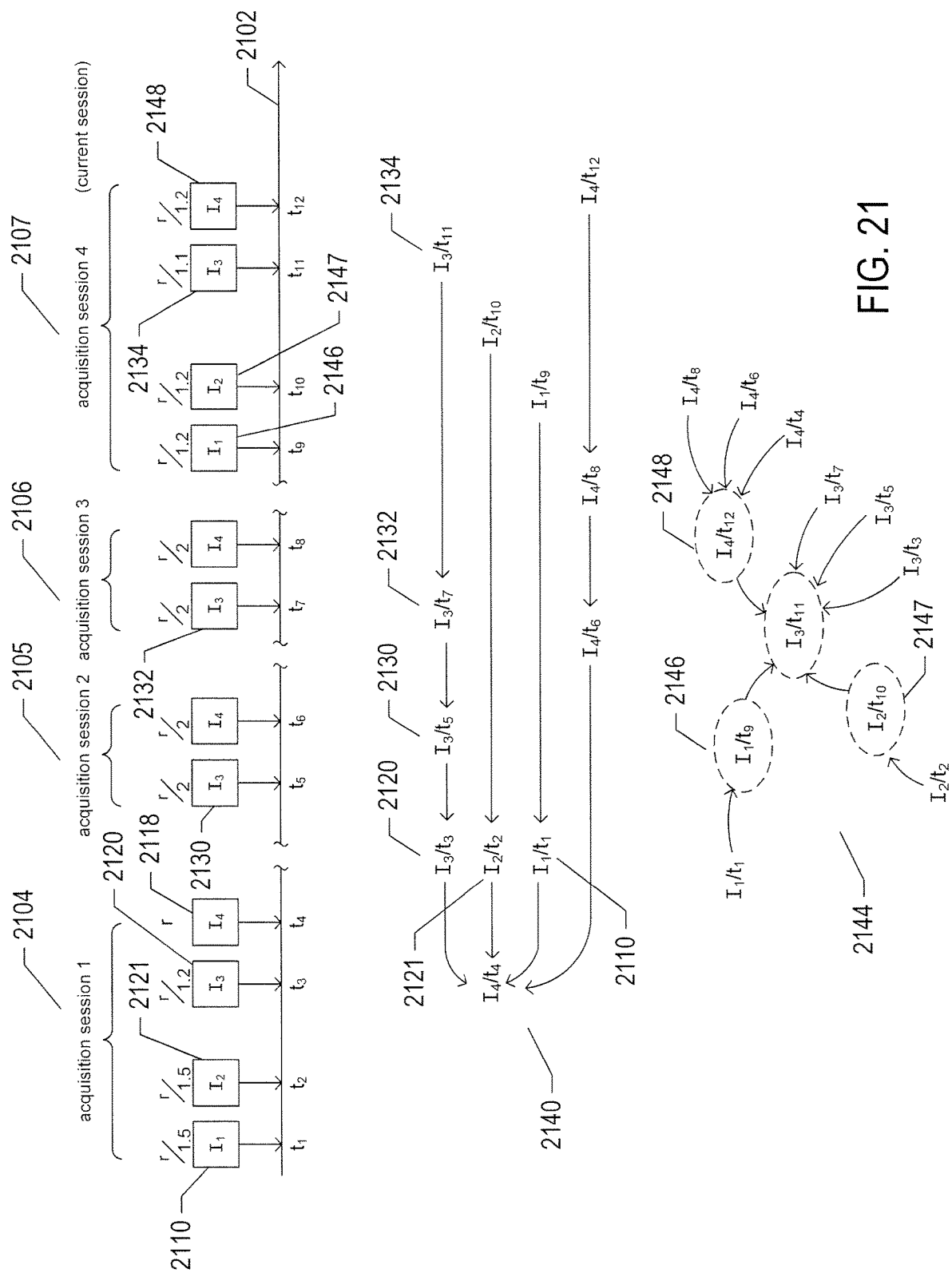
FIG. 21 illustrates a general registration strategy for a group of related images.

FIG. 21 illustrates several general registration strategies for a group of related images. In FIG. 21, a timeline is shown as a horizontal axis 2102. Four different image-acquisition sessions 2104-2107 are carried out. The acquisition sessions may be, for example, medical-imaging sessions carried out in a patient. Four different types of medical images are acquired: $I_1$, $I_2$, $I_3$, and $I_4$. Each acquired medical image is represented by a square, such as square 2110 representing a medical image of type $I_1$ acquired at time $t_1$ 2112 at a resolution of r/1.5 2114. Multiple acquisition sessions are employed to monitor progression of some type of pathology and/or treatment, over time. These images may be used for change detection to monitor progression of a treatment or pathology. As discussed above, registration of the images is required for change detection and quantitative enhancement.

In one approach, registration of multiple images may be effectively carried out by choosing a high-resolution image as a basis image and registering the remaining images directly or indirectly to the selected basis image. In the example shown in FIG. 21, the image 2118 of type $I_4$ acquired at time $t_4$ has the highest resolution, r, and is therefore selected as the reference image. In one strategy, a basis image having the highest resolution is the image having the highest resolution in the dimension with least resolution. Other methods of choosing the highest-resolution image are possible and, in case of ties, secondary considerations are applied to choose a basis image. Next, a remaining image of each type acquired close in time to the selected basis image, generally from the same acquisition session, when possible, is selected for registration to the reference image 2110, 2120, and 2121. Finally, for each type of image, the remaining, as yet unselected images of that type are successively registered to one another in proximity-in-time order. For example, for the images of type $I_3$, image 2130 is registered to image 2120, image 2132 is registered to image 2130, and image 2134 is registered to image 2132. Thus, the highest-resolution image of the group is selected as the basis image in a first step. In a second step, an image of each type close in time to the basis image is selected and registered to the reference image. Then, in subsequent steps, the remaining image of each type closest to the most recently registered image of that type is registered to the most recently registered image of that type, becoming the most recently registered image of that type with respect to a subsequent step. Once all of the images have been registered, a final resolution is chosen for the images and the images are rescaled and refined to that chosen resolution. This approach is illustrated by diagram 2140 in the central portion of FIG. 21. It is often the case that an intermediate resolution from among the range of resolutions of the images provides the best trade-off between resolution and potential artifact introduction by up-sampling from lower-resolution images to a higher-resolution image. The above-described image-group registration process ensures that registrations are carried out preferentially between images of a particular type and between images of that type adjacent with respect to the timeline, to minimize inadvertent removal of desired, subtle signals that reflect actual physiological changes that are intended to be revealed in pairs of images to which a difference operations applied in order to generate a change-detection resultant image.

In another approach, illustrated in diagram 2144 in the lower portion of FIG. 21, a highest resolution image 2134 is selected from the current acquisition session 2107 as the basis image. Then, images 2146, 2147, and 2148 of the remaining types closest in time to the selected basis image are selected to form, along with the basis image, a basis image set 2134, 2146, 2147, and 2148. Finally, each remaining image of each type is registered to the basis-set image of the same type. In this approach, interpolation is performed only once for each image, following one or more registration transformations, to avoid compounding registration errors.

In general, registration strategies for groups of related images seek to minimize compounding registration errors, such as multiple-interpolation-step errors, minimizing errors introduced from registration of images of dissimilar types, and minimizing registration errors arising from local time-dependent changes in the image entity that the registration process may attempt to eliminate at the cost of introducing many more, smaller global errors. There are many different possible strategies with different sets of advantages, disadvantages, and trade-offs. However, naïve and ill-considered strategies may lead to poor downstream change detection and quantitative enhancement.

Image Normalization to which, in Part, the Current Document and Claims are Directed The current subsection of this document describes two different methods for normalization of images, both based on the use of intrinsic intensity information within the images. In the implementations of these methods disclosed below, two-dimensional intensity histograms are tabulated and used to normalize the intensities of one image to another reference image. For this reason, both disclosed methods fall into a class of normalization methods referred to, in this document, as "histogram-based normalization methods."

FIGS. 22A-G illustrate tabulation of pixel-intensity mappings and generation of a difference-metric value for a particular mapping model. FIGS. 22A-E all use the same illustration conventions, next discussed with reference to FIG. 22A. The examples are based on two-dimensional images, but the illustrated methods are equally applicable to three-dimensional images. In each figure, a first example image 2202 and a second example image 2204 are shown, similar to pairs of images shown in FIGS. 5A, 6A, 7A, 8A, and 9A. Below the two images, a table 2206 is shown in each figure. The table represents a mapping of each intensity value that occurs in the first image 2202, referred to as image "A," to intensity values in the second image 2204, referred to as image "B," that occur at the pixel locations corresponding to the pixel locations in image A having the intensity value The table is essentially a two-dimensional histogram. As discussed below, each row in the table can be thought of as a one-dimensional histogram of the distribution of pixel intensities in pixels in image B corresponding to the pixels in image A having a particular intensity value. The population of this data table is illustrated in FIGS. 22B-E. The illustrated mapping is a mapping for non-0 intensities in image A to corresponding intensities in image B, in the currently discussed example.

Figure 22A:
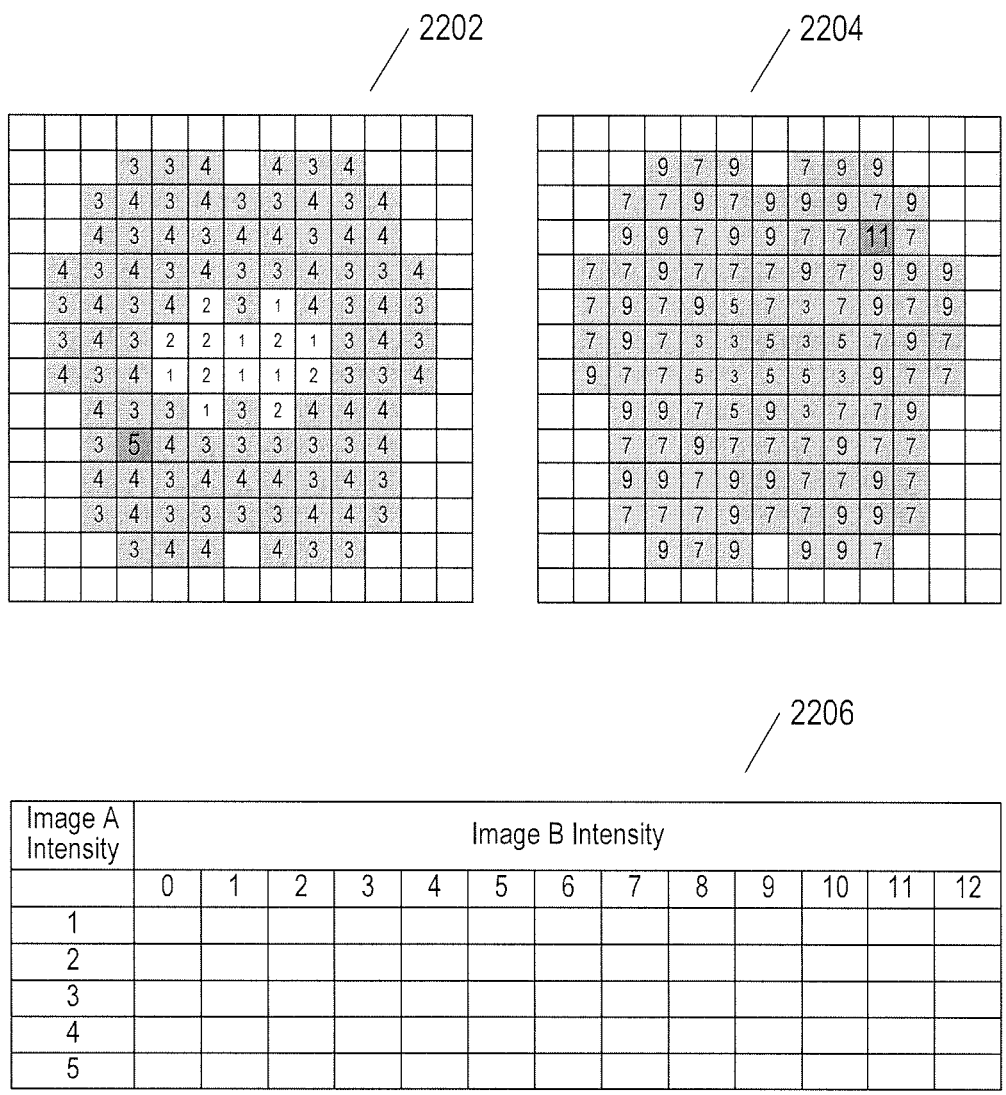
FIGS. 22A-G illustrate tabulation of pixel-intensity mappings and generation of a difference metric value for a particular mapping model.
Figure 22B:
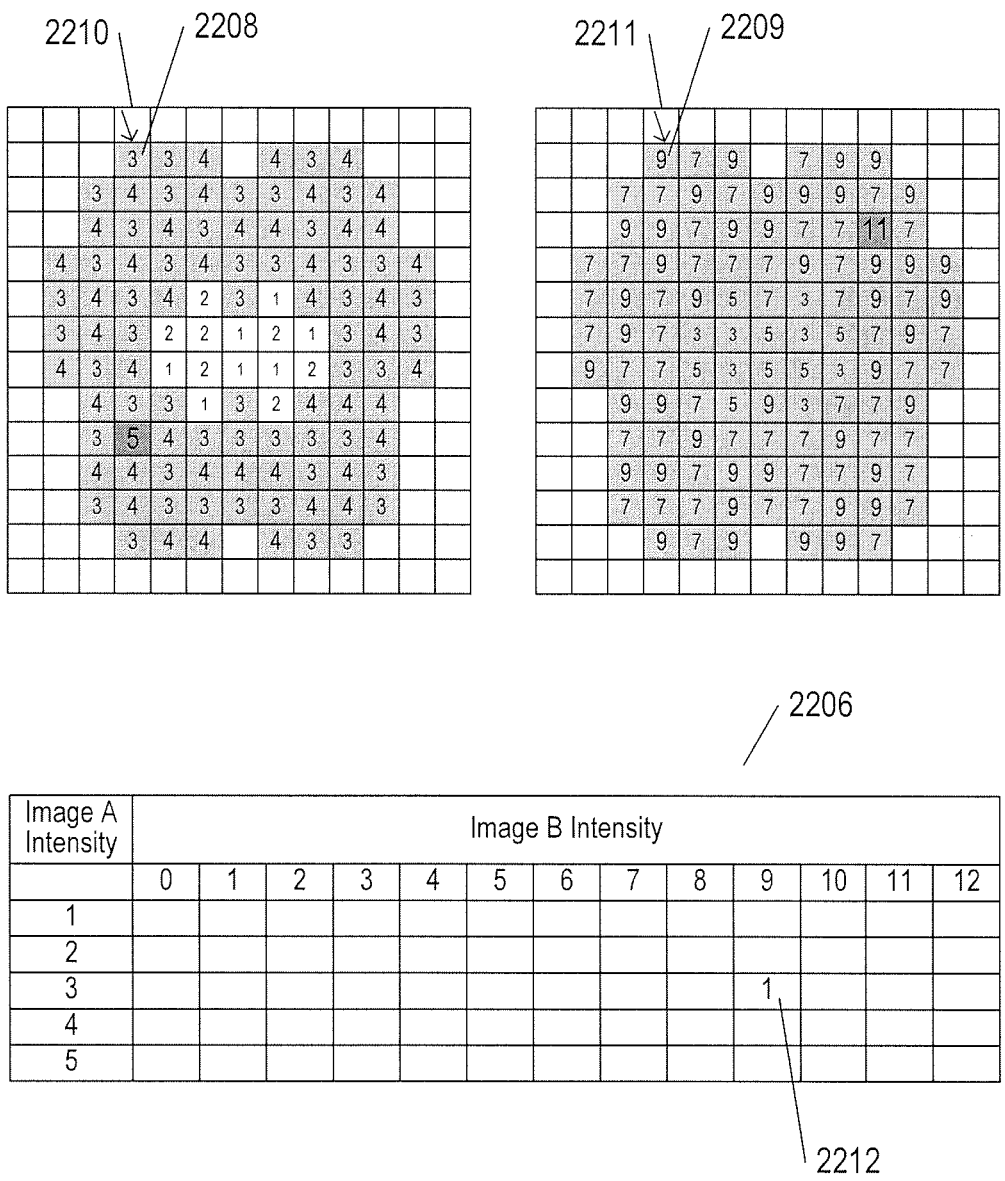
Figure 22C:
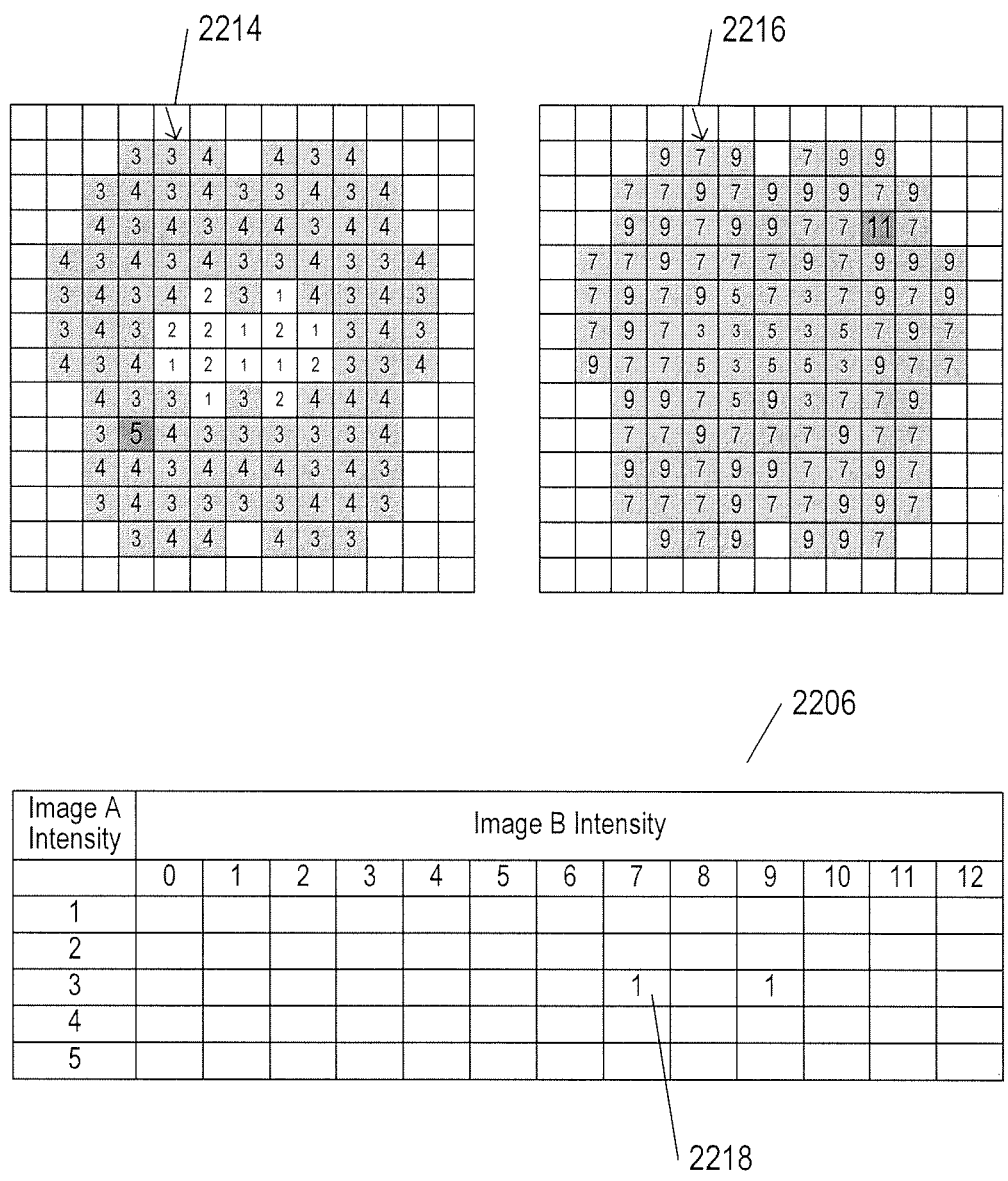
Figure 22D:
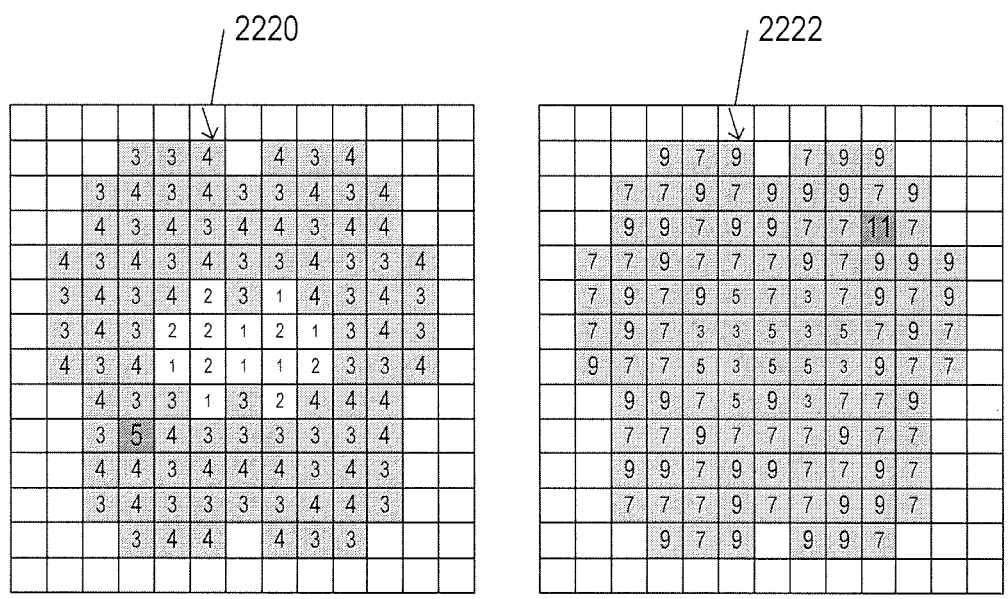
Figure 22E:
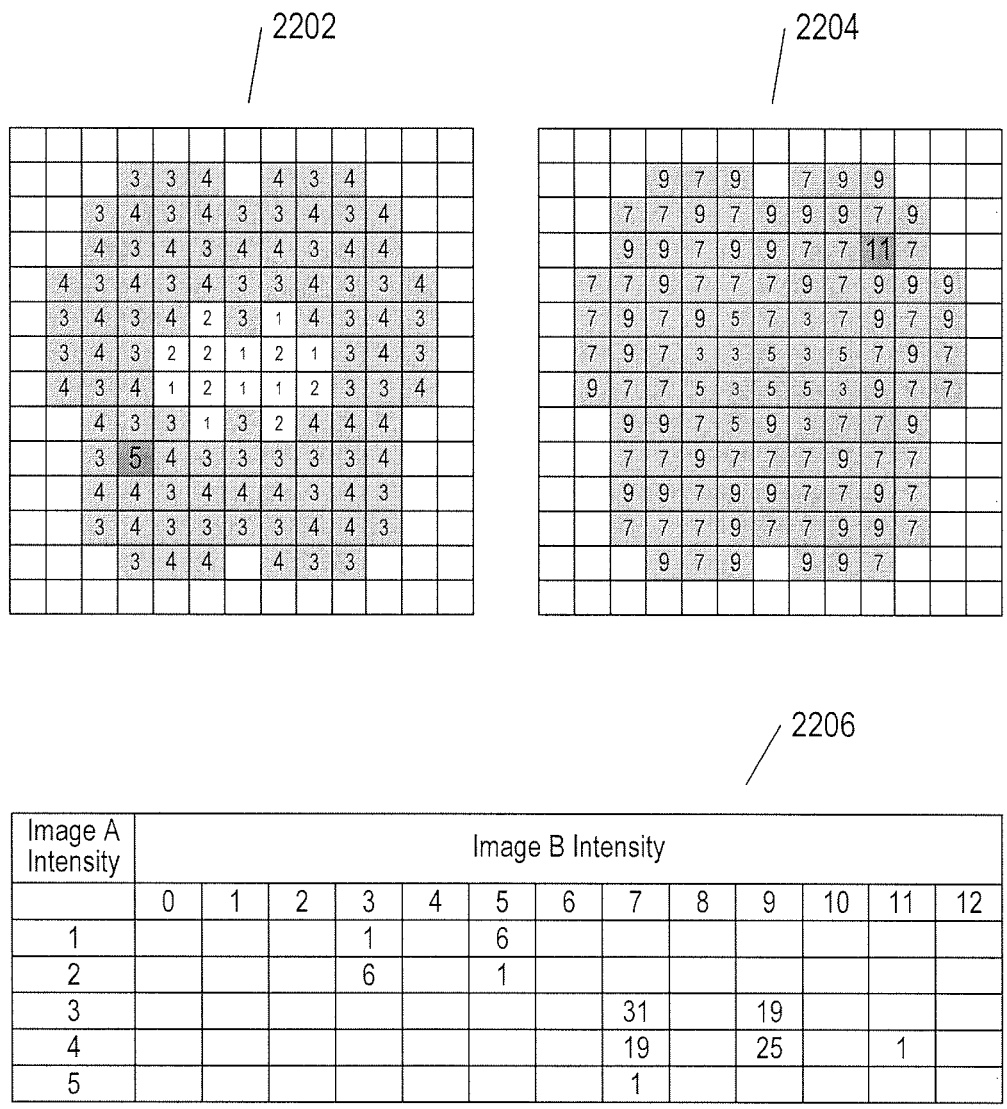

FIG. 22B shows a first step in the population of data table 2206. A pair of equivalently located pixels 2208 and 2209 are indicated by arrows 2210 and 2211 in images A and B. The intensity value 3 of pixel 2210 in image A is mapped to intensity value 9 of pixel 2211 in image B. Therefore, the cell 2212 in table 2206 corresponding to mapping of intensity value 3 to intensity value 9 from image A to image B is incremented to 1. FIG. 22C shows consideration of a next pair of pixels represented by arrows 2214 and 2216. In this case, the intensity value 3 in image A is mapped to the intensity value 7 in image B. Thus, the cell 2218 corresponding to a mapping of intensity value 3 to intensity value 7 is incremented to the value 1. FIG. 22D shows a third step in table population. Arrows 2220 and 2222 indicate a third pair of pixels. In this case, intensity value 4 is mapped to intensity value 9, as a result of which cell 2224 in table 2206 is incremented to the value 1. This process proceeds through all of the shaded pixel pairs in images A and B to populate table 2206, as shown in FIG. 22E.

Figure 22F:
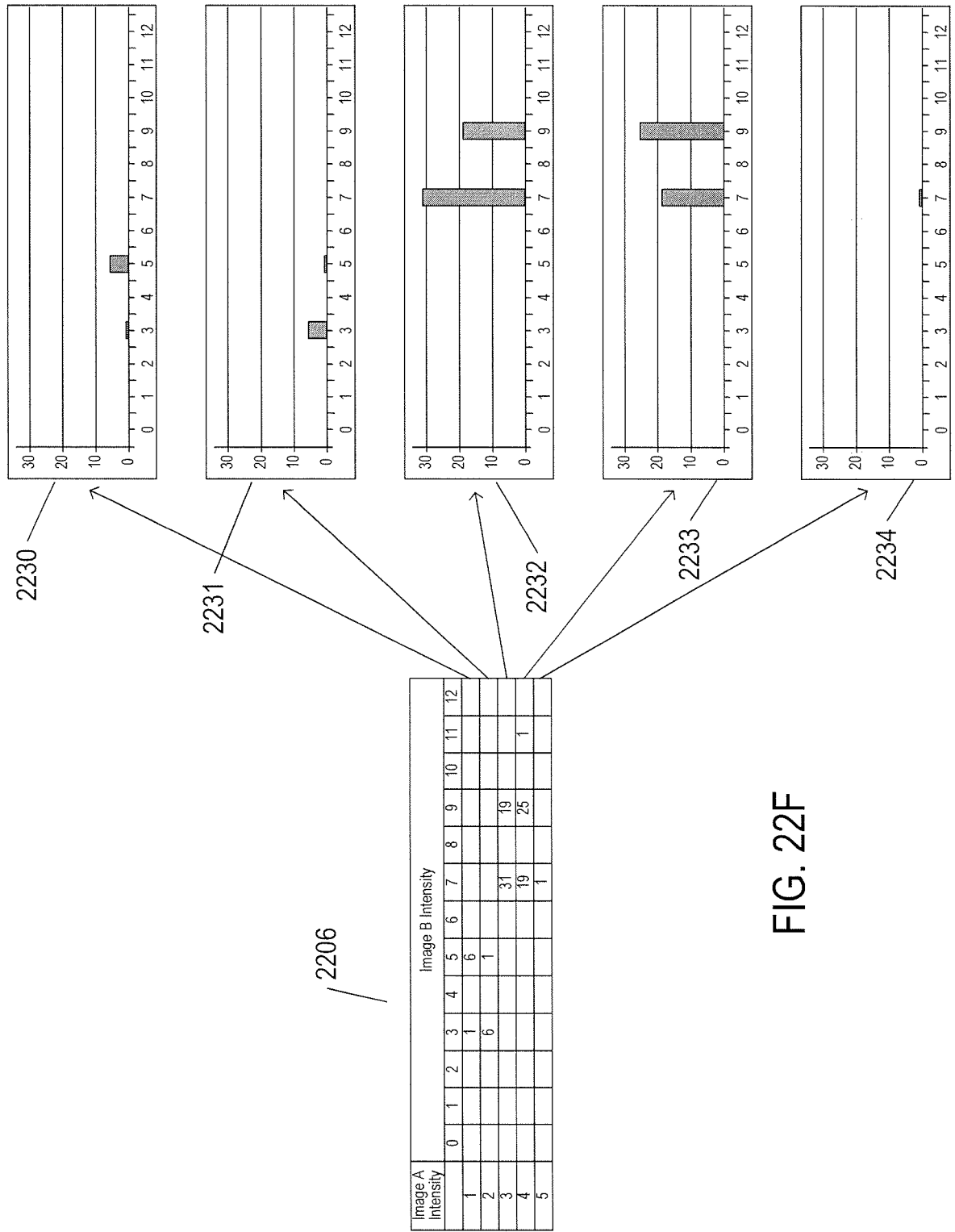

As shown in FIG. 22F, table 2206, produced by considering a sequence of positionally equivalent pixels in images A and B, as discussed above with reference to FIGS. 22A-E, can be alternatively considered to be a set of histograms 2230-2234, with each row in table 2206 providing the data for a single, corresponding histogram. Histogram 2230 shows the distribution of intensity values in image B for pixels in image B positionally corresponding to pixels in image A with intensity value 1. Similarly, histogram 2231 shows the distribution of intensities of pixels in image B positionally corresponding to pixels in image A with intensity value 2.

Figure 22G:
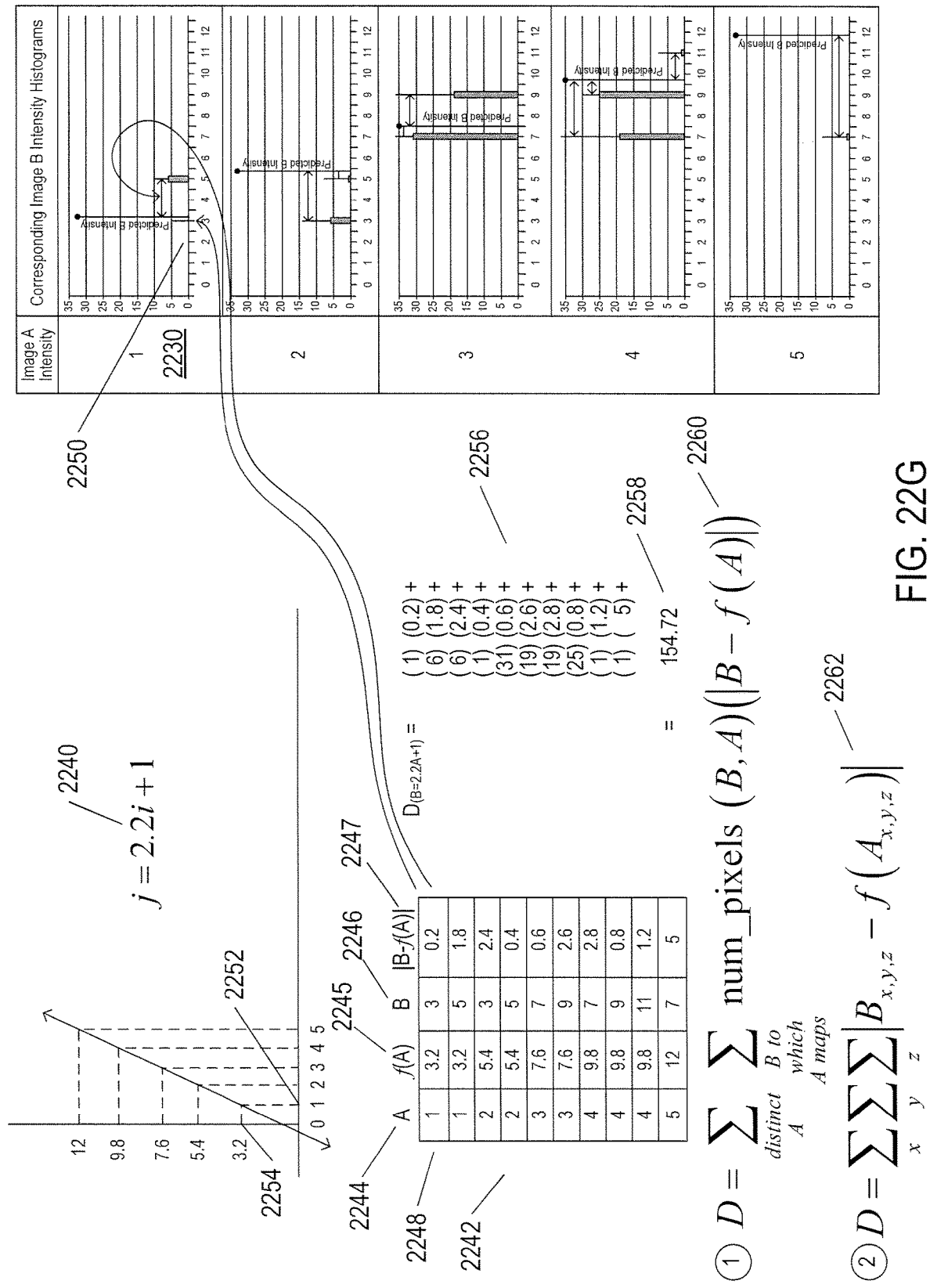

The currently disclosed methods and systems seek to use the tabulated intensity-mapping data, such as the data tabulated in example 2206 or, equivalently, tabulated in histograms 2230-2234 shown in FIG. 22F, to generate parameters for a mapping function. FIG. 22G shows a plot 2240 of the mapping function $j=mi+b$, where the values for the parameters m and b have been determined to be 2.2 and 1, respectively. The difference metric is used to evaluate how closely the mapping function fits the tabulated data. Computation of the difference metric is illustrated in the lower portion of FIG. 22G. First, a table 2242 of differences is computed. Each row in this table corresponds to the mapping from a particular intensity value in image A to another intensity value in image B, and also corresponds to a particular bar within one of the histograms. The elements within a row, or the columns of the table, correspond to: (1) the intensity value in image A 2244; (2) a corresponding intensity value computed using the mapping function 2245; (3) the intensity value observed in image B 2246; and (4) the absolute value of the difference between the observed intensity value and the intensity value computed by the mapping function 2247. Thus, the first row 2248 in table 2242 corresponds to the first bar 2250 in histogram 2230. This bar represents the number of pixels with intensity value 1 in image A whose positionally corresponding pixel in image B has the intensity value 3. According to the mapping function, the intensity value 1 (2252 in FIG. 22G) in image A is mapped to the intensity value 3.2 (2254 in FIG. 22G) in image B. The absolute value of the difference between the computed value 3.2 and the observed value 3 is 0.2.

In the central portion of FIG. 22G, an example calculation of the difference metric D is shown 2256. This difference metric is computed as a sum of terms, each term corresponding to a row in table 2242. Each computed absolute-value difference in the final column of table 2242 is multiplied by the height of the histogram bar corresponding to the row in FIG. 2242 that contains the absolute-value difference to produce a numeric sum of terms 2258 that represents the sum of the absolute values of the differences between the observed pixel values in image B and the pixel values computed by the mapping function based on corresponding intensities in image A. The computation of the difference metric D is alternatively illustrated by two equations 2260 and 2262. The first equation is equivalent to the computation shown in the example 2256. The outer summation is over the distinct intensity values observed in image A. The inner summation is over the distinct intensity values observed in image B for a given intensity value observed in image A. The terms of the expression are the product of the number of pixels with a particular intensity value in image B times the absolute value of the difference between that intensity value and the computed intensity value. Alternatively, as shown by equation 2262, the difference metric is the sum, over all corresponding pairs of pixels in images A and B, of the absolute value of the difference between the observed intensity value of each pixel in image B and the value computed by the mapping function for the intensity value of the corresponding pixel in image A.

Figure 23A:
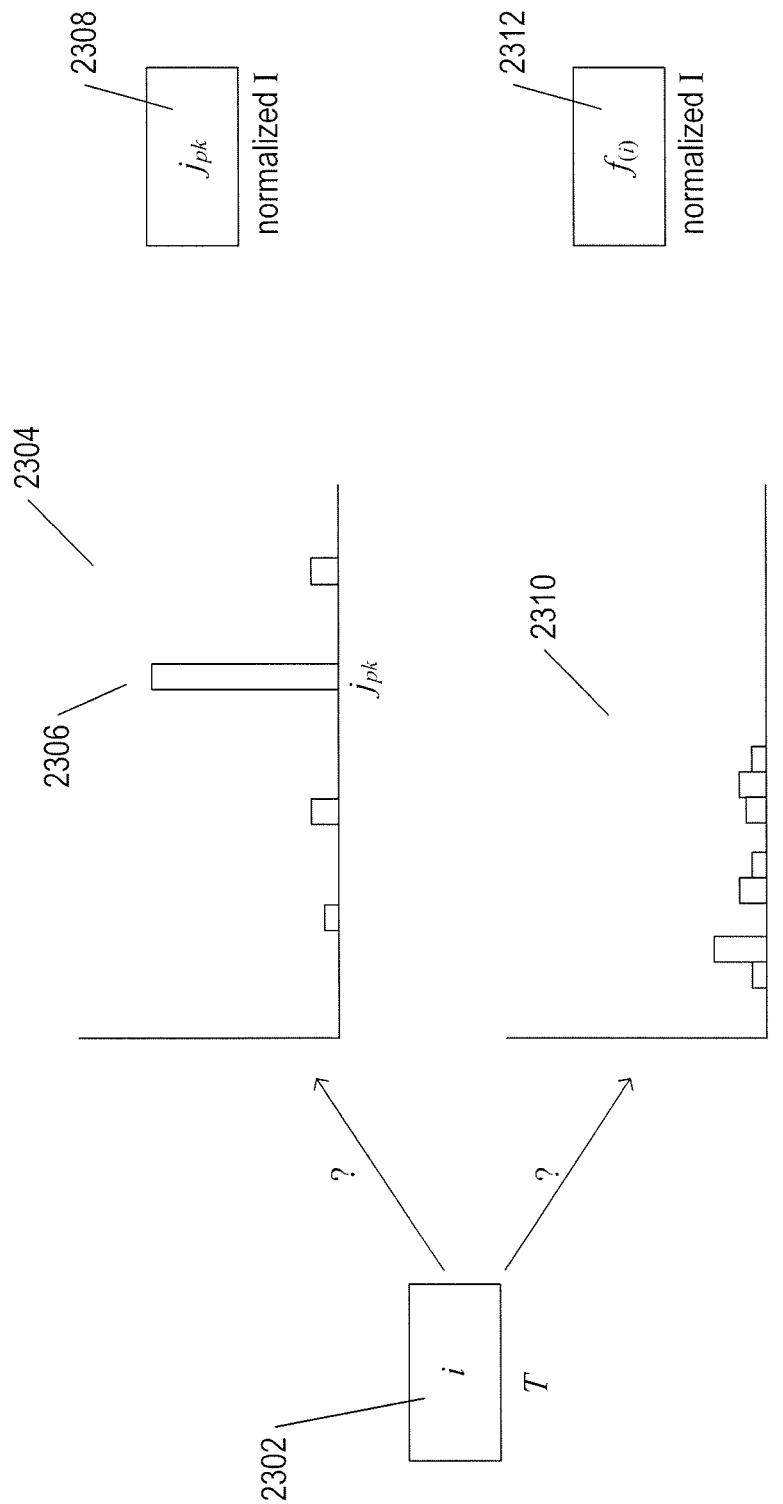
FIGS. 23A-B illustrate the final intensity-mapping model produced by the currently disclosed methods and system.
Figure 23B:
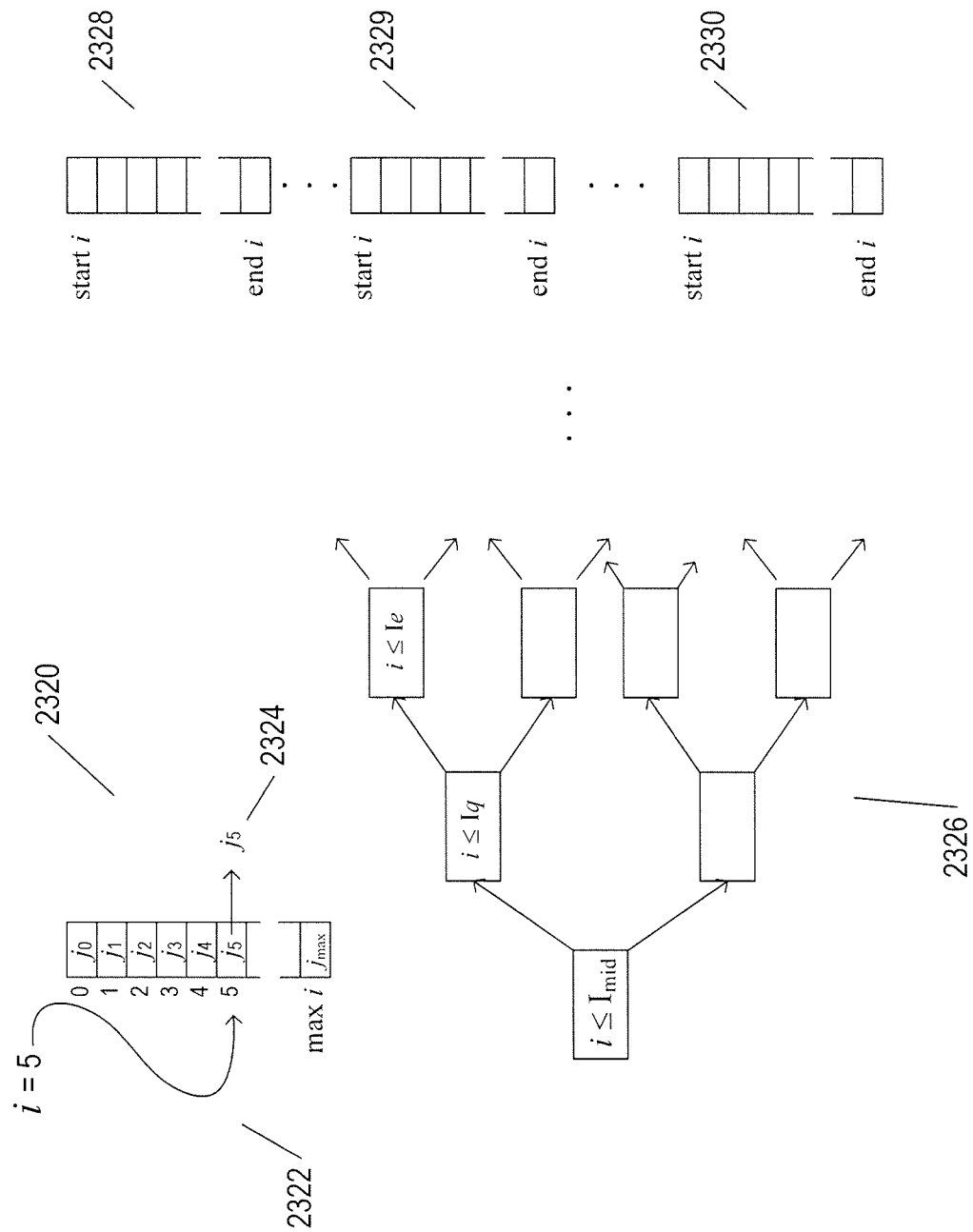

FIGS. 23A-B illustrate the final intensity-mapping model produced by the currently disclosed methods and system. Recall the data table 2206 in FIGS. 22A-E. Each row in this data table corresponds to a histogram, as discussed above with reference to FIG. 22F. As shown in FIG. 23A, an intensity that occurs as a value of a pixel in the first image 2302 corresponds to a histogram of pixel intensities in the second image. When, as shown in histogram 2304, there is a prominent peak 2306 in the histogram, as determined either by the height of the peak or the relative height of the peak with respect to the next-highest peak, the final mapping model simply maps intensity 2302 to the intensity value $j_{pk}$ corresponding to the prominent peak 2308. Thus, in the prominent-peak case, the mapping function generated by the genetic parameter-fitting method is not used. By contrast, as shown in histogram 2310, when there is no single prominent peak in the distribution of intensities, the mapping function ƒ(i) is used to generate the intensity value 2312 for normalizing intensity value i in the first image. Thus, final intensity-mapping model is a hybrid model, containing both observed intensity correspondences as well as computed intensity correspondences. A hybrid model can be thought of as a discontinuous model in relation to a model solely based on a mapping function.

The final intensity-mapping model for each image domain is a table of computed mappings, such as table 2320 in FIG. 23B. An intensity value of a pixel in the image to be normalized is used as an index 2322 in the table 2320 to select a corresponding normalized value 2324 for the normalized image. However, in cases where there are far more possible intensity values than observed intensity values, in which case the table 2320 would be very large and sparse, a tree-like index 2326 can be developed to index a set of compact tables 2328-2330. An intensity value from the original image is used to traverse the index 2326 to identify the appropriate compact table, and the intensity is then used as an index into that table, following subtraction of the intensity in the first entry of the table from the intensity value, in order to find a corresponding normalized image intensity. Many other types of model data structures are possible.

Figure 24B:
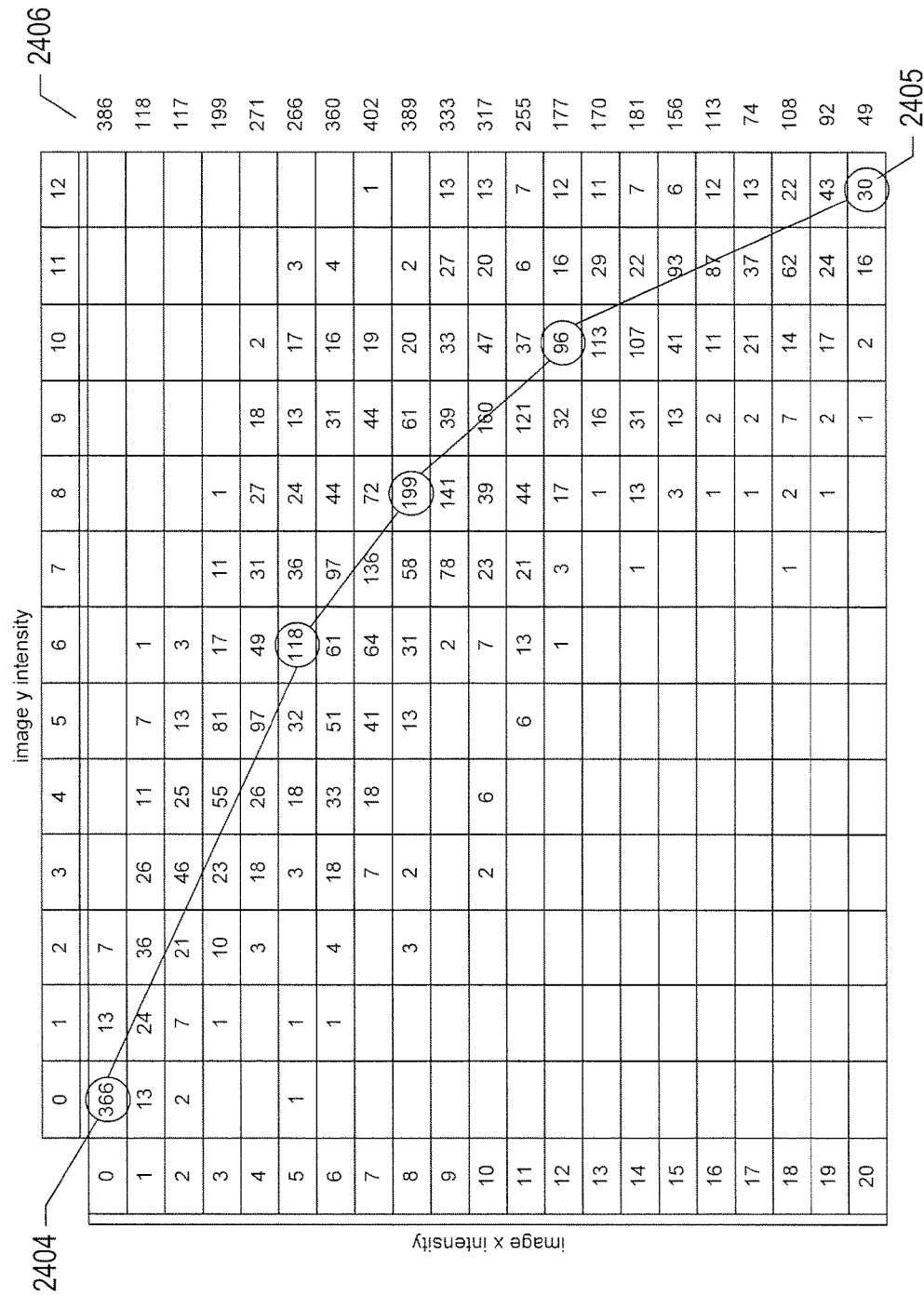

FIGS. 24A-F illustrate a second histogram-based normalization method. This method begins a two-dimensional histogram generated from a pair of images X and Y, as discussed above with reference to FIGS. 22A-E. FIG. 24A shows an example two-dimensional histogram of the same form as the two-dimensional histogram 2206 shown in FIGS. 22A-E. The cells, or elements, of the two-dimensional histogram 2402 shown in FIG. 24A that do not contain numerical values are assumed to contain the numerical value 0.

Initial steps of the second histogram-based normalization method are illustrated in FIG. 24B. A first parameter used by this method is R, the number of histogram rows per control point. The number of control points for the example histogram is then 21/R, where 21 is the number of rows in the example histogram. Assuming a value of 4 for the parameter R, five control points are needed. In FIG. 24B, the selected control points are indicated by circles overlying the elements, or cells, corresponding to the control points, such as circle 2404 overlying the element with indices (0, 0). A first control point is placed at that element as well as at the lowest, rightmost element 2405. That leaves n=3 remaining control points to place. The rows of the two-dimensional histogram are divided into n+1 approximately equal partitions and a control point is placed between each of these partitions. The partitioning is carried out according to the sum of intensities in the rows of the candidate partitions. In FIG. 24B, the final column of numerical values 2406 shows the sum of intensities for each row. The sum of these values is then divided by n+1 to determine the aggregate intensity value for each partition. The remaining control points are placed at the approximate center of the aggregate intensity of the row determined to be the boundary between two adjacent partitions. By this method, the remaining control points are shown placed near the aggregate-intensity centers of rows 5, 8, and 12 in the two-dimensional histogram shown in FIG. 24B.

Figure 24C:
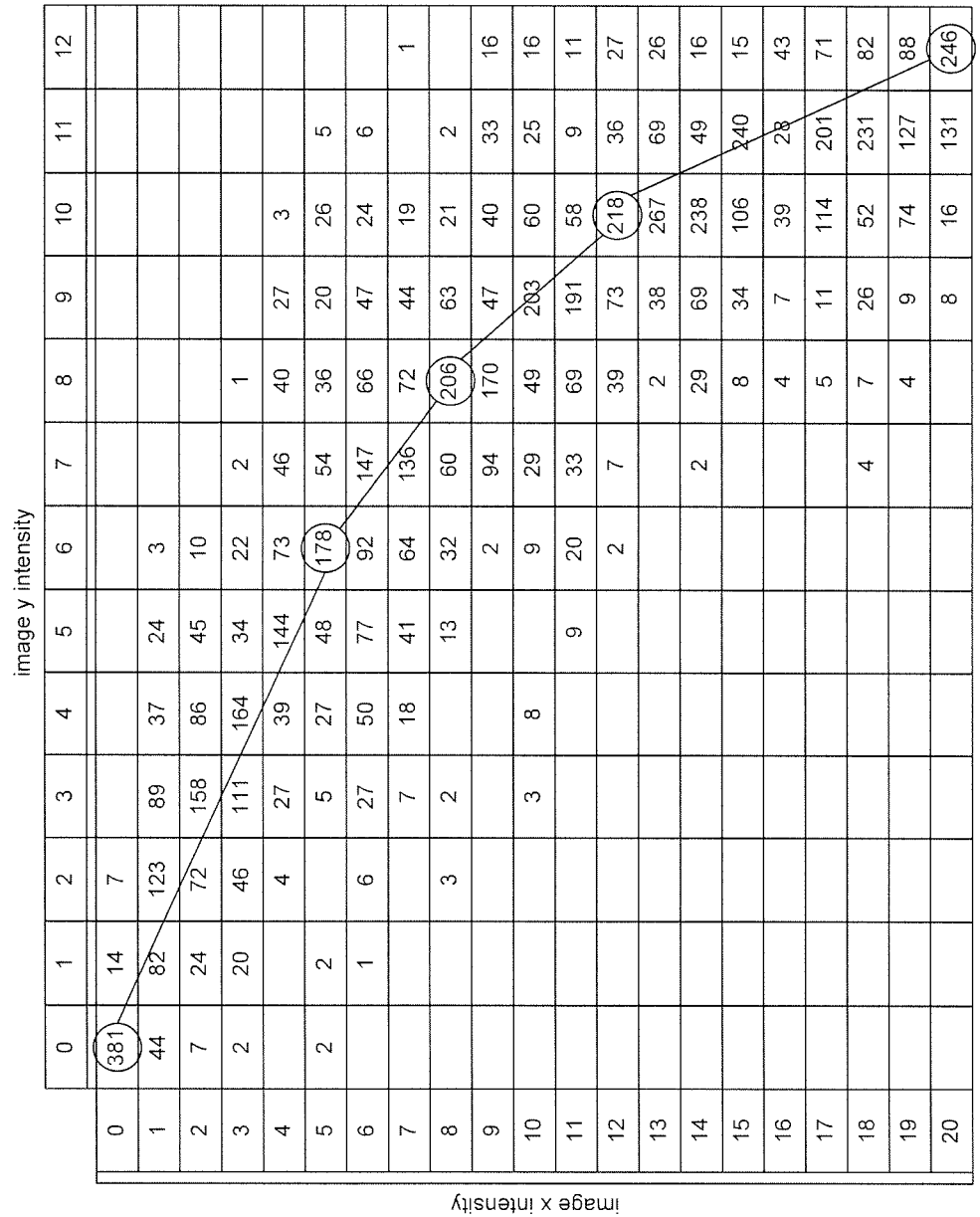
Figure 24D:
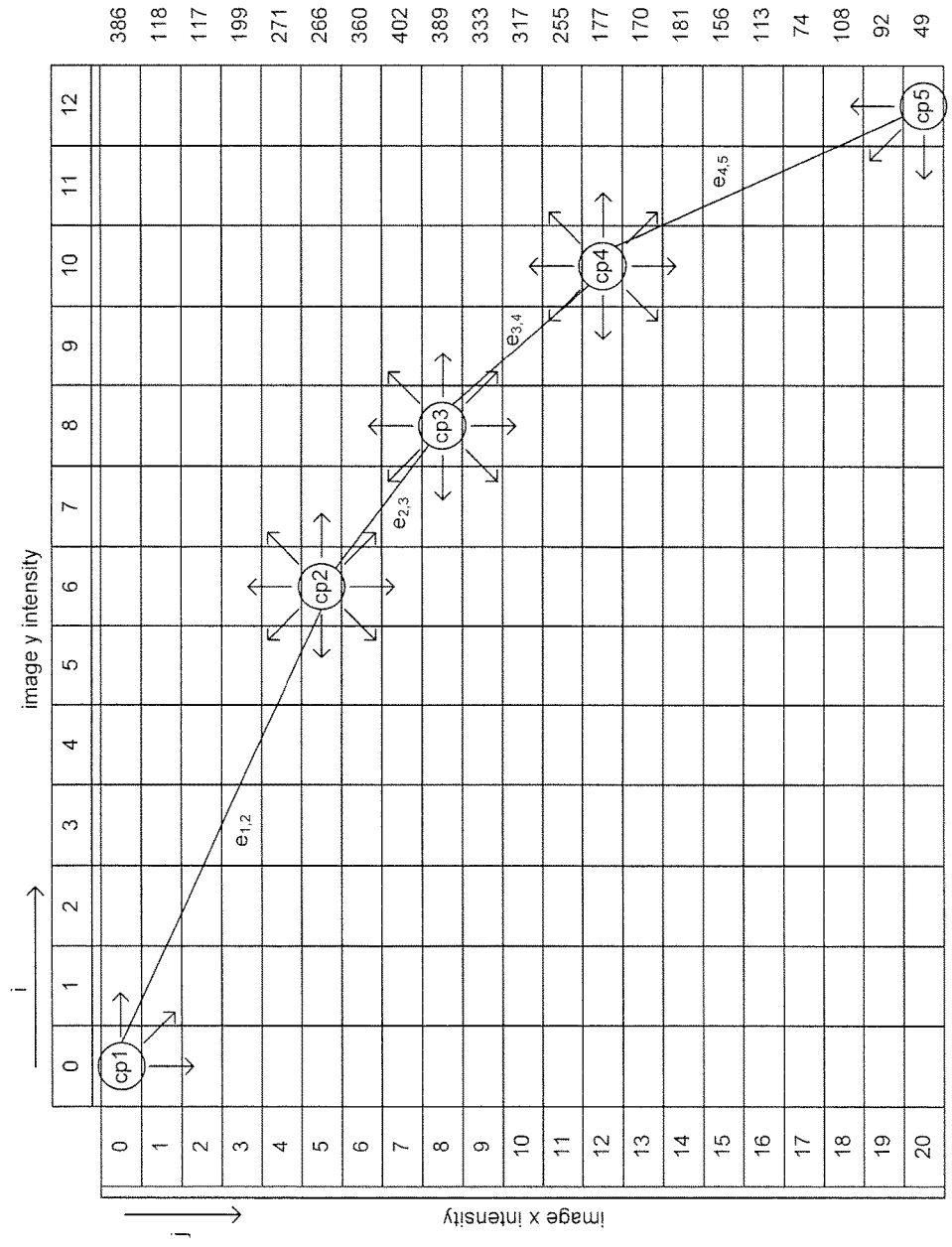

In a next step, shown in FIG. 24C, the intensity values in each row are rescaled so that all of the rows have the same approximate aggregate intensity. Then, as shown in FIG. 24D, an optimization procedure is used to adjust the positions of the control points, with the possible adjustments indicated by the directional arrows, such as directional arrow 2408 in FIG. 24D. The numerical values of the two-dimensional-histogram elements are omitted, for clarity of illustration, in FIG. 24D. As indicated by the expressions 2410 at the bottom of FIG. 24D, repositioning of control points is constrained to prevent two control points from residing in the same element or cell and to require that each successive control point is rightward and downward from the preceding control point.

FIG. 24E provides expressions that characterize optimization of the control points. The control points, and edges between the control points, together comprise a mapping function M, as indicated by expression 2412. The lengths of the edges are computed by a city-block length metric 2414. Each cell or bin in the two-dimensional histogram is represented by the notation $b_{i,j}$, where i and j are the indices of the bin, as indicated by expression 2416. The intensity value stored in the bin is indicated by the notation $[b_{i,j}]$, as indicated by expression 2418. As indicated by expression 2420, the number of bins that a particular edge traverses is provided by the function numBins($e_{x,y}$), where $e_{x,y}$ denotes the edge between control points x and y. As indicated by expression 2422, the $i^{th}$ bin of the bins traversed by edge $e_{x,y}$, is returned by the function bin($e_{x,y}$, i,). Finally, with this notation in hand, a fitness metric for the current mapping function M, represented by the current locations of the control points and the edges between them and provided by expression 2424, can be understood. The fitness metric is the aggregate intensity of the bins traversed by the edges of the mapping-function model divided by the length of the piecewise curve comprising the edges of the mapping-function model. As indicated by expression 2426, an optimal or near optimal mapping function is obtained by optimizing the model by maximizing the fitness metric of the model under the constraints discussed with reference to expressions 2410 in FIG. 24D.

Figure 24F:
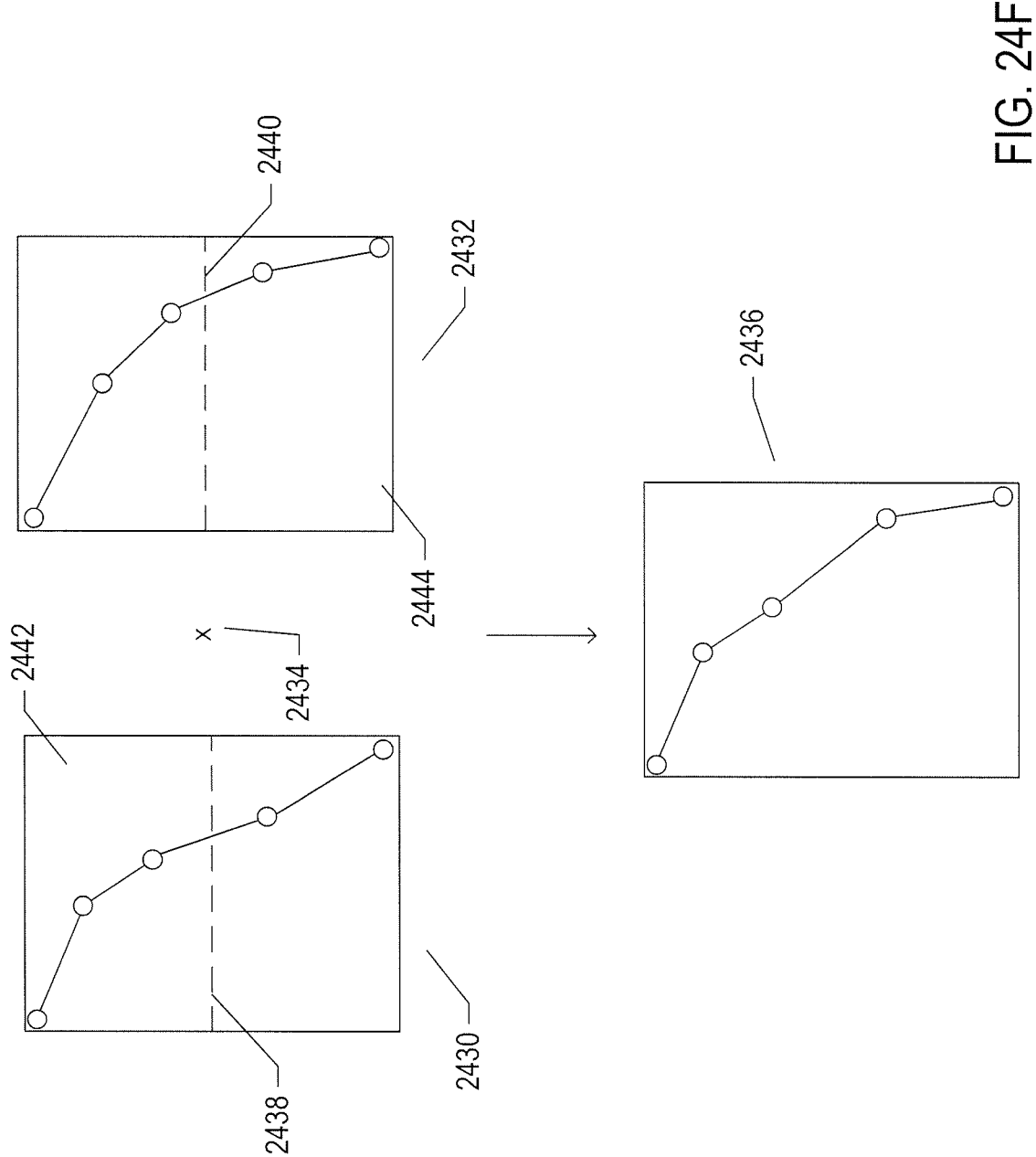

In one optimization approach, a genetic method is used. As shown in FIG. 24F, next-generation individuals, each associated with a mapping function, are obtained by breeding previous-generation individuals. Mapping functions 2430 and 2432 are associated with two current-generation individuals which are bred 2434 to produce a next generation individual with a new mapping function 2436 representing a combination of the parent mapping functions 2430 and 2432. In this approach, the parent mapping functions are both divided into two parts, as indicated by dashed lines 2438 and 2440. The new mapping function 2436 is obtained by combining the upper portion 2442 parent mapping function 2430 with the lower portion 2444 of parent mapping function 2432. Additional control points are added to the new mapping function in order to satisfy the optimization constraints. As with the first normalization method discussed above with reference to FIGS. 22A-G, the second histogram-based normalization method is also a hybrid method that employs the final intensity-mapping model discussed above with reference to FIG. 23A.

Figure 25:
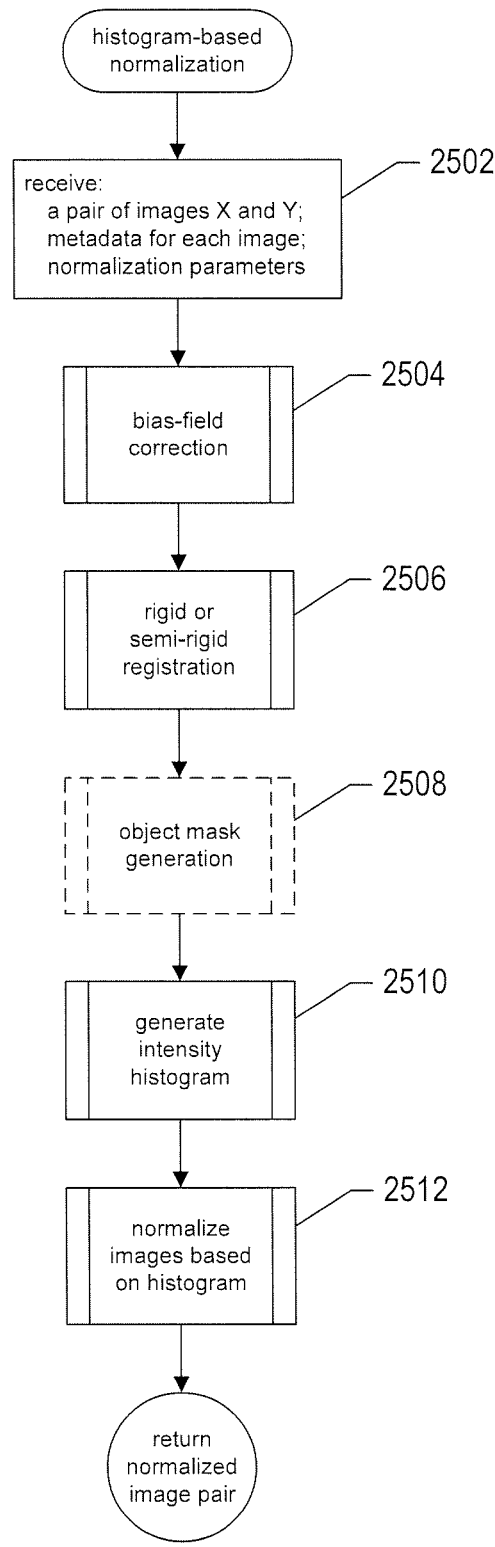
FIG. 25 provides a control-flow diagram that represents histogram-based normalization.

FIG. 25 provides a control-flow diagram that represents histogram-based normalization. In step 2502, a pair of images X and Y are received, along with metadata for the images and normalization parameters. Of course, the images may be passed by reference. The image X is to be normalized to reference image Y. In step 2504, bias-field correction is undertaken to remove global, large-scale intensity variations in image X or in both images X and Y. In step 2506, image X is registered to image Y if the registration has not already been undertaken prior to embarking on histogram-based normalization. In optional step 2508, an object mask may be generated to determine the portions of image X to normalize with respect to reference image Y. For many types of subject matter, such as medical images, large portions of the image may have background intensity values and may have relatively little or no value for image analysis, as a result of which there is no need to normalize them. In fact, in many cases, attempting to normalize background intensities can introduce errors in the normalization of intensities of interest. In step 2510, a two-dimensional histogram, such as that shown in FIG. 24A, is generated for the pair of images. Finally, in step 2512, a histogram-based normalization method is carried out, such as the histogram-based normalization method discussed above with reference to FIGS. 22A-G or the histogram-based normalization method discussed above with reference to FIGS. 24A-F.

Figure 26A:
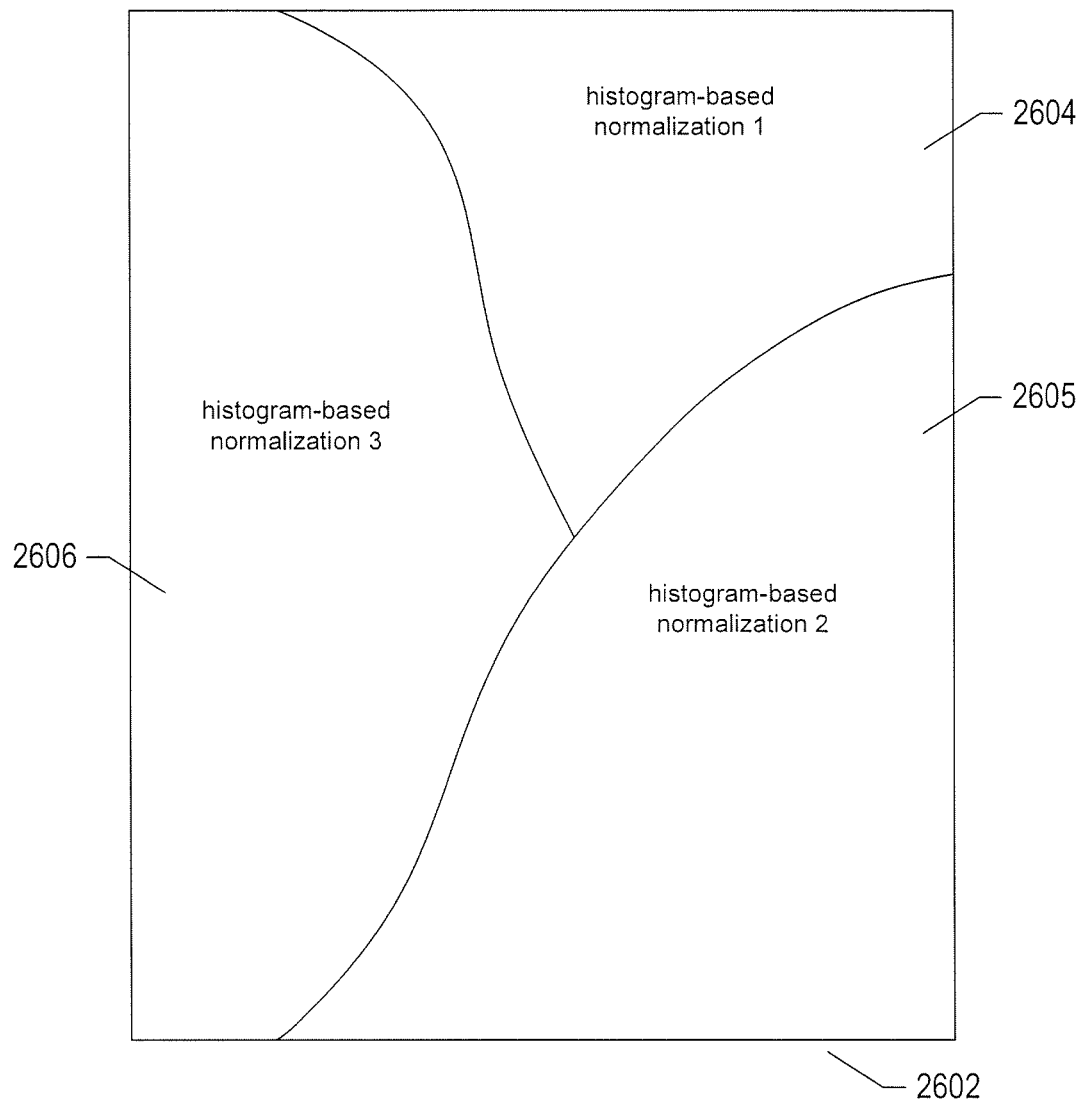
FIGS. 26A-B illustrate multi-region normalization.
Figure 26B:
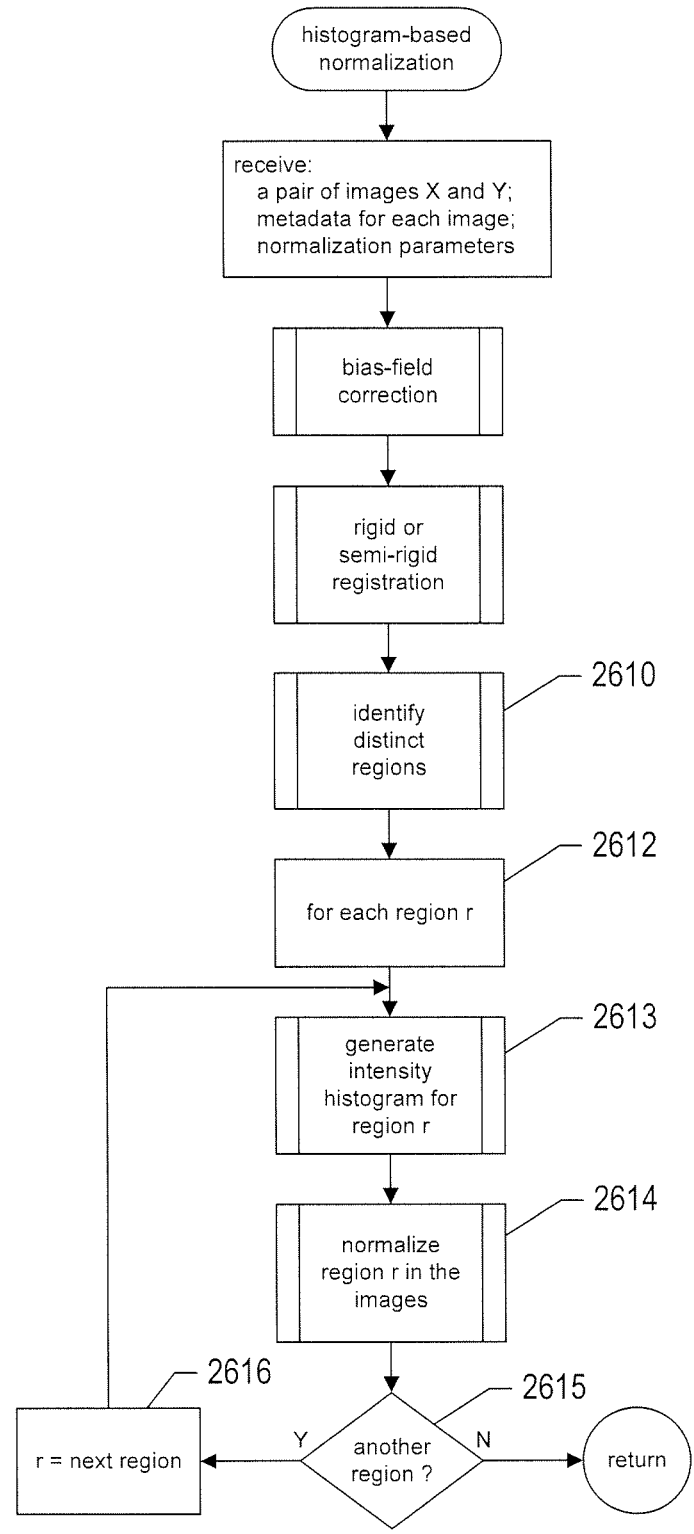

As mentioned above, for many types of subject matter, more accurate normalization is obtained by separately normalizing multiple discrete regions, or portions, of a pair of images. FIGS. 26A-B illustrate multi-region normalization. As shown in FIG. 26A, an image 2602 may be partitioned into multiple regions 2604-2606. This partitioning can be undertaken by various different methods. Certain methods may use texture-based and intensity-distribution based metrics to identify multiple regions in an image that likely correspond to different subject matter within the field of view encompassed by the image. A noise-removal method, discussed below, is a specific example of a more general region-detection method that can be used to partition an image, as in FIG. 26A. FIG. 26B provides a control-flow diagram for multi-region histogram-based normalization, similar to the control-flow diagram provided in FIG. 25 for single-region normalization. Many of the steps in FIG. 26B are identical to corresponding steps in FIG. 25, and are not therefore again described. In step 2610, the distinct regions within the pair of images are identified. Each distinct region is then normalized in the for-loop of steps 2612-2616.

Optimization

FIGS. 27A-F illustrate aspects of a genetic, or evolutionary, mapping-function-parameter-fitting method that is used to optimize parameter values for a mapping function that maps intensities from a first image to a second image within at least a pair of image domains. The genetic parameter-fitting method is used iteratively to produce successive generations of individuals, each corresponding to a set of mapping-function parameter values. The method simulates evolution of individuals to produce a most fit individual with the best model parameter values. Variations of this method can be employed to fit parameters for the histogram-based normalization models of both the first and second types, discussed above. Variations of the method can also be used for fitting parameters for registration models.

Figure 27A:
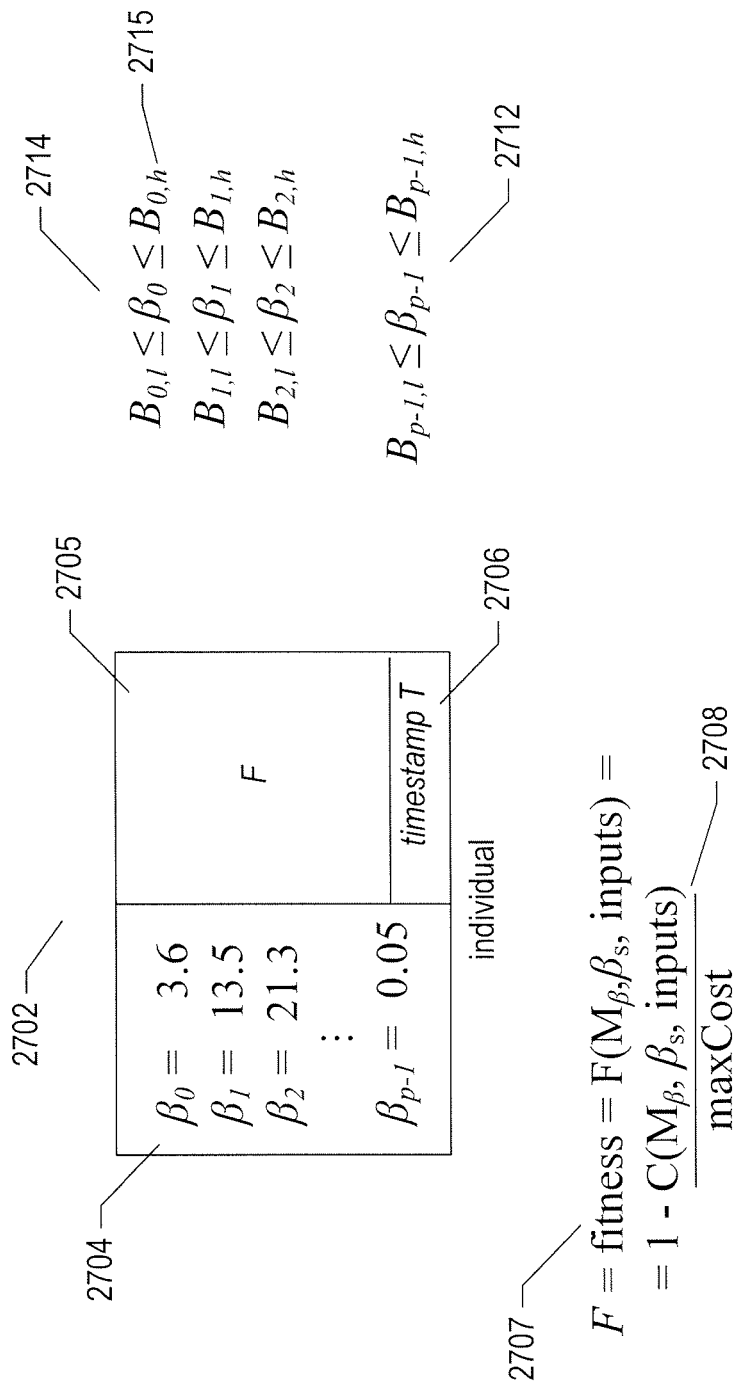

FIG. 27A illustrates an individual. The individual 2702 can be thought of as a data structure associated with a parameterized model 2703, such as a registration model or normalization model, that includes a set of model parameter values 2704, a fitness value 2705, and a timestamp 2706. The fitness value may be considered to be a function F 2707 of the model, model parameter values, and model inputs or may be considered to be a function of a cost computed from a cost function 2708 that is a function C of the model, model parameter values, and model inputs. The timestamp is, in the described implementation, an indication of the number of generations over which the particular individual has survived. Fitness values range from 0 to 1 2710, with 1 representing a maximally fit, or perfectly fit, individual. In alternative implementations, different computed fitness values with difference ranges and meanings may be used. For example, the cost can be used as the fitness value, in which case a value of 0 would be best and increasing positive values would represent decreasing fitness. The parameter values $\beta_0, \beta_1, \ldots \beta_{p-1}$ are the constant parameter values for a model, such as the mapping functions produced by histogram-based normalization. As discussed above, a linear mapping function may have two parameter values, in which case an individual would contain the two parameter values $\beta_0$ and $\beta_1$. There is a set of lowest-possible and highest-possible values for each parameter value, so that the parameter values can be assumed to fall within the ranges specified by the lowest and highest values 2712. In certain implementations, these ranges are empirically estimated. Thus, for example, the value of parameter $\beta_0$ 2714 is assumed to fall within the range $[B_{0,l}, B_{0,h}]$ 2715.

Figure 27B:
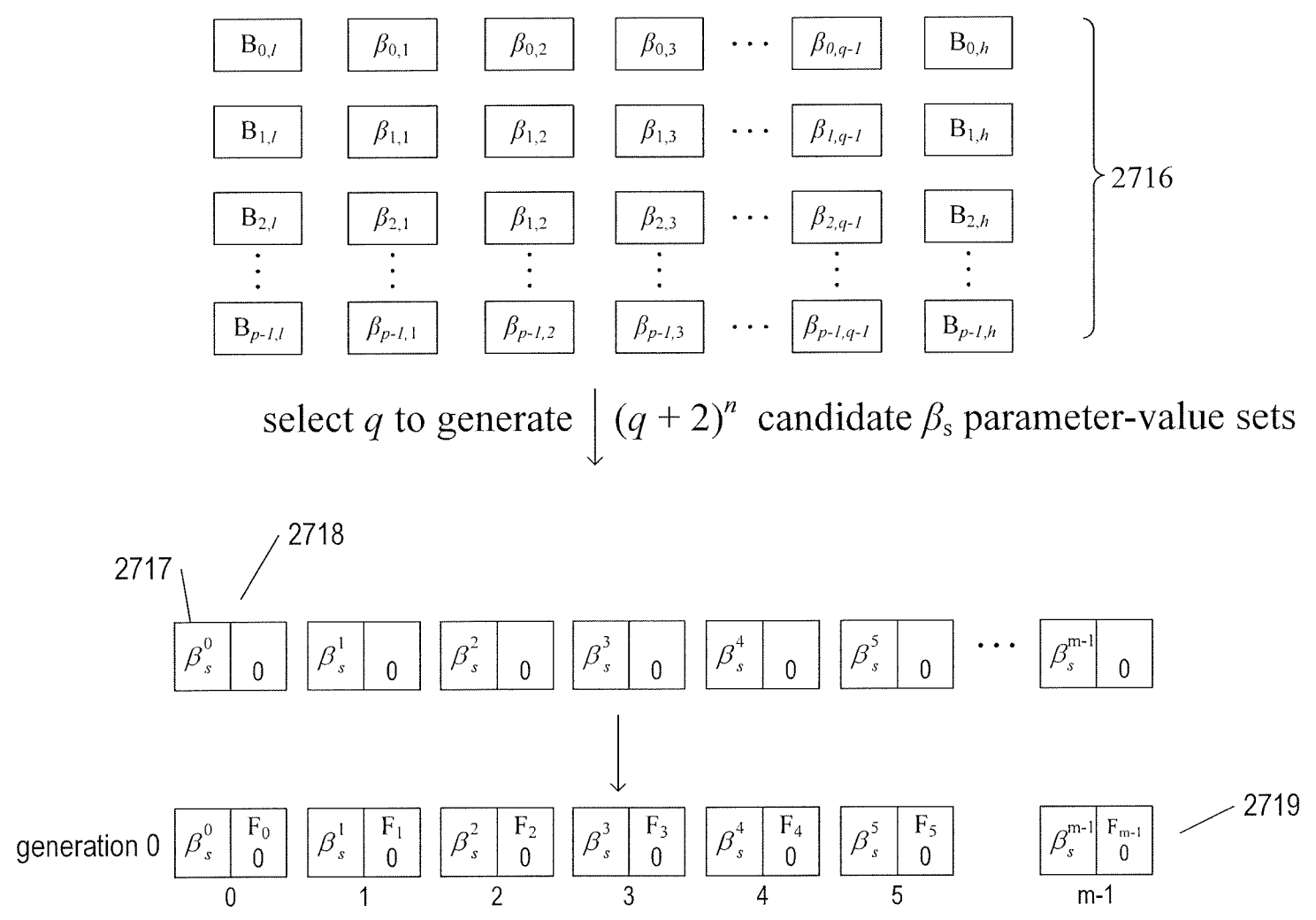

FIG. 27B illustrates construction of a first generation of individuals, generation 0. In this construction, used in certain implementations, a number q of different, evenly spaced, candidate parameter values within the range of values for each parameter is computed, as represented by the matrix-like set of nodes 2716 in FIG. 27B. These candidate parameter values can be used to generate $(q+2)^n$ different sets of candidate parameters $\beta_s$. The value q is selected so that the number of candidate parameter-value sets $\beta_s$ is equal to or greater than the number of individuals used in the genetic optimization method. A unique set of candidate parameter values $\beta_s$ is assigned to each individual, such as the candidate set of parameter values $\beta_s^0$ 2717 assigned to individual 2718. The timestamp for each generation-0 individual is set to 0. Finally, a fitness value is computed for each individual and included in the individual data structure. Generation 0 is shown in FIG. 27B as the individuals in the row of individuals 2719.

Figure 27C:
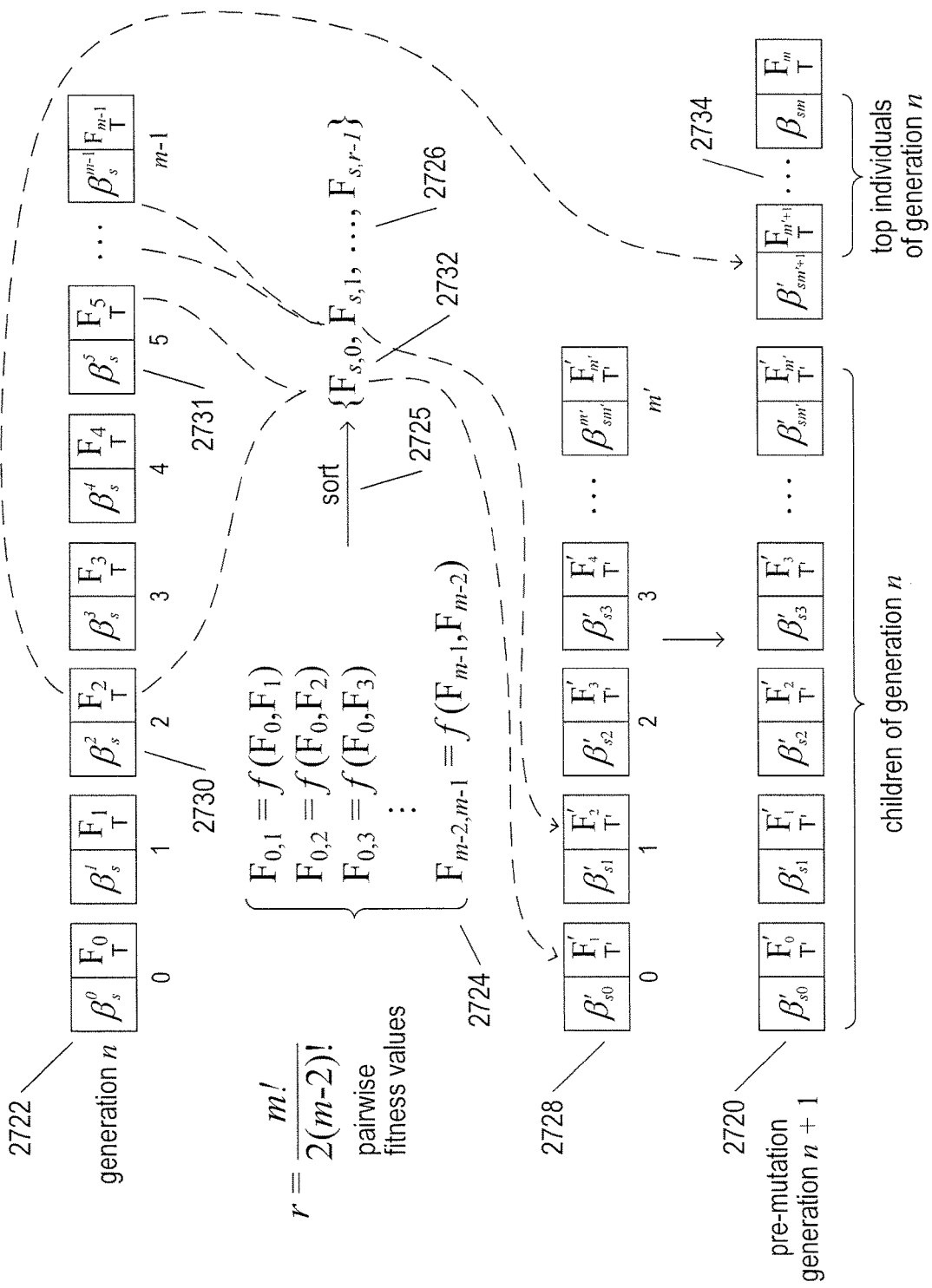

FIG. 27C illustrates production of a next generation n+1 of individuals 2720 from a generation n of individuals 2722. In a first step, a set of combined or pairwise fitness values is computed for the possible combinations of two individuals selected from generation n 2724. Computation of the pairwise fitness values may simply be addition of the fitness values of each individual in the pair of individuals, but may also be represented by a more complex function in alternative implementations. The set of pairwise fitness values is sorted 2725 in descending magnitude order. Then, a child individual is produced from the parent individuals in generation n corresponding to pairwise fitness values selected from the set of pairwise fitness values 2726 in magnitude-descending order. For example, a first child individual 2728 is obtained by breeding parent individuals 2730 and 2731 corresponding to the pairwise fitness value 2732. A number of child individuals is produced in this manner equal to 90 percent of the total number of individuals in a generation. Then, the 10% most fit individuals from generation n are selected as the remaining 10% 2734 of the individuals in generation n+1. Thus, 90% of the individuals in a subsequent generation n+1 are children bred from the most fit pairs of individuals in generation n and 10% of the individuals in a subsequent generation n+1 are replicates of the 10% most fit individuals of generation n. Of course, the 90% death ratio and 10% survival ratios for successive generations are only one possible pair of ratios. In alternative implementations, different death and survival ratios may be used and, in certain implementations, the ratios may vary over parameter fitting through successive generations.

Figure 27D:
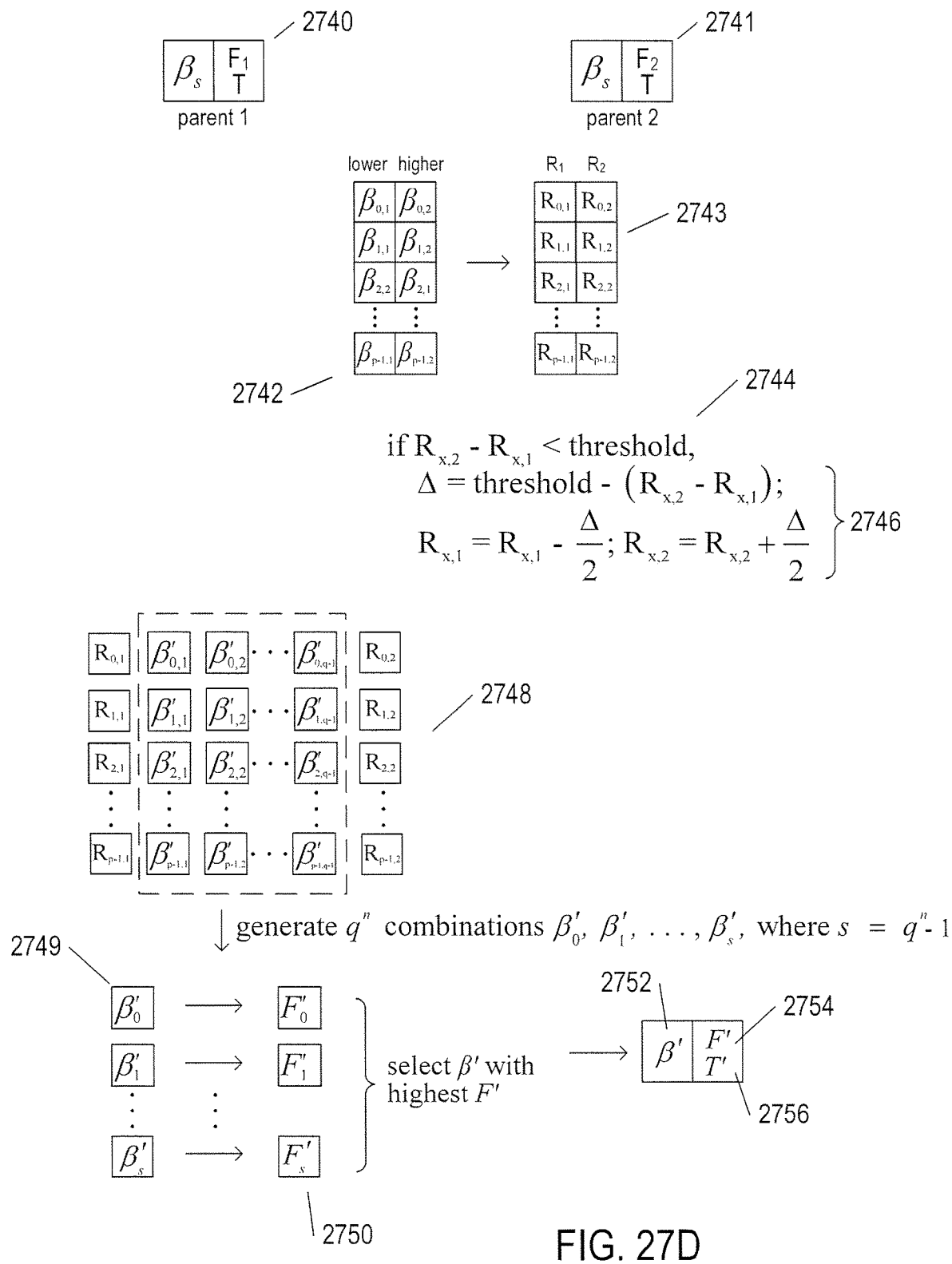

FIG. 27D illustrates how two fit parents from generation n are bred to produce a child individual, such as the breeding of individuals 2730 and 2731 from generation n, in FIG. 27C, to produce child 2728. In FIG. 27D, the two parents 2740 and 2741 are shown at the top of the figure. Pairs of corresponding parameter values of these two parents are sorted into pairs of parameter values that includes a first lower-valued parameter and a second higher-valued parameter 2742. These sorted pairs of parameter values are then used to produce parameter-value ranges 2743. In most cases, the range $R_0$-$R_1$ is equal to the range represented by ordered parameters $\beta_0$-$\beta_1$. However, when the difference between the highest value and lowest value in the range is less than a threshold value 2744, the range values are adjusted to span the minimum threshold range 2746. This handles a case in which the difference between the highest value and lowest value is sufficiently small that the differences between adjacent parameter values for a parameter would be too small to produce meaningful changes in the overall fitness for the mapping function. Next, as indicated by matrix 2748, a set of candidate parameter values, evenly spaced within the range for each parameter value, is generated. A number q of candidate values for each parameter value is generated, where q is a parameter of the genetic optimization method. A number $q^n$ parameter combinations, each combination including a candidate value for each of the n model parameters, is selected from this set of candidate parameter values. Then, a corresponding fitness value is generated for each of the $q^n$ combinations, as indicated by columns 2749 and 2750 in FIG. 27D. The set of candidate parameter values with the highest fitness value is then selected as the set of parameter values for the child 2752. The corresponding fitness metric is included in the child 2754 along with a new timestamp value of 0 (2756).

Figure 27E:
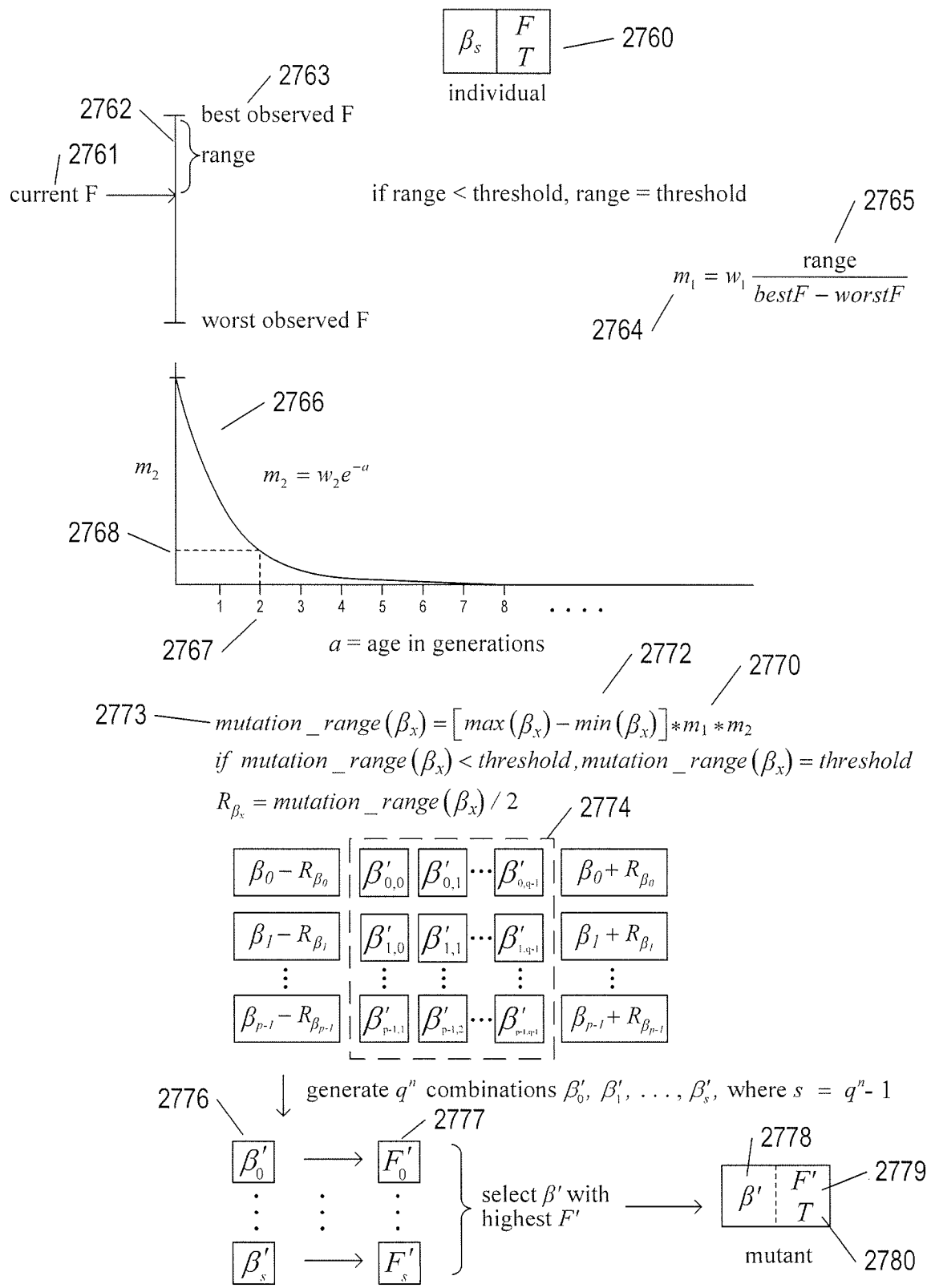

After producing children and copying fit individuals from a previous generation to produce individuals of the next generation, as discussed above with reference to FIG. 27C, each of the individuals is mutated. FIG. 27E illustrates the mutation operation. At the top of FIG. 27E, a next-generation individual is shown 2760. Two multipliers are computed for the individual. A first multiplier $m_1$ reflects the current optimality of the individual. The computed fitness for the individual 2761 is used to determine a range 2762 that is equal to the distance between the current fitness and the best-observed fitness 2763. The first multiplier $m_1$ 2764 is computed as the ratio of that range to the difference between the best and worst observed fitnesses multiplied by a weight $w_1$ 2765. A second multiplier $m_2$ is generated from an exponential decay curve 2766. The current age, in generations of the individual, such as the age 2 (2767 in FIG. 27E), is used to compute a corresponding $m_2$ value 2768. The more optimal the parameter set of the individual, as reflected by the narrowness of the computed range 2762, the smaller the multiplier $m_1$ 2764. The older the individual, the smaller the multiplier $m_2$. The product of these two multipliers 2770 is used as a multiplier of the total possible range of parameter values 2772 to produce a mutation range 2773 for the parameter. Then, an evenly spaced set of candidate parameter values, shown within the dashed square 2774, is generated within this range for each model parameter. Thus, the more fit the individual and the older the individual, the smaller the adjustments to the parameter values that are made during the mutation process. A set of combinations of candidate parameter values, one candidate parameter value selected from each row in the matrix 2774, represents the set of possible parameter-value sets for the mutated individual. The fitness values for each candidate set of parameter values are then computed, as represented by columns 2776 and 2777 in FIG. 27E, and the candidate set of parameter values corresponding to the highest-computed fitness is used as the set of parameter values for the mutant individual 2778. The computed fitness value for the set of parameter values is inserted into the individual 2779 but the timestamp remains unchanged 2780.

Figure 27F:
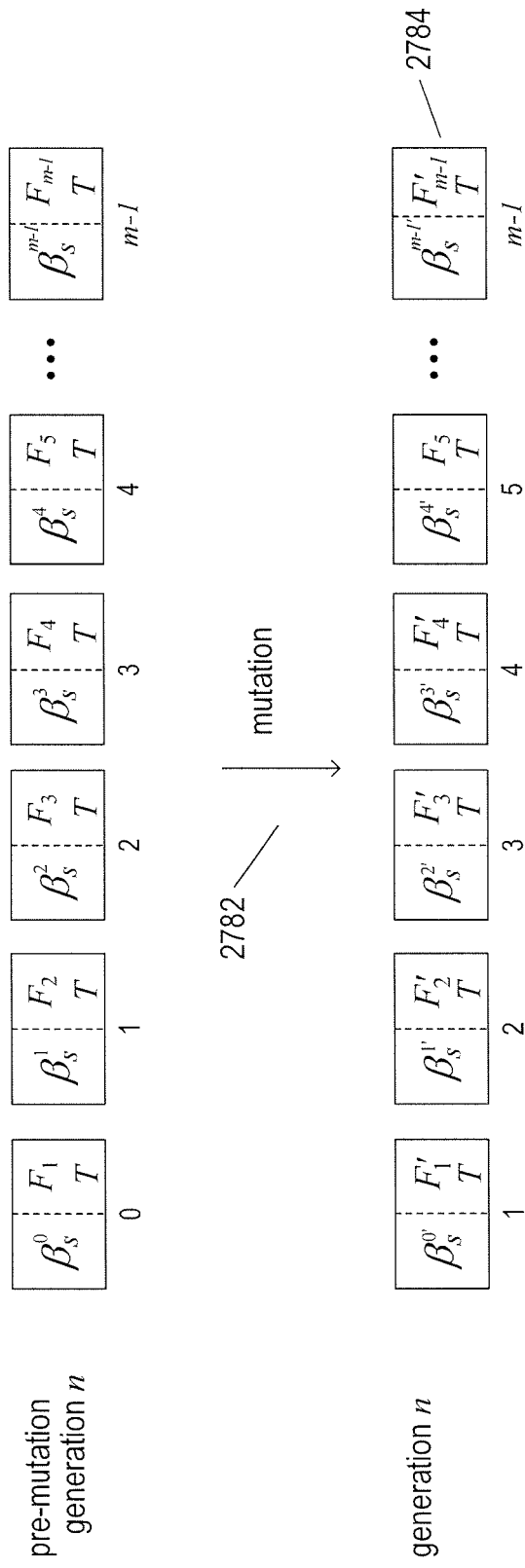

FIG. 27F illustrates completion of construction of a next generation. As shown in FIG. 27F, mutation 2782 of each individual in the pre-mutation set of individuals produces a complete subsequent generation n+1 2784. It should be noted that the currently disclosed genetic mapping-function-parameter-fitting method is deterministic, unlike commonly used stochastic genetic mapping-function-parameter-fitting methods. The term "deterministic," as used in the preceding sentence, means that the same parameter values would be obtained for a given data set each time the currently disclosed genetic mapping-function-parameter-fitting method is applied to the data set. Many stochastic genetic mapping-function-parameter-fitting methods employ pseudo-randomly-seeded by pseudo-random-number generators to select parameter values during breeding and mutation, as a result of which generally different parameters are produced each time the commonly used genetic mapping-function-parameter-fitting methods are applied to a given data set. Determinism is a highly desirable characteristic for image normalization, particularly for medical images. However, stochastic parameter-fitting methods may also be used in alternative implementations. In fact, many other parameter-fitting methods may be used in alternative implementations, including least-squares, Gauss-Newton non-linear least squares, and various optimization methods.

FIGS. 28A-H provide control-flow diagrams that illustrate one implementation of the routine "evolutionary optimization," which illustrates the optimization method discussed above with reference to FIGS. 27A-F. Note that, in certain cases, routines are shown with explicit input parameters, while, in other cases, it is assumed that a called routine can access variables within the scope of the calling routine. Of course, there are many different ways for organizing and communicating variables and parameters in computer programs.

Figure 28A:
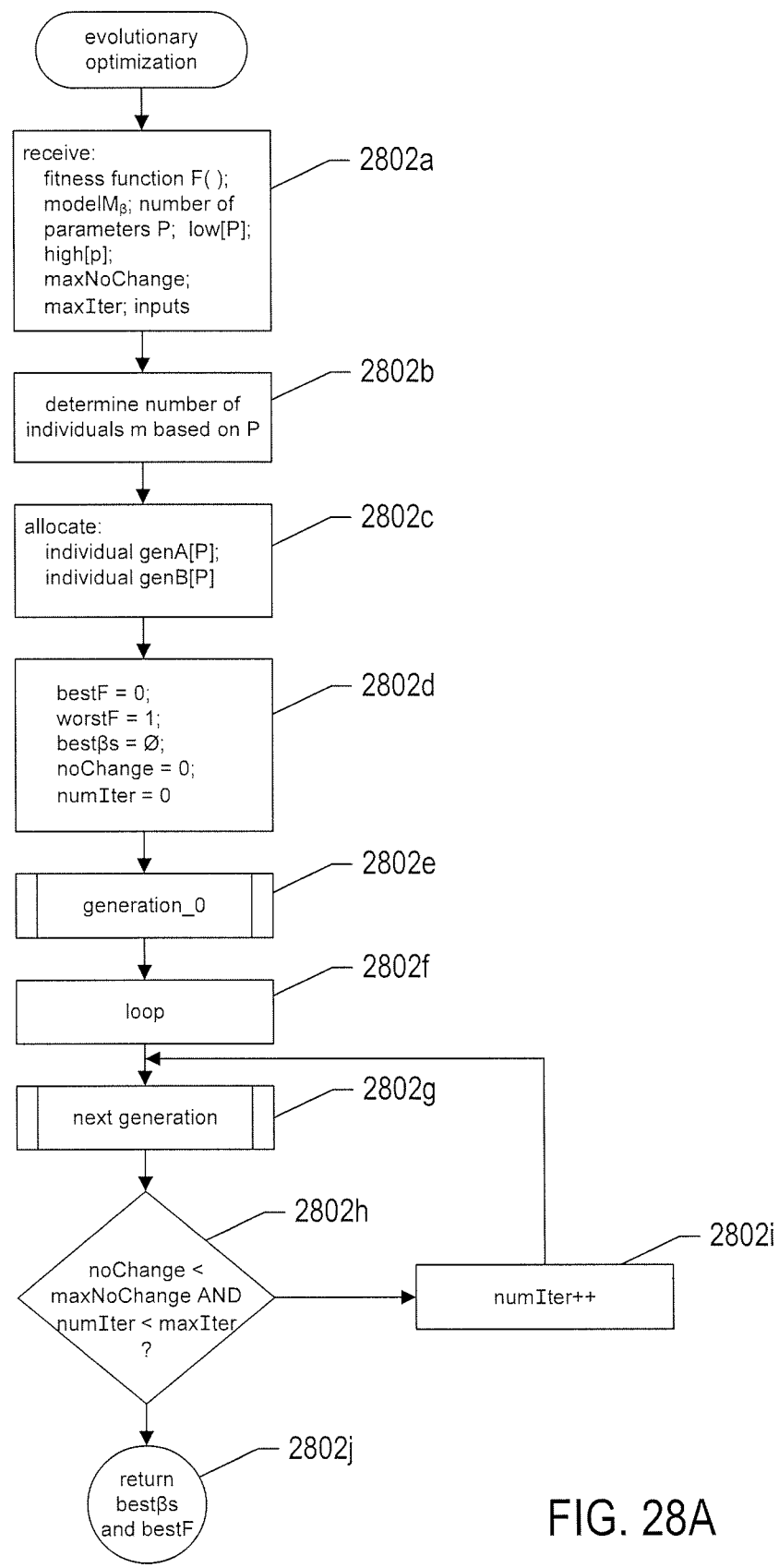
FIGS. 28A-H provide control-flow diagrams that illustrate one implementation of the routine "evolutionary optimization," which illustrates the optimization method discussed above with reference to FIGS. 27A-F.

In step 2802a of FIG. 28A, the routine "evolutionary optimization" receives a fitness function F( ), model MM, an indication of the number of parameters associated with the model P, the ranges for the parameters, in the two arrays low and high, the maximum number of generations to generate without producing a more fit individual maxNoChange, the maximum number of generations to generate maxIter, and inputs for the fitness function F( ). In step 2802b, the number of in individuals to be used in each generation of the genetic method is determined based on the number of model parameters P. In step 2802c, arrays for storing two generations of individuals, genA and genB, are allocated. In step 2802d, a number of variables are initialized, including the variables bestF, worstF, best$\beta$s, noChange, and numIter. In step 2802e, the routine "generation 0" is called to generate the first generation of individuals, as discussed above with reference to FIG. 27B. Then, in the loop of steps 2802f-2802i, the routine "next generation" is called, in step 2802g, and the variable numIter is incremented, in step 2802i, until either no change in fitness has been observed for some number of preceding iterations, as represented by the value in the variable noChange, or until the maximum number of iterations maxIter has been carried out, as determined in step 2802h. Following completion of the loop of steps 2802f-2802i, the parameters of the individual that produced the best fitness value are selected as the model parameters and are returned, in step 2802j, along with the fitness value for those parameters.

Figure 28B:
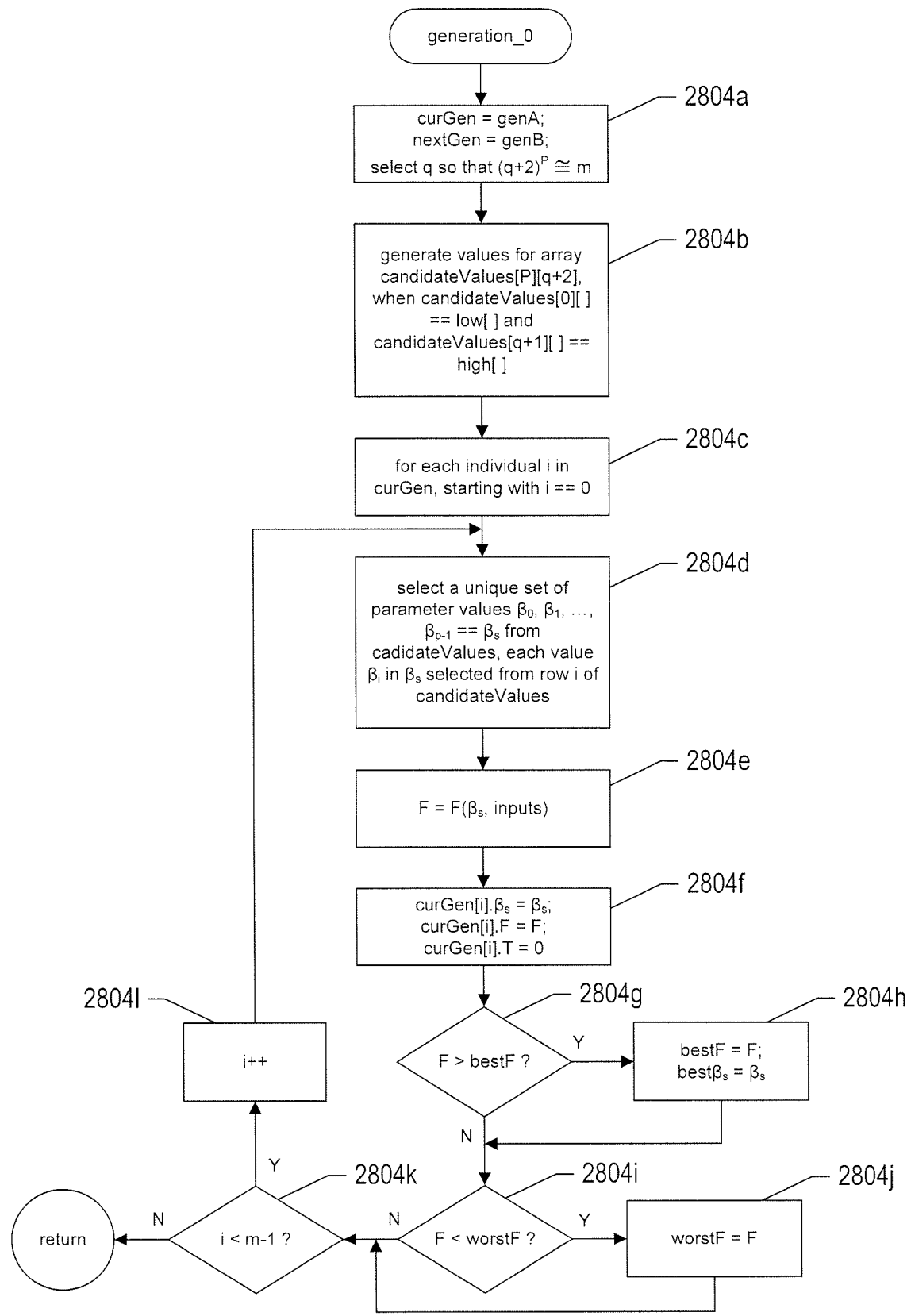

FIG. 28B provides a control-flow diagram for the routine "generation 0," called in step 2802e of FIG. 28A. In step 2804a, the reference curGen is set to the value of the reference genA, the reference nextGen is set to the value of reference genB, and a value for q is selected so that $(q+2)^P$ is approximately equal to in, as discussed above with reference to FIG. 27B. In step 2804b, a set of candidate model parameter values is generated, as shown in matrix 2716 of FIG. 27B. Then, in the for-loop of steps 2804c-2804j, each of the individuals in generation 0 is initialized. A set of unique parameter values is selected from the candidate parameter values for the currently considered individual in step 2804d. A fitness value F for the currently considered individual is generated from the fitness function in step 2804e. In step 2804f, the currently considered individual is initialized with the selected set of parameter values, fitness value, and a timestamp of 0. When the fitness value F as a value greater than the value stored in the variable bestF, as determined in step 2804g, the variables bestF and best$\beta$s are set to F and the selected set of parameter values, respectively, in step 2804h. When the fitness value F is less than the value stored in the variable worstF, as determined in step 2804i, the variable worstF is set to F, in step 2804j. The for-loop of steps 2804c-2804j continues until all of the generation-0 individuals in initialized.

Figure 28C:
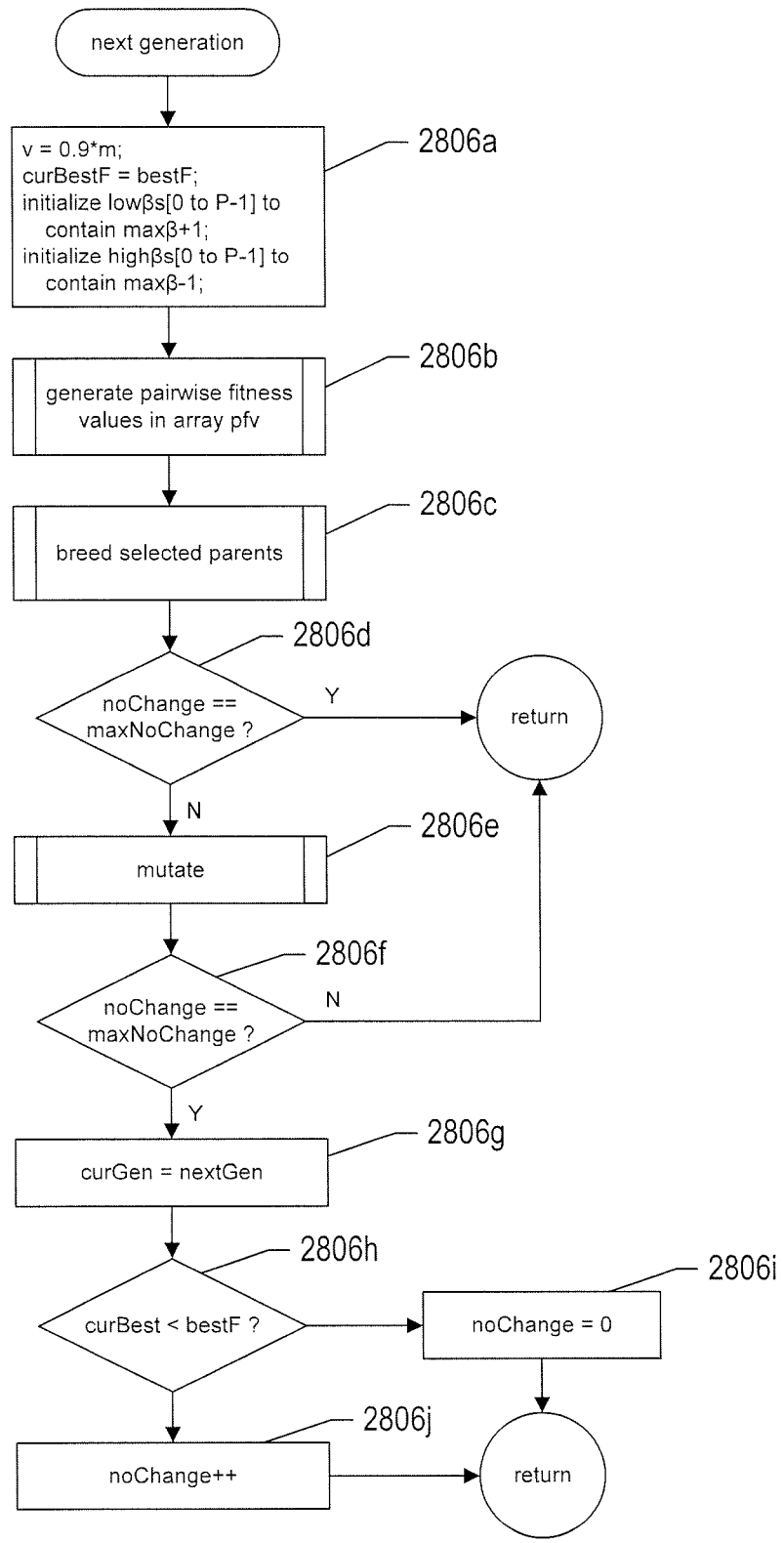

FIG. 28C provides a control-flow diagram for the routine "next generation," called in step 2802g in FIG. 28A. This routine carries out the production of a next generation of individuals, as discussed above with reference to FIGS. 27C-27F. In step 2806a, the variable v is set to 0.9 times the number of individuals m, the variable curBestF is set to the contents of variable bestF, and two arrays of model parameters low$\beta_s$ and high$\beta_s$ are both initialized. As discussed above, the number 0.9 is one possible value for the death ratio for individuals in succeeding generation, but other death ratios may be used in alternative implementations. In step 2806b, the routine "generate pairwise fitness values in array pfv" is called to generate the pairwise fitness values (2724 in FIG. 27C), as discussed above with reference to FIG. 27C. In step 2806c, the most fit pairs of parents, selected based on the sorted pairwise fitness values in the array pfv, are bred, by a call to the routine "breed selected parents" in step 2806c. Breeding is discussed above with reference to FIG. 27D. In step 2806i, the routine "next generation" determines if the value in the variable noChange is equal to the parameter maxNoChange. If so, the routine "next generation" returns. The variable noChange is set to the parameter maxNoChange by various routines, including the routine "breed selected parents," to terminate optimization under certain conditions. In step 2806e, the routine "mutate" is called to mutate each individual in the next generation, as discussed above with reference to FIG. 27F. In step 2806f, the routine "next generation" again determines if the value in the variable noChange is equal to the parameter maxNoChange. If so, the routine "next generation" returns. In step 2806g, the reference curGen is set to point to the newly created next generation. When the value stored in the local variable curBestF is less than bestF, indicating that a new best fitness value has been produced during production of the next generation of individuals, as determined in step 2806h, the value of the global variable noChange is set to 0, in step 2806i. Otherwise, the value in global variable noChange is incremented, in step 2806j. When the value stored in global variable noChange reaches a threshold value, the genetic optimization method is terminated, since at least a very good local optimum for the model parameter values has been obtained.

Figure 28D:
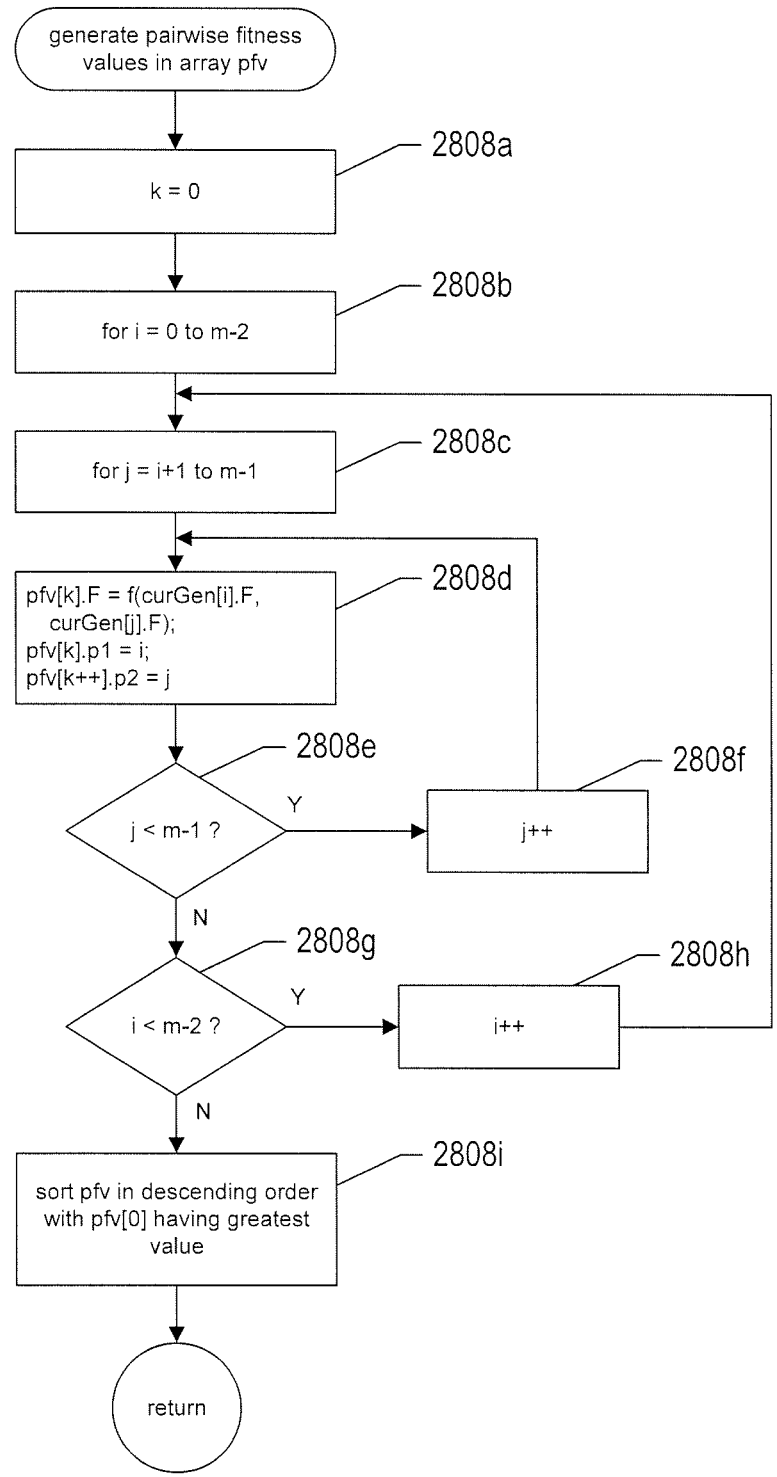

FIG. 28D provides a control-flow diagram for the routine "generate pairwise fitness values in array pfv," called in step 2806b of FIG. 28C. In step 2808a, the variable k is set to 0. In the nested for-loops of steps 2808b-2808f, each possible pair of parents in the current generation, indexed by indices i and j, is considered. A next fitness value for the currently considered pair of parents, as well as the indices for the currently considered parents, are entered into the elements of the array pfv indexed by the variable k. Following completion of the nested for-loops of steps 2808b-2808f, the array pfv is sorted, in step 2808i.

Figure 28E:
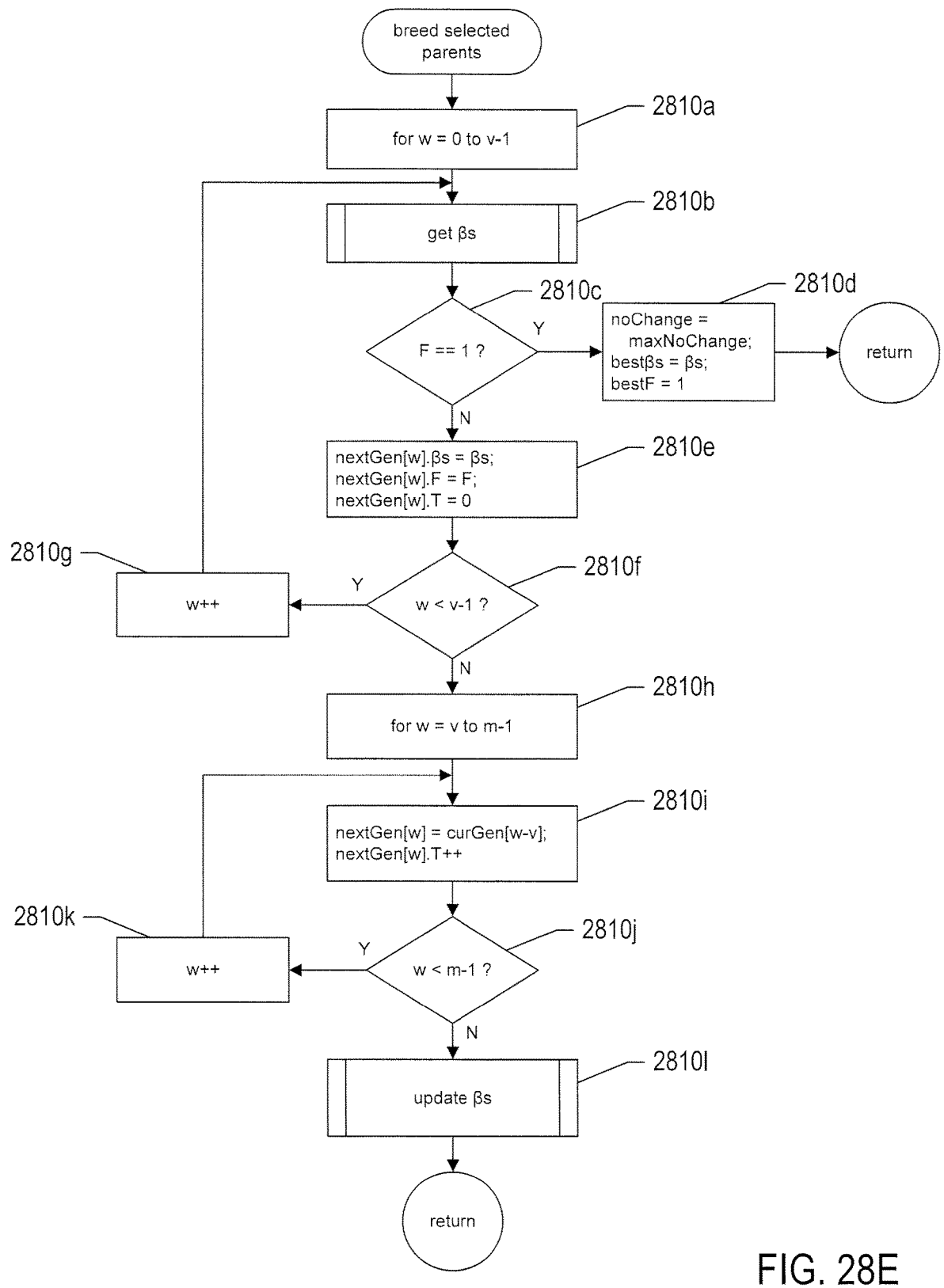

FIG. 28E provides a control-flow diagram for the routine "breed selected parents," called in step 2806c of FIG. 28C. This routine carries out the generation of child individuals for a subsequent generation from parent individuals in a current generation, as discussed above with reference to FIG. 27D. In the for-loop of step 2810a 2810g, the routine "breed selected parents" breeds new children from parents, filling elements of the array nextGen with indices between 0 and v−1, or, in other words, filling 90% of the elements of the array nextGen. In step 2810b, the routine "get $\beta$s" is called to get a next set of parameters $\beta$s and a corresponding fitness value F from breeding the next pair of parents in the array pfv. When the obtained fitness value F is equal to 1, as determined in step 2810c, the variable noChange is set equal to the parameter maxNoChange, the global variable best$\beta$s is set to set of parameters $\beta$s returned by the routine "get $\beta$s," and the global variable bestF is set to 1, in step 2810d, and the routine "breed selected parents" then returns. Otherwise, in step 2810e, the currently considered child individual of the next generation is initialized with βs and F, returned by the routine "get βs," and the timestamp for the currently considered child individual is set to 0. In the for-loop of step 2810h 2810k, the routine "breed selected parents" copies the most fit 10% individuals of the current generation to the next generation. Finally, in step 2810l, the routine "breed selected parents" calls the routine "update βs" to update the contents of the arrays lowβs and highβs to keep track of the smallest and greatest values for each model parameter.

Figure 28F:
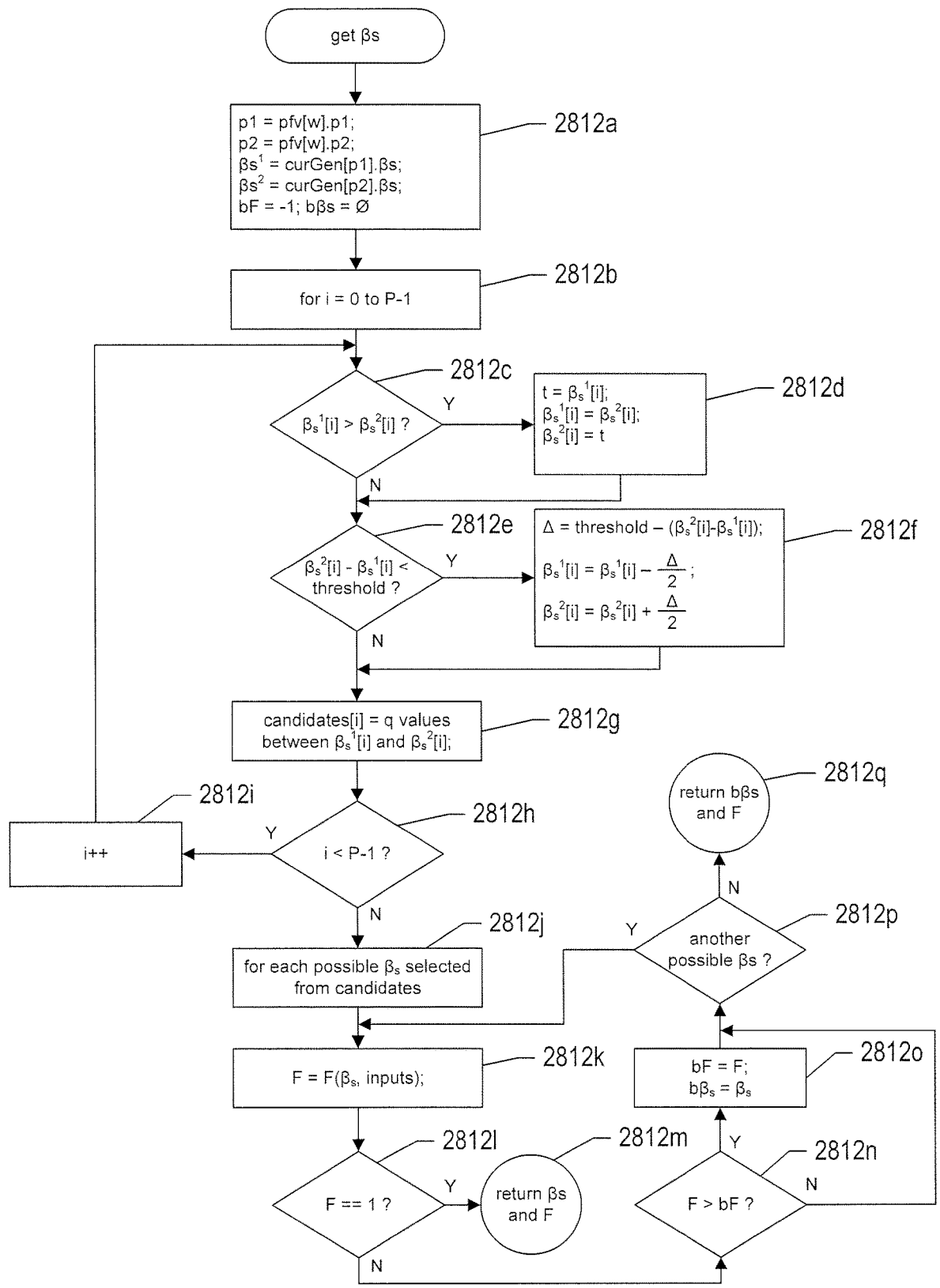

FIG. 28F provides a control-flow diagram for the routine "get βs," called in step 2810b of FIG. 28E. In step 2812a, the routine "get βs" accesses a breeding pair of parents, stored in the array pfv, in order to get indices for the parents, and then uses the indices to extract the sets of parameters of the parents from the array curGen. Local variables bF and bβs are also initialized in step 2812a. In the for-loop of steps 2012b-2812i, for each parameter i, the routine "get βs" determines the lower and high values from the parents, in steps 2812c-2812d, adjusts these values in the case that the difference between the values is less than a threshold value, in steps 2812e and 2812f, as discussed with reference to FIG. 27E, and then generates a list of q candidate values for the parameter between the low and high values for the parameter among the parents in step 2012g, as also discussed above with reference to FIG. 27E. In the for-loop of steps 2812j-2812p, routine "get βs" selects the set of candidate parameters from the candidate parameters that provide the greatest fitness and returns the selected set of candidate parameters and fitness value in either step 2812m or step 2812q.

Figure 28G:
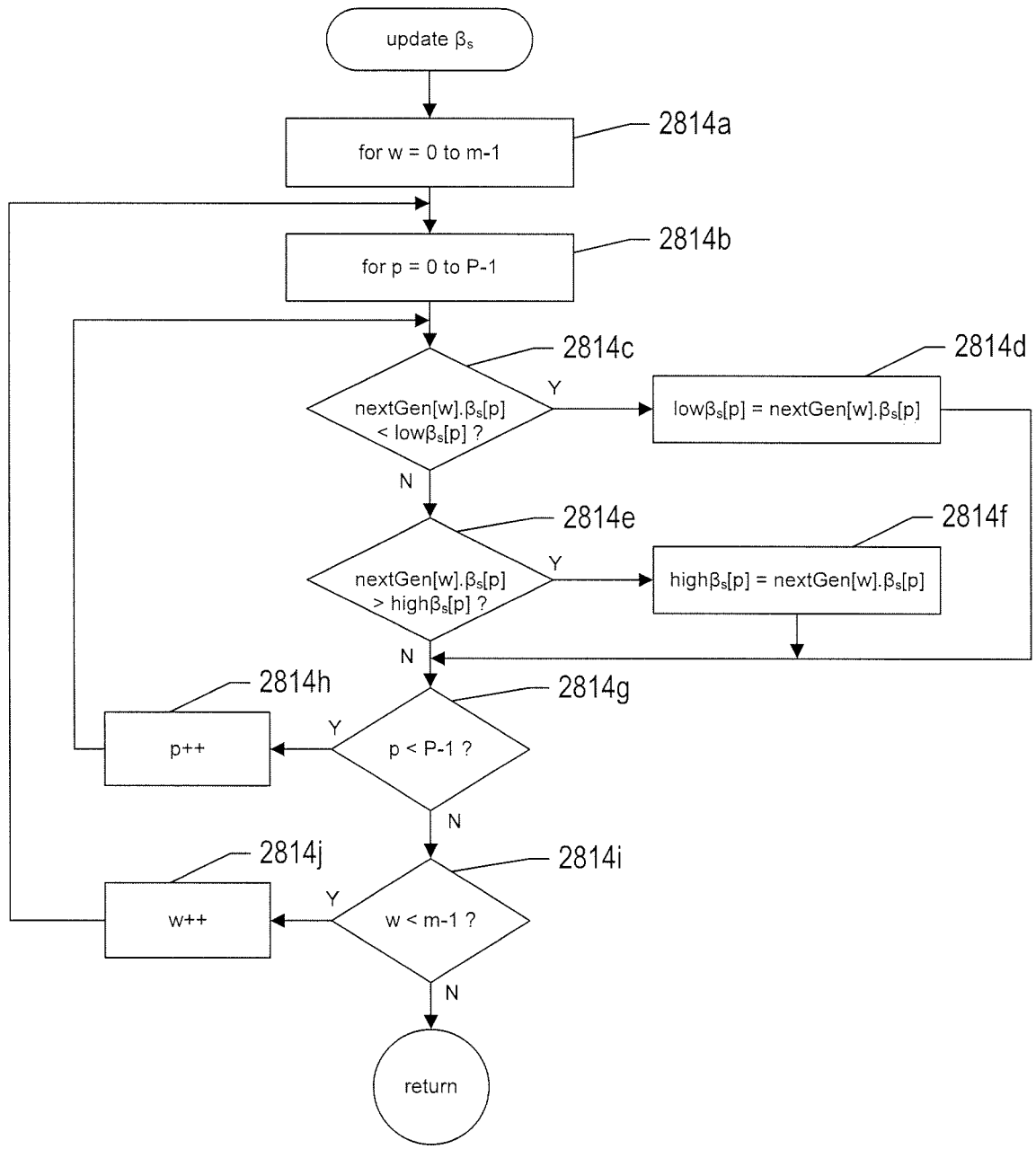

FIG. 28G provides a control-flow diagram for the routine "update 13s," called in steps 28101 of FIG. 28E. In the nested for-loops of steps 2814a-2814j, the routine "update" considers each individual in the next generation and updates the low or high values for each parameter, stored in the arrays lowβs and highβs, in the case that the currently considered individuals parameter value is lower than the current low value for the parameter or higher than the current high value for the parameter.

Figure 28H:
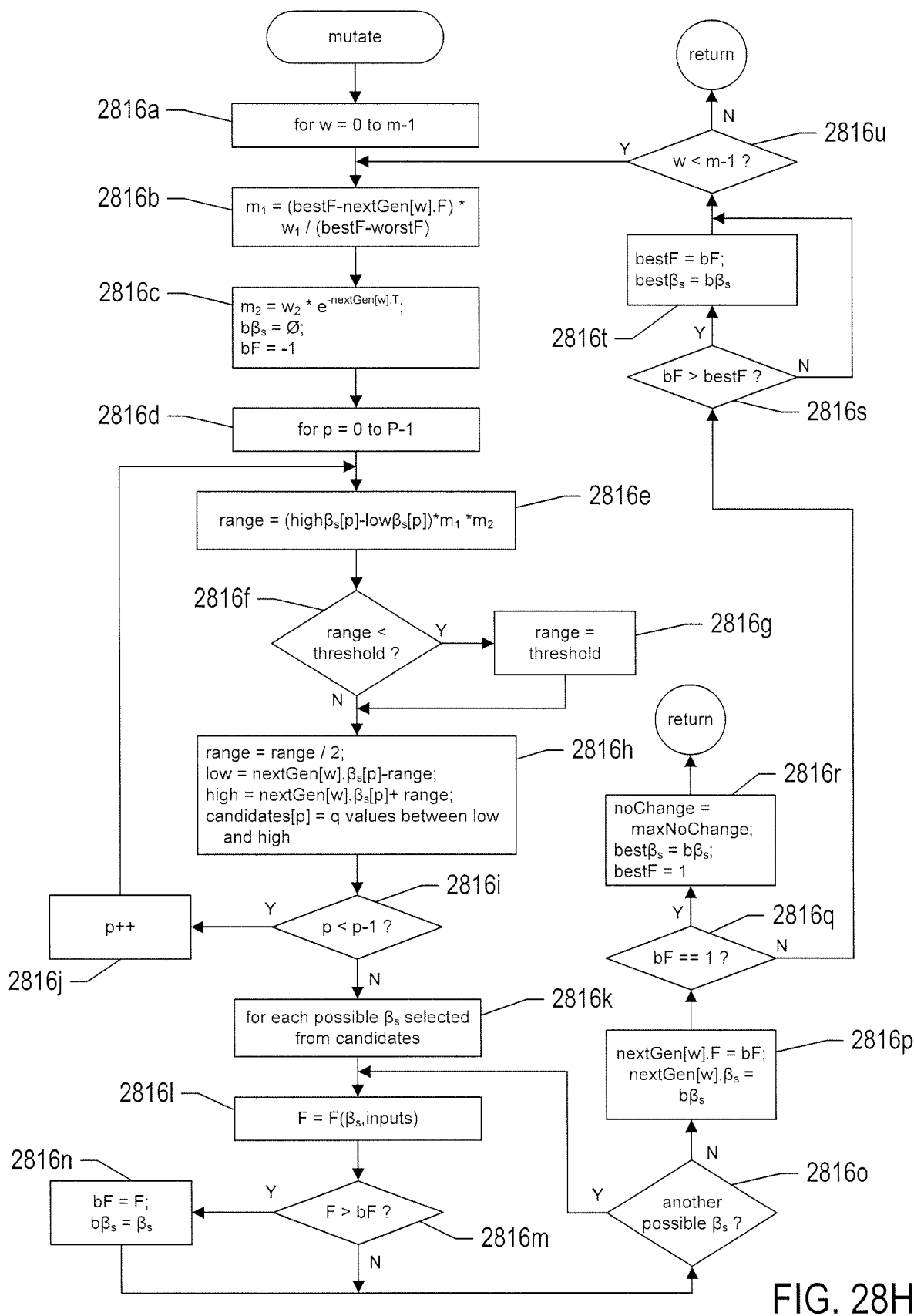

FIG. 28H provides a control-flow diagram for the routine "mutate," called in step 2808e of FIG. 28C. The routine "mutate" carries out the mutation of individuals in a next generation, as discussed above with reference to FIGS. 27E-F. In the for-loop of steps 2816a-2816u, each individual in the next generation is considered. In steps 2816b-2816c, local variables $m_1$ and $m_2$ are initialized, as discussed above with reference to FIG. 27F. In the for-loop of steps 2816d-2816j, q candidate values for each parameter are selected from a range of values for the parameter, as discussed above with reference to FIG. 27E, with the range adjusted to be greater than or equal to a threshold range. In the for-loop of steps 2816k-2816o, a set of parameter values βs is selected for the currently considered individual of the next generation from the candidate parameter values that provides the greatest fitness for the individual. In step 2816p, the individual's fitness and parameter values are accordingly updated. If the fitness is 1, as determined in step 2816q, the variable noChange is set equal to the parameter maxNoChange, the global variable bestβs is set to the selected parameters βs, and the global variable bestF is set to 1, in step 2816r, and the routine "mutate" then returns. Otherwise, if the fitness bF is greater than bestF, as determined in step 2816s, bestF is set to bF and bestβs is set to the selected parameters βs, in step 2816t.

Figure 29A:
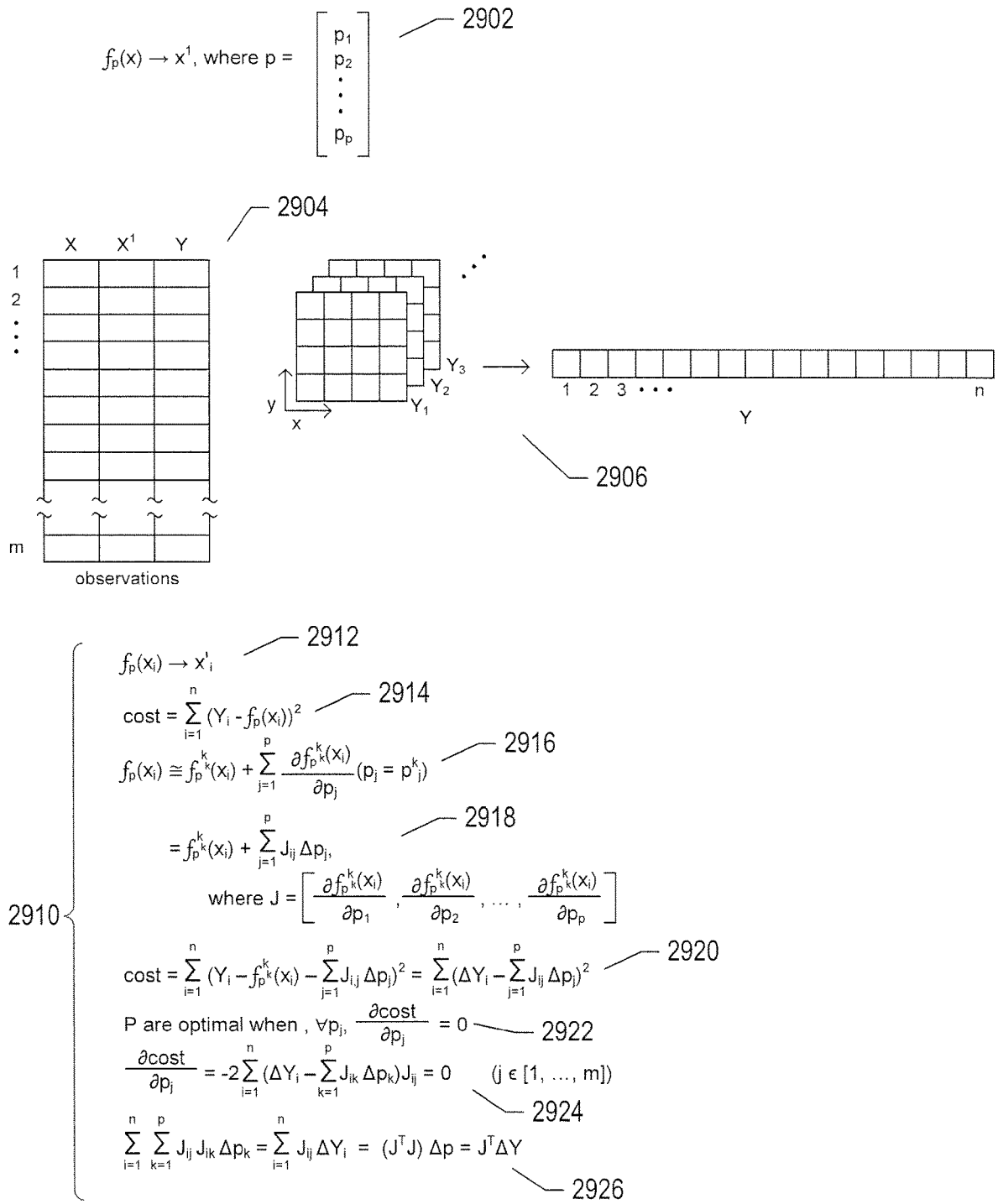
FIGS. 29A-B illustrate an alternative, least-squares optimization can be used to optimize an initial set of parameters within a reasonable neighborhood of near-optimal or optimal parameters.
Figure 29B:
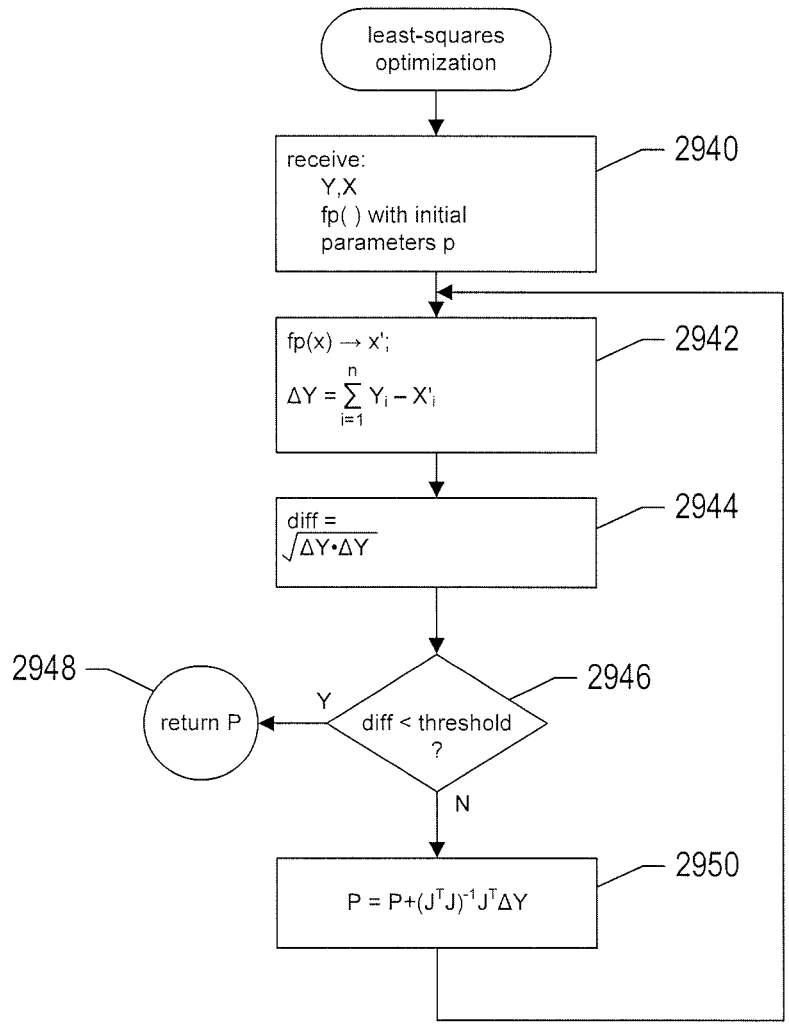

FIGS. 29A-B illustrate an alternative, least-squares optimization that can be used to optimize an initial set of parameters within a reasonable neighborhood of near-optimal or optimal parameters. As shown in FIG. 29A, the least-squares optimization considers a general function $f(X)$, parameterized by a set of parameters P, which is applied to a set of variables X to produce a corresponding set of values X', as indicated by expression 2902. A set of observations 2904 is compiled for the function, where Y is a set of correct values that should have been produced by application of $f( )$ to X while X' are the values actually produced. As indicated by internal diagram 2906, sets of observed values within a set of observations, such as a set of images, can be linearized to produce a single set of linear observations.

The least-squares optimization method is described by the set of equations 2910 in the lower portion of FIG. 29A. The expression 2912 is a restatement of expression 2902. The cost associated with application of the function $f( )$ to X is the sum of the squares of the differences between the expected or correct values in the values produced by application of the function $f( )$ to X, as indicated by expression 2914. The function $f( )$ can be approximated by a Taylor expansion 2916, in which only the $0^{th}$ and $1^{st}$ order terms are used. This approximation can be more succinctly expressed by expression 2918 using matrix notation. The cost can then be expressed as indicated by expression 2920. A local or global optimum occurs when, for each parameter, the partial derivative of the cost with respect to the parameter is zero, as indicated by expression 2922. Partial differentiation of costs with respect to a particular parameter, $p_j$, using expression 2920, produces expression 2924. Rearrangement produces the final expression 2926, which relates changes to the values of the parameters to the differences between the values produced by application of the function and the correct or expected values. This allows the parameter values to be adjusted according to computed changes in order to move towards a local or global optimal set of parameters for the function.

FIG. 29B provides a control-flow diagram for at least-squares optimization. In step 2940, a set of correct or expected outputs from the function as well as a set of corresponding inputs, Y and X, are received along with the function $f_p( )$ and an initial set of parameters P. In step 2942, the function is applied to inputs X to produce outputs X' and the sum of the differences ΔY between the expected or accurate outputs Y and the actual outputs X' is computed. A difference is then computed, in step 2944, as the square root of the square of the differences. When the difference is less than a threshold value, as determined in step 2946, the optimization method completes with the return of the current parameters, in step 2948. Otherwise, adjusted parameters are computed, in step 2950, as discussed above with reference to expression 2926 in FIG. 29A, and control flows back to step 2942 for an additional iteration. As mentioned above, least-squares optimization depends on the initial parameter values, received in step 2940, being within some reasonable neighborhood of the final parameter values, so that the truncated Taylor-series approximation for the function $f_p( )$ provide a reasonable approximation.

The above-discussed evolutionary and leased-squares optimization methods are but two of many possible optimization methods that can be used to optimize parameters for registration and normalization models. Generally, each optimization model is best suited for certain types of optimization problems, and those skilled in the art of optimization understand the range of optimization methods that can be used as well as how best to select an appropriate optimization method for particular problem domains.

Quantitative Enhancement Maps and Synthetically Enhanced Images to which, in Part, the Current Document and Claims are Directed The use of contrast agents is discussed above, with reference to FIGS. 12A-E. As was made clear in that discussion, use of contrast agents to generate a quantitative-enhancement map is highly dependent on correct registration and normalization of the pre-contrast and post-contrast images. A variety of different types of quantitative-enhancement maps are used in different types of imaging. In general, whether for change detection or enhancement of imaged features by changing imaging-instrumentation types or parameters between successive images acquired over a short period of time, it is not possible to generate a quantitative-enhancement map unless reliable and accurate registration and normalization have first been carried out. As also discussed above, currently employed normalization methods based on parameterized mathematical models and/or extrinsic information generally fall short of the levels of reliability and accuracy needed to produce quantitative-enhancement maps and often, instead, produce serious artifacts and anomalies.

Figure 30A:
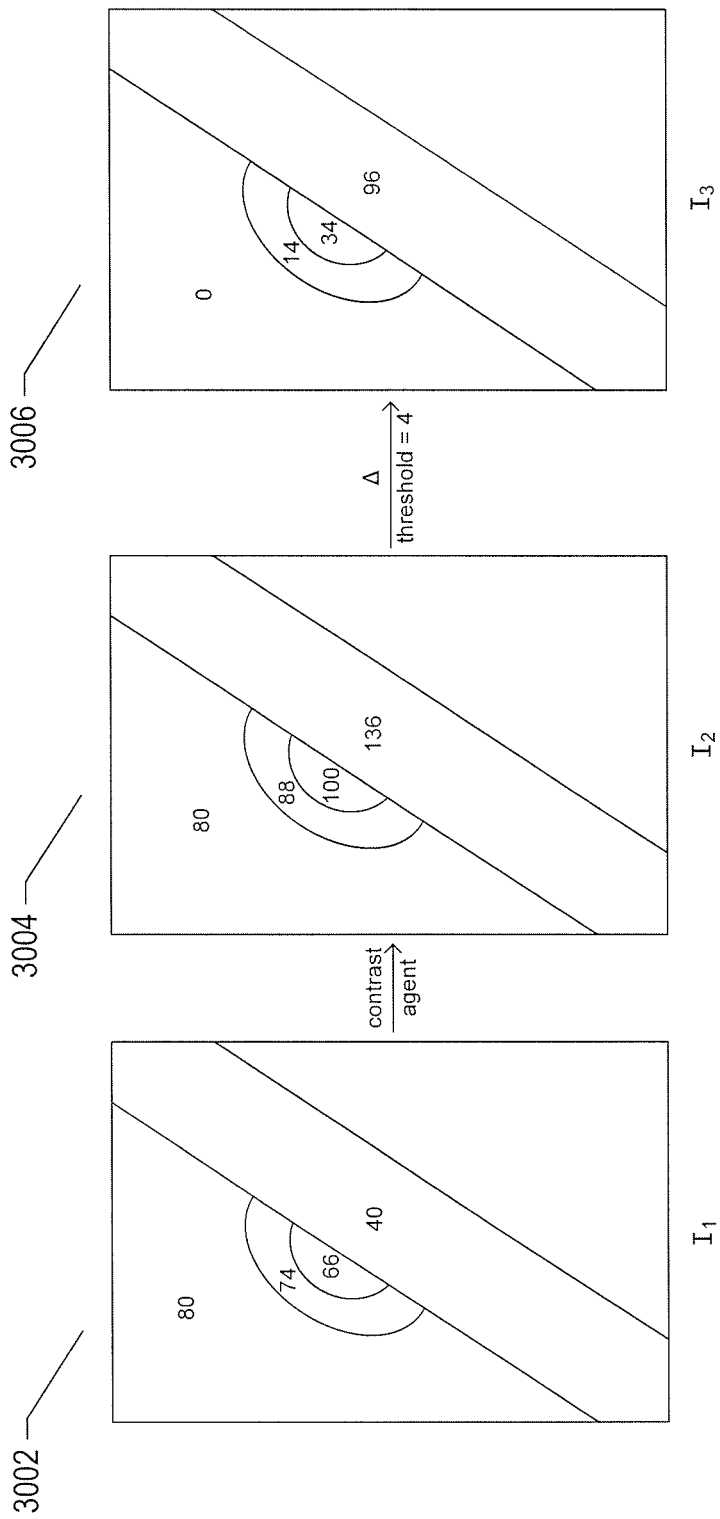
FIGS. 30A-C illustrate use of 8% by volume contrast agent rather than the 2% by volume contrast agent used in the example of FIGS. 12A-E.
Figure 30B:
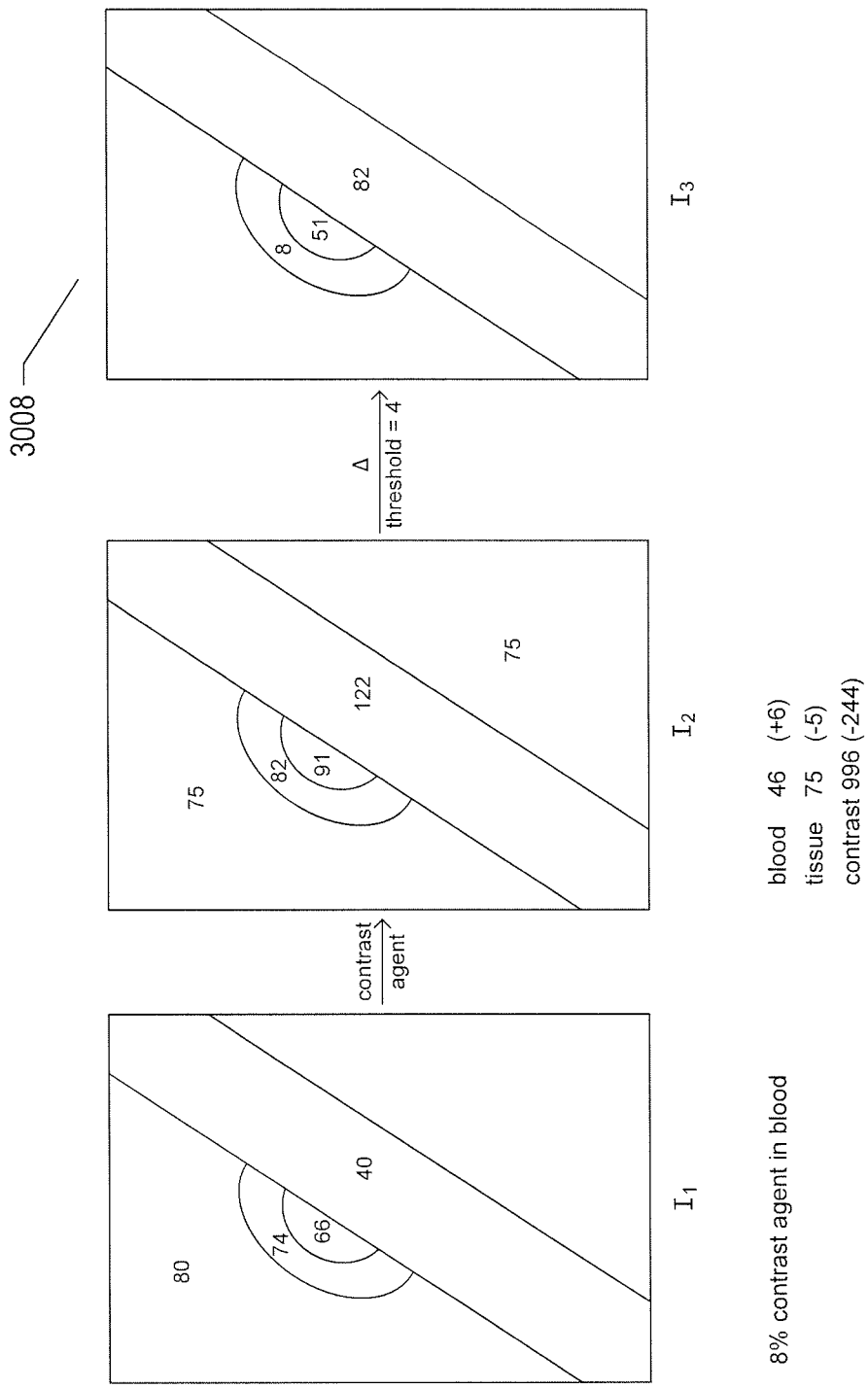
Figure 30C:
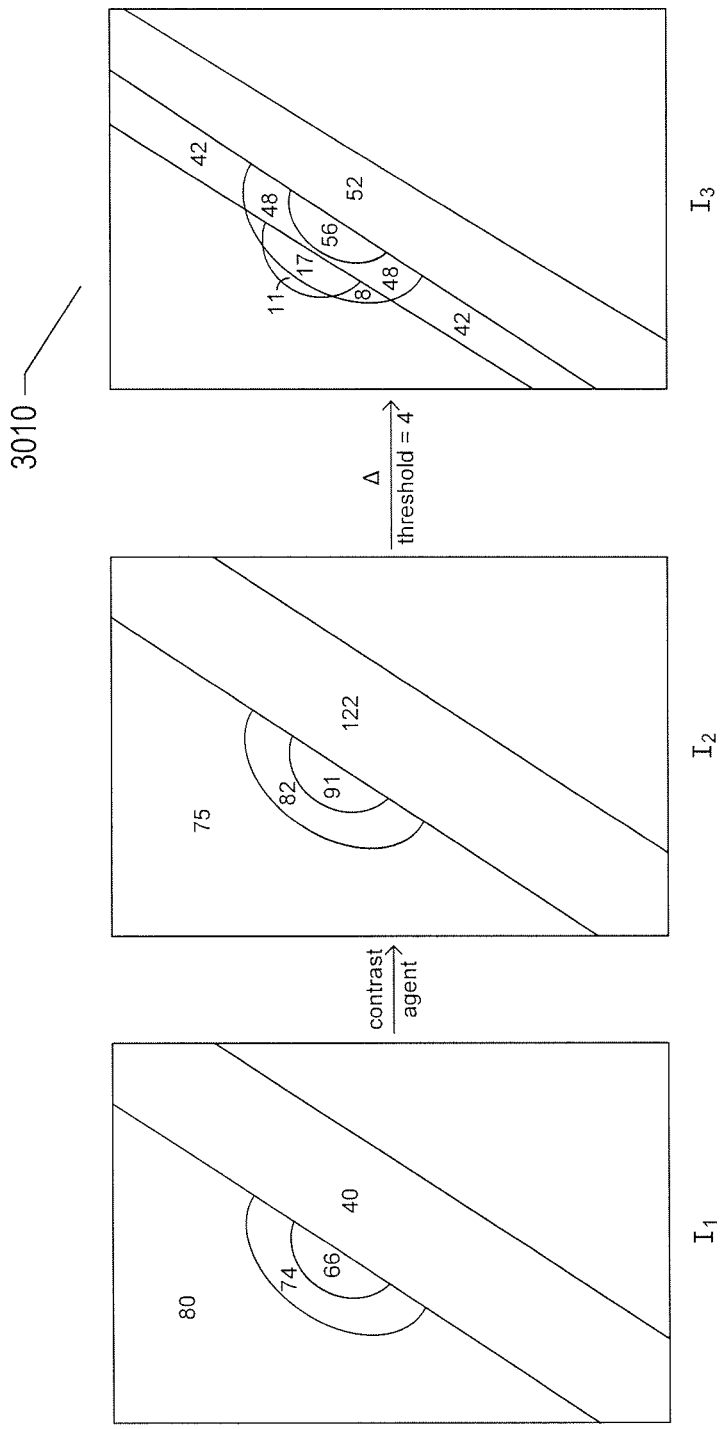

In addition to enabling generation of quantitative-enhancement maps, the currently disclosed registration and normalization methods also provide for synthetically enhanced images. Returning to the example used in FIGS. 12A-E, an experimentalist may be tempted to employ an increased amount of contrast agent in order to enhance the quantitative-enhancement map $I_3$ provided by the differencing operation shown in FIG. 12A. FIGS. 30A-C illustrate use of 8% by volume contrast agent rather than the 2% by volume contrast agent used in the example of FIGS. 12A-E. As shown in FIG. 30A, when the pre-contrast 3002 and post-contrast 3004 images are properly registered and normalized, the resulting quantitative enhancement image 3006 provides a much brighter and slightly more accurate enhancement of the fluid-containing regions in the image. However, as shown in FIG. 30B, when there is a significant normalization problem, previously discussed with reference to FIG. 12D, associated with the post-contrast image, the resulting enhancement map 3008 is even less quantitative than when 2% contrast agent is used. As shown in FIG. 30C, when the post-contrast image is associated both with normalization and registration errors, the resulting enhancement map 3010 is both non-quantitative and significantly distorted. Unfortunately, contrast agents and administration of contrast agents are expensive and many contrast agents are associated with toxicity and/or serious physiological side effects, so rather than using higher concentrations of contrast agents, it would be desirable to decrease the concentration of contrast agents.

Figure 31:
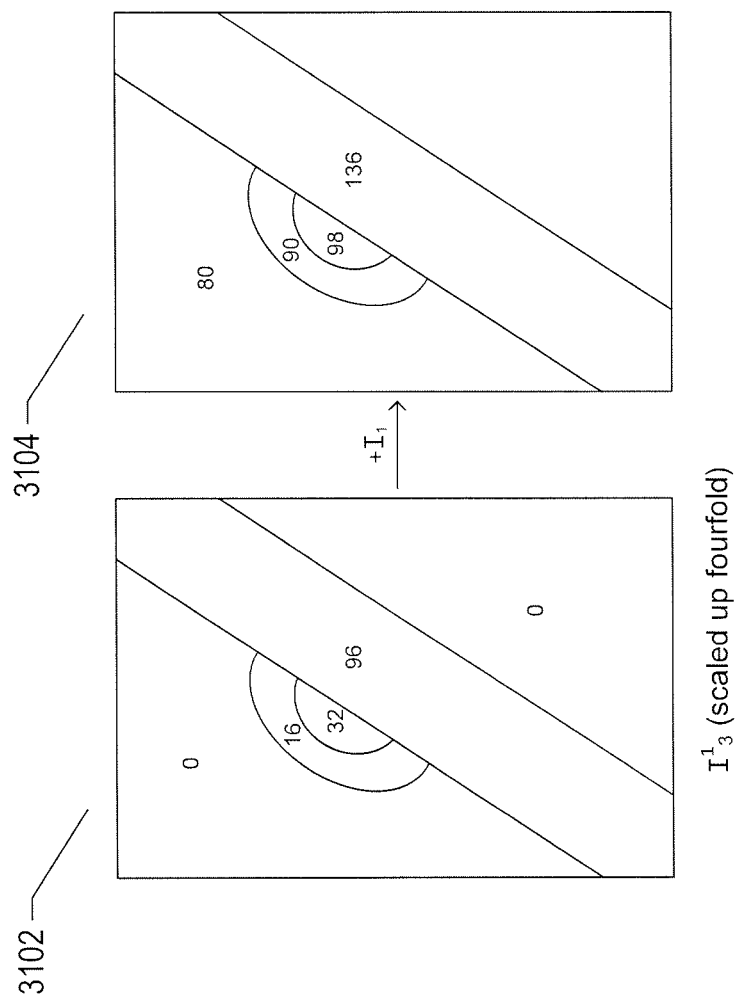
FIG. 31 illustrates an alternative approach to producing enhanced images, referred to as "synthetically enhanced images."

FIG. 31 illustrates an alternative approach to producing enhanced images, referred to as "synthetically enhanced images." In this approach, the quantitative enhancement image (1210 in FIG. 12A) can be used to greatly enhance the fluid-containing regions within the original image (1202 in FIG. 12A) by scaling up the intensities in the quantitative enhancement image to produce an upscaled quantitative enhancement image (3102 in FIG. 31). The upscaled quantitative enhancement image can then be added, pixel-by-pixel or voxel-bi-voxel, to the original pre-contrast image to produce a synthetically enhanced image (3104 in FIG. 31). The synthetically enhanced image shows the fluid-containing regions significantly brightened with respect to the non-fluid-containing regions, but the non-fluid-containing regions are still shown at their original intensities. In this case, the synthetically enhanced image 3104 is not quantitative, but may provide helpful visual emphasis to particular regions or features of interest. Furthermore, the synthetically enhanced image, while not quantitative, does, at least, preserve the order of decreasing intensity within the fluid-containing regions, which may facilitate accurate diagnosis of a leaking fluid vessel in this example. The largest advantage of synthetically enhanced images, however, is that a reasonable visual signal that facilitates identification of regions and features of interest may be obtained by using far less contrast agent than traditionally used to produce enhanced images. By doing so, the toxicity and side-effects issues can be ameliorated and the cost of medical imaging significantly reduced.

Noise-Removal Methods to which, in Part, the Current Document and Claims are Directed As discussed above, the methods used to produce synthetically enhanced images ultimately depend on accurate and reliable image registration and image normalization. Another aspect of producing synthetically enhanced images requiring careful attention is that of noise. Synthetic enhancement of images may greatly amplify artifacts and noise present in difference images that are boosted and added back to original images. FIGS. 32A-I illustrate a noise-removal method that is used to remove noise from difference images prior to synthetic boosting in order to reduce or eliminate noise-related artifacts in synthetically enhanced images.

Figure 32A:
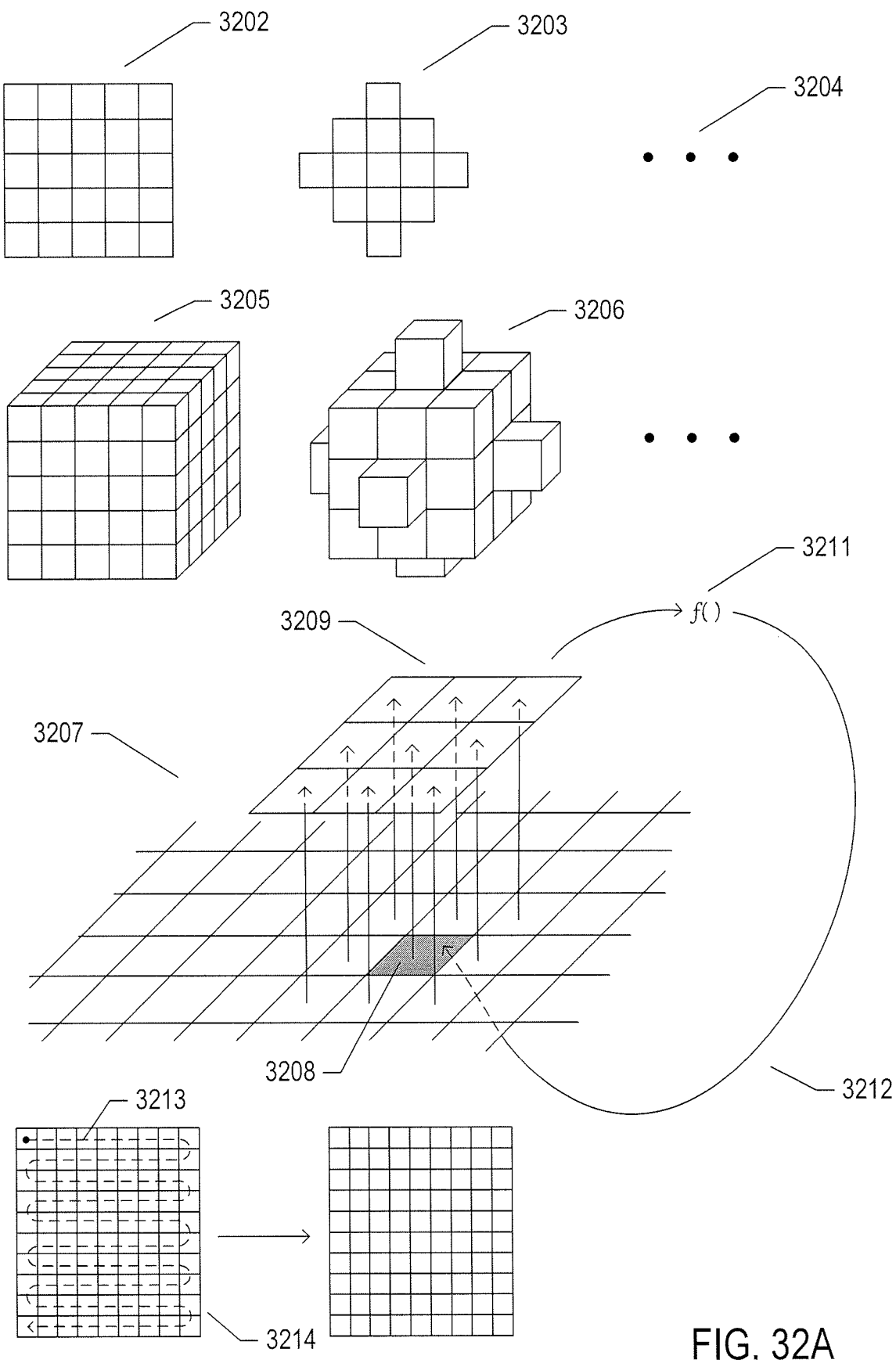

FIG. 32A illustrates the concept of a kernel that may be applied, in a convolution-like operation, to an image in order to produce an altered image. A kernel is a set of adjacent pixels or voxels. For application to two-dimensional images, two-dimensional kernels, such as kernels 3202 and 3203, may be used. Of course, there are many additional possible two-dimensional kernels, as indicated by ellipsis 3204. For application to three-dimensional images, three-dimensional kernels, such as kernels 3205 and 3206, may be used. A two-dimensional kernel is applied to a pixel of a two-dimensional image as shown in sub-diagram 3207 of FIG. 32A. A particular pixel of an image is shown shaded 3208. The kernel 3209 is logically superimposed over the pixel and its neighbors. The cells of the kernel inherit the intensities of the pixel and its neighborhood, as indicated by arrows, such as arrow 3210 in FIG. 32A. One or more kernel-associated functions are then carried out on these inherited intensities 3211, which may produce a new value for the pixel, as indicated by arrow 3212. In other cases, the kernel-associated functions may produce more complex outputs. In many cases, the values generated by kernel-associated functions are placed in a new, second image while the kernel is being applied to a first image. Application of a kernel to each pixel in the first image is an operation mathematically related to convolution. A kernel may be applied to each pixel in an image by traversing the image along some type of path, such as the raster-like path indicated by the dashed curve 3213 within the image 3214 shown in FIG. 32A. Pixels close enough to image boundaries that superposition of the kernel over the pixel results in kernel voxels lying outside the boundaries of the image may be handled in various different ways. In certain cases, modified kernels that fully correspond to image voxels may be used for such pixels. In other cases, the pixels are simply not processed by the convolution operation and either retain their original values in the new image or may be set to specified or computed values in the new image. In the discussion below, processing of the boundary pixels during kernel application is not specifically addressed, in order to simplify the discussion.

Figure 32B:
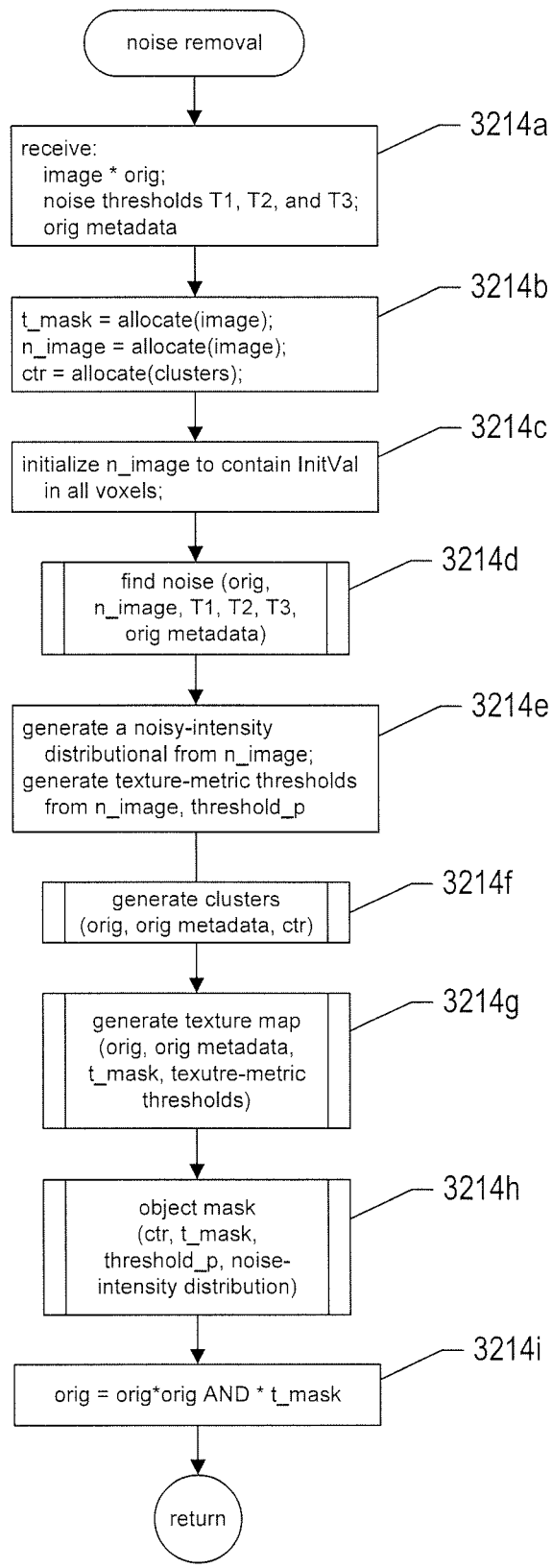

FIG. 32B provides a control-flow diagram that illustrates one implementation of the currently disclosed noise-removal method. This method may, of course, be applied to both two-dimensional and three-dimensional images. In step 3214a, the method receives a reference to an image to be denoised, orig, three threshold values T1, T2, and T3, and metadata for the image. In step 3214b, two temporary images of the same size as the input image, t_mask and n_image, are allocated in addition to a clusters data structure, referenced by the pointer ctr, which stores a clusters of pixels or voxels. In essence, the pointer ctr references a container of pixel or voxel containers. In step 3214c, the temporary image referenced by n_image is initialized to contain a value InitVal in all pixels or voxels. The value InitVal is a value outside of the range of intensity values in the input image. In step 3214d, a call is made to a routine "find noise," which identifies noise-containing regions in the input image and stores the identified regions in n_image. In step 3214e, a noise-intensity distribution is determined from the noisy regions indicated by n_image, as well as a number of texture-metric thresholds, discussed below, and a threshold_p value, also discussed below. In step 3214f, a routine "generate clusters" is called to generate clusters of pixels or voxels corresponding to non-noise regions and/or features in the original image. In step 3214g, a routine "generate texture map" is called to store, in the temporary image referenced by t_mask, essentially a bitmap, the value 1 into voxels corresponding to regions or features in the original image likely to be non-noise regions and features based on their textures, with the remaining voxels set to the value 0. In step 3214h, a routine "object mask" is called to set voxels of the temporary image referenced by t_mask corresponding to non-noise regions or features of the original image to 1. Finally, in step 3214i, an aggregate AND-like operation is carried out on the original voxel intensities of the input image and the corresponding intensities in the voxels of the temporary image referenced by t_mask, removing voxel intensities likely to represent noise from the original image.

FIG. 32C illustrates a noise_kernel employed by the routine "find noise," called in step 3214d of FIG. 32B. A three-dimensional kernel, such as kernel 3215, is used for three-dimensional images. The associated kernel function is provided by pseudocode 3216. The noise-kernel-associated function noise_kernel receives, as arguments, indices i, j, and k for a voxel, a reference to the original image orig, reference to a noise image noise, and two threshold values T1 and T2. In statements 3217, local variables new and sum are set to the value 0 and local-variable indices l, m, and n are declared. In the triply-nested for-loops 3218, the intensity values within the kernel are examined to determine whether they all fall between the negative and positive threshold values −T1 and T1. If so, the sum of the intensity values are stored in the local variable sum. Otherwise, the function noise_kernel returns a value of 0. If the sum of the intensity values, stored in the local variable sum, falls outside of the range [−T2, T2], the function noise_kernel returns a value of 0, in statement 3220. Otherwise, in the triply-nested for-loops 3221, the number of kernel voxels that do not correspond to voxels in the map noise having the initialized value InitVal are set to the intensity value of the corresponding input-image voxel and are counted by the local variable new. The noise kernel, when applied to a voxel of the original image, determines whether the voxels in the kernel-specified neighborhood of the voxel have intensities within a threshold range of intensities centered at 0 and, if so, those intensities of the corresponding input-image voxels that have not already been stored in the noise image are stored in the noise image. The number of input-image voxels stored in the noise image are counted and the count is returned.

Figure 32D:
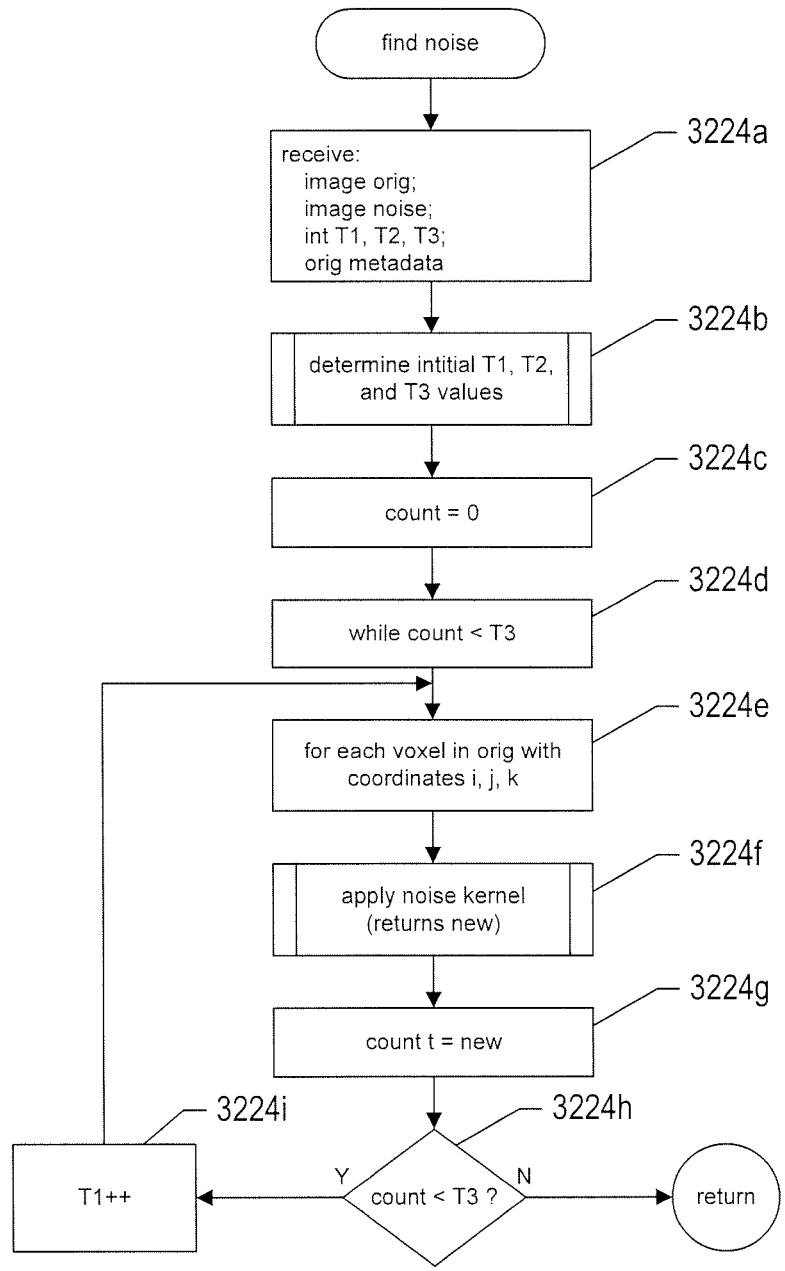

FIG. 32D provides a control-flow diagram for the routine "find noise," called in step 3214d of FIG. 32B. In step 3224a, the routine "find noise" receives a reference to the original input image, orig, a reference to a noise image, noise, three threshold values T1, T2, and T3, and metadata for the image. In step 3224b, the routine "find noise" determines numerical values for the three threshold values T1, T2, and T3. Threshold value T1 specifies an initial range of values, centered about intensity 0, that likely correspond to noise. Threshold value T2 specifies a total aggregate intensity threshold and threshold value T3 specifies a total number of noise voxels to identify in the input image. These threshold values may depend on the image metadata, including the possible range of intensity values in the image and the size of the image. In step 3224c, the local variable count is set to 0. In the while-loop of steps 3224d-3224i, the noise kernel is applied to the image and the number of new noise voxels found are added to the value stored in the local variable count. For each subsequent iteration of the while-loop of steps 3224d-3224i, the intensity range specified by threshold value T1 is increased, by incrementing the threshold value T1 in step 3224i. The while-loop of steps 3224d-3224i until the number of noise voxels equal or greater to the threshold value T3 have been identified and stored in the noise image.

FIG. 32E illustrates an object kernel employed by the routine "find noise," called in step 3214f of FIG. 32B. A three-dimensional kernel, such as kernel 3226 is used for three-dimensional images. The associated kernel function is provided by pseudocode 3227. The object-kernel-associated function object kernel receives, as arguments, indices i, j, and k for a voxel, the reference to the original image orig, a Boolean argument sign, and the reference to the container of voxel containers ctr. The function object kernel is designed for two passes over the input image. In one pass, the value of the Boolean argument sign is false and all of the voxels within the object kernel must have negative intensities for the voxels in the image corresponding to the kernel voxels to be deemed to belong to an object feature or region while in the other pass, the value of the Boolean argument sign is true and all of the voxels within the object kernel must have intensities greater than or equal to 0 for the corresponding image voxels to be deemed to belong to an object feature or region. In statements 3228, the local variable c it is declared, local-variable indices l, m, and n are declared, a local Boolean variable full is declared and set to true, and a local Boolean variable merge is declared and set to false. In the triply-nested for-loops 3229, the intensities of the kernel voxels are accessed to determine whether or not they all have the same, desired polarity, where the polarity is indicated by the Boolean argument sign, as discussed above. If any voxel intensity has the wrong polarity, the local variable full is set to false and the triply-nested for-loops are terminated. In addition, if any of the kernel voxels are already part of a cluster, the local variable merge is set to true. If the kernel corresponds to a complete object or region, as indicated by the value stored in local variable full, then, in the triply-nested for-loops 3230, the voxels are added to the cluster c. If at least one of the voxels is already part of another cluster, as indicated by the value stored in the local variable merge, the cluster c is merged with other clusters already stored in the container referenced by ctr by statement 3231. Otherwise, the cluster c is added as a new cluster to the cluster container referenced by ctr by statement 3232. If the kernel does not correspond to a complete object or region, as indicated by the value stored in local variable full, then, in the triply-nested for-loops 3233, each voxel is added to the cluster container ctr as a single-voxel cluster. Thus, the object kernel, when applied to the original image, is used to identify voxels in regions of the image containing voxels of a single polarity and either adds these voxels to the cluster container is a new cluster or merges the voxels into already existing clusters, depending on whether or not there is overlap of the voxels with existing clusters.

Figure 32F:
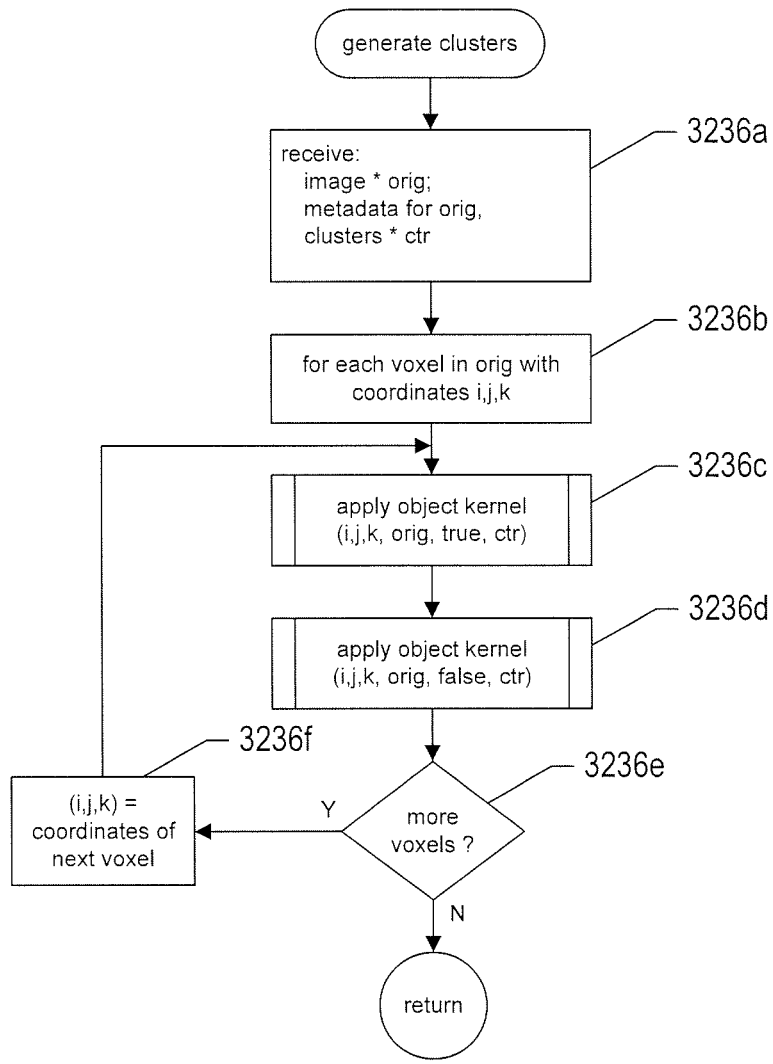

FIG. 32F provides a control-flow diagram for the routine "generate clusters," called in step 3214f of FIG. 32B. In step 3236a, the routine "generate clusters" receives a reference to the original image, orig, metadata for the original image, and a reference to the cluster container, ctr. In the for-loop of steps 3236b-3236f, the object kernel is applied for the positive polarity, in step 3236c, and for the negative polarity, in step 3236d, for every voxel in the original image. Thus, the routine "generate clusters" generates a full set of clusters corresponding to object regions.

Figure 32G:
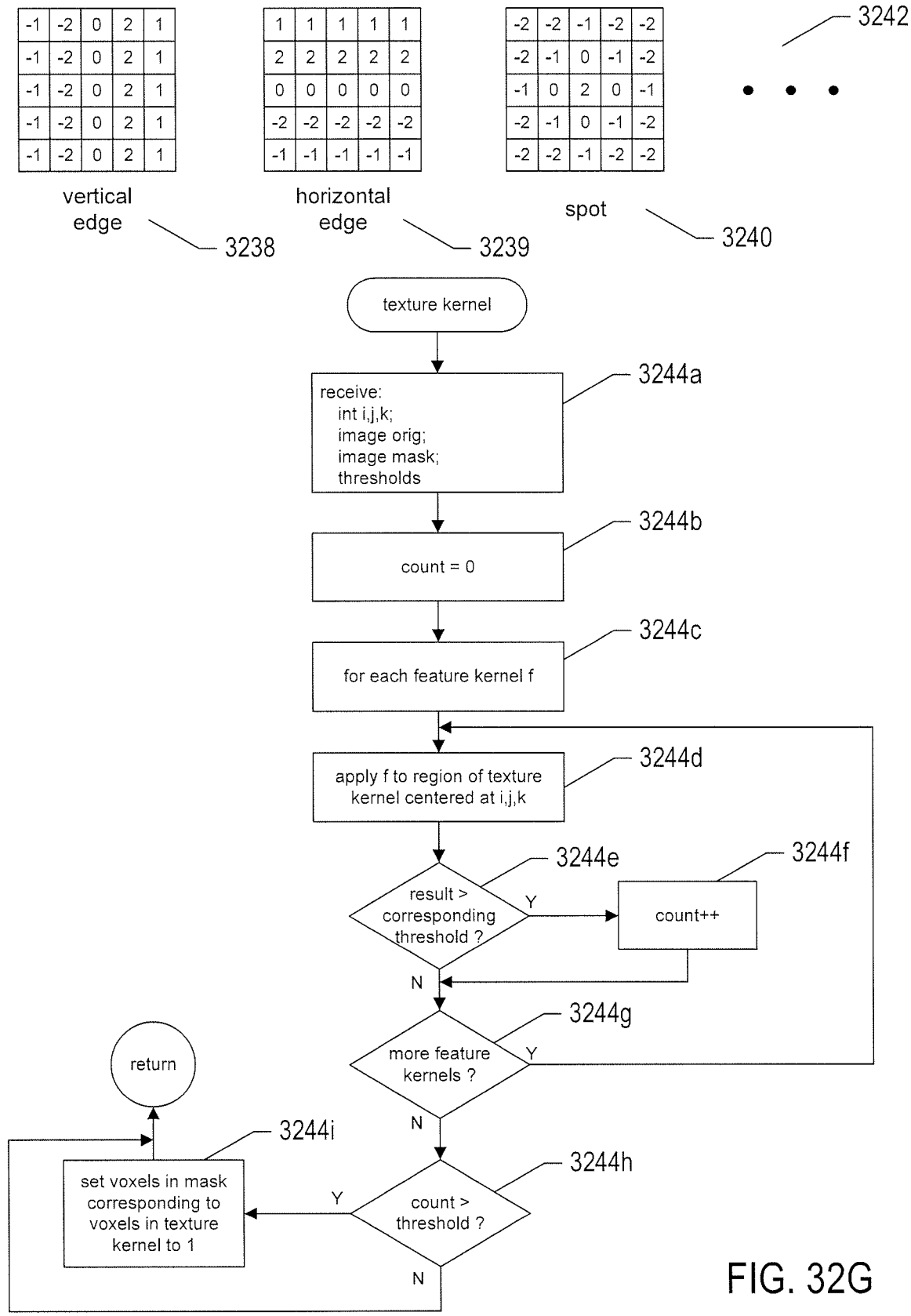

FIG. 32G provides a control-flow diagram for the function associated with the texture kernel. In fact, the texture kernel is a set of three-dimensional feature kernels, for three-dimensional images, analogous to the two-dimensional feature kernels 3238-3240 and additional, similar kernels, as indicated by ellipsis 3242. The feature kernels are commonly used to identify edges, high-intensity or low-intensity peaks or spots, and other such local intensity features within an image. The feature kernels include values that are multiplied by the intensity values of the corresponding image voxels and added together to produce a single result value. The texture kernel comprises essentially application of a set of feature kernels and a count of the number of the applied texture kernels that produce values greater than corresponding threshold values. When that count exceeds a threshold value, the kernel voxels are considered to be non-noise voxels, and corresponding voxels in the texture mask are set to 1. In step 3244a, the texture-kernel function "texture kernel" receives, as arguments, indices i, j, and k for a voxel, the reference to the original image orig, a reference to a texture mask mask, and threshold values for each of the feature kernels. In step 3244b, the local variable count is set to 0. In the for-loop of steps 3244c-3244g, each feature kernel $f$ is applied, in step 3244d, to the original-image voxel with indices i, j, and k. When application of the feature kernel $f$ produces a value greater than a corresponding threshold, as determined in step 3244e, the local variable count is incremented in step 3244f. Following completion of the for-loop of steps 3244c-3244g, when the local variable count has a value greater than a threshold value, as determined in step 3244h, the voxels of the texture mask corresponding to the voxels of the texture kernel are set to the value 1.

Figure 32H:
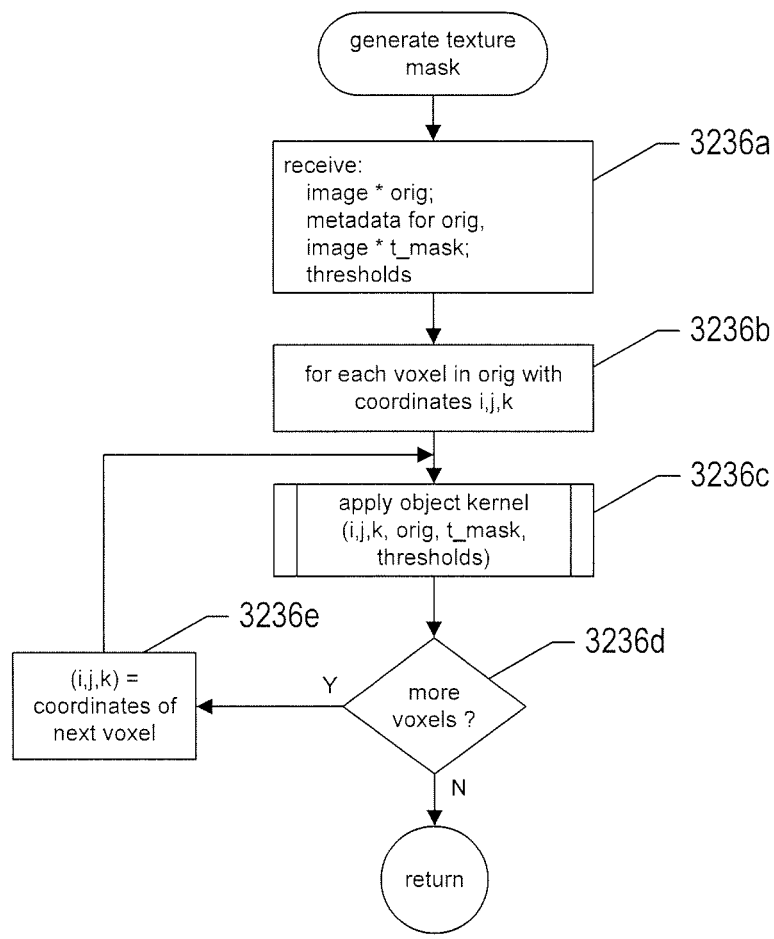

FIG. 32H provides a control-flow diagram for the routine "generate texture mask," called in step 3214g of FIG. 32B. The routine "generate texture mask" applies the texture kernel to each voxel in the original image, with the results stored in the image t_mask. In step 3246a, the routine "generate texture mask" receives a reference to the original image, orig, metadata for the original image, a reference to the texture mask, t_mask, and thresholds for the feature kernels and for the aggregate count of feature kernels returning a positive result. In the for-loop of steps 3246b-3246e, the texture kernel is applied to every voxel in the original image.

Figure 32I:
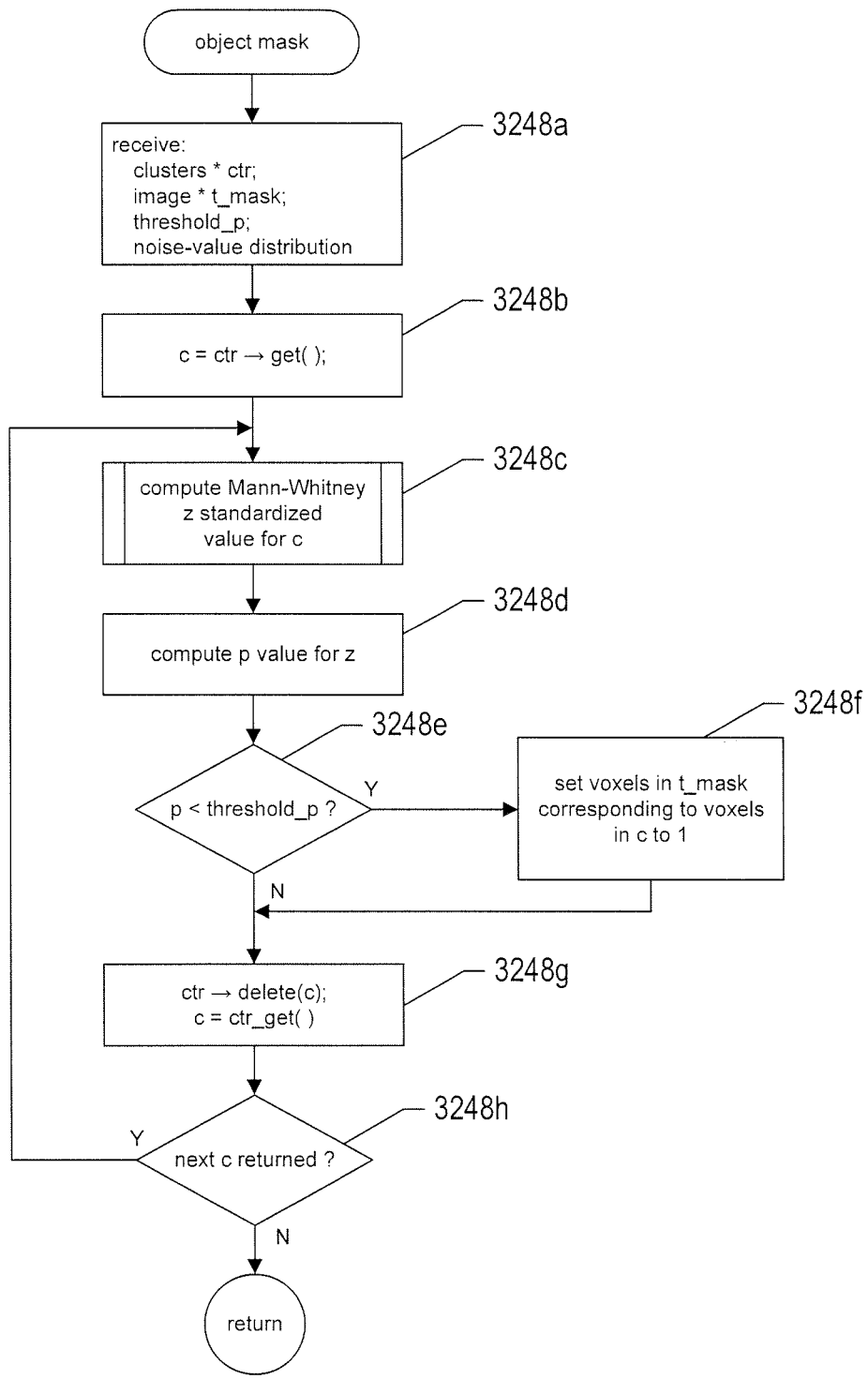

FIG. 32I provides a control-flow diagram for the routine "object mask," called in step 3214h of FIG. 32B. The routine "object mask" processes the clusters stored in the cluster container referenced by the pointer ctr. In step 3248a, the routine "object mask" receives a reference to the cluster container ctr, a reference to the texture mask, t_mask, and the threshold threshold_p and the noise-value distribution determined in step 3214e of FIG. 32B. In the for-loop of steps 3248b-3248h, each cluster contained in the cluster container is processed. In step 3248c, the routine "object mask" calls a routine to compute a Mann-Whitney z standardized value for the intensities in the currently considered cluster with respect to the noise-value distribution. In step 3248d, a p value is computed from the Mann-Whitney z standardized value, using a table of values. When the p value is less than the threshold threshold_p, as determined in step 3848e, the values of the voxels in the mask t_mask corresponding to the voxels of the currently considered cluster are set to 1, in step 3248f. The currently considered cluster is deleted from the container and a new cluster fetched from the container in step 3248g.

Sequential Imaging

Figure 33A:
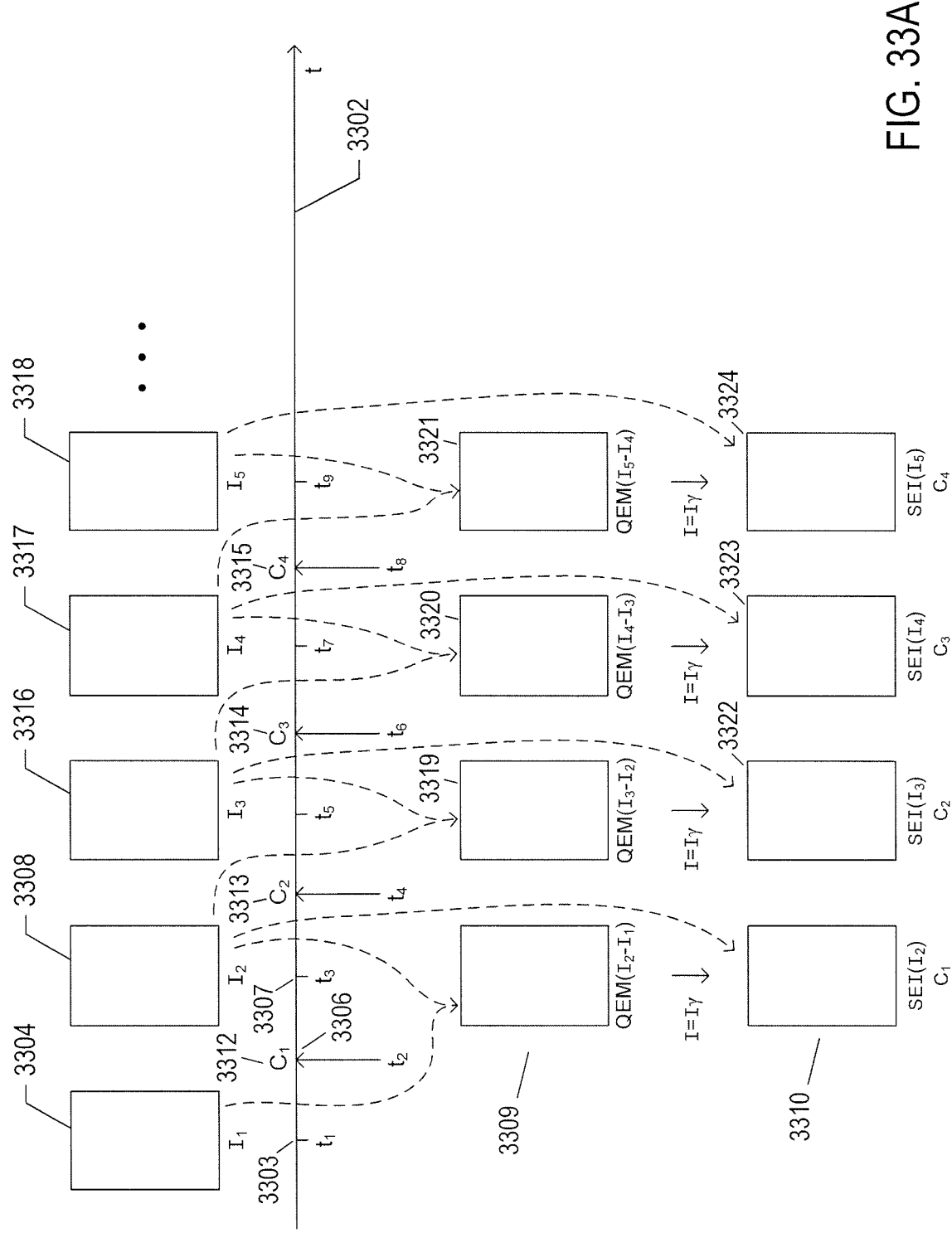
FIGS. 33A-C illustrate use of the above-discussed quantitative-enhancement and synthetic-enhancement methods during sequential imaging.
Figure 33B:
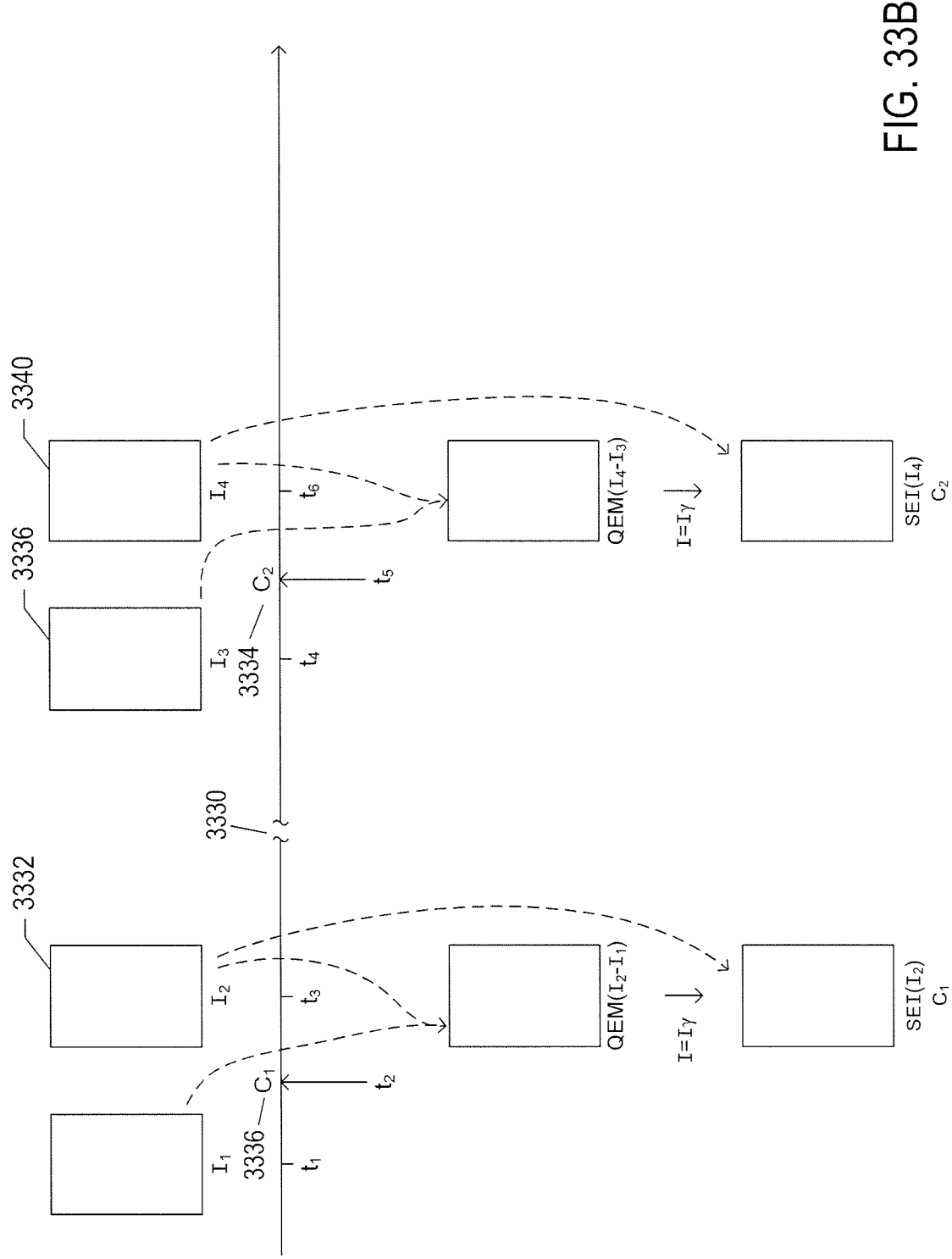
Figure 33C:
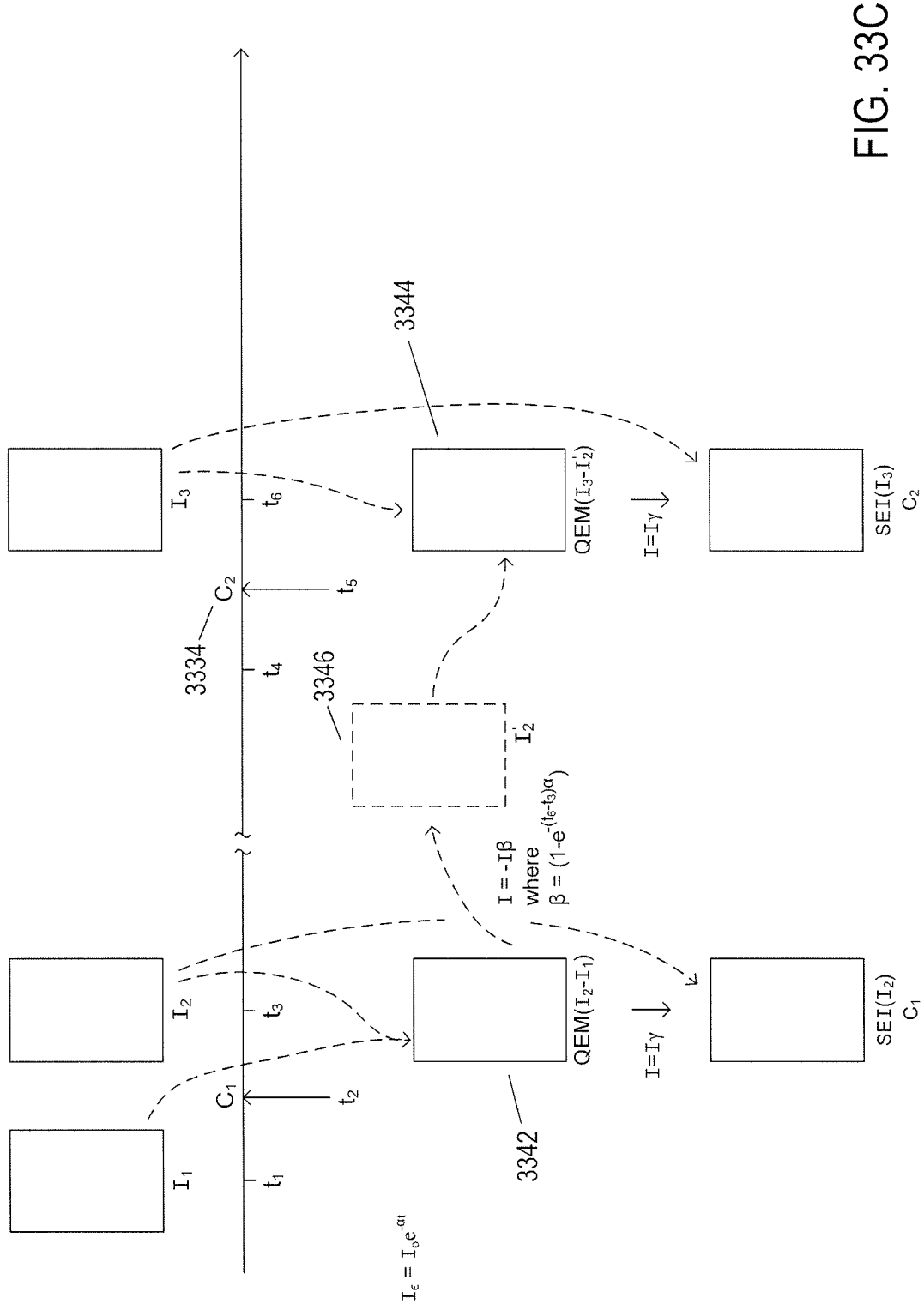

FIGS. 33A-C illustrate use of the above-discussed quantitative-enhancement and synthetic-enhancement methods during sequential imaging. There are many imaging procedures that involve sequences of imaging steps. One example is the separate introduction of multiple different contrast agents over a period of time in order to enhance different physiological features or sets of physiological features that each respond to the different contrast agents. More generally, a sequence of images may be acquired in order to detect differences due to induced or naturally occurring changed to the imaged subject matter over time.

FIG. 33A illustrates one generalized example of sequential imaging. A horizontal timeline 3302 visually organizes a series of imaging and change-inducing steps with respect to time. At time $t_1$ 3303, a first image $I_1$ 3304 is acquired. At time $t_2$ 3306, a change-inducing event $C_1$ occurs, such as introduction of a contrast agent into the imaged portion of a patient. At time $t_3$ 3307, a second image $I_2$ 3308 is acquired. As discussed above, a quantitative-enhancement map ("QEM") 3309 can be generated from the registered and normalized image pair $I_1/I_2$ in order to recover the differences between image $I_2$ and image $I_1$ which, when the time interval $t_1$-$t_3$ it is relatively short, can often be assumed to arise from, or to be related to, the change-inducing event $C_1$. As also discussed above, the QEM 3309 and second image $I_2$ can be used to generate a synthetically enhanced image ("SEI") 3310 in which those features arising from the change-inducing event $C_1$ visually stand out in the context of the imaged subject matter. In the case of sequential introduction of different contrast agents followed by image acquisition, one example of a series of change-inducing events $C_1$ 3312, $C_2$ 3313, $C_3$ 3314, and $C_4$ 3315 at times $t_1$, $t_2$, $t_3$, and $t_4$ in the example shown in FIG. 33A, each image in the series of images $I_1$ 3304, $I_2$ 3308, $I_3$ 3316, $I_4$ 3317, $I_5$ 3318 may reflect changes induced by all of the change-inducing events prior to acquisition of the image. For example, if each event in the series of change-inducing events $C_1$, $C_2$, $C_3$, $C_4$ represents introduction of a different contrast agent, and when the half-life of the contrast agents within the patient is comparable to, or longer than, the time intervals between image acquisitions, then image $I_5$ may show cumulative changes due to all of the preceding contrast-agent introductions over the course of the series of change-inducing events $C_1$, $C_2$, $C_3$, $C_4$. As a result, it may be exceedingly difficult for a diagnostician to differentiate changes and features in the set of successive images related to introduction of particular contrast agents. However, when successive QEMs 3309, 3319, 3320, and 3321 are generated and stored for each acquired image following acquisition of image $I_1$, each of the successive QEMs may represent differences or features due to the preceding change-inducing event. For example, QEM 3321 may represent features and changes between images $I_5$ and $I_4$ due entirely or largely to the change-inducing event $C_4$, since the cumulative changes and features due to the preceding change-inducing events $C_1$, $C_2$, $C_3$ are common to both images $I_5$ and $I_4$ and are therefore removed in the difference operation used to generate QEM 3321. The series of QEMs can also be used, along with one of the images used to produce each of the QEMs, to generate corresponding SEIs 3322-3324 to facilitate analysis of the changes and features resulting from each change-inducing event $C_1$, $C_2$, $C_3$, $C_4$. The ability to clearly delineate changes and features due to each of a series of change-inducing events is made possible by QEMS generated and stored for each successive pair of images that span a change-inducing event. In the case of sequential introduction of multiple different contrast agents, generation of SEIs may also vastly decrease the total amount of contrast agent introduced into a patient due to the ability to use much smaller amounts of contrast agent in order to achieve the same visual enhancement, as discussed above.

The generation and storage of successive QEMs over the course of acquisition of a sequence of images may not only provide for visualization of image changes and features resulting from individual change-inducing events, but may also reduce the total number of images that need to be acquired in order to visualize image changes and features resulting from individual change-inducing events. FIG. 33B illustrates a sequential-imaging example similar to that shown in FIG. 33A. However, in this example, there is a relatively lengthy gap in time 3330 between generation of image $I_2$ 3332 and the second change-inducing event $C_2$ 3334. In this case, the practitioner may choose to acquire an additional image $I_3$ 3336 prior to the second change-inducing event $C_2$ 3334 because the effects of the first change-inducing event $C_1$ 3336 may have diminished during the time gap 3330, as a result of which a QEM generated from the image pair $I_4$ 3340/$I_2$ 3332 would not only include image changes and features due to the change-inducing event $C_2$ 3334, but would also include image changes and features due to the different magnitudes of the image changes and features due to image-changing event $C_1$ 3336 in images $I_2$ and $I_4$. A diagnostician or other practitioner might not be able to distinguish the two different types of changes and features.

As shown in FIG. 33C, the QEM 3342 generated from images $I_2$ and $I_1$ can be used, along with information about the time-dependent diminishing of intensity of the image changes and features due to change-inducing event $C_1$, to generate QEM 3344, which accurately reflects image changes and features due to change-inducing event $C_2$ 3334 only, without the need for the additional image $I_3$ 3336 shown in FIG. 33B. In the example shown in FIG. 33C, it is known that the time-dependent intensity of image changes and features due to the change-inducing event $C_1$ can be expressed as:

$$I_t = I_0 e^{-\alpha t}.$$

Therefore, multiplying the intensities in QEM 3342 by $-\beta$, where $\beta=(1-e^{-\alpha(t_6-t_3)})$, and adding this modified QEM to image $I_2$ produces an image $I'_2$ 3346 that, when used instead of image $I_2$ to generate QEM 3344, produces a QEM 3344 that shows image changes and features rising only or largely from change-inducing event 3334. Alternatively, an expression for the time-dependent intensity of image changes and features due to the change-inducing event $C_1$ may be determined, in certain cases, from comparing images $I_4$ and $I_2$ and then modifying image $I_4$ in order to generate QEM 3344. This is but one example of many different possible additional benefits, in addition to those discussed above with reference to FIG. 33A, that can be obtained by generating QEMs for successive pairs of images during sequential-imaging processes.

Image Display

Figure 34A:
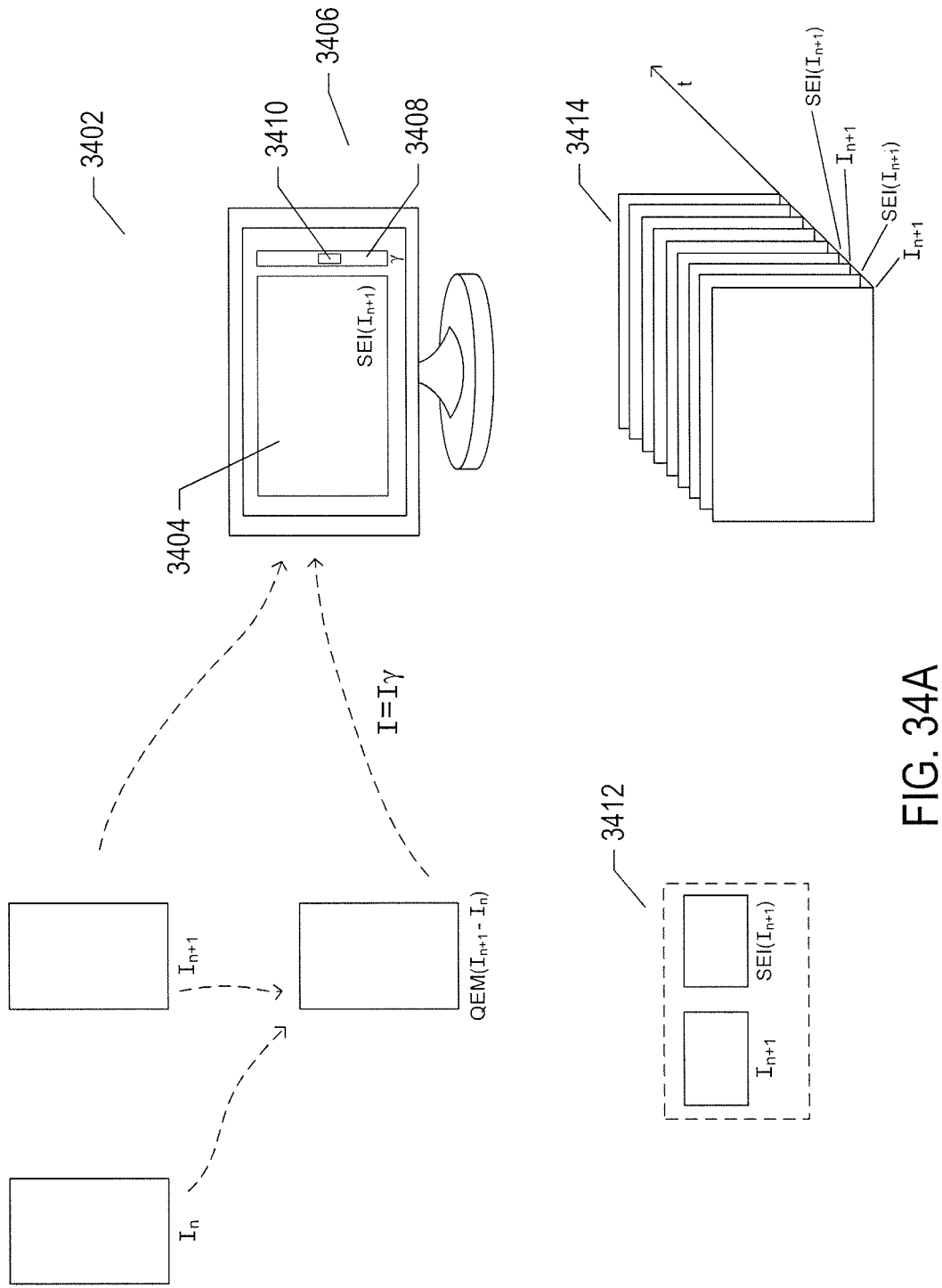
FIGS. 34A-B illustrate various different image-display methods enabled by the quantitative-enhancement and synthetic-enhancement methods discussed above.
Figure 34B:
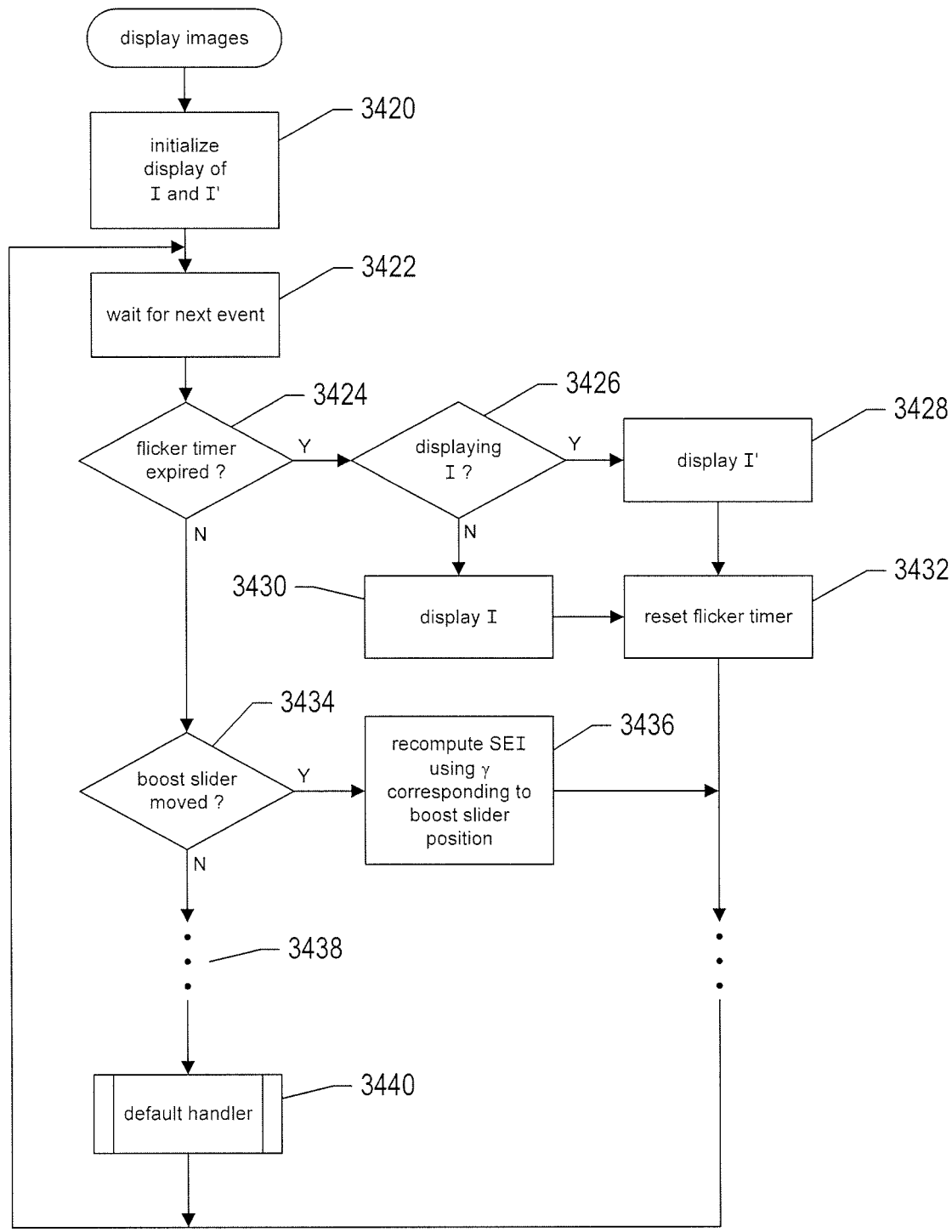

FIGS. 34A-B illustrate various different image-display methods enabled by the quantitative-enhancement and synthetic-enhancement methods discussed above. First, as shown in the upper portion of FIG. 34A 3402, the degree of enhancement in an SEI, $\gamma$, may be a selectable parameter during display of an SEI 3404 on a display device 3406. In this example, a vertical scroll bar 3408 is displayed to allow a user to alter the degree of enhancement $\gamma$, with repositioning of the indicator 3410 within the scroll bar 3408 resulting in a recomputation and redisplay of the SEI using a different degree of enhancement $\gamma$ indicated by the new position of the indicator. Thus, synthetic enhancement may be controllable during display by a user. Second, display of images and QEM and SEIs derived from the images can employ static display of multiple images 3412 or rapid interleaving of the displays of two or more images 3414, a process referred to as "flicker," to allow viewers of the images to more readily visually detect enhanced features. In example 3412, an acquired image and an SEI generated for the acquired image are displayed side-by-side, to allow a reviewer to easily and rapidly compare the images in order to detect the enhanced changes and features. In example 3414, display of the acquired image is rapidly interleaved with display of the SEI generated for the acquired image, which draws a viewer's attention to enhanced changes and features in the SEI. Any of various different pairs of images selected from acquired images, QEMs, and SEIs may be used in these display techniques.

FIG. 34B provides an abbreviated control-flow-diagram-based illustration of the display methods illustrated in FIG. 34A. In step 3420, display of two images is initialized. Then, the display routine waits, in step 3422, for a next event. When the next event is expiration of a flicker timer, as determined in step 3424, then, in step 3426, the routine determines whether or not the first of the two images is currently being displayed. If so, display is switched to display the second of the two images in step 3428. Otherwise, display is switch to display the first the two images, and step 3430. In step 3432, the flicker timer is reset. When the next event is a degree-of-enhancement-slider-moved event, as determined in step 3434, an SEI that is currently being displayed is recomputed using a new degree-of-enhancement factor $\gamma$ indicated by the current position of the degree-of-enhancement-slider and displayed to the display device, in step 3436. Ellipsis 3438 indicates that many other types of events may be handled in the event loop shown in FIG. 34B, including events for altering the displayed to display both images simultaneously, selecting alternative images for display, and many other types of display-related events. A default handler 3440 handles rare and unexpected events.

Although the present invention has been described in terms of particular embodiments, it is not intended that the invention be limited to these embodiments. Modifications within the spirit of the invention will be apparent to those skilled in the art. For example, any of many different implementations may be generated by modifying any of many different implementation and design parameters, including selection of hardware and computing platforms, programming languages, modular organization, control structures, data structures, and other such implementation and design parameters. As discussed above, many different optimization methods may be used for optimizing model parameters for registration and normalization models. The currently disclosed methods can be applied to two-dimensional and three-dimensional images.

It is appreciated that the previous description of the disclosed embodiments is provided to enable any person skilled in the art to make or use the present disclosure. Various modifications to these embodiments will be readily apparent to those skilled in the art, and the generic principles defined herein may be applied to other embodiments without departing from the spirit or scope of the disclosure. Thus, the present disclosure is not intended to be limited to the embodiments shown herein but is to be accorded the widest scope consistent with the principles and novel features disclosed herein.

The invention claimed is:

1. A method for processing images comprising:
receiving a pair of images;
registering the pair of images to generate a pair of registered images;
normalizing the pair of registered images using a histogram-based normalization process to generate a pair of normalized images; and
employing the pair of normalized images to generate a quantitative-enhancement map.

2. The method of claim 1
wherein each image of the pair of images is a digitally-encoded image comprising multiple image elements;
wherein each image element includes an encoded value representing an intensity;
wherein each image element is indexable with respect to a coordinate system;
wherein each image element is associated with multiple indices; and
wherein the multiple indices associated with an image element specify a position of the image element within the image.

3. The method of claim 2 wherein each image is one of:
a two-dimensional image that includes, as image elements, pixels; and
a three-dimensional image that includes, as image elements, voxels.

4. The method of claim 2 wherein registering the pair of images to generate a pair of registered images further comprises:
selecting one image from the pair of images as a reference image and the other image from the pair of images as a subject image;
selecting an alignment metric that returns a numerical indication of how well the images of the pair of images are aligned;
optimizing, with respect to the alignment metric, a number of numerical parameters that include a first set of parameters corresponding to elements of a transformation matrix and that may include a second set of parameters related to a starting point for application of the one or more transformations represented by the transformation matrix to the subject image;
using the second set of parameters to obtain the starting point; and
applying the transformation matrix corresponding to the optimized first set of parameters to align the subject image to the reference image in order to generate the pair of registered images.

5. The method of claim 4 wherein the alignment metric is one of:
a computed mutual-information;
a correlation coefficient;
a sum of squared intensity differences; and
a sum of squared relative intensity differences.

6. The method of claim 4 wherein optimizing, with respect to the alignment metric, a number of numerical parameters that include a first set of parameters corresponding to elements of a transformation matrix and that may include a second set of parameters related to a starting point for application of the one or more transformations represented by the transformation matrix to the subject image further comprises:
iteratively optimizing the number of numerical parameters, starting at a low resolution and proceeding to a desired resolution, using the optimized parameters obtained by a preceding optimization as the starting point for a next-highest-resolution optimization.

7. The method of claim 4 wherein normalizing the pair of registered images using a histogram-based normalization process to generate a pair of normalized images further comprises:
selecting one image of the pair of registered images as a first image and the other image of the pair of registered images as a second image;
determining
for each different intensity value encoded within the image elements of the first image, a distribution of intensities of image elements in the second image corresponding to image elements in the first image with the intensity value, and
for each different intensity value encoded within the image elements of the second image, a distribution of intensities of image elements in the first image corresponding to image elements in the second image with the intensity value;
using the distributions of intensities to generate a mapping function; and
generating the normalized pair of images from the registered pair of images by using the mapping function to map the intensities of the first image to normalized intensities or to map the intensities of the second image to normalized intensities.

8. The method of claim 7 wherein using the distributions of intensities to generate a mapping function further comprises:
selecting a parametrized mapping function and initial parameter values for the parametrized mapping function; and optimizing values of the parameters of the selected mapping function with respect to a normalization metric to generate the mapping function.

9. The method of claim 8 wherein the normalization metric is computed for a pair of images by:
for each different intensity value in a first image of the pair of images,
computing a sum of products, each product obtained by multiplying a number of image elements in the second image of the pair of images having a particular intensity value and corresponding to the intensity value in the first image by a difference between the particular intensity and a value returned by the mapping function for the intensity value in the first image; and
summing the computed sums of products.

10. The method of claim 7 wherein using the distributions of intensities to generate a mapping function further comprises:
arranging the distributions within a two-dimensional histogram, each row in the two-dimensional histogram comprising a one-dimensional distribution of intensities of image elements within a second image of the registered pair of images corresponding to a particular intensity value encoded in one or more image elements of a first image of the registered pair of images and each column in the two-dimensional histogram comprising a one-dimensional distribution of intensities of image elements within the first image of the registered pair of images corresponding to a particular intensity value encoded in one or more image elements of the second image of the registered pair of images;
determining an initial number R of control points;
selecting R cells of the two-dimensional histogram as control points of a segmented curve in which the control points are connected by straight lines;
optimizing, under a set of constraints, the number of control points and positions of the control points within the two-dimensional histogram with respect to a fitness metric; and
using the segmented curve corresponding to the optimized control points as the mapping function.

11. The method of claim 10 wherein the set of constraints includes:
two control points cannot correspond to a single cell of the two-dimensional histogram; and
for each pair of neighboring control points along a unidirectional traversal of the segmented curve, the second control point of the pair of neighboring control points lies within a particular quadrant of a coordinate system, centered at the first control point of the pair of neighboring control points and having axes parallel to the rows and columns of the two-dimensional histogram.

12. The method of claim 10 wherein the fitness function is an aggregate intensity of the bins traversed by the edges of the segmented curve divided by the length of the segmented curve.

13. The method of claim 1 wherein employing the pair of normalized images to generate a quantitative-enhancement map further comprises:
allocating a data structure to contain image elements of the quantitative-enhancement map; and
generating an intensity value for each image element of the quantitative-enhancement map by
for each image element of the quantitative-enhancement map
computing a difference between the intensity values encoded in the corresponding elements of each image of the pair of normalized images, and
encoding the computed difference in the image element of the quantitative-enhancement map.

14. The method of claim 1 further including:
generating, from the quantitative-enhancement map and an image of the pair of images, a synthetically enhanced image by
allocating a data structure to contain image elements of the synthetically enhanced image; and
generating an intensity value for each image element of the synthetically enhanced image by
for each image element of the synthetically enhanced image
computing a sum of the intensity value encoded in the corresponding element of the image and the product of the intensity value encoded in the corresponding element of the quantitative-enhancement map and an enhancement factor, and
encoding the computed sum in the image element of the synthetically enhanced image.

15. A system that processes images, the system comprising:
one or more processors;
one or more memories;
one or more mass-storage devices; and
computer instructions, stored in one or more of the one or more memories that, when executed by one or more of the one or more processors, control the system to
receive a pair of images;
register the pair of images to generate a pair of registered images;
normalize the pair of registered images using a histogram-based normalization process to generate a pair of normalized images; and
employ the pair of normalized images to generate a quantitative-enhancement map.

16. The system of claim 15
wherein each image of the pair of images is a digitally-encoded image comprising multiple image elements;
wherein each image element includes an encoded value representing an intensity;
wherein each image element is indexable with respect to a coordinate system;
wherein each image element is associated with multiple indices; and
wherein the multiple indices associated with an image element specify a position of the image element within the image.

17. The system of claim 16 wherein the system registers the pair of images to generate a pair of registered images by:
selecting one image from the pair of images as a reference image and the other image from the pair of images as a subject image;
selecting an alignment metric that returns a numerical indication of how well the images of the pair of images are aligned;
optimizing, with respect to the alignment metric, a number of numerical parameters that include a first set of parameters corresponding to elements of a transformation matrix and that may include a second set of parameters related to a starting point for application of the one or more transformations represented by the transformation matrix to the subject image;
using the second set of parameters to obtain the starting point; and applying the transformation matrix corresponding to the optimized first set of parameters to align the subject image to the reference image in order to generate the pair of registered images.

18. The system of claim 17 wherein the system normalizes the pair of registered images using a histogram-based normalization process to generate a pair of normalized images by:
- selecting one image of the pair of registered images as a first image and the other image of the pair of registered images as a second image;
- determining
  - for each different intensity value encoded within the image elements of the first image, a distribution of intensities of image elements in the second image corresponding to image elements in the first image with the intensity value, and
  - for each different intensity value encoded within the image elements of the second image, a distribution of intensities of image elements in the first image corresponding to image elements in the second image with the intensity value;
- using the distributions of intensities to generate a mapping function; and
- generating the normalized pair of images from the registered pair of images by using the mapping function to map the intensities of the first image to normalized intensities or to map the intensities of the second image to normalized intensities.

19. The system of claim 15 wherein the system employs the pair of normalized images to generate a quantitative-enhancement map by:
- allocating a data structure to contain image elements of the quantitative-enhancement map; and
- generating an intensity value for each image element of the quantitative-enhancement map by
  - for each image element of the quantitative-enhancement map
    - computing a difference between the intensity values encoded in the corresponding elements of each image of the pair of normalized images, and
    - encoding the computed difference in the image element of the quantitative-enhancement map.

20. A physical data-storage device encoded with computer instructions that, when executed by one or more processors of a system having one or more processors, one or more memories, and one or more mass-storage devices, control the system to:
- receive a pair of images;
- register the pair of images to generate a pair of registered images;
- normalize the pair of registered images using a histogram-based normalization process to generate a pair of normalized images; and
- employ the pair of normalized images to generate a quantitative-enhancement map.

* * * * *